(12) United States Patent
Jiang

(10) Patent No.: US 8,238,905 B2
(45) Date of Patent: Aug. 7, 2012

(54) PREDICTIVE INTELLIGENCE

(75) Inventor: John Yue Jun Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 780 days.

(21) Appl. No.: 12/219,622

(22) Filed: Jul. 24, 2008

(65) Prior Publication Data

US 2009/0061860 A1 Mar. 5, 2009

Related U.S. Application Data

(63) Continuation-in-part of application No. 10/635,804, filed on Aug. 5, 2003, now Pat. No. 7,072,651, and a continuation-in-part of application No. 11/374,437, filed on Mar. 14, 2006, now Pat. No. 7,684,793, and a continuation-in-part of application No. 11/374,427, filed on Mar. 14, 2006, now Pat. No. 7,590,417, and a continuation-in-part of application No. 11/402,128, filed on Apr. 12, 2006, now Pat. No. 7,929,953, and a continuation-in-part of application No. 11/375,577, filed on Mar. 15, 2006, now abandoned, and a continuation-in-part of application No. 11/366,021, filed on Mar. 2, 2006, now Pat. No. 7,660,580, said application No. 12/219,622 is a continuation-in-part of application No. 11/366,017, filed on Mar. 2, 2006, now Pat. No. 7,742,763, said application No. 12/219,622 is a continuation-in-part of application No. 12/153,453, filed on May 19, 2008.

(60) Provisional application No. 60/935,053, filed on Jul. 24, 2007, provisional application No. 60/935,223, filed on Aug. 1, 2007, provisional application No. 60/658,258, filed on Mar. 2, 2005, provisional application No. 60/657,798, filed on Mar. 2, 2005, provisional application No. 60/924,525, filed on May 18, 2007.

(51) Int. Cl.
*H04W 4/00* (2009.01)

(52) U.S. Cl. ............ 455/432.1; 455/432.2; 455/432.3; 455/435.1

(58) Field of Classification Search .............. 455/418, 455/419, 432.1–432.3, 433, 435.1–435.3, 455/436–444
See application file for complete search history.

(56) References Cited

U.S. PATENT DOCUMENTS 5,353,328 A  10/1994  Jokimies
(Continued)

FOREIGN PATENT DOCUMENTS

CA  2281041 A1  2/2001
(Continued)

OTHER PUBLICATIONS

GSM 378 on CAMEL Digital Cellular telecommunications system (Phase 2+);Customized Applications for Mobile network Enhanced Logic (CAMEL) Phase 2; Stage 2 (GSM 03.78 version 7.2.0 Release 1998).
(Continued)

*Primary Examiner* — Wayne Cai
(74) *Attorney, Agent, or Firm* — Arent Fox LLP

(57) ABSTRACT

The present invention provides a method for facilitating roaming tests for a host network. The method includes creating a fake profile via a gateway associated with the host network for a roaming subscriber at a Mobile Switching Center (MSC)/Visiting Location Register (VLR). The MSC/VLR is associated with at least one of the host network and a roaming partner network of the host network. The roaming subscriber is associated with both the host network and the roaming partner network. The method further includes simulating via the gateway, transactions with a first network element associated with at least one of the host network and the roaming partner network to test at least one of the first network element's response for the simulated transactions, and network routing on the roaming subscriber to a second network element associated with at least one of the host network and the roaming partner network.

33 Claims, 63 Drawing Sheets

U.S. PATENT DOCUMENTS

| | | | |
|---|---|---|---|
| 5,586,166 A | 12/1996 | Turban |
| 5,742,910 A | 4/1998 | Gallant et al. |
| 5,764,730 A | 6/1998 | Rabe et al. |
| 5,818,824 A | 10/1998 | Lu et al. |
| 5,854,982 A | 12/1998 | Chambers et al. |
| 5,901,359 A | 5/1999 | Malmstrom |
| 5,903,832 A | 5/1999 | Seppanen et al. |
| 5,930,701 A | 7/1999 | Skog |
| 5,940,490 A | 8/1999 | Foster et al. |
| 5,943,620 A | 8/1999 | Boltz et al. |
| 5,953,653 A | 9/1999 | Josenhans et al. |
| 5,987,318 A | 11/1999 | Alperovich et al. |
| 5,987,323 A | 11/1999 | Huotori |
| 5,987,325 A | 11/1999 | Tayloe |
| 6,014,561 A | 1/2000 | Mölne |
| 6,052,604 A | 4/2000 | Bishop et al. |
| 6,058,309 A | 5/2000 | Huang et al. |
| 6,075,855 A | 6/2000 | Christiansen et al. |
| 6,085,084 A | 7/2000 | Christmas |
| 6,138,005 A | 10/2000 | Park |
| 6,138,009 A | 10/2000 | Birgerson |
| 6,148,197 A | 11/2000 | Bridges et al. |
| 6,163,701 A | 12/2000 | Saleh et al. |
| 6,185,295 B1 | 2/2001 | Frederiksen et al. |
| 6,185,436 B1 | 2/2001 | Vu |
| 6,192,255 B1 | 2/2001 | Lewis et al. |
| 6,195,532 B1 | 2/2001 | Bamburak et al. |
| 6,208,864 B1 | 3/2001 | Agrawal et al. |
| 6,212,372 B1 | 4/2001 | Julin |
| 6,356,755 B1 | 3/2002 | Valentine et al. |
| 6,356,756 B1 | 3/2002 | Koster |
| 6,456,845 B1 | 9/2002 | Drum et al. |
| 6,456,859 B1 | 9/2002 | Desblancs et al. |
| 6,463,298 B1 | 10/2002 | Sorenson et al. |
| 6,466,786 B1 | 10/2002 | Wallenius |
| 6,505,050 B1 | 1/2003 | Brudos et al. |
| 6,515,974 B1 | 2/2003 | Inoue et al. |
| 6,574,481 B1 | 6/2003 | Rathnasapathy et al. |
| 6,603,761 B1 | 8/2003 | Wang et al. |
| 6,603,968 B2 | 8/2003 | Anvekar et al. |
| 6,611,516 B1 | 8/2003 | Pirkola et al. |
| 6,628,934 B2 | 9/2003 | Rosenberg et al. |
| 6,636,502 B1 | 10/2003 | Lager et al. |
| 6,671,523 B1 | 12/2003 | Niepel et al. |
| 6,684,073 B1 | 1/2004 | Joss et al. |
| 6,693,586 B1 | 2/2004 | Walters et al. |
| 6,738,622 B1 | 5/2004 | Stadelmann et al. |
| 6,738,636 B2 | 5/2004 | Lielbridis |
| 6,764,003 B1 | 7/2004 | Martschitsch et al. |
| 6,782,264 B2 | 8/2004 | Anderson |
| 6,795,444 B1 | 9/2004 | Vo et al. |
| 6,856,818 B1 | 2/2005 | Ford |
| 6,876,860 B1 | 4/2005 | Berg et al. |
| 6,920,487 B2 | 7/2005 | Sofer et al. |
| 6,925,299 B1 | 8/2005 | Sofer et al. |
| 6,961,559 B1 | 11/2005 | Chow et al. |
| 6,963,543 B2 | 11/2005 | Diep et al. |
| 6,968,383 B1 | 11/2005 | Heutschi et al. |
| 6,975,852 B1 | 12/2005 | Sofer et al. |
| 6,978,156 B1 | 12/2005 | Papadopoulos et al. |
| 7,020,479 B2 | 3/2006 | Martschitsch |
| 7,072,651 B2 | 7/2006 | Jiang et al. |
| 7,139,570 B2 | 11/2006 | Elkarat et al. |
| 7,184,764 B2 | 2/2007 | Raviv et al. |
| 7,231,431 B2 | 6/2007 | Sofer et al. |
| 7,590,417 B2 | 9/2009 | Jiang |
| 7,684,793 B2 | 3/2010 | Jiang |
| 7,929,953 B2 | 4/2011 | Jiang |
| 2002/0009199 A1 | 1/2002 | Ala-Laurila et al. |
| 2002/0012351 A1 | 1/2002 | Sofer et al. |
| 2002/0037708 A1 | 3/2002 | McCann et al. |
| 2002/0049065 A1 | 4/2002 | Wallenius |
| 2002/0087631 A1 | 7/2002 | Sharma |
| 2002/0101858 A1 | 8/2002 | Stuart et al. |
| 2002/0101859 A1 | 8/2002 | Maclean |
| 2002/0160763 A1 | 10/2002 | Mittal et al. |
| 2002/0187701 A1 | 12/2002 | Healey |
| 2002/0191575 A1 | 12/2002 | Kalavade et al. |
| 2002/0196775 A1 | 12/2002 | Tuohino et al. |
| 2003/0017843 A1 | 1/2003 | Noblins |
| 2003/0050047 A1 | 3/2003 | Ala-Luukko |
| 2003/0051041 A1 | 3/2003 | Kalavade et al. |
| 2003/0064723 A1 | 4/2003 | Thakker |
| 2003/0069922 A1 | 4/2003 | Arunachalam |
| 2003/0129991 A1 | 7/2003 | Allison et al. |
| 2003/0133421 A1 | 7/2003 | Sundar et al. |
| 2003/0139180 A1 | 7/2003 | McIntosh et al. |
| 2003/0208560 A1 | 11/2003 | Inoue |
| 2003/0224795 A1 | 12/2003 | Wilhoite et al. |
| 2003/0229791 A1 | 12/2003 | De Jong |
| 2004/0019539 A1 | 1/2004 | Raman et al. |
| 2004/0053610 A1 | 3/2004 | Kim |
| 2004/0067781 A1 | 4/2004 | Grech et al. |
| 2004/0082346 A1 | 4/2004 | Skytt et al. |
| 2004/0087305 A1 | 5/2004 | Jiang |
| 2004/0120552 A1 | 6/2004 | Borngraber et al. |
| 2004/0131023 A1 | 7/2004 | Auterinen |
| 2004/0132449 A1 | 7/2004 | Kowarsch |
| 2004/0148400 A1 | 7/2004 | Mostafa |
| 2004/0152463 A1 | 8/2004 | Grootwassink |
| 2004/0196858 A1 | 10/2004 | Tsai et al. |
| 2004/0203750 A1 | 10/2004 | Cowdrey et al. |
| 2004/0224680 A1 | 11/2004 | Jiang |
| 2004/0229601 A1 | 11/2004 | Zabawskyj et al. |
| 2004/0236836 A1 | 11/2004 | Appelman |
| 2005/0003831 A1 | 1/2005 | Anderson |
| 2005/0021834 A1 | 1/2005 | Coulombe |
| 2005/0047378 A1 | 3/2005 | Wuschke et al. |
| 2005/0064883 A1 | 3/2005 | Heck et al. |
| 2005/0070278 A1 | 3/2005 | Jiang |
| 2005/0130654 A1* | 6/2005 | Di Claudio et al. .......... 455/433 |
| 2005/0186939 A1 | 8/2005 | Barnea et al. |
| 2005/0186960 A1 | 8/2005 | Jiang |
| 2005/0186979 A1 | 8/2005 | McCann et al. |
| 2005/0192007 A1 | 9/2005 | Kumar et al. |
| 2005/0192036 A1 | 9/2005 | Greenwood et al. |
| 2005/0215250 A1 | 9/2005 | Chava et al. |
| 2005/0232282 A1 | 10/2005 | Silver et al. |
| 2005/0250493 A1 | 11/2005 | Elkarat et al. |
| 2006/0003775 A1 | 1/2006 | Bull et al. |
| 2006/0009204 A1 | 1/2006 | Ophir |
| 2006/0025129 A1 | 2/2006 | Wolfman et al. |
| 2006/0052113 A1 | 3/2006 | Ophir et al. |
| 2006/0068778 A1 | 3/2006 | Della-Torre |
| 2006/0068786 A1 | 3/2006 | Florence |
| 2006/0079225 A1 | 4/2006 | Wolfman et al. |
| 2006/0079236 A1 | 4/2006 | Del Pino et al. |
| 2006/0089146 A1* | 4/2006 | Gazzard ....................... 455/445 |
| 2006/0148459 A1 | 7/2006 | Wolfman et al. |
| 2006/0205404 A1 | 9/2006 | Gonen et al. |
| 2006/0211420 A1 | 9/2006 | Ophir et al. |
| 2006/0252425 A1 | 11/2006 | Jiang |
| 2007/0021118 A1 | 1/2007 | Ophir et al. |
| 2007/0049269 A1 | 3/2007 | Ophir et al. |
| 2007/0054665 A1* | 3/2007 | Elkarat et al. ............. 455/432.1 |
| 2007/0072587 A1 | 3/2007 | Della-Torre |
| 2007/0178885 A1 | 8/2007 | Lev et al. |
| 2007/0232300 A1 | 10/2007 | Wolfman |
| 2007/0259663 A1 | 11/2007 | Weintraub et al. |
| 2008/0020760 A1 | 1/2008 | Elkarat et al. |
| 2008/0025295 A1 | 1/2008 | Elliott et al. |
| 2008/0293409 A1 | 11/2008 | Gillot et al. |
| 2009/0061854 A1 | 3/2009 | Gillot et al. |
| 2010/0240361 A1 | 9/2010 | Jiang |

FOREIGN PATENT DOCUMENTS

| | | |
|---|---|---|
| EP | 0899 974 A2 | 3/1999 |
| EP | 1389024 | 2/2004 |
| EP | 1622403 | 2/2006 |
| GB | 2322998 | 9/1998 |
| GB | 2424493 | 9/2006 |
| WO | WO 98/26621 A2 | 6/1998 |
| WO | WO 98/26626 A2 | 6/1998 |
| WO | WO 00/18156 A1 | 3/2000 |
| WO | WO 00/51375 A | 8/2000 |
| WO | WO 00/56085 | 9/2000 |
| WO | WO 00/79761 A | 12/2000 |

| | | |
|---|---|---|
| WO | WO 00/79825 A | 12/2000 |
| WO | WO 01/22750 | 3/2001 |
| WO | WO 01/65884 | 9/2001 |
| WO | WO 02/41641 A2 | 5/2002 |
| WO | WO 02/19667 | 7/2002 |
| WO | WO 03/019960 A1 | 3/2003 |
| WO | WO 03/043367 A | 5/2003 |
| WO | WO 03/065660 A | 8/2003 |
| WO | WO 2004/081802 | 9/2004 |
| WO | WO2004/075598 | 9/2005 |
| WO | WO2005/101857 | 10/2005 |
| WO | WO2008/012815 | 1/2008 |

OTHER PUBLICATIONS

3 GPP TS 29.010 V3.10.0 (Dec. 2002); Technical Specification; 3$^{rd}$ Generation Partnership Project; Technical Specification Group Core Network; Information element mapping between Mobile Station—Base Station System (MS-BSS) and Base Station System—Mobile-services Switching Centre (BSS—MSC); Signalling procedures and the Mobile Application Part (MAP) (Release 1999).
Q762 (General Functions of CCITT Signaling System No. 7 ISDN User Part Messages and parameters). 1999.
Q 763 (Formats and codes of CCITT Signaling System No. 7 ISDN User Part Message and parameters). 1999.
Q765 (Application Transport Mechanism, CCITT Signaling System No. 7 ISDN User Part) (May 1998).
Q766 (Performance Objectives in the Integrated Services Digital Network Application, CCITT Signaling System No. 7 ISDN User Part) (Mar. 1993).
Q769 (ITU-T—ISDN User Part Enhancements for the Support of Number Portability) (Dec. 1999).
Q1214, ITU-T Intelligent Network Distributed Functional Plane For Intelligent Network CS-1. 1995.
Q1215, ITU-T Physical Plane for Intelligent Network CS-1. 1995.
Q1218 ITU-T Interface Recommendation for Intelligent Network CS-1. 1995.
Q701, Specifications of Signalling System No. 7—Functional Description of the Message Transfer Part (MTP) of Signalling System No. 7. 1993.
Q702 ITU-T Specifications of Signalling System No. 7, Signalling Data Link. 1993.
Q703 ITU-T Specifications of Signalling System No. 7—Message Transfer Part. Signalling link. 1996.
Q704, Signalling network functions and messages. Specifications of Signalling System No. 7—Message Transfer Part. (Jul. 1996).
TD.35 NRTRDE Format for Fraud information, Jul. 2011.
FF.18 NRTRDE Business Requirements, Feb. 2010.
ETSI CS domain charging documents: TS 12.05, Jul. 1999.
ETSI CS domain charging documents: TS 32.005, Dec. 2003.
ETSI CS domain charging documents: TS 32.205, Mar. 2005.
ETSI CS domain charging documents: TS 32.298, Jun. 2011.
ETSI PS domain charging documents: TS 12.15, Dec. 2002.
ETSI PS domain charging documents: TS 32.015, Dec. 2003.
ETSI PS domain charging documents: TS 32.215, Jun. 2005.
ETS 300 374-1 Intelligent Network (IN); Intelligent Network Capability Set 1 (CS1); Core Intelligent Network Application Protocol (INAP); Part 1: Protocol specification, Sep. 1994.
EN 301 140-1 Intelligent Network (IN); Intelligent Network Application Protocol (INAP); Capability Set 2 (CS2); Part 1: Protocol specification, Jun. 1999.
John Yue Jun Jiang, U.S. Appl. No. 60/679,444, filed May 9, 2005.
GSM 03.79 on CAMEL Support of Optimal Routing (SOR), Jun. 2000.
GSM 318 Basic Call Handling, May 2000.
GSM 23018 Basic Call Handling, Jul. 2011.
GSM 23081 Line identification service, May 2011.
GSM 23116 Super Charger Function, Oct. 2011.
IR.21 GSM Association Roaming Database, Structure and Updating Procedures, Aug. 2003.
FF 17 International Revenue Share Fraud, Aug. 2005.
GSMA Official Document BA19: RAEX on AA.14 Business Requirements, Sep. 2006.
Digital cellular telecommunications system (Phase 2+); Specification of the SIM Application Toolkit for the Subscriber Identity Module—Mobile Equipment (SIM-ME) Interface (GSM 11,14 version 8.3.0 Release 1999) STSI TS 101 267 V8.3.0, XX, XX, Aug. 2000, pp. 1-69 and pp. 114-115 (XP-002222021).
"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5,4.0, Dec. 2002, pp. 1-207 (XP-014007573).
"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002, pp. 1-102 (XP-002298277).
Ala-Laurila, et al., "Wireless LAN Access Network Architecture for Mobile Operators," IEEE Communications Magazine, Nov. 2001, pp. 82-89 (XP-001107810).
Brunen, M. "Roaming im Zugangsnetz Mit OWLAN uberall zu Hause sein, "Net-Zeitschrift Fuer Kommunikationsmangement, Huthig Verlag, Heilderberg, 2002, pp. 39-42 (XP-001122438).
GSM Association Permanent Reference Document: IR.33, PRD IR.33 "GPRS Roaming Guidelines," version 3.2.0, Apr. 3, 2003, pp. 1-20 (XP-009998978).
Ostrowski, F., "Roaming und Handover zwischen UMTS und Funk-LA," NTZ (Nachrichtentechnische zeitschrift), 2002, pp. 24-26 (XP-001132263).
Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).
"Universal Mobile Telecommunications system (UMTS) NAS Functions Related to Mobile Station MS in Idle Mode" ETSI TS 123 122 V3.1.0, Jan. 2000, pp. 1-33.
"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.21, Jan. 2000, pp. 62-69 and 376.
Salman A. Baset et al., "An analysis of the Skype Peer-to-Peer Internet Telephony Protocol", Department of Computer Science, Sep. 15, 2004, 12 pages.
Salkintzis, et al., "WLAN-GPRS Integration for Next-Generation Mobile Data Networks," IEEE Wireless Communications, Oct. 2002, pp. 112-123 (XP-001132263).
Michael Mouly, "The GSM System for Mobile Communications", pp. 103-104. Cell and Sys, 1992.
GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).
GSM 978 on CAMEL Application protocol Digital cellular telecommunications system (Phase 2+); Customized Applications for Mobile network Enhanced Logic (CAMEL); Camel Application Part (CAP) specification (GSM 09.78 version 7.1.0 Release 1998).
GSM 902 on MAP Specification Digital Cellular Telecommunications (Phase 2+); Mobile Application Part (MAP) Specification (3GPP TS 09.02 version 7.9.0 Release 1998).
Q.761 (Functional description of the ISDN User Part of CCITT Signaling System No. 7).
Q762 (General Functions of CCITT Signaling System No. 7 ISDN User Part Messages and parameters).
Q 763 (Formats and codes of CCITT Signaling System No. 7 ISDN User Part Message and parameters).
Q 764 (1999), Signaling System No. 7—ISDN User Part signaling procedures.
Q. 765 (1998), Signaling system No. 7—Application transport mechanism.
Q. 766 (1993), Performance objectives in the integrated services digital network application.
Q. 769.1 (1999), Signaling system No. 7—ISDN user part enhancements for the support of Number Portability.
Q 711 (1996), Functional description of signaling connection control part.

Q 712 (1996), Definition and function of signaling connection control part messages.
Q713 (1996), Signaling connection control part formats and codes.
Q 714 (1996), Signal connection control part procedures.
Q 716 (1993), Signaling Connection Control Part (SCCP) performance.
Q 730 (1999), ISDN User Part supplementary services.
GSM 340 on SMS Digital cellular telecommunications system (Phase 2+); Technical realization of the Short Message Service (SMS); (GSM 03.40 version 7.4.0 Release 1998).
SMPP Forum: SMPP Protocol Document Version: Oct. 12, 1999 Issue 1.2.
Universal Mobile Telecommunications System (UMTS); Multimedia Messaging Service (MMS), Functional description; Stage 2 (3GPP TS 23.140 version 4.2.0 Release 4).
GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998).
Technical Specification 3rd Generation Partnership Project; Technical Specification Group Services and System Aspects; Service accessibility (Release 1999).
Signaling procedure and the Mobile Application Part (MAP) (Release 1999).
GMS 408 on radio interface layer 3; Digital cellular telecommunications system (Phase 2+); Mobile radio interface layer 3 specification (GSM 04.08 version 7.4.2 Release 1998).
GSM 322 network selection Digital cellular telecommunications system (Phase 2+); functions related to Mobile Station (MS) in idle mode and group receive mode (GSM 03.22 version 8.3.0 Release 1999).
GSM 23122 network selection 3GPP TS 23.122 V3.9.0 (Dec. 2002) Technical Specification; 3rd Generation Partnership Project; Technical Specification Group Core Network; NAS Functions related to Mobile Station (MS) in idle mode (release 1999).
GSM 22011 service accessibility; 3 GPP TS 22.011 V3.8.0 (Sep. 2002) Technical Specification; 3rd Generation Partnership Project; Technical Specification Group Services and System Aspects; Service accessibility (Release 1999).
3 GPP 29010; 3 GPP TS 29.010 (Dec. 2002); Technical Specification; 3rd Generation Partnership Project; Technical Specification Group Core Network; Information element mapping between Mobile Station—Base Station System (MS-BSS) and Base Station System—Mobile-services Switching Centre (BSS—MSC).
GSM 318 on CAMEL Basic Call Handling; Digital cellular tellecommunications system (Phase 2+) Basic call handling; Technical realization (GSM 03.18 version 6.6.0 Release 1997).
GSM 1114 SIM Toolkit, (Dec. 1996).
Supplementary European Search Report dated Jul. 3, 2008, 6 pages.
Reinhard Becher et al., "CAMEL: The Impact of Personal Communications on Intelligent Networks," XVI World Telecom Congress Proceedings, Sep. 21, 1997, pp. 225-233.
GSM 11.11 Digital Cellular telecommunications system (Phase 2+); Specification of the Subscriber Identity Module—Mobile Equipment (SIM-ME) interface (GSM 11.11 version 5.0.0 Dec. 1995).
IR.73 Steering of Roaming Implementing Guidelines 0.1; May 13, 2005.
ETSI TS 101 181 Digital Cellular telecommunications system (Phase 2+); Security Mechanisms for the SIM application toolkit; Stage 2 (GSM 03.48 version 8.3.0 Release 1999).
3rd Generation Partnership Project; Technical Specification Group Terminals; Security Mechanisms for the (U)SIM Application Toolkit; Test Specification (Release 5); (3GPP TS 31.048 version 5.1.0) (Oct. 2005).
3rd Generation Partnership Project; Technical Specification Group Core Network; Gateway Location Register (GLR)—Stage 2 (3G TS 23.119 version 0.3.0) (Oct. 1999).

3rd Generation Partnership Project; Technical Specification Group Core Network; NAS Functions related to Mobile Station (MS) in idle mode (Release 1999); (3GPP TS 23.122 version 3.9.0) (Dec. 2002).
3rd Generation Partnership Project; Technical Specification Group Radio Access Network; UE Procedures in Idle Mode (3G TS 25.304 version 3.0.0) (Oct. 1999).
3rd Generation Partnership Project; Technical Specification Group Core Network; Information element mapping between Mobile Station—Mobile-services Switching Centre (BSS-MSC); Signalling procedures and the Mobile Application Part (MAP) (Release 1999) (3GPP TS 29.010 version 3.10.0) (Dec. 2002).
3rd Generation Partnership Project; Technical Specification Group Services and System Aspects; Customized Applications for Mobile network Enhanced Logic (CAMEL); Service description, Stage 1 (3G TS 22.078 version 3.2.0) (Dec. 1999).
3rd Generation Partnership Project; Technical Specification Group Services and System Aspects; Customized Applications for Mobile network Enhanced Logic (CAMEL); Phase 4-Stage 2; IM CN Interworking (Release 6) (3GPP TS 23.278 version 6.0.0) (Dec. 2004).
ETSI TS 101 344 Digital Cellular telecommunications system (Phase 2+);General Packet Radio Service (GPRS) Service description; Stage 2 ((3GPP TS 03.60 version 7.9.0 Release 1998)
ETSI TS 101 347 Digital Cellular telecommunications system (Phase 2+);General Packet Radio Service (GPRS); GPRS Tunneling Protocol (GTP) across the Gn and Gp Interface (3GPP TS 09.60 version 7.10.0 Release 1998).
3rd Generation Partnership Project; Technical Specification Group Services and System Aspects; General Packet Radio Service (GPRS); Service description, Stage 2 (Release 5) (3GPP TS 23.060 version 5.2.0) (Jun. 2002).
ETSI TS 129 060 Digital Cellular telecommunications system (Phase 2+); Universal Mobile Telecommunications System (UMTS); General Packet Radio Service (GPRS); GPRS Tunneling Protocol (GTP) across the Gn and Gp Interface (3GPP TS 29.060 version 5.4.0 Release 5) (Dec. 2002).
3rd Generation Partnership Project; Technical Specification Group Core Network; Location Management Procedures (Release 4); (3GPP TS 23.012 version 4.0.0) (Mar. 2001).
ITU-T Q.771 Series Q: Switching and Signalling—Specifications of Signalling System No. 7—Transaction capabilities application part. Functional description of transaction capabilities (Jun. 1997).
ITU-T Q.772 Series Q: Switching and Signalling—Specifications of Signalling System No. 7—Transaction capabilities application part. Transaction capabilities information element definitions (Jun. 1997).
ITU-T Q.773 Series Q: Switching and Signalling—Specifications of Signalling System No. 7—Transaction capabilities application part. Transaction capabilities formats and encoding (Jun. 1997).
ITU-T Q.774 Series Q: Switching and Signalling—Specifications of Signalling System No. 7—Transaction capabilities application part. Transaction capabilities procedures. (Jun. 1997).
ITU-T Q.775 Series Q: Switching and Signalling—Specifications of Signalling System No. 7—Transaction capabilities application part. Transaction capabilities procedures. (Jun. 1997).
GSM 04.08 Digital Cellular telecommunications system (Phase 2+);Mobile radio interface layer 3 specification (GSM 04.08 version 5.2.0 May 1996).
ETSI TS 124 008 Digital Cellular telecommunications system (Phase 2+); Universal Mobile Telecommunications System (UMTS); Mobile radio interface layer 3 specification, Core Network protocols—Stage 3 (3G TS 24.008 version 3.2.1 Release 1999).
3rd Generation Partnership Project; Technical Specification Group Core Network; Mobile Application Part (MAP) specification; (Release 4); (3GPP TS 29.002 version 4.8.0) (Jun. 2002).
ITU-T Q.705 Specifications of Signalling System No. 7; Signalling System No. 7—Signalling Network Structure (Mar. 93).

* cited by examiner

PREDICTIVE INTELLIGENCE

RELATED APPLICATIONS

This application claims the benefit of U.S. Provisional Application No. 60/935,053 titled "A Single Operator and Network Side Solution for Inbound and Outbound Roaming Tests and Discoveries of Roaming Partner Services and Frauds Without Involving Remote Probes or Real Roamer Traffic" filed on Jul. 24, 2007. This application also claims the benefit of U.S. Provisional Application No. 60/935,223 titled "Roaming Intelligence from Passive Monitoring and Active Signaling from Single Operator Perspective on Real Inbound and Outbound Roaming Traffic" filed on Aug. 1, 2007. This application is also a continuation-in-part of application Ser. No. 10/635,804, filed Aug. 5, 2003, now U.S. Pat. No. 7,072,651 titled "Method And System For Cellular Network Traffic Redirection." It is also a continuation-in-part of U.S. patent application Ser. No. 11/374,437 titled "Anti-Traffic Redirection System" filed on Mar. 14, 2006 now U.S. Pat. No. 7,684,793. It is also a continuation-in-part of U.S. patent application Ser. No. 11/374,427 titled "Method, system and computer program product for countering anti-traffic redirection" filed on Mar. 14, 2006 now U.S. Pat. No. 7,590,417. It is also a continuation-in-part of U.S. patent application Ser. No. 11/402,128 titled "Inbound traffic redirection system" filed on Apr. 12, 2006 now U.S. Pat. No. 7,929,953. It is also a continuation-in-part of U.S. patent application Ser. No. 11/375,577 titled "Method and apparatus by which a home network can detect and counteract visited network inbound network traffic redirection" filed on Mar. 15, 2006 now abandoned. It is also a continuation-in-part of U.S. patent application Ser. No. 11/366,021 titled "Inbound roamer call control system" filed on Mar. 2, 2006 now U.S. Pat. No. 7,660,580 claiming priority to U.S. Provisional Application No. 60/658,258, filed oil Mar. 2, 2005. It is also a continuation in part of U.S. patent application Ser. No. 11/366,017 titled "Dynamic Generation of Camel Subscription Information For Outbound Roamers" filed on Mar. 2, 2006 now U.S. Pat. No. 7,742,763, claiming priority to a U.S. Provisional Application No. 60/657,798, filed on Mar. 2, 2005. This application is also a continuation-in-part of U.S. patent application Ser. No. 12/153,453 titled "Method and System for Exchanging NRTRD Files Between a Visited Network and a Home Network in Real Time" filed May 19, 2008, claiming priority to U.S. Provisional Application No. 60/924,525 titled "Real Time Roaming Data Exchange Service" filed on May 18, 2007. Each of these related applications is incorporated herein by this reference in its entirety.

FIELD OF THE INVENTION

The present invention generally relates to mobile communication. More specifically, the invention relates to proactive roaming tests, discoveries of roaming partner services and discoveries of frauds in roaming.

BACKGROUND OF THE INVENTION

Roaming traffic contributes a significant percentage of an operator's revenue and even a better percentage of the operator's margin. With increasing competition and regulatory control, operators are being more pressured to increase their roaming revenue and reduce roaming margin losses. They need keep a check on roaming quality and fraud control at both, own networks to serve inbound roamers and roaming partner networks to serve outbound roamers, that can directly impact an operator's roaming revenue and margin.

Establishing roaming relationships is essential for operators to achieve roaming revenue in the first place. Such process involves both inbound and outbound roaming tests. These tests are usually only performed prior to the launch of these roaming relationships. However, roaming partners may constantly change network configuration, upgrade new software, add new number ranges, introduce new inter-connection routing or add new network elements. These changes or incomplete or incorrect execution of changes could affect roaming services. Constantly maintaining roaming quality of the services thus will help increase roaming revenue. Also, while roaming represents a substantial revenue source for the operators, it is also subjected to frauds like Subscriber Identity Module (SIM) box and interconnection frauds.

Further, many operators may employ aggressive and innovative services for increasing roaming revenue. However, these services may have detrimental effects on roaming partners. Thus, early detection of these services can help roaming partners to play defenses and retain roaming revenue. Some of the exemplary roaming services are outbound traffic redirection (i.e., steering of traffic (SoR)) that allows a home operator to direct its outbound roaming traffic towards preferred operators with better Inter-Operator Tariff (IOT), discounts or group alliance relationship. Another innovative service is detecting home operator's traffic redirection (Anti-SoR) solution that arms a visited operator against such attack and allows retaining its inbound roamers within its own network. Yet another innovative service will arm a home operator against the Anti-SoR by a visited network and hence protect its outbound roaming revenue. Also, another service provides inbound SoR capability to a visited operator to retain the inbound roamers within its network.

A co-related service to anti-traffic steering is the use of Gateway Location Register (GLR) by a Visited Public Mobile Network (VPMN). Still another innovative way to increase roaming revenue is network extension which allows a client operator to piggyback a host operator's roaming relationships. Yet another innovative way to increase roaming revenue is home routing which allows a Home Public Mobile Network (HPMN) outbound roamer's non-HPMN international calls to be routed via the HPMN to gain mobile termination or international termination revenue due to arbitrage. Still another innovative way to increase roaming revenue (or margin) or reduce roaming cost is optimal routing to voicemail (or late call forwarding) which allows an unanswered call to the HPMN outbound roamer to be optimally routed to the HPMN voicemail without tromboning.

One of the existing solutions that addresses some of these above mentioned issues is to deploy remote probes (real or virtual mobile stations) around the world. When a remote probe behaves like a virtual mobile station, a virtual SIM is dynamically slotted in from a central multiplexer of real SIMs to test different types of subscribers for different types of services under some kinds of schedules. When a remote probe is a real mobile station, then real or virtual SIMs can be inserted for testing purpose. However, there are several issues with the remote probes approach. First is coverage, as despite of increasing coverage in multiple countries and major cities, this approach does not assure covering of home operator's roamer's services in the part that are not covered by these remote probes. The coverage problem also applies to a visiting operator for inbound roamers when the country's expanse is huge such as China, India etc. Moreover, the operator often cannot afford to continuously test its inbound roaming service availability to accommodate constant changes of network infrastructures including network elements (e.g. VLR/VMSCs) and routing. Another drawback is cost as remote probe vendors need ways to recuperate the cost (e.g. remote probe hardware cost, data center collocation cost including bandwidth and maintenance etc.) for the vast amount of investment for extended coverage. Also, without enough coverage, some SIM box frauds might not be detected. Further, even testing any kind of subscriber (e.g. prepaid, postpaid, Virtual Private Network (VPN), machine-to-machine etc.) is done by providing the corresponding SIM card to the test vendor. It is unlikely that they will multiply the number of test scenarios by the number of profiles because of the costs of these tests, thus making it is hard for the operator to control the quality of service offered to any of the subscribers. Also, due to its lack of network signaling, remote probe approach is also not quite effective in detecting various revenue affecting services like mentioned above. Further, in terms of providing revenue assurance, owing to the constant changes in IOT tariffs and constant upgrades of billing systems, constant regression tests can help reduce these revenue leaks. However, since remote probes are bottlenecked by their coverage area, unfortunately many countries that are out of the coverage cannot gain benefit of these tests. Further, remote probe approach cannot test for operator/network initiated services such as on-demand Operator Determined Barring (ODB), Cancel Location, InSertSusbcriberData (ISD), Immediate Service Termination (IST) and on-demand profile changes. Furthermore, lack of network side signaling and monitoring also make it less diagnostic on the failure causes and less ideal in operational management of subscriber profiles.

Another alternative solution is to monitor just the roaming links at the home/host operator. The solution is completely network based without involvement of mobile stations (local or remote). In this way, many types of inbound roaming and outbound roaming Transaction Capabilities Application Part (TCAP) signaling messages can be probed at the operator network. However, this approach is unable to find out whether outbound roamers can perform Mobile originated (MO) or forwarded calls for non-Customized Applications for Mobile Network Enhanced Logic (CAMEL) agreement networks. Further, it is unable to perform revenue assurance tests without real roamer usage. Also, this approach is unable to know if any potential problems exist at the visiting network elements. This approach is also unable to test or discover failures on Supplementary Services (SS) and home-operator/network initiated services. Further, this approach cannot detect frauds like SIM box proactively.

Another alternative is to just test Signaling Connection Control Part (SCCP) routing from home operator to the roaming. Because no profile is assumed or created, such an approach is rather limited because it cannot test behaviors on roaming calls, SS, General Packet Radio Service (GPRS), CAMEL and SS profiles. Also, such an approach cannot detect roaming and interworking services, quality, network capabilities and international frauds.

In accordance with the foregoing, there is a need in the art of a system, a method, and a computer product for creating a single operator and pure network based solution that gives the operator intelligence to deal with above mentioned problems.

SUMMARY

The present invention is directed towards a method for facilitating roaming tests for a host network. The method includes creating a fake profile by a gateway associated with the host network for a roaming subscriber at a Mobile Switching Center (MSC)/Visiting Location Register (VLR). The MSC/VLR is associated with at least one of the host network and a roaming partner network of the host network. The host network and the roaming partner network correspond to a Home Public Mobile Network (HPMN) and a Visited PMN. The roaming subscriber is associated with both the host network and the roaming partner network. The method further includes simulating by the gateway, transactions with a first network element associated with at least one of the host network and the roaming partner network to test at least one of the first network element's response for the simulated transactions, and network routing on the roaming subscriber to a second network element associated with at least one of the host network and the roaming partner network.

Another aspect of the invention presents a system for facilitating roaming tests for a host network. The system includes a gateway associated with the host network for creating a fake profile of a roaming subscriber at a MSC/VLR associated with at least one of the host network and a roaming partner network of the host network. The host network and the roaming partner network correspond to an HPMN and a VPMN. Further, the roaming subscriber is associated with both the host network and the roaming partner network. Further, the gateway simulates transactions with a first network element associated with at least one of the host network and the roaming partner network to test at least one of the first network element's response for the simulated transactions and network routing on the roaming subscriber to a second network element associated with at least one of the host network and the roaming partner network.

Yet another aspect of the present invention provides a computer program product including a computer usable program code for facilitating roaming tests for a host network. The computer program product includes a gateway associated with the host network for creating a fake profile of a roaming subscriber at a MSC/VLR associated with at least one of the host network and a roaming partner network of the host network. The host network and the roaming partner network correspond to an HPMN and a VPMN. The roaming subscriber is associated with both the host network and the roaming partner network. The gateway further simulates the transactions with a first network element associated with at least one of the host network and the roaming partner network to test at least one of the first network element's response for the simulated transactions, and network routing on the roaming subscriber to a second network element associated with at least one of the host network and the roaming partner network.

BRIEF DESCRIPTION OF DRAWINGS

In the drawings, the same or similar reference numbers identify similar elements or acts.

DETAILED DESCRIPTION

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

The present invention provides a system, a method, and a computer program product where a host network operator detects one or more roaming partner networks' services and frauds, in addition to testing roaming services of its inbound and outbound roamers visiting and coming from these roaming partner networks. The present invention allows the host network operator to detect roaming frauds, new roaming services offered by the roaming partner networks, issues in the host network's roaming services, quality of the host network's roaming services and services of the roaming partner networks that may affect roaming revenue of the host network operator. The present invention also helps in preventing revenue losses and also to control frauds before any real roamers or real services usage or real fraud occurrence or real quality issues pop up. The present invention further helps a hosting operator to increase revenue, reduce loss, prevent fraud and improve customer experience and quality. A roaming partner network corresponds to a network that has at least one roaming agreement such as, but not limited to, Global System for Mobile communication (GSM), General Packet Radio Services (GPRS), Customized Application for Mobile Enhanced Logic (CAMEL) and Third Generation of mobile (3G) agreement with the host network. It will be apparent to a person skilled in the art that roaming services include standard call and non-call related activities such as, but not limited to, Mobile Originated (MO) call, Mobile Terminated (MT) call, Short Message Service (SMS), Packet Data Network (PDN), and other Value Added Services (VASs) such as call forwarding, call barring etc.

Figure 1:
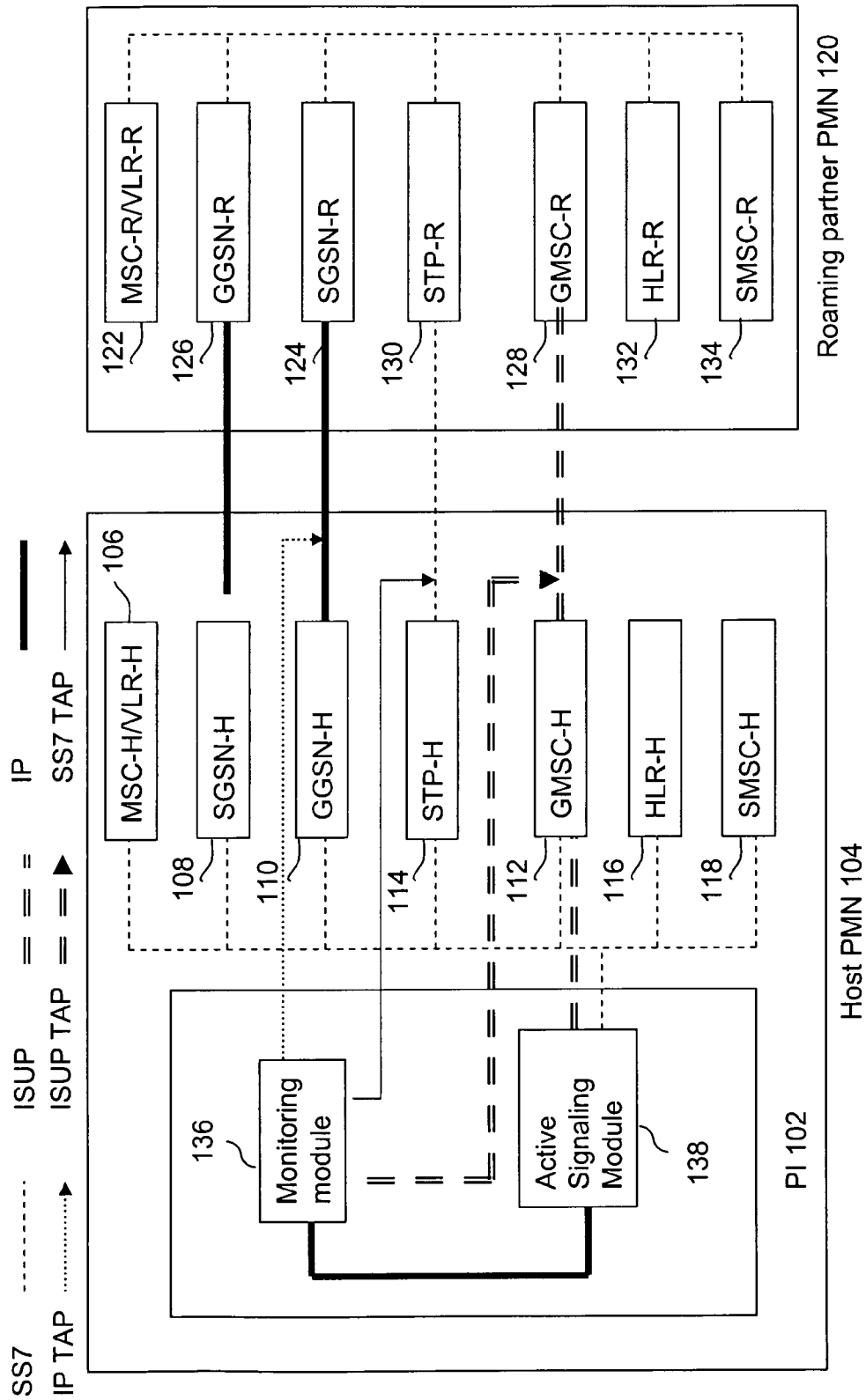
FIG. 1 illustrates a system for testing roaming services for simulated inbound and outbound roamers of a host Public Mobile Network (PMN), in accordance with an embodiment of the present invention.

The host network operator performs the proactive roaming tests by deploying a gateway, either at a centralized location or in the host network. FIG. 1 illustrates a system 100 that tests roaming services for inbound and outbound roamers of the host network, in accordance with an embodiment of the present invention. System 100 includes a Predictive Intelligence (PI) module 102 (i.e., the gateway) in a host Public Mobile Network (PMN) 104 (i.e., the host network). PI module 102 has ability to detect roaming services and determine issues related to these roaming services. Host PMN 104 operator uses PI module 102 to test roaming services of its outbound roamers that may roam in any of the roaming partner networks, and its inbound roamers that may be coming from any of these roaming partner networks. Thus, host PMN 104 acts as a Home PMN (HPMN) of the outbound roamers, whereas roaming partner networks in which these outbound roamers may roam act as Visited PMNs (VPMNs). Accordingly, host PMN 104 acts as a VPMN for the inbound roamers, whereas roaming partner networks to which these inbound roamers belong act as HPMNs. Host PMN 104 further includes a Mobile Switching Center (MSC)/Visiting Location Register (VLR) 106, a Serving GPRS Support Node (SGSN) 108, a Gateway GPRS Support Node (GGSN) 110, a Gateway MSC (GMSC) 112, a roaming Signal Transfer Point (STP) 114, a Home Location Register (HLR) 116 and a Short Message Service Center (SMSC) 118. Since network elements MSC/VLR 106, SGSN 108, GGSN 110, GMSC 112, STP 114, HLR 116 and SMSC 118 reside in Host PMN 104, they are hereinafter referred to as MSC-H/VLR-H 106, SGSN-H 108, GGSN-H 110, GMSC-H 112, STP-H 114, HLR-H 116 and SMSC-H 118, respectively. These network elements communicate with each other over a Signaling System 7 (SS7) link (represented by dashed lines in FIG. 1), except that SGSN-H 108 communicates with GGSN-H 110 via an Internet Protocol (IP) link (represented by solid lines in FIG. 1).

System 100 further includes a roaming partner PMN 120 (i.e., the roaming partner network) that is associated with host PMN 104. It will be apparent to a person skilled in the art that system 100 may include various other roaming partner networks. However, for the sake of convenience, this embodiment considers only one roaming partner network (i.e., roaming partner PMN 120). Roaming partner PMN 120 includes a MSC/VLR 122, a SGSN 124, a GGSN 126, a GMSC 128, an STP 130, an HLR 132 and an SMSC 134. Since network elements MSC/VLR 122, SGSN 124, GGSN 126, GMSC 128, STP 130, HLR 132 and SMSC 134 reside in roaming partner PMN 120, they are hereinafter referred to as MSC-R/VLR-R 122, SGSN-R 124, GGSN-R 126, GMSC-R 128, STP-R 130, HLR-R 132 and SMSC-R 134, respectively. All these network elements of roaming partner PMN 120 communicate with each other over the SS7 link, except that SGSN-R 124 communicates with GGSN-R 126 via the IP link. Further, as shown in FIG. 1, the network elements of roaming partner PMN 120 also communicate with the network elements of host PMN 104. For example, GMSC-R 128 communicates with GMSC-H 112 over an ISDN User Part Protocol (ISUP) link, whereas SGSN-R 124 and GGSN-R 126 communicate with GGSN-H 110 and SGSN-H 108, respectively via the IP link. Other network elements of roaming partner PMN 120 (e.g., MSC-R/VLR-R 122) communicate with various other network elements of host PMN 104 (e.g., HLR-H 116) via the SS7 link. It will also be apparent to a person skilled in the art that host PMN 104 and roaming partner PMN 120 may also include various other network components (not shown in FIG. 1), depending on the architecture under consideration. In an embodiment of the present invention, various network elements of host PMN 104 and roaming partner PMN 120 are located in an IR.21 database (not shown in FIG. 1) such as RAEX IR.21. In an embodiment of the present invention, the IR.21 database is coupled to PI module 102.

By testing roaming services for the inbound and outbound roamers, PI module 102 detects issues in the roaming services, ensures proper functioning of these roaming services and the service quality offered to the inbound and outbound roamers, as mentioned above. PI module 102 includes a monitoring module 136 and an active signaling module 138. The PI module 102 serves as a complete system that provides host network with ability to proactively perform roaming tests and detect roaming services and frauds. Monitoring module 136 taps SS7 and IP roaming links between network elements of host PMN 104 and roaming partner PMN 120 in order to monitor roaming signaling traffic and packet data traffic at host PMN 104. The roaming signaling traffic includes both Signaling Connection Control Part (SCCP) and ISUP traffic. In an embodiment of the present invention, the SCCP and ISUP traffic is transported over an IP interface such as, but not limited to, Signaling Transport (SIGTRAN) protocol, Voice over IP (VoIP) and Real-Time Transport Protocol (RTP). The SCCP traffic includes Mobile Application Part (MAP) traffic, CAMEL Application Part (CAP) traffic and Transaction Capabilities Application Part (TCAP) traffic. For packet data traffic, monitoring module 136 monitors the IP link in a Gp interface between SGSN-H 108 and GGSN-R 126, and between GGSN-H 110 and SGSN-R 124, in accordance with an embodiment of the present invention. Monitoring module 136 further taps the SS7 link between STP-H 114 and STP-R 130 and the ISUP link between GMSC-H 112 and GMSC-R 128, in accordance with another embodiment of the present invention. In one embodiment of the present invention, monitoring module 136 passively taps signaling path between the network elements of host PMN 104 and roaming partner PMN 120. In another embodiment of the present invention, monitoring module 136 intercepts the signaling path with an address such as a Global Title (GT), a point code or an IP address.

Furthermore, in an embodiment of the present invention, active signaling module 138 performs roaming signaling traffic and packet data traffic exchange between host PMN 104 and roaming partner PMN 104 for host PMN 104's outbound and inbound roamers. Additionally, in another embodiment of the present invention, active signaling module 138 communicates with the network elements of host PMN 104 138 internally (e.g., communicates with GMSC-H 112 via the ISUP link and communicates with MSC-H/VLR-H 106 via the SS7 link).

In an embodiment of the present invention, in order to test roaming services for outbound roamers, host PMN 104 operator selects a test International Mobile Subscriber Identity (IMSI) of host PMN 104, hereinafter referred to as an IMSI-H. Similarly, in order to test roaming services for inbound roamers, host PMN 104 operator selects a test IMSI of roaming partner PMN 120 as a part of International Roaming Expert Group (IREG)/Transferred Account Data Interchange Group (TADIG) testing with host PMN 104. The IMSI of roaming partner PMN 120 is hereinafter referred to as an IMSI-R. Since the IMSI-H and IMSI-R are test IMSIs, they are not associated with any mobile station or any real roamer traffic. Therefore, a subscriber using the IMSI-H and a subscriber using the IMSI-R are hereinafter referred to as simulated outbound roamer and simulated inbound roamer (both interchangeably referred to as roaming subscribers), respectively.

In an embodiment of the present invention, PI module 102 may be deployed at a central location i.e. PI module 102 is hosted at a third party PMN or at a central location for a group of operators.

Figure 2:
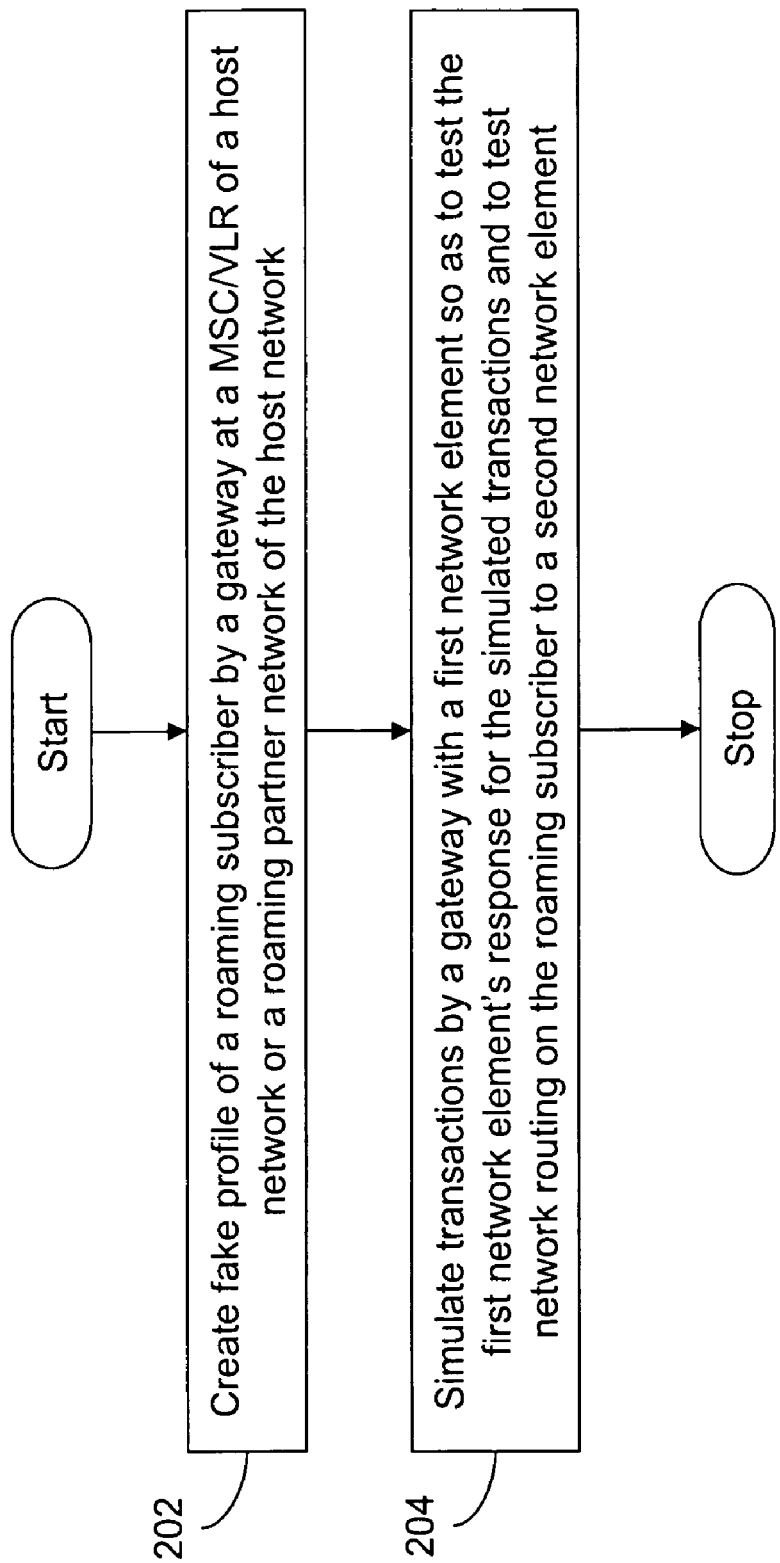
FIG. 2 represents a flowchart for testing roaming services for the simulated inbound and outbound roamers, in accordance with an embodiment of the present invention.

Now, in order to predict roaming environment for host PMN 104 operator, PI module 102 needs to create test profile at a MSC/VLR location of the roaming subscriber and then check various roaming services and fraud by host PMN 104 and its roaming partner PMNs. FIG. 2 represents a flowchart for testing roaming services for the simulated inbound and outbound roamers, in accordance with an embodiment of the present invention. At step 202, PI module 102 creates a fake profile of the roaming subscriber at a MSC/VLR location of the roaming subscriber. In one embodiment of the present invention, in case of outbound roaming, active signaling module 138 creates fake profile for the simulated outbound roamer at MSC-R/VLR-R 122. In another embodiment of the present invention, in case of inbound roaming, active signaling module 138 creates fake profile for the simulated inbound roamer at MSC-H/VLR-H 106. Details of the profile creation for simulated inbound and outbound roamers are explained later in various embodiments of the present invention.

Thereafter at step 204, PI module 102 simulates transactions with a first network element, in order to test either the first network element's response for the simulated transactions or network routing from the first network element on the roaming subscriber to a second network element. Simulated transactions include, but not limited to, TCAP traffic, packet data traffic and ISUP traffic. The first network element can be any network element in host PMN 104 or roaming partner PMN 120, depending upon the type of testing or detection performed by PI module 102. In an embodiment of the present invention, in order to test MT call for outbound roamers, active signaling module 138 issues a fake MT call on a Mobile Station International Subscriber Directory Number (MSISDN) corresponding to the IMSI-H, to GMSC-H 112. Since the MSISDN is associated with the simulated outbound roamer's IMSI-H, it is hereinafter referred to as MSISDN-H. In other words, active signaling module 138 simulates transactions with GMSC-H 112 as the first network element to test MT call for outbound roamers. Similarly, the second network element can be any network element different from the first network element in host PMN 104 or roaming partner PMN 120.

Various embodiments of the present invention, where PI module 102 tests the first network element's response on a service type, e.g., SMS, calls, SS, dual IMSI inbound roaming, outbound roaming network extension etc. are described later. In another embodiment of the present invention, active signaling module 138 issues a fake MT call such as an ISUP IAM to GMSC-R 128 to test MO call routing for the simulated inbound roamer. In this case, GMSC-R 128 routes the MT call to MSC-H/VLR-H 106 location of the simulated inbound roamer. MSC-H/VLR-H 106 can then route the MT call on a Forward-To Number (FTN) set at MSC-H/VLR-H 106. In an embodiment of the present invention, the FTN corresponds to active signaling module 138's number or MSISDN assigned by host PMN 104 operator. Detection of the MT call on the FTN facilitates PI module 102 to successfully test network routing service on the inbound roamers. In this case, GMSC-R 128 and MSC-H/VLR-H 106 correspond to the first network element and the second network element, respectively. Details of testing network routing on inbound and outbound roamers are explained later in various embodiments of the present invention.

In order to perform various roaming services tests, PI module 102 first needs to create fake profiles for the simulated subscribers. The different types of profiles that could be created are, without limitation, Supplementary Services (SS) profile, Operator Determined Barring (ODB) profile, CAP profile and GPRS profile. PI module 102 creates profiles for simulated outbound roamers by sending signaling messages such as a MAP Provide_Roaming-Number (PRN), a MAP Insert Subscriber Data (ISD) and a MAP_RESTORE_DATA (RSD)-ACK on their respective test IMSIs to any MSC/VLR of roaming partner PMN 120 (e.g., MSC-R/VLR-R 122). Therefore, PI module 102 can test various roaming services against the profiles created at the MSC/VLR. In an embodiment of the present invention, PI module 102 selects a MSC/VLR or any other network element of roaming partner PMN 120 from the IR.21 database.

Figure 3:
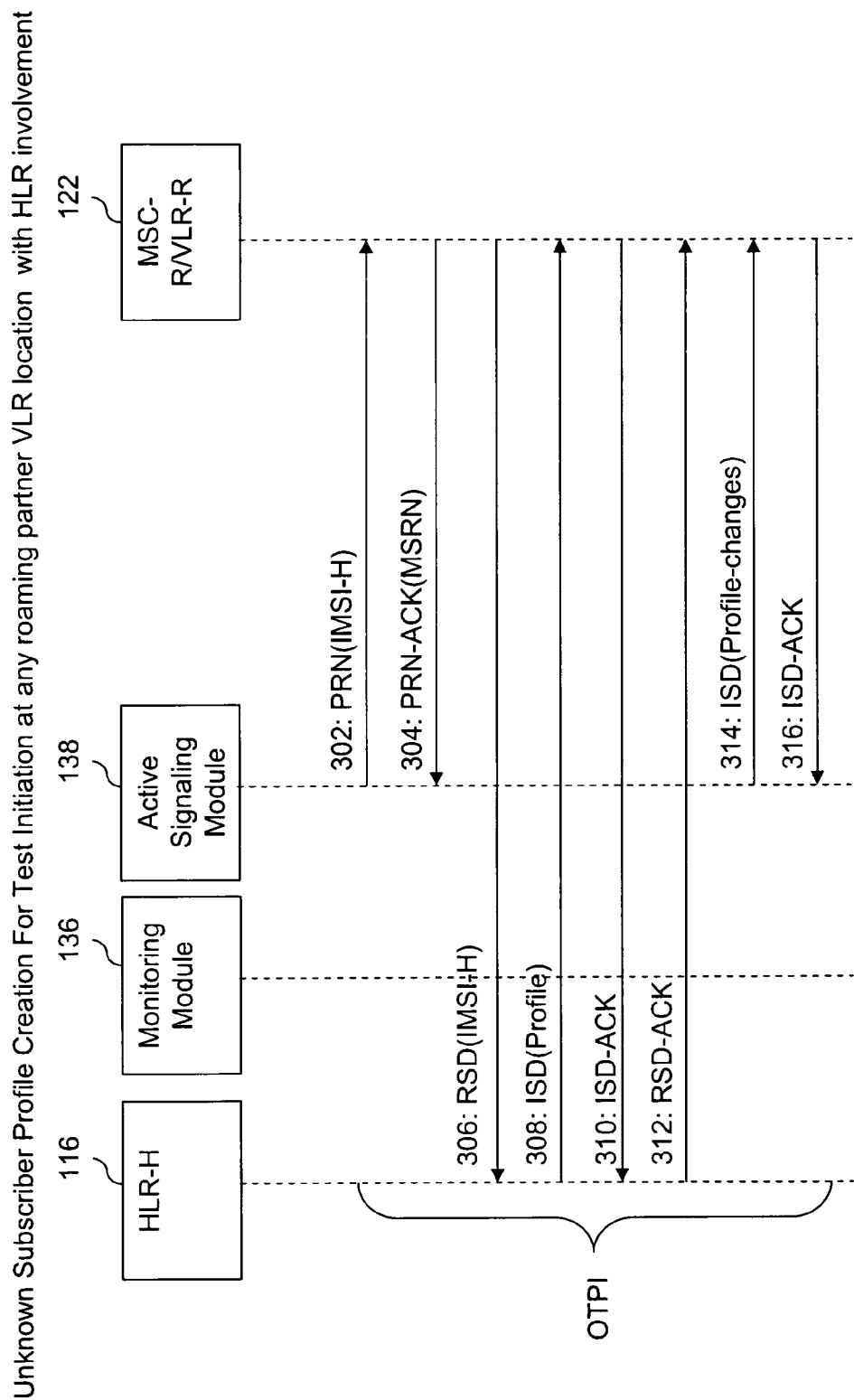
FIG. 3 represents a flow diagram for creating profile using a Predictive Intelligence (PI) module for the simulated outbound roamer of the host PMN at a Mobile Switching Center (MSC)/Visiting Location Register (VLR) in a roaming partner PMN without involving a Home Location Register (HLR) in the host PMN, in accordance with an embodiment of the present invention.

FIG. 3 represents a flow diagram for creating profile using PI module 102 for the simulated outbound roamer of host PMN 104 at MSC-R/VLR-R 122 without involving HLR-H 116, in accordance with an embodiment of the present invention. In this case, host PMN 104 operator configures its STP-H 114 to route various signaling messages (e.g., MAP Send Authentication Info (SAI) and RSD messages) on the IMSI-H to active signaling module 138. At step 302, active signaling module 138 sends the MAP PRN message on the IMSI-H to MSC-R/VLR-R 122. Upon receiving the PRN message, MSC-R/VLR-R 122 returns a Mobile Station Routing Number (MSRN) associated with the simulated outbound roamer in a PRN-ACK message, at step 304. It will be apparent to a person skilled in the art that upon receiving an unknown IMSI, a MSC/VLR retrieves authentication data for the received IMSI from a home network HLR of the unknown IMSI. Since the IMSI-H is a test IMSI unknown to MSC-R/VLR-R 122, MSC-R/VLR-R 122 retrieves the authentication information for the IMSI-H in an authentication message such as a MAP SAI-ACK message or a MAP Send Parameters-ACK message from HLR-H 116, by sending another authentication message such a MAP Send Authentication Info (SAI) message or a MAP Send Parameters message to HLR-H 116. Detection of the exchange of authentication messages at monitoring module 136 indicates successful testing of the authentication for the simulated outbound roamer. Further, the IMSI-H is either still unknown to MSC-R/VLR-R 122 or its data record is set as "Not Confirmed" in the MSC-R/VLR-R 122 by an indicator "Confirmed by HLR". This forces MSC-R/VLR-R 122 to request the simulated outbound roamer's profile information from HLR-H 116 by sending the MAP RSD to STP-H 114. Since STP-H 114 is configured to redirect signaling messages to active signaling module 138, at step 306, STP-H 114 redirects the received MAP RSD message to active signaling module 138. The RSD message then triggers an ISD operation at HLR-H 116. Thus at step 308, active signaling module 138 sends profile information for the simulated outbound roamer in the MAP ISD message to MSC-R/VLR-R 122. Thereafter, at step 310, MSC-R/VLR-R 122 sends a MAP ISD-ACK to active signaling module 138. Finally at step 312, active signaling module 138 sends MAP RSD-ACK to MSC-R/VLR-R 122. After successful completion of the MAP RSD procedure, MSC-R/VLR-R 122 sets the indicator "Confirmed by HLR" to "Confirmed".

Alternatively, in another embodiment of the present invention, PI module 102 creates profile for the simulated outbound roamer at MSC-R/VLR-R 122 with HLR-H 116 involvement. In this case, active signaling module 138 initiates a fake Location Update (LUP) procedure on the IMSI-H towards HLR-H 116 to fake that the simulated outbound roamer is at MSC-R/VLR-R 122. In this case, LUP, ISD, ISD-ACK and LUP-ACK messages are exchanged between active signaling module 138 and HLR-H 116 as per the standard signal flow of LUP procedure. Thus, HLR-H 116 creates profile information for the IMSI-H at active signaling module 138. Active signaling module 138 then issues a PRN on the IMSI-H to MSC-R/VLR-R 122, in order to retrieve an MSRN corresponding to the IMSI-H in a PRN-ACK message from MSC-R/VLR-R 122 and cause MSC-R/VLR-R 122 to exchange profile of the simulated outbound roamer via Restore Data procedure with HLR-H 116. It will be apparent to a person skilled in the art that in the Restore Data procedure, a MSC/VLR of a roamer and an HLR exchange RSD, ISD, ISD-ACK and RSD-ACK messages with each other. In an embodiment of the present invention, upon detecting successful exchanges of these messages (i.e., using monitoring module 136) in the Restore Data procedure, active signaling module 138 then issues a standalone MAP ISD to MSC-R/VLR-R 122, in order to add or modify any profile (e.g., CAMEL, SS etc.) for the simulated outbound roamer. In case the RSD message uses an E.164 address of the PRN message as that of active signaling module 138, then active signaling module 138 directly inserts or modifies profile at MSC-R/VLR-R 122 either after relaying the RSD message to HLR-H 116 using an MGT of the IMSI-H or without relaying it to HLR-H 116. In the latter case, active signaling module 138 performs a fake LUP.

Alternatively, in yet another embodiment of the present invention, PI module 102 creates profile for the simulated outbound roamer at MSC-H/VLR-H 106 with HLR-H 116 involvement. The signal flow for this case is similar to signal flow for the creation of profile at MSC-R/VLR-R 122 with HLR-H 116 involvement explain in the above-mentioned embodiment of the present invention, except that in case of the creation of profile at MSC-H/VLR-H 106, PRN and PRN-ACK messages are exchanged between active signaling module 138 and MSC-H/VLR-H 106, and RSD procedure is performed between MSC-H/VLR-H 106 and HLR-H 116. Moreover, in case of profile creation at MSC-H/VLR-H 106, active signaling module 138 exchanges the standalone ISD and its acknowledgement with MSC-H/VLR-H 106.

Furthermore, PI module 102 can also create profile for the simulated inbound roamer of host PMN 104. In a first embodiment of the present invention, PI module 102 creates profile for the simulated inbound roamer at MSC-H/VLR-H 106 with HLR-R 132 involvement. Signal flow for this case is same as signal flow for profile creation of the simulated outbound roamer at MSC-R/VLR-R 122 with HLR-H 116 involvement as explained above. However, in case of profile creation of the simulated inbound roamer, MSC-R/VLR-R 122, HLR-H 116 and IMSI-H are replaced with MSC-H/VLR-H 106, HLR-R 132 and IMSI-R, respectively. The process for authentication in case of the inbound roaming is same as the authentication process explained earlier for outbound roaming, except that MSC-R/VLR-R 122, IMSI-H and HLR-H 116 are replaced with MSC-H/VLR-H 106, IMSI-R and HLR-R 132, respectively. Similarly, in a second embodiment of the present invention, PI module 102 creates profile for the simulated inbound roamer at MSC-H/VLR-H 106 without HLR-R 132 involvement. Signal flow for this case is same as signal flow for profile creation of the simulated outbound roamer at MSC-R/VLR-R 122 without HLR-H 116 involvement as explained above, except that in case of simulated inbound roamer, MSC-R/VLR-R 122 and IMSI-H are replaced with MSC-H/VLR-H 106 and IMSI-R, respectively. Likewise, in a third embodiment of the present invention, PI module 102 creates profile for the simulated inbound roamer at MSC-R/VLR-R 122 with HLR-R 132 involvement. Signal flow for this case is same as signal flow for profile creation of the simulated outbound roamer at MSC-H/VLR-H 106 with HLR-H 116 involvement as explained above. However, in case of profile creation of the simulated inbound roamer, MSC-H/VLR-H 106, HLR-H 116 and IMSI-H are replaced with MSC-R/VLR-R 122, HLR-R 132 and IMSI-R, respectively.

Specific Profile Initiation or Modification

As mentioned above, PI module 102 can define specific profiles such as SS, CAMEL, GPRS and ODB at a MSC/VLR of the simulated roaming subscriber. Active signaling module 138 can create such profile during the profile creation process as explained above. Alternatively, in another embodiment of the present invention, active signaling module 138 defines or modifies the profile after the profile creation process. In this case, active signaling module 138 issues a standalone ISD message or Delete Subscriber Data (DSD) message to the MSC/VLR to modify/define the profile at the MSC/VLR location. This allows host PMN 104 operator to test SS, CAMEL, GPRS and ODB profile support at any MSC/VLR of roaming partner PMN 120 for outbound roaming and at any MSC/VLR of host PMN 104 for inbound roaming.

Some network operators only allow prepaid CAMEL outbound roamers to register at roaming partner networks that have CAMEL agreement with them. In order to ensure no revenue loss, some of these network operators may send Roaming Not Allowed (RNA) to its prepaid roamer's registration attempt at a roaming partner without CAMEL agreement. However, this may result in revenue loss for such non-CAMEL agreement network operators, e.g., in case there is no network that has a CAMEL agreement at the prepaid roamer's location. Therefore, in order to avoid loss of such roaming revenue, some network operators may enforce ODB barring for its outbound roamers. In an embodiment of the present invention, host PMN 104 operator uses PI module 102 to enforce ODB for its simulated outbound roamers. This allows host PMN 104 operator to check whether it can apply ODB on its real outbound roamers. However, in case a network (e.g., roaming partner PMN 120) does not pass ODB test, host PMN 104 operator applies Steering of Roaming (SoR) techniques to dynamically move its outbound roamers to another network that supports ODB, in accordance with an embodiment of the present invention.

Figure 4:
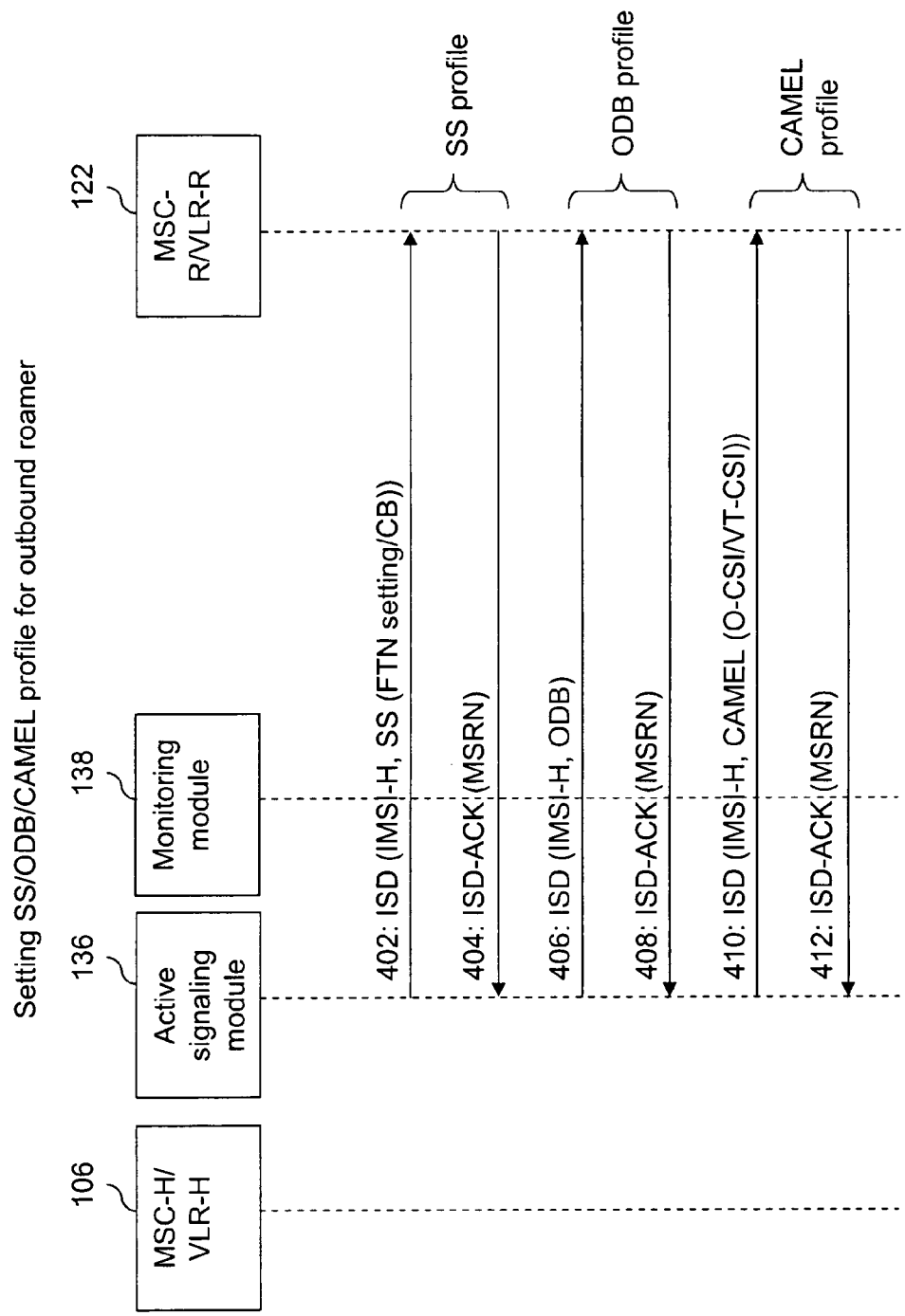
FIG. 4 represents a flow diagram for setting Supplementary Services (SS), Operator Determined Barring (ODB) and CAMEL Application Part (CAP) profile for the simulated outbound roamer at the roaming partner PMN MSC/VLR, in accordance with an embodiment of the present invention.

FIG. 4 represents a flow diagram for setting SS, ODB and CAMEL profile for the simulated outbound roamer at MSC-R/VLR-R 122, in accordance with an embodiment of the present invention. At step 402, active signaling module 138 issues a standalone ISD message on the IMSI-H to MSC-R/VLR-R 122 with an SS indication. In an embodiment of the present invention, the SS indication is Call Barring (CB). In another embodiment of the present invention, the SS indication is an FTN setting, which causes MSC-R/VLR-R 122 to forward an MT call, received on the MSISDN-H, to the FTN. At step 404, MSC-R/VLR-R 122 then returns an MSRN corresponding to the IMSI-H in an ISD-ACK message, to active signaling module 138. Similarly, active signaling module 138 can also set ODB and CAMEL profile (e.g., O-CSI, VT-CSI etc.) at MSC-R/VLR-R 122. Signal flow in steps 406 to 408 and 410 to 412 are same as signal flow in steps 402 to 404, except that active signaling module 138 sends ODB profile at step 406 while it sends CAMEL Subscription Information (CSI) profile at step 410 (instead of SS profile) to MSC-R/VLR-R 122. It will be apparent to a person skilled in the art that setting ODB at a MSC/VLR restricts a roamer to initiate calls and send SMS while roaming, whereas setting the CSI profile at a MSC/VLR allows a roamer to initiate and receive calls, and send and receive SMS, even while roaming.

Similarly, in a second embodiment of the present invention, PI module 102 sets SS, ODB and CAMEL profile for the simulated inbound roamer at MSC-H/VLR-H 106. The signal flow for the inbound roaming case is same as the signal flow for the outbound roaming case as explained above in conjunction with FIG. 4, except that in case of inbound roaming, MSC-R/VLR-R 122 is replaced with MSC-H/VLR-H 106.

Location Management

Generally, the location procedure is triggered by a mobile station at the radio interface. Any fault at the radio interface affects all roaming and non-roaming mobile subscribers under the coverage of such faulty radio interface. On the other hand, the roaming-related LUP faults are mostly linked to configuration and routing issues at the core network level. Such faults may affect some specific core network elements and routes, and hence may not easily be discovered.

In an embodiment of the present invention, host PMN 104 operator uses PI module 102 to detect various LUP procedure faults. The mechanism is similar to the profile creation procedure described above in the context of the present invention. Moreover, using the RestoreData procedure, host PMN 104 operator can evaluate the correct handling of the LUP procedure, i.e., correct E.212 to E.214 translation or IMSI analysis, subsequent routing procedure, CAMEL support and correct MAP version configuration. As a result, PI module 102 estimates location management success rate and its corresponding duration. Since a VLR indicates its CAMEL capabilities during the LUP procedure, PI module 102 validates such VLR capabilities against the expected configuration. Also, in an embodiment of the present invention, PI module 102 dynamically decides whether a CAMEL profile (e.g., O-CSI, VT-CSI etc.) has to be sent (e.g., in a standalone ISD message) to the VLR.

PI module 102 can perform location management for inbound roaming, using the test IMSIs provided by roaming partner PMN 120. In a first embodiment of the present invention, active signaling module 138 issues a LUP message on the IMSI-R to HLR-R 132 with a CgPA as its own address or GT, in order to test LUP routing between HLR-R 132 and any VLR in host PMN 104 (e.g., MSC-H/VLR-H 106). In this case, active signaling module 138 directly receives profile for the IMSI-R in an ISD message from HLR-R 132. Thereafter, active signaling module 138 exchanges ISD-ACK and LUP-ACK messages directly with HLR-R 132. In a second embodiment of the present invention, active signaling module 138 issues a LUP message on the IMSI-R to HLR-R 132 with a CgPA as MSC-H/VLR-H 106, in order to test LUP routing between HLR-R 132 and MSC-H/VLR-H 106. In this case, MSC-H/VLR-H 106 (i.e., instead of active signaling module 138) receives profile for the IMSI-R in the ISD message from HLR-R 132. Detection of profile exchange at active signaling module 138 (i.e., in the first embodiment) or monitoring module 136 (i.e., in the second embodiment) confirms successful testing of location management for inbound roamers. It will be apparent to a person skilled in the art that in case of GPRS, the VLR location, LUP message and LUP-ACK message are replaced with an SGSN location, a GPRS-LUP message and a GPRS-LUP-ACK message, respectively.

Outbound MT Call Testing

Figure 5:
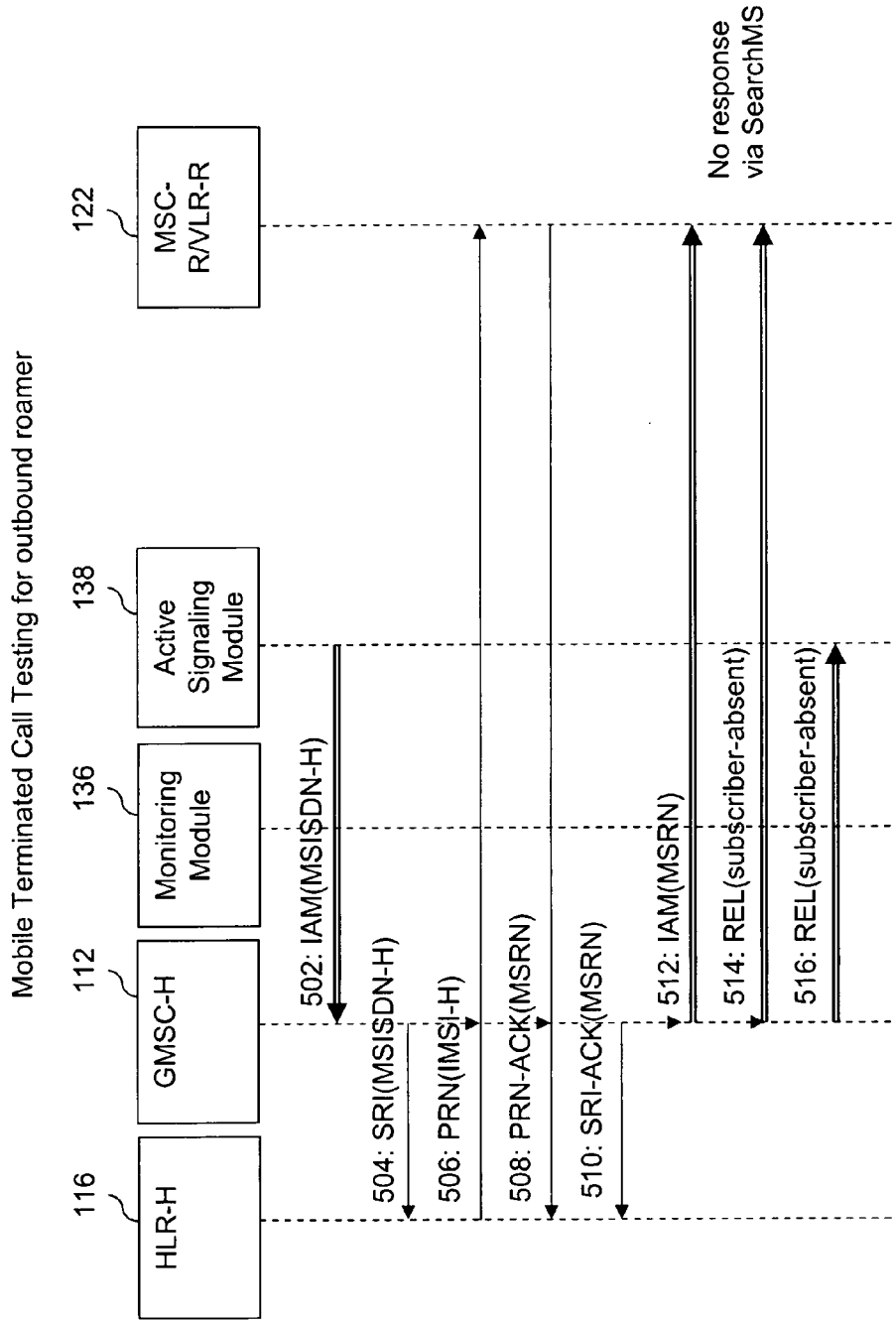
FIG. 5 represents a flow diagram for testing a Mobile Terminated (MT) call on the simulated outbound roamer's Mobile Station International Subscriber Directory Number (MSISDN), in accordance with a first embodiment of the present invention.

Once profile is created for the simulated outbound roamer's IMSI-H at MSC-R/VLR-R 122, PI module 102 can initiate a fake MT call on the MSISDN-H. FIG. 5 represents a flow diagram for testing an MT call on the simulated outbound roamer's MSISDN-H, in accordance with a first embodiment of the present invention. In one embodiment of the present invention, PI module 102 obtains MSISDN-H via monitoring of the signaling messages associated with the simulated outbound roamer (e.g., during the simulated outbound roamer's LUP process). In another embodiment of the present invention, PI module 102 obtains MSISDN-H via direct profile exchange. Also, active signaling module 138 issues a PRN request to MSC-R/VLR-R 122, in order to obtain an MSRN corresponding to the MSISDN-H in a PRN-ACK message from MSC-R/VLR-R 122. Moreover, active signaling module 138 issues a standalone ISD message on the IMSI-H to MSC-R/VLR-R 122, in order to obtain MSISDN-H in an ISD-ACK message from MSC-R/VLR-R 122. This process of initiating direct profile exchange and retrieving MSRN by active signaling module 138 is hereinafter interchangeably referred to as Outbound Test Profile Initiation (OTPI). In yet another embodiment of the present invention, PI module 102 already stores the MSISDN-H with its corresponding IMSI-H.

In order to test the MT call handling behavior of MSC-R/VLR-R 122, active signaling module 138 initiates MT call on the obtained MSISDN-H or the MSRN. Hence at step 502, active signaling module 138 issues an ISUP Initial Address Message (IAM) message on the MSISDN-H to GMSC-H 112. Thereafter, at steps 504 to 512, standard flow for an MT call follows with the exchange of SRI (MSISDN-H), PRN (IMSI-H), PRN-ACK (MSRN), SRI-ACK (MSRN) and ISUP IAM (MSRN) messages. In an embodiment of the present invention, monitoring module 136 optionally monitors signaling messages such as PRN (IMSI-H), PRN-ACK (MSRN), IAM (MSRN) and REL.

Furthermore, standard Q850 defines various release causes for call control messages. For example, this standard specifies that the "Subscriber Absent" cause value 20 is used when a mobile station has logged off and radio contact is not obtained with a mobile station or if a subscriber is temporarily not addressable at any user network interface. Since the subscriber in this case is a simulated outbound roamer, the simulated outbound roamer does not exist at the radio side. Thus, upon receiving ISUP IAM (MSRN) message from GMSC-H 112, when MSC-R/VLR-R 122 performs a SearchMS operation, no mobile will respond to this operation. Therefore, at step 514, MSC-R/VLR-R 122 issues a release (REL) message with an "absent subscriber" indication to GMSC-H 112. Finally at step 516, active signaling module 138 receives the REL message from GMSC-H 112. The absent subscriber indication in the received REL message allows PI module 102 to conclude that the MT call testing is successful. It will be apparent to a person skilled in the art that the release cause may be received a few seconds after the call initiation. This delay generally lasts approximately eight seconds and is usually steady for all networks. This delay is introduced by the SearchMS procedure at the radio interface. Hence, PI module 102 may use this delay to distinguish between such test calls and the calls released due to SearchMS abort from international connectivity issues.

Further, host PMN 104 operator may also want to test Third Generation of mobile (3G) MT calls for its simulated outbound roamers. Since 3G roaming video calls provides higher roaming revenue, ensuring successful testing of roaming video calls helps host PMN 104 operator to increase it 3G roaming revenue. This case assumes that roaming partner PMN 120 supports 3G roaming. In order to test 3G MT calls for simulated outbound roamer, simulated 3G roaming profiles need to be created for the outbound roamer at roaming partner PMN 120. 3G MT call testing is similar to the MT call testing explained above in conjunction with FIG. 5, except that 3G parameters are also exchanged during the OTPI process and at steps 502, 504, 506 and 512. 3G parameters indicate HLC, LLC and Bearer (GSM/ISDN) as defined in GSM 23.018 standard. Other tests can be on pre-paging support at MSC-R/VLR-R 122. Further, in this case of 3G MT call testing, the release cause in the REL message received at active signaling module 138 indicates whether roaming partner PMN 120 supports 3G for host PMN 104's outbound roamers. Similarly, host PMN 104 operator may also test 3G MT call testing for the simulated outbound roamer directly on the MSRN. The process for testing 3G MT call directly on the MSRN is same as the process described above for the normal MT call testing on the MSRN, except that active signaling module 138 also sends 3G parameters during the OTPI process and in the ISUP IAM message to MSC-R/VLR-R 122.

Inbound MT Call Testing

Figure 6:
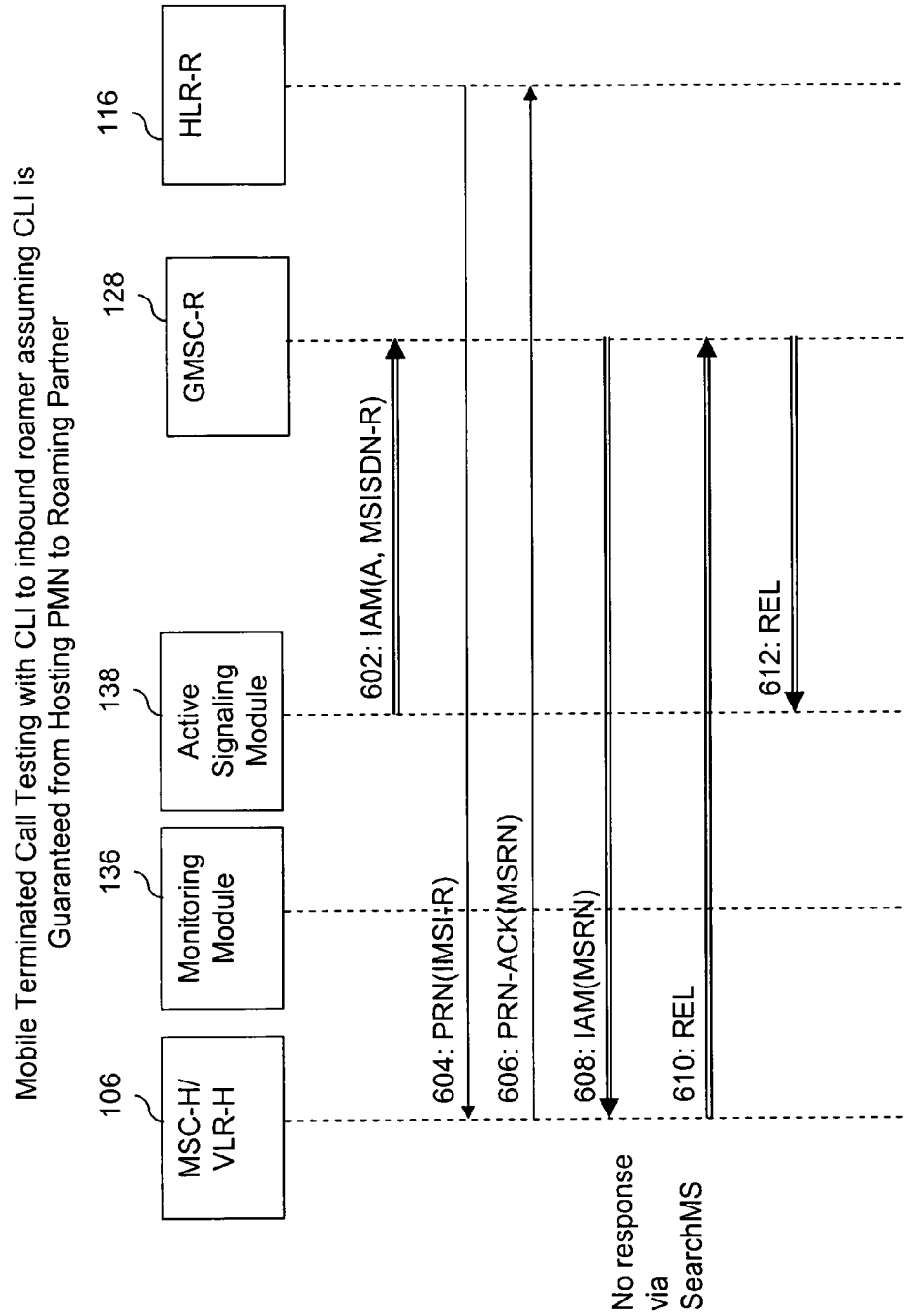
FIG. 6 represents a flow diagram for testing the MT call on the simulated inbound roamer's MSISDN, in accordance with a second embodiment of the present invention.

Furthermore, host PMN 104 operator may also want to test an MT call for its simulated inbound roamers. Once profile is created for the simulated inbound roamer's IMSI-R at MSC-H/VLR-H 106, PI module 102 can initiate a fake MT call on an MSISDN of the simulated inbound roamer. Since the MSISDN is associated with the inbound roamer's IMSI-R, it is hereinafter referred to as MSISDN-R. FIG. 6 represents a flow diagram for testing the MT call to the simulated inbound roamer's MSISDN-R, in accordance with a second embodiment of the present invention. PI module 102 obtains MSISDN-R using any one of the techniques explained above for obtaining MSISDN-H. In order to test the MT call handling behavior of MSC-H/VLR-H 106, active signaling module 138 initiates MT call on the obtained MSISDN-R or the MSRN. Hence at step 602, active signaling module 138 issues an ISUP IAM message on the MSISDN-R to GMSC-R 128, where 'A' represents a calling party. Steps 604 to 612 are same as corresponding steps in FIG. 5, which describes the exchange of SRI (not shown in FIG. 6), PRN, PRN-ACK, SRI-ACK (not shown in FIG. 6) and ISUP IAM messages. However, in this case of the simulated inbound roamer, IMSI-H is replaced with IMSI-R, MSISDN-H with MSISDN-R, MSC-R/VLR-R 122 with MSC-H/VLR-H 106, GMSC-H 112 with GMSC-R 128, and HLR-H 116 with HLR-R 132. Even the absent subscriber indication in the REL message allows PI module 102 to detect that the MT call test is successful, as explained in case of simulated outbound roamers.

Further, host PMN 104 operator may also test 3G MT call for its simulated inbound roamer similar to the 3G MT call test for the simulated outbound roamer explained above. However, IMSI-H, MSISDN-H, MSC-R/VLR-R 122, GMSC-H 112 and HLR-H 116 are replaced with IMSI-R, MSISDN-R, MSC-H/VLR-H 106, GMSC-R 128 and HLR-R 132, respectively.

Host PMN 104 operator may provide Calling Line Identity (CLI) services to its outbound and inbound roamers in order to increase the possibility of call completion, in addition to offering better roamer experience. However due to international and national interconnection problems, CLI issues may arise. PI module 102 allows host PMN 104 operator to test CLI delivery on the simulated roaming subscribers. The signal flow of MT call CLI testing between host PMN 104 and roaming partner PMN 120 for the simulated inbound roamer is same as normal MT call testing for the simulated inbound roamer as explained above, except that at step 608, ISUP IAM (MSRN) from GMSC-R 128 to MSC-H/VLR-H 106 is replaced with ISUP IAM (A, MSRN) where A is the calling party. In an embodiment of the present invention, PI module 102 obtains the caller ID using monitoring module 136 that monitors various signaling messages exchanged during the MT call testing for the simulated inbound roamer.

Alternatively, in another embodiment of the present invention, active signaling module 138 performs testing of the MT call to the simulated inbound roamer directly on the simulated inbound roamer's MSRN. In this case, active signaling module 138 issues a PRN request to MSC-H/VLR-H 106, in order to obtain an MSRN corresponding to the MSISDN-R in a PRN-ACK message from MSC-H/VLR-H 106. Moreover, active signaling module 138 obtains MSISDN-R via direct profile exchange by issuing a standalone ISD message on the IMSI-R to MSC-H/VLR-H 106. In this case, MSC-H/VLR-H 106 then returns MSISDN-R in an ISD-ACK message to active signaling module 138. This process of initiating direct profile exchange and retrieving MSRN by active signaling module 138 is hereinafter interchangeably referred to as Inbound Test Profile Initiation (ITPI). In this case, after retrieving MSRN during the ITPI process, active signaling module 138 issues an ISUP IAM signaling message on the MSRN to MSC-H/VLR-H 106. Thereafter, upon detecting no response for the SearchMS operation, MSC-H/VLR-H 106 returns the REL message to active signaling module 138 with the absent subscriber indication. PI module 102 therefore infers successful completion of MT call testing for the simulated inbound roamer in host PMN 104. Similarly, host PMN 104 operator may also test 3G MT call testing for the simulated inbound roamer directly on the MSRN. The process for testing 3G MT call directly on the MSRN is same as the process described above for the normal MT call testing on the MSRN, except that active signaling module 138 also sends 3G parameters during the ITPI process and in the ISUP IAM message to MSC-H/VLR-H 106.

MO Call Testing

PI module 102 can also initiate test MO call on an MSISDN of the simulated outbound roamer. Since the simulated roaming subscriber has no real mobile station associated with him, in order to test MO call, PI module 102 uses Call Forwarding (CF) technique, in accordance with an embodiment of the present invention. Although some MSC vendors split their configuration tables for MO and forwarded calls; however, such distinction is mainly used for local subscribers and is not applicable for roaming subscribers.

In various embodiments of testing MO call, since the mobile station is always not reachable, PI module 102 sets the FTN at an MSC/VLR location of the simulated roaming subscriber. The process of setting FTN is same as the OTPI/ITPI process described earlier for setting SS, ODB or CSI, except that in case of setting FTN at the MSC/VLR location, active signaling module 138 sends FTN along with the IMSI (i.e., IMSI-H in case of outbound and IMSI-R in case of inbound) of the roaming subscriber to the MSC/VLR. In an embodiment of the present invention, host PMN 104 operator configures GMSC-H 112 to direct signaling messages such as ISUP IAM and REL on the FTN to active signaling module 138.

Outbound MO Call Testing

Figure 7:
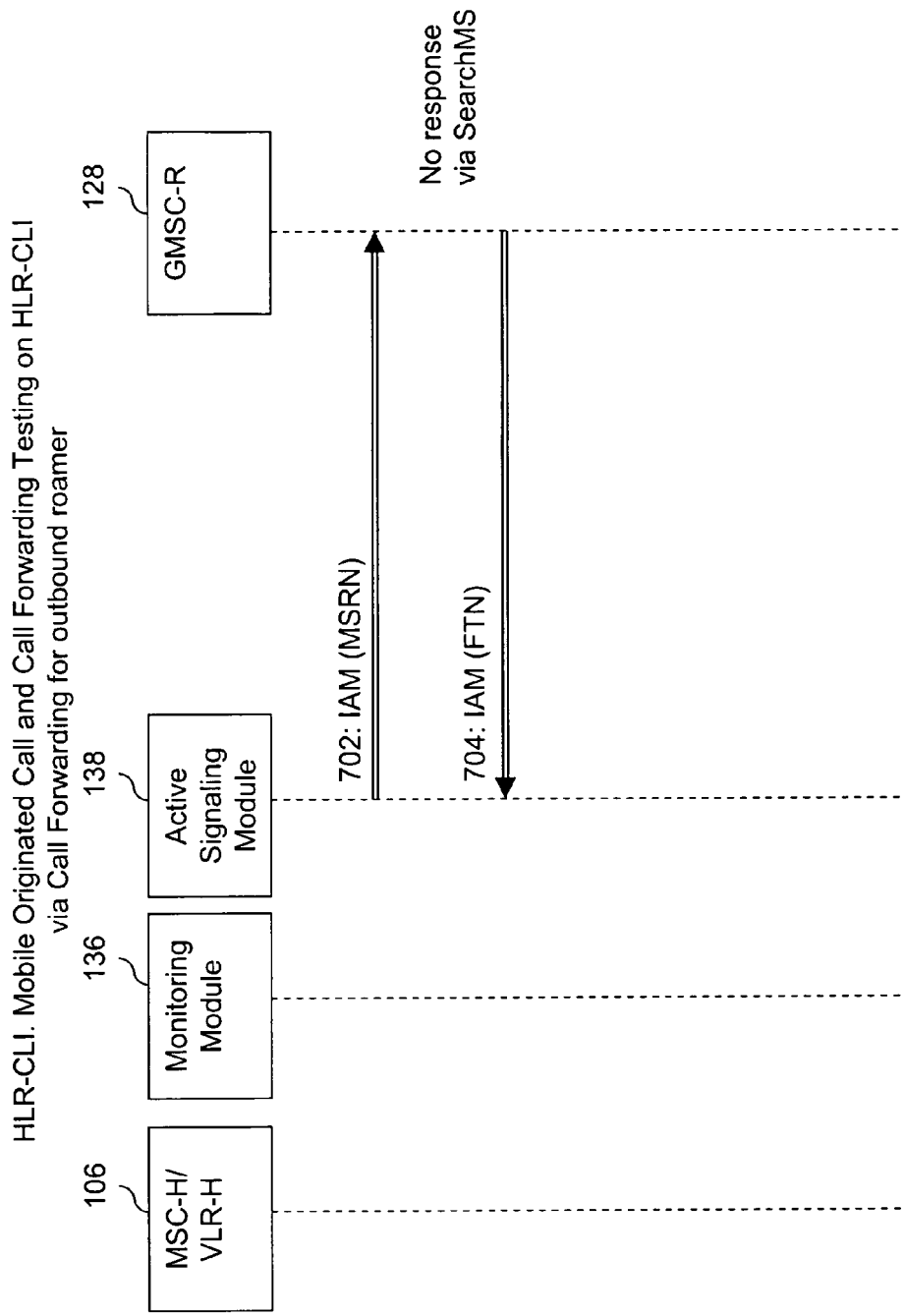
FIG. 7 represents a flow diagram for testing a Mobile Originated (MO) call by the simulated outbound roamer, in accordance with a first embodiment of the present invention.

FIG. 7 represents a flow diagram for testing MO call by the simulated outbound roamer, in accordance with a first embodiment of the present invention. In order to test the MO call handling behavior of MSC-R/VLR-R 122, active signaling module 138 initiates MT call on the MSISDN-H or the MSRN. Hence at step 702, active signaling module 138 issues an ISUP IAM message on the MSRN to MSC-R/VLR-R 122.

In an embodiment of the present invention, when MSC-R/VLR-R 122 initiates searchMS operation to search mobile station of the simulated outbound roamer, the operation fails to establish radio contact as there is no real mobile station associated with the simulated outbound roamer (i.e., absent subscriber). Since call forwarding is set at MSC-R/VLR-R 122 with the FTN as active signaling module 138's number, MSC-R/VLR-R 122 directs the MO call on the FTN. Hence at step 704, MSC-R/VLR-R 122 initiates a forwarded call such as an ISUP IAM (FTN) to active signaling module 138. Detection of the ISUP IAM (FTN) at active signaling module 138 signifies successful completion of MO call testing. In an embodiment of the present invention, in order to avoid generation of Call Detail Record (CDR) for the fake MO call, active signaling module 138 exchanges ISUP REL messages with MSC-R/VLR-R 122.

In an embodiment of the present invention, active signaling module 138 sends simulated roamer profile containing a CAMEL O-CSI parameter or VT-CSI parameter to MSC-R/VLR-R 122, where a Service Control Point (SCP) GT of the CSI is set to active signaling module 138. Thus, host PMN 104 distinguishes the failure of MO test using incoming call (i.e., from roaming partner PMN 120 to host PMN 104) rather than outgoing call (i.e. from host PMN 104 to roaming partner PMN 120). In case of CAMEL-enabled simulated roaming subscriber, simulated roaming subscriber's MSC/VLR sends a CAMEL IDP message to active signaling module 138, before the call is forwarded. Detection of the CAMEL IDP message at active signaling module 138 confirms either successful completion of MT call or initiation of CF procedure. By doing so, PI module 102 is able to detect any issues in the MO leg of the call. Moreover, in case of a successful MO call attempt, PI module 102 evaluates call setup duration by calculating the time difference between the reception of the ISUP IAM and the CAMEL IDP at active signaling module 138.

In order to test 3G MO calls for simulated outbound roamer, simulated 3G roaming profiles need to be created for the outbound roamer at 3G supported roaming partner PMN 120. 3G MO call testing is similar to the MO call testing explained above in conjunction with FIG. 7, except that 3G parameters are also exchanged during the OTPI process and at steps 702 and 704. Furthermore, PI module 102 allows host PMN 104 operator to test CLI delivery on the simulated outbound roamer. Some host PMNs provide an HLR based CLI solution to its roaming partner PMNs. Under this solution, a host PMN HLR and a roaming partner PMN VLR supports PRN additional signal information where the caller party A will be present in an SRI request to the host network HLR. The signal flow of MO call CLI testing between host PMN 104 and roaming partner PMN 120 for the simulated outbound roamer is same as normal MO call testing for the simulated outbound roamer explained above in conjunction with FIG. 7, except that at step 702, ISUP IAM (MSRN) is replaced with ISUP IAM (unknown, MSRN) and at step 704, ISUP IAM (FTN) is replaced with ISUP IAM (A, FTN) where A in this case is the calling party (i.e., simulated outbound roamer). In this case of MO call CLI testing, active signaling module 138 also sends the calling party A to MSC-R/VLR-R 122 during the OTPI process. Since a PRN message exchanged between MSC-R/VLR-R 122 and HLR-H 116 already contains simulated outbound roamer's CLI, active signaling module 138 does not issue caller ID in the ISUP IAM call to MSC-R/VLR-R 122. By doing so, PI module 102 tests PRN additional signal information support and CLI support from roaming partner PMN 120 to host PMN 104.

Alternatively, in another embodiment of the present invention, PI module 102 tests MO call on a non-HLR based CLI for the simulated outbound roamer. The signal flow of MO call non-HLR CLI testing between host PMN 104 and roaming partner PMN 120 is same as HLR based CLI testing explained above, except that active signaling module 138 sends ISUP IAM (A, MSRN) instead of ISUP IAM (unknown, MSRN) and the calling part A is not exchanged during the OTPI process. In an embodiment of the present invention, in case the non-HLR CLI is guaranteed in both directions (i.e., host PMN 104 and roaming partner PMN 120 directions), then active signaling module 138 receives the caller ID from MSC-R/VLR-R 122.

Inbound MO Call Testing

Figure 8:
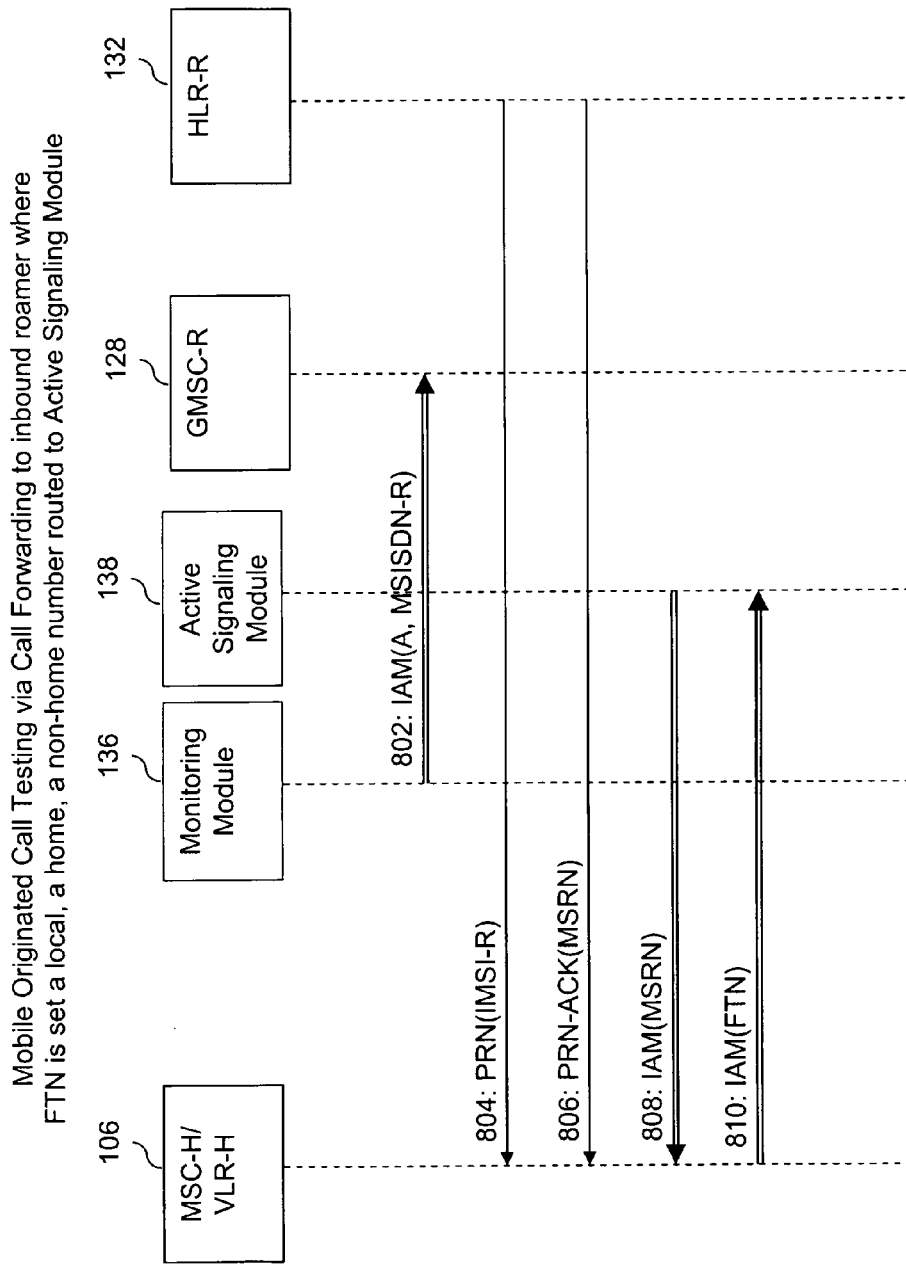
FIG. 8 represents a flow diagram for testing MO call by the simulated inbound roamer, in accordance with a second embodiment of the present invention.

Furthermore, host PMN 104 operator may also want to test MO calls for its simulated inbound roamers. FIG. 8 represents a flow diagram for testing MO call by the simulated inbound roamer, in accordance with a second embodiment of the present invention. PI module 102 obtains MSISDN-R using any one of the techniques explained earlier for obtaining MSISDN-H, except that MSC-R/VLR-R 122 is replaced with MSC-H/VLR-H 106 while exchanging messages. In case the technique used is ITPI, active signaling module 138 also adds an FTN for the simulated inbound roamer at MSC-H/VLR-H 106. In an embodiment of the present invention, host PMN 104 operator configures active signaling module 138 to set the FTN as a local number, a host PMN number or a non-host PMN number at MSC-H/VLR-H 106. In order to test the MO call handling behavior of MSC-H/VLR-H 106, active signaling module 138 initiates MT call on the obtained MSISDN-R or the MSRN. Hence at step 802, active signaling module 138 issues an ISUP IAM message on the MSISDN-R to GMSC-R 128 with calling party as A. Thereafter, at steps 804 to 808, the exchange of PRN (IMSI-H), PRN-ACK (MSRN) and ISUP IAM (MSRN) messages follows standard flow for MT call. Finally at step 810, active signaling module 138 receives a forwarded call such as ISUP IAM message on the FTN from MSC-H/VLR-H 106. Detection of the forwarded call at active signaling module 138 indicates successful completion of the MO call testing for the simulated inbound roamer. In an embodiment of the present invention, in order to avoid generation of CDR for the fake MO call, active signaling module 138 returns an ISUP REL message to MSC-H/VLR-H 106.

Further, host PMN 104 operator may also test 3G MO call for its simulated inbound roamer coming from 3G supported roaming partner PMN 120. The call flow for testing 3G MO call is similar to the 2G MO call test for the simulated inbound roamer (as explained above in conjunction with FIG. 8). However, active signaling module 138 also sends 3G parameters; during the ITPI process, in the ISUP IAM message to GMSC-R 128, the PRN and ISUP IAM messages from HLR-R 132 to MSC-H/VLR-H 106, and the ISUP IAM message on the FTN from MSC-H/VLR-H 106 to active signaling module 138.

Alternatively, in another embodiment of the present invention, host PMN 104 applies an optimal routing technique to test MO call via call forwarding to the simulated inbound roamer. The process for testing MO call using optimal routing technique is same as normal testing of MO call as described above in conjunction with FIG. 8, except that the optimal routing technique allows host PMN 104 to perform the MO call testing within its own network. Therefore, signaling messages ISD, PRN, PRN-ACK, IAM (MSRN) and IAM (FTN) are exchanged between active signaling module 138 and MSC-H/VLR-H 106. As explained earlier, detection of the forwarded call (i.e., ISUP IAM (FTN)) at active signaling module 138 confirms successful testing of the MO call. In an embodiment of the present invention, PI module 102 compares MO call test results generated from the testing done in FIG. 8 and optimal routing technique. Using these results, host PMN 104 operator can identify issues related to its international connectivity to roaming partner PMN 120.

Revenue Assurance

Host PMN 104 operator can use the MO call test to ensure revenue assurance on MO calls and MT calls at any switch of roaming partner PMN 120 for outbound roaming and at any switch of host PMN 104 operator for inbound roaming. This is beneficial for host PMN 104 operator as it can test new tariff changes (e.g., due to regulation or new tariff) on a network operator's (its own network or roaming partner networks) mediation and billing process after an initial TADIG testing at the establishment of roaming agreements. In this case, CDR needs to be generated at the involved switch. PI module 102 needs to have active ISUP signaling support, in accordance with an embodiment of the present invention. This active ISUP signaling support is achieved by direct ISUP signaling between GMSC-H 112 and active signaling module 138. In this case, PI module 102 also has circuit trunk support, in accordance with an embodiment of the present invention. Alternatively, in another embodiment of the present invention, circuit trunk support is achieved by ISUP loopback from GMSC-H 112 to active signaling module 138, which need not have circuit trunk support. The creation of actual CDR also facilitates host PMN 104 operator to identify which roaming partner network is compliant with Transferred Account Procedure (TAP) format.

Since MO call testing is essentially MT call testing with late call forwarding, there are two legs of roaming charges for the simulated roaming subscriber. The first leg is an MT leg and the second leg is an MO leg, which allows revenue assurance test for both MO and MT calls in one test. In an embodiment of the present invention, PI module 102 applies revenue assurance for only the MO leg when the optimal routing technique is applied for the inbound roaming tests. In this case, host PMN 104 operator may restrict its test to MO call only.

For outbound roaming tests, calls are tested for FTNs that are known to host PMN 104 operator. However, for inbound roaming tests, calls can be tested on any FTN as long as host PMN 104 operator is able to route the call to PI module 102.

Figure 9:
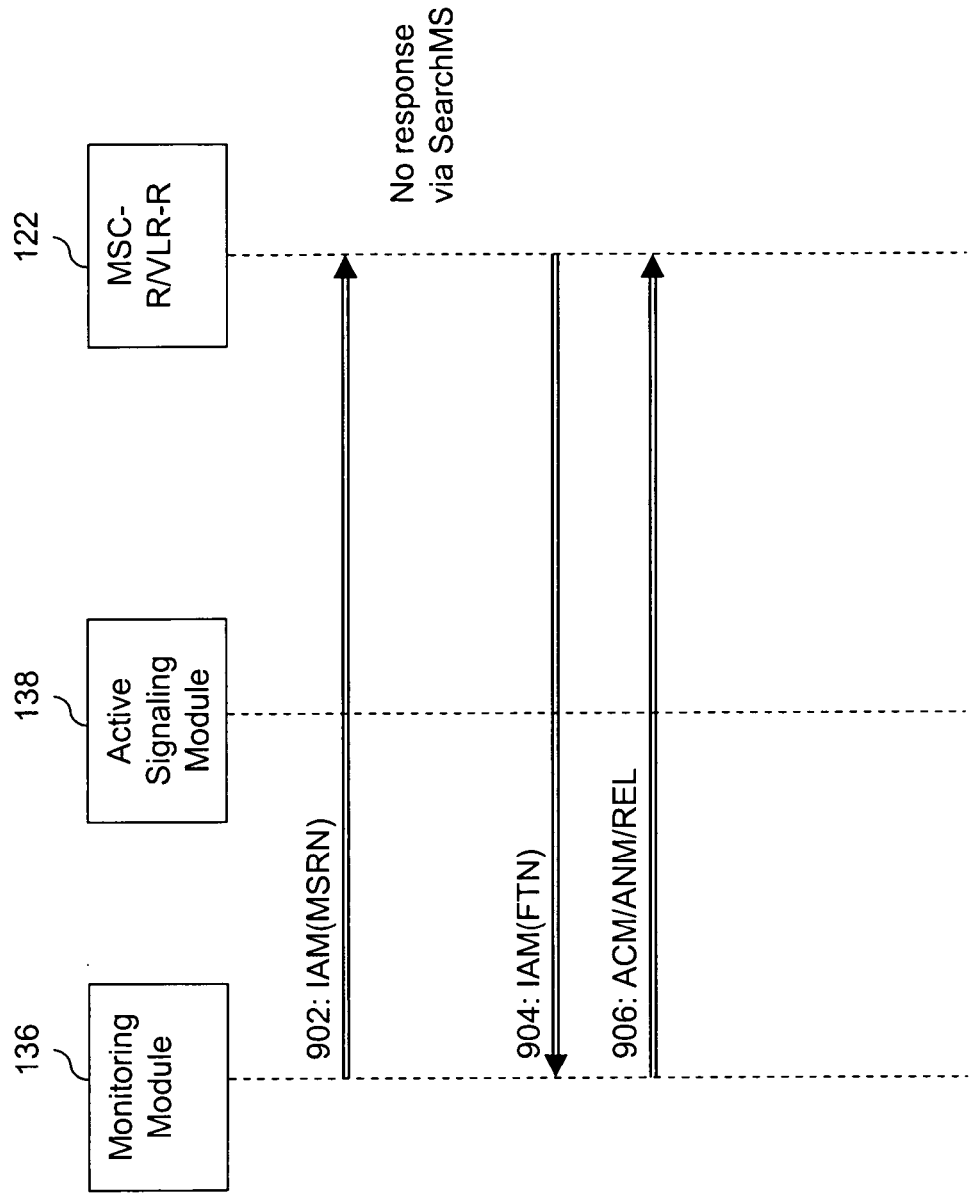
FIG. 9 represents a flow diagram for testing MO call by the simulated outbound roamer using a Forward-To Number (FTN) of the host PMN, in accordance with a first embodiment of the present invention.

FIG. 9 represents a flow diagram for testing MO call by the simulated outbound roamer using an FTN of host PMN 104, in accordance with a first embodiment of the present invention. This embodiment assumes that an MT call on such an FTN is destined for active signaling module 138. OTPI process and steps 902 to 904 of this embodiment is similar to the OTPI process and corresponding steps, respectively, explained earlier in conjunction with FIG. 7, except that the forwarded call is answered for a configurable time (i.e., defined by host PMN 104 operator) to get MT and MO roaming CDRs generated for outbound and inbound roamers. Thus at step 906, upon receiving the forwarded call ISUP IAM (FTN) from MSC-R/VLR-R 122, active signaling module 138 returns an answer message such as an ISUP ACM message and an ISUP ANM message to MSC-R/VLR-R 122 so as to charge the MO call. Additionally, to terminate the answered call, active signaling module 138 can also return an ISUP REL message to MSC-R/VLR-R 122. The revenue assurance of 3G MO call is similar to the MO call testing explained above in conjunction with FIG. 9, except that 3G parameters are also exchanged during the OTPI process and at steps 902 and 904.

Alternatively, in another embodiment of the present invention, PI module 102 tests MO call by the simulated outbound roamer using an FTN of a network other than host PMN 104. Such an FTN and network are hereinafter interchangeably referred to as non-host FTN and non-host PMN, respectively. Even this embodiment assumes that an MT call on such an FTN is destined for active signaling module 138. Host PMN 104 operator uses this case for revenue assurance, as described earlier. The signal flow for testing MO call using non-host FTN is similar to the MO call testing explained above in conjunction with FIG. 9, except that the forwarded call is received at the non-host PMN. Moreover, active signaling module 138 receives an ACM message and an ANM message from MSC-R/VLR-R 122. Detection of the ACM and ANM messages at active signaling module 138 confirms the successful testing of MO call. Active signaling module 138 then returns a REL message to MSC-R/VLR-R 122 at some time instant (i.e., configurable by host PMN 104 operator), in accordance with one embodiment of the present invention. Alternatively, in another embodiment of the present invention, active signaling module 138 receives the REL message from MSC-R/VLR-R 122.

Figure 10:
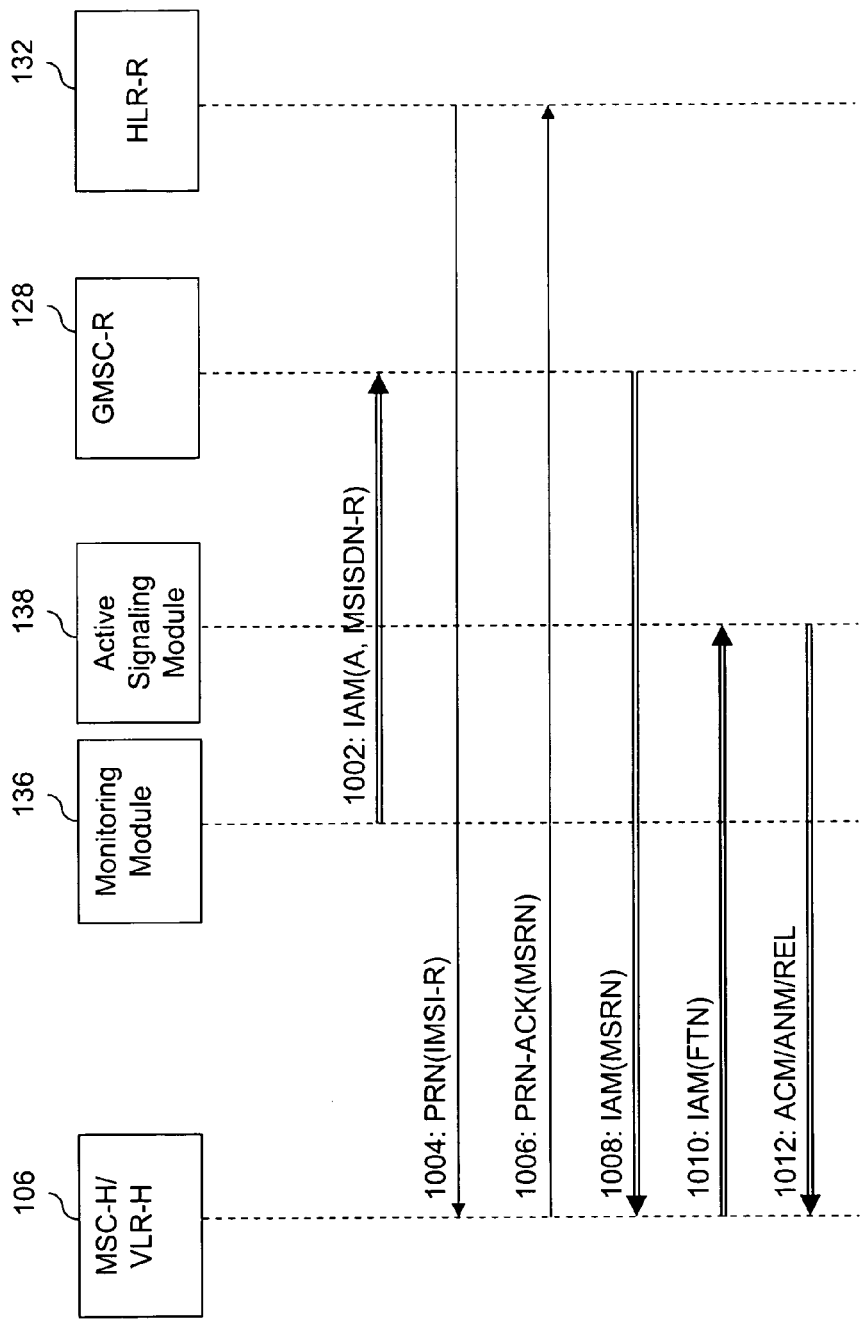
FIG. 10 represents a flow diagram for testing MO call by the simulated inbound roamer using a local number, or a number of the host PMN, or a non-host PMN number as the FTN destined for the PI module, in accordance with a second embodiment of the present invention.

Host PMN 104 operator can also use the MO call test to provide revenue assurance for the simulated inbound roamer. FIG. 10 represents a flow diagram for testing MO call by the simulated inbound roamer using a local number or a number of host PMN 104 or a non-host PMN number as the FTN destined for active signaling module 138, in accordance with a second embodiment of the present invention. ITPI process and steps 1002 to 1010 of this embodiment is similar to the ITPI process and corresponding steps, respectively, explained earlier in conjunction with FIG. 8. Further, active signaling module 138 answers the forwarded call IAM (FTN) for a configurable time so as to get MT and MO roaming CDRs generated for outbound roaming and inbound roaming. Thus at step 1012, active signaling module 138 issues an ISUP ACM message and an ISUP ANM message to MSC-H/VLR-H 106. Additionally, active signaling module 138 issues an ISUP REL message to release the fake call on the FTN. The revenue assurance of 3G MO call is similar to the MO call testing explained above in conjunction with FIG. 10, except that 3G parameters are also exchanged during the OTPI process and at steps 1002, 1004, 1008 and 1010.

CAMEL Testing and CAMEL Revenue Assurance

For roaming partner PMNs that have CAMEL support and CAMEL agreements with host PMN 104, PI module 102 can also perform CAMEL MO call and MT call testing. In an embodiment of the present invention, PI module 102 tests O-CSI for CAMEL phase 1 and 2, and VT-CSI for CAMEL phase 3 via MO call and MT call, respectively. Depending on the CAMEL phase I or above, PI module 102 can also test CAMEL phase-specific messages such as, but not limited to, Event Reports BCSM (ERB), Call Information Reports and online charging. For the sake of simplicity, various embodiments of the present invention refer CAMEL support and CAMEL agreement as CAMEL agreement only.

In order to test CAMEL MO and MT calls, PI module 102 needs to first create fake profile for the simulated roaming subscriber at his MSC/VLR location. Therefore, in various embodiments of CAMEL MO and MT calls described below, PI module 102 performs the OTPI and IPTI processes for simulated outbound roamer and simulated inbound roamer, respectively. Additionally, in the OTPI and ITPI processes, PI module 102 also creates O-CSI and VT-CSI profile for MO and MT calls, respectively, with SCP (or gsm-SCF) GT set to active signaling module 138. Thereafter, PI module 102 tests O-CSI with MO call testing via call forwarding (i.e., to the FTN) of the MT call, and tests VT-CSI with MT call testing.

Furthermore, CAMEL implementations or versions in some vendors' VLRs have errors as discovered in the field. Although CAMEL profiles is created properly in such VLRs, but CAMEL features are not supported as desired by these VLRs' network operators. Hence CAMEL testing is essential to discover these problems. In an embodiment of the present invention, for network operators that do not pass CAMEL tests, host PMN 104 operator applies Steering of Routing (SoR) techniques to dynamically move its outbound roamers to a network that supports CAMEL roaming.

Figure 11:
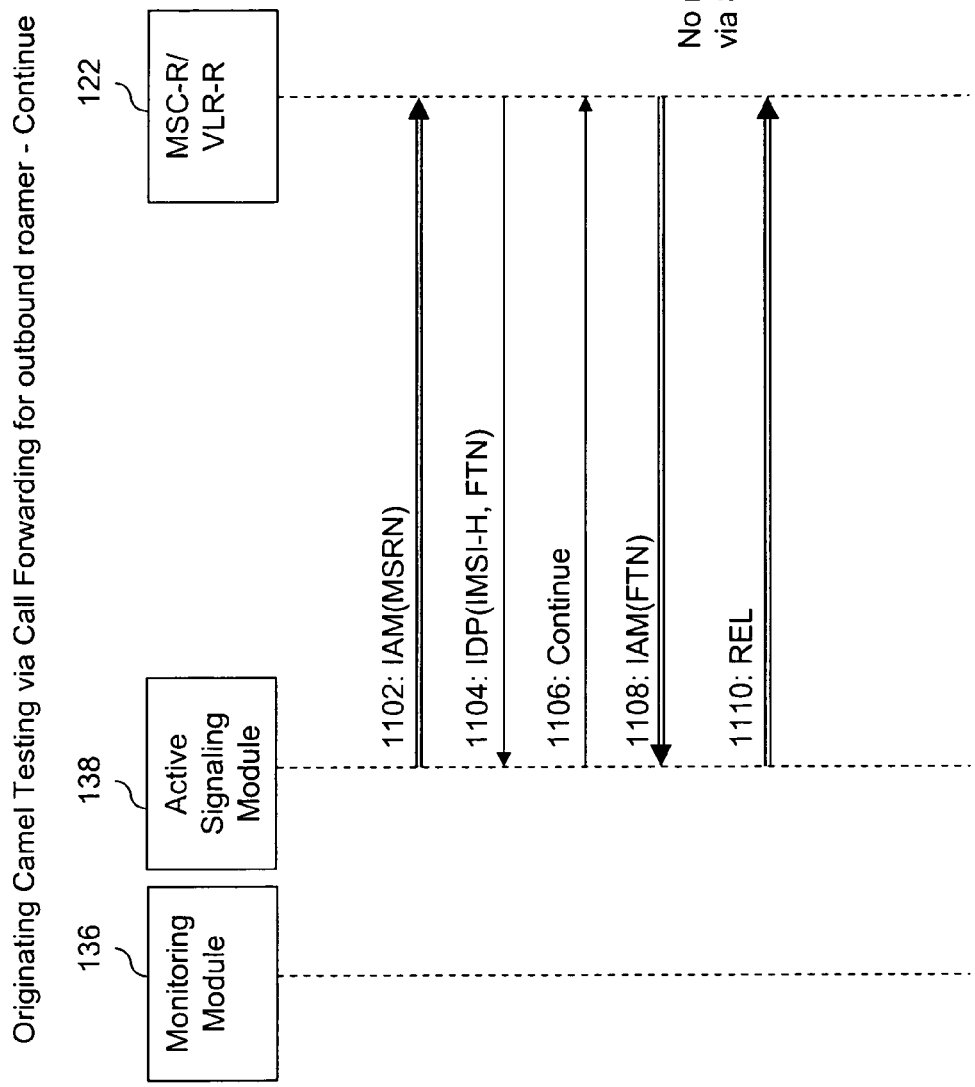
FIG. 11 represents a flow diagram for testing of Originating CAMEL Subscription Information (O-CSI) on the simulated outbound roamer using a Continue operation, in accordance with a first embodiment of the present invention.

FIG. 11 represents a flow diagram for testing of O-CSI on the simulated outbound roamer using Continue operation, in accordance with a first embodiment of the present invention. In this case, PI module 102 ensures that CDR is not generated for the simulated outbound roamer at any MSC/VLR of a roaming partner network with which the O-CSI test is performed. At step 1102, active signaling module 138 issues an ISUP IAM to MSC-R/VLR-R 122 on an MSRN obtained from the OTPI process.

Upon receiving the ISUP IAM (MSRN) message at MSC-R/VLR-R 122, MSC-R/VLR-R 122 initiates SearchMS procedure as described earlier. Moreover, in case the simulated outbound roamer is a CAMEL-enabled subscriber, MSC-R/VLR-R 122 returns a CAP IDP message on the FTN to active signaling module 138, prior to initiating the call forwarding via ISUP signaling, at step 1104. In an embodiment of the present invention, the CAP IDP message reception informs PI module 102 that the MT call is successful or call forwarding procedure is initiated. By doing so, PI module 102 detects whether the MO leg is troublesome. Further at step 1106, active signaling module 138 issues a Continue message to MSC-R/VLR-R 122, in order to test successful MO call attempt on the simulated outbound roamer. At step 1108, MSC-R/VLR-R 122 returns a forwarded call ISUP IAM (FTN) to active signaling module 138. Finally at step 1110, in order to avoid generation of CDR for the simulated outbound roamer at MSC-R/VLR-R 122, active signaling module 138 issues a REL message to MSC-R/VLR-R 122. In an embodiment of the present invention, for a successful MO call test, PI module 102 evaluates call setup duration by calculating the time difference between the issue of the ISUP IAM (MSRN) message and reception of the CAMEL IDP message.

Similarly, host PMN 104 operator can also test O-CSI for CLI delivery from host PMN 104 to roaming partner PMN 120. This case assumes that roaming partner PMN 120 supports CAMEL roaming. The signal flow for testing O-CSI for CLI delivery is similar to testing O-CSI without CLI delivery explained above in conjunction with FIG. 11, except that ISUP IAM (MSRN), IDP (IMSI-H, FTN) and ISUP IAM (FTN) messages are replaced with ISUP IAM (A, MSRN), IDP (A, IMSI-H, B, FTN) and ISUP IAM (A, B, FTN) messages, respectively, where A is a calling party and B is an original called party. Since the CLI is guaranteed from host PMN 104 to roaming partner PMN 120, the CAP IDP message contains the information for calling party A.

Alternatively, in another embodiment of the present invention, host PMN 104 operator tests O-CSI using HLR based CLI solution. The signal flow for testing O-CSI for HLR based CLI delivery is similar to testing O-CSI for non-HLR based CLI delivery explained earlier in the context of the present invention, except that active signaling module 138 sends the caller ID during the OTPI process instead of sending it in the ISUP IAM call to MSC-R/VLR-R 122. In this case of HLR based CLI delivery, a PRN message exchanged during the MO call testing contains the CLI. Moreover, since the CAP IDP message or the forwarded call ISUP IAM contains the calling party A, PI module 102 tests PRN additional signal information support. In one embodiment of the present invention in case of CAMEL support and CAMEL agreement between host PMN 104 and roaming partner PMN 120, PRN additional signal information support is tested without relying on CLI delivery from roaming partner PMN 120 to host PMN 104. In another embodiment of the present invention, in case of absence of either CAMEL support at host PMN 104 or roaming partner PMN 120, or CAMEL agreement between host PMN 104 and roaming partner PMN 120, PRN additional signal information support is tested by relying on CLI delivery from roaming partner PMN 120 to host PMN 104.

Further in case of absence of CAMEL support, if the MT leg of the forwarded call in MO call test indicates correct redirection cause even though caller ID is absent, host PMN 104 operator infers that the MO leg from its network to roaming partner PMN 120 has Quality of Service (QoS) issues on CLI delivery. In an embodiment of the present invention, in case the MT leg is known to have CLI guarantee, then the MO call testing results with no CLI in the MT leg indicates that the MO leg has CLI QoS issues, whereas MT leg has no such issues. However, in another embodiment of the present invention in case the MO leg is known to have CLI guarantee, then the MO call testing results with no CLI in the MT leg indicates that the MT leg has CLI QoS issues. In this case, PI module 102 needs CAMEL support or PRN additional signal information support to test whether the MO leg has CLI QoS issues. Alternatively in case of lack of such support, host PMN 104 operator gathers information for different routes to determine which route has QoS and CLI issues, using PI module 102. In an embodiment of the present invention, active signaling module 138 initiates plurality of calls on shared routes to different destinations (including MSCs of the same country, same networks etc.). In this way, host PMN 104 operator statistically gathers information for the route that is really losing CLI or introducing QoS issues. For example, if destinations A and B share the same outgoing route from host PMN 104 perspective, then if call legs from destination A towards host PMN 104 often delivers CLI and meets desired QoS, whereas call legs from destination B does not deliver CLI and meets desired QoS; then host PMN 104 operator concludes that the B's route to host PMN 104 is to be corrected.

In another embodiment of the present invention, host PMN 104 operator tests O-CSI on the simulated outbound roamer using Connect operation. Even in this case, PI module 102 ensures that CDR is not generated for the simulated outbound roamer at any MSC/VLR of a roaming partner network with which the O-CSI test is performed. The signal flow for testing O-CSI for CLI delivery using Connect operation is similar to testing O-CSI using Continue operation explained above in conjunction with FIG. 11, except that Continue and ISUP IAM (FTN) messages are replaced with a Connect message on a new number and an ISUP IAM message on the new number, respectively. The new number can be any number including international numbers to host PMN 104 or third countries (i.e., other than host PMN 104 and roaming partner PMN 120 countries), which can be used to test call barring (SS or ODB) as mentioned earlier. For example, host PMN 104 operator can test call barring to disallow calls to international numbers except host PMN 104 by having CAP Connect to set the new number to a non-host international number.

Figure 12:
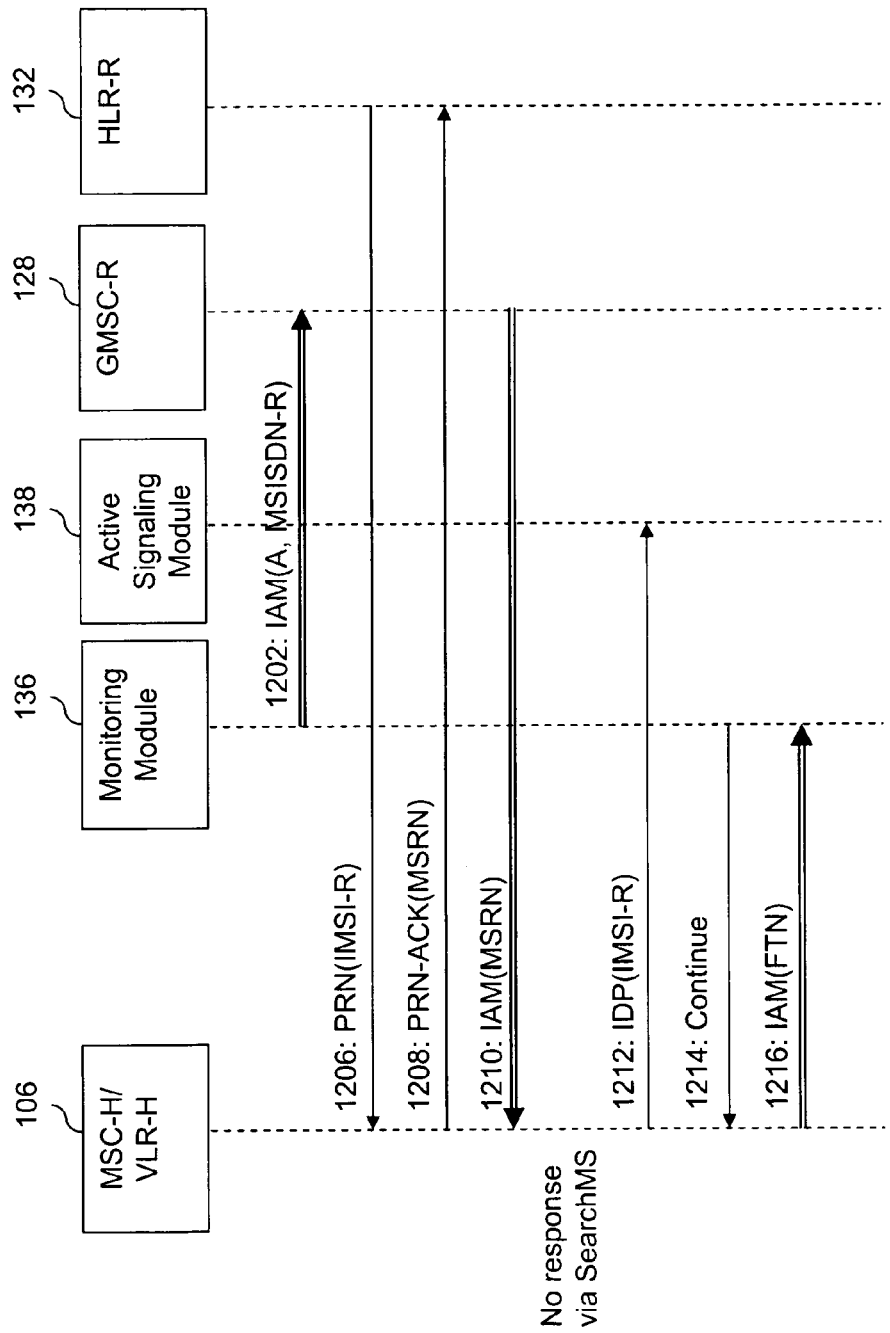
FIG. 12 represents a flow diagram for testing of the O-CSI on the simulated inbound roamer using the Continue operation, in accordance with a second embodiment of the present invention.

Furthermore, host PMN 104 operator can also perform O-CSI testing for the simulated inbound roamer. FIG. 12 represents a flow diagram for testing of O-CSI on the simulated inbound roamer using Continue operation, in accordance with a second embodiment of the present invention. Similar to testing of O-CSI on the simulated inbound roamer, PI module 102 ensures that CDR is not generated for the simulated inbound roamer at any MSC/VLR of a roaming partner network with which the O-CSI test is performed. The process of setting FTN at MSC-H/VLR-H 106 is same as the ITPI process described earlier in the context of the present invention. Further, the signal flow in steps 1202 to 1208 is same as signal flow explained earlier in steps 802 to 808, where active signaling module 138 issues the fake call to GMSC-R 128, and thereafter standard signal flow for MT call follows. Since profile information for the simulated inbound roamer at MSC-H/VLR-H 106 is earlier updated with O-CSI, MSC-H/VLR-H 106 issues a CAP IDP message on the IMSI-R to active signaling module 138, at step 1210. Finally at steps 1212 and 1214, active signaling module 138 issues a Continue message to MSC-H/VLR-H 106, and MSC-H/VLR-H 106 returns an ISUP IAM on the FTN to active signaling module 138.

Alternatively, in another embodiment of the present invention, PI module 102 tests O-CSI on the simulated inbound roamer on Connect operation. The signal flow for this case is similar to signal flow explained above in conjunction with FIG. 12, except that signaling messages Continue and ISUP IAM (FTN) are replaced with signaling messages Connect (new number) and ISUP IAM (new number), respectively.

Figure 13:
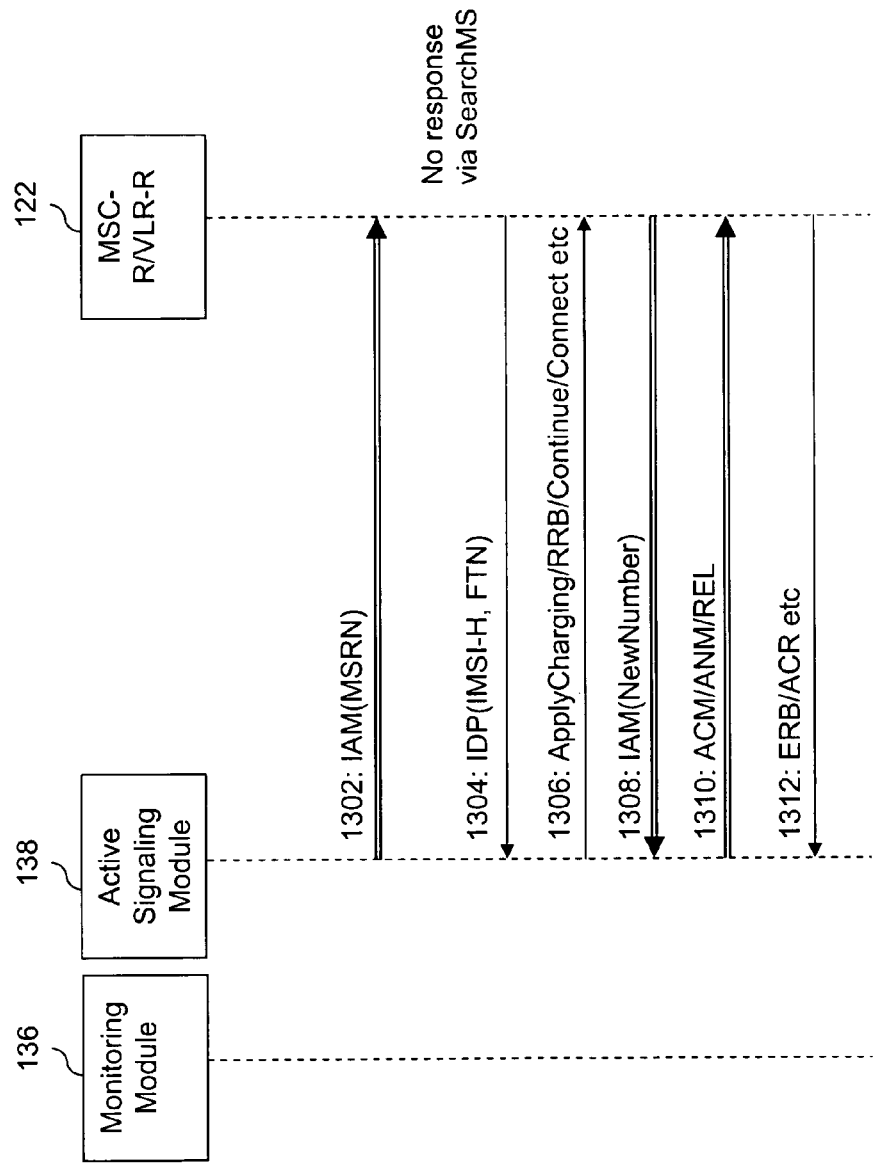
FIG. 13 represents a flow diagram for testing of the O-CSI on the simulated outbound roamer for CAMEL revenue assurance, in accordance with a first embodiment of the present invention.

FIG. 13 represents a flow diagram for testing of O-CSI on the simulated outbound roamer for CAMEL revenue assurance, in accordance with a first embodiment of the present invention. In this case, PI module 102 answers the MO call for the simulated outbound roamer at any MSC/VLR of a roaming partner PMN, in order to generate CDR at the involved switch. The OTPI process is same as the OTPI process explained earlier in conjunction with FIG. 11. The signal flow in steps 1302 and 1304 is same as corresponding signal flow explained earlier in conjunction with FIG. 11, where active signaling module 138 issues the call ISUP IAM (MSRN) to MSC-R/VLR-R 122, and then active signaling module 138 receives CAP IDP (IMSI-H, FTN) message from MSC-R/VLR-R 122. Thereafter, at step 1306, active signaling module 138 issues Apply charging, Request Report Basic call state model (RRB), Continue and Connect messages to MSC-R/VLR-R 122. Further at step 1308, MSC-R/VLR-R 122 issues an ISUP IAM message on the new number to active signaling module 138, in response to which active signaling module 138 issues ACM, ANM and REL messages to MSC-R/VLR-R 122, at step 1310. Finally at step 1312, MSC-R/VLR-R 122 issues an ERB message to active signaling module 138.

Figure 14:
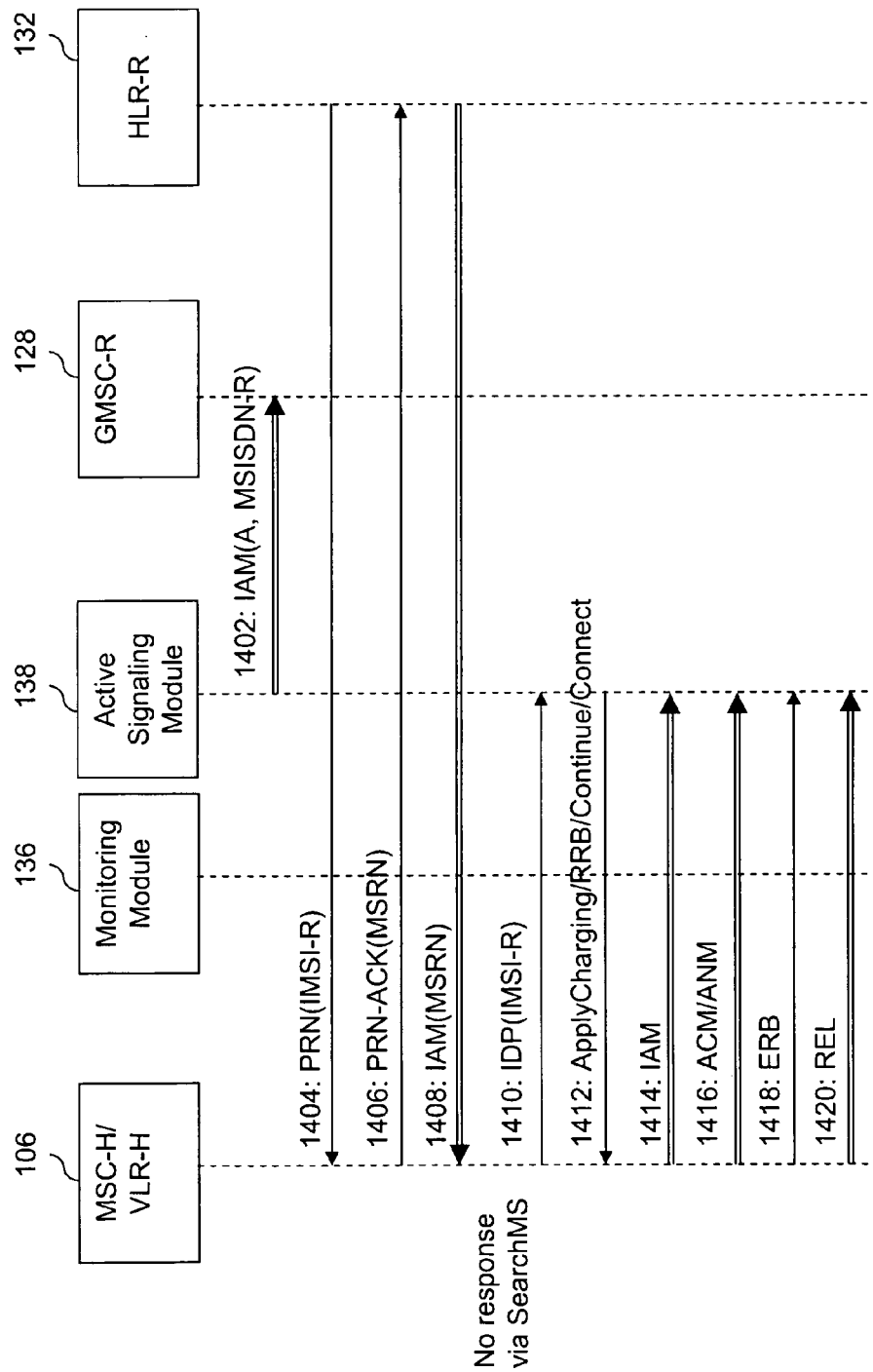
FIG. 14 represents a flow diagram for testing of the O-CSI on the simulated inbound roamer for CAMEL revenue assurance, in accordance with a second embodiment of the present invention.

FIG. 14 represents a flow diagram for testing of O-CSI on the simulated inbound roamer for CAMEL revenue assurance, in accordance with a second embodiment of the present invention. In this case, PI module 102 answers the MO call for the simulated inbound roamer at any MSC/VLR of a roaming partner PMN, in order to generate CDR at the involved switch. The ITPI process in this case is same as the ITPI process explained earlier in conjunction with FIG. 12. The signal flow in steps 1402 to 1410 is same as signal flow explained earlier in corresponding steps explained earlier in conjunction with FIG. 12, where active signaling module 138 issues the call ISUP IAM on the MSISDN-R to GMSC-R 128, and thereafter standard signal flow for MT call follows. Further at step 1412, active signaling module 138 issues Apply charging, RRB, Continue and Connect messages to MSC-H/VLR-H 106. At step 1414, MSC-H/VLR-H 106 issues an ISUP IAM message to active signaling module 138, in response to which active signaling module 138 issues ACM and ANM messages to MSC-H/VLR-H 106, at step 1416. Thereafter at step 1418, MSC-H/VLR-H 106 issues an ERB message to active signaling module 138. Finally at step 1420, MSC-H/VLR-H 106 issues a REL message to active signaling module 138, in order to terminate the ISUP IAM call initiated at step 1414.

Figure 15:
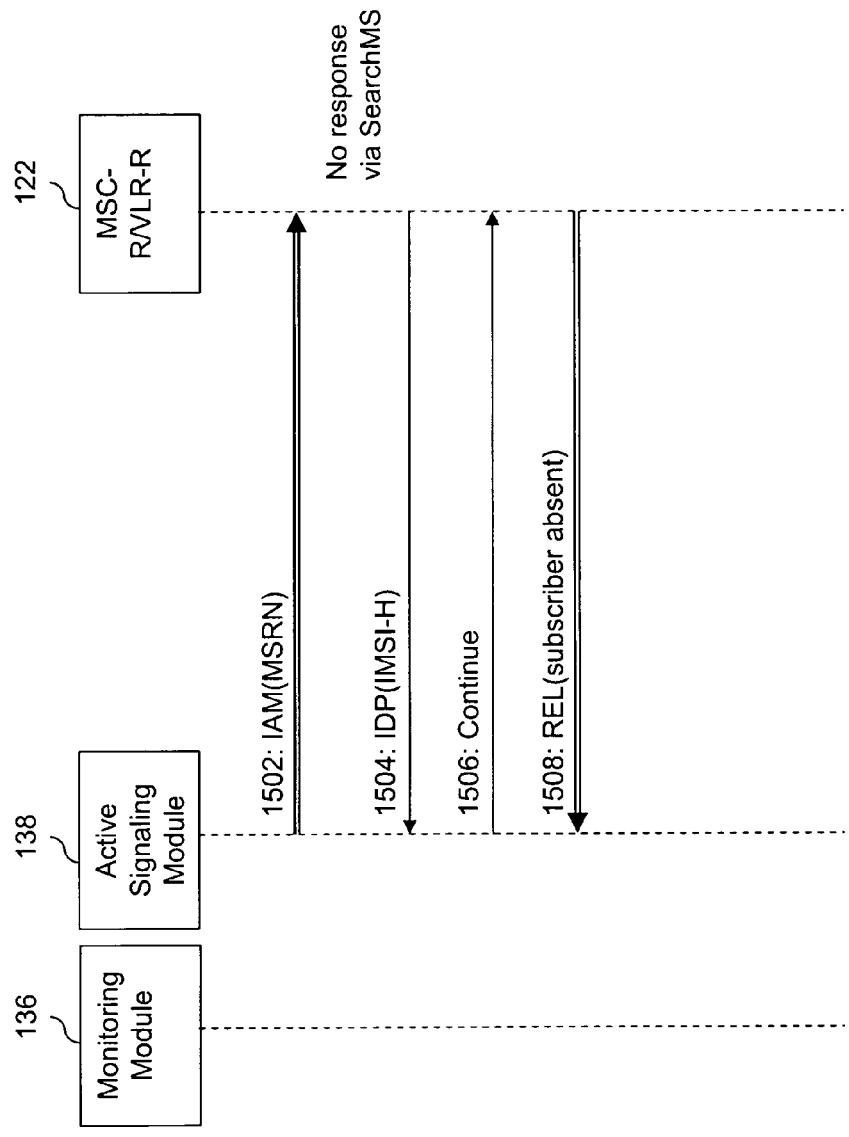
FIG. 15 represents a flow diagram for testing of Visited Terminated CSI (VT-CSI) on the simulated outbound roamer using the Continue operation, in accordance with a first embodiment of the present invention.

FIG. 15 represents a flow diagram for testing of VT-CSI on the simulated outbound roamer using Continue operation, in accordance with a first embodiment of the present invention. In this case, PI module 102 ensures that CDR is not generated for the simulated outbound roamer at any MSC/VLR of a roaming partner network with which the VT-CSI test is performed. The OTPI process in this case is similar to the OTPI process explained earlier in conjunction with FIG. 11, except that active signaling module 138 also add VT-CSI at MSC-R/VLR-R 122, and it does not send FTN to MSC-R/VLR-R 120. At steps 1502, active signaling module 138 initiates an ISUP IAM (MSRN) call to MSC-R/VLR-R 122. Active signaling module 138 then receives an IDP (IMSI-H) message from MSC-R/VLR-R 122, at step 1504. Thereafter at step 1506, active signaling module 138 issues a Continue message to MSC-R/VLR-R 122. MSC-R/VLR-R 122 then performs SearchMS operation, as described earlier in the context of the present invention. However, since MSC-R/VLR-R 122 fails to find any mobile station for the simulated outbound roamer, MSC-R/VLR-R 122 returns an absent subscriber as the cause in a REL message to active signaling module 138, at step 1508. Detection of the absent subscriber indication at active signaling module 138 confirms successful testing of VT-CSI on the simulated outbound roamer.

In another embodiment of the present invention, PI module 102 tests VT-CSI on the simulated outbound roamer using Connect operation. Even in this case, PI module 102 ensures that CDR is not generated for the simulated outbound roamer at any MSC/VLR of a roaming partner network with which the VT-CSI test is performed. The OTPI process in this case is same as the OTPI process explained above in conjunction with FIG. 15. Moreover, the signal flow for testing VT-CSI using Connect operation is similar to signal flow for testing VT-CSI using Continue operation, except that the Continue message is replaced with a Connect message on the new number. Additionally, in the signal flow for the Connect operation, MSC-R/VLR-R 122 issues an ISUP IAM on the new number to active signaling module 138, and active signaling module 138 then returns a REL message to MSC-R/VLR-R 122.

Figure 16:
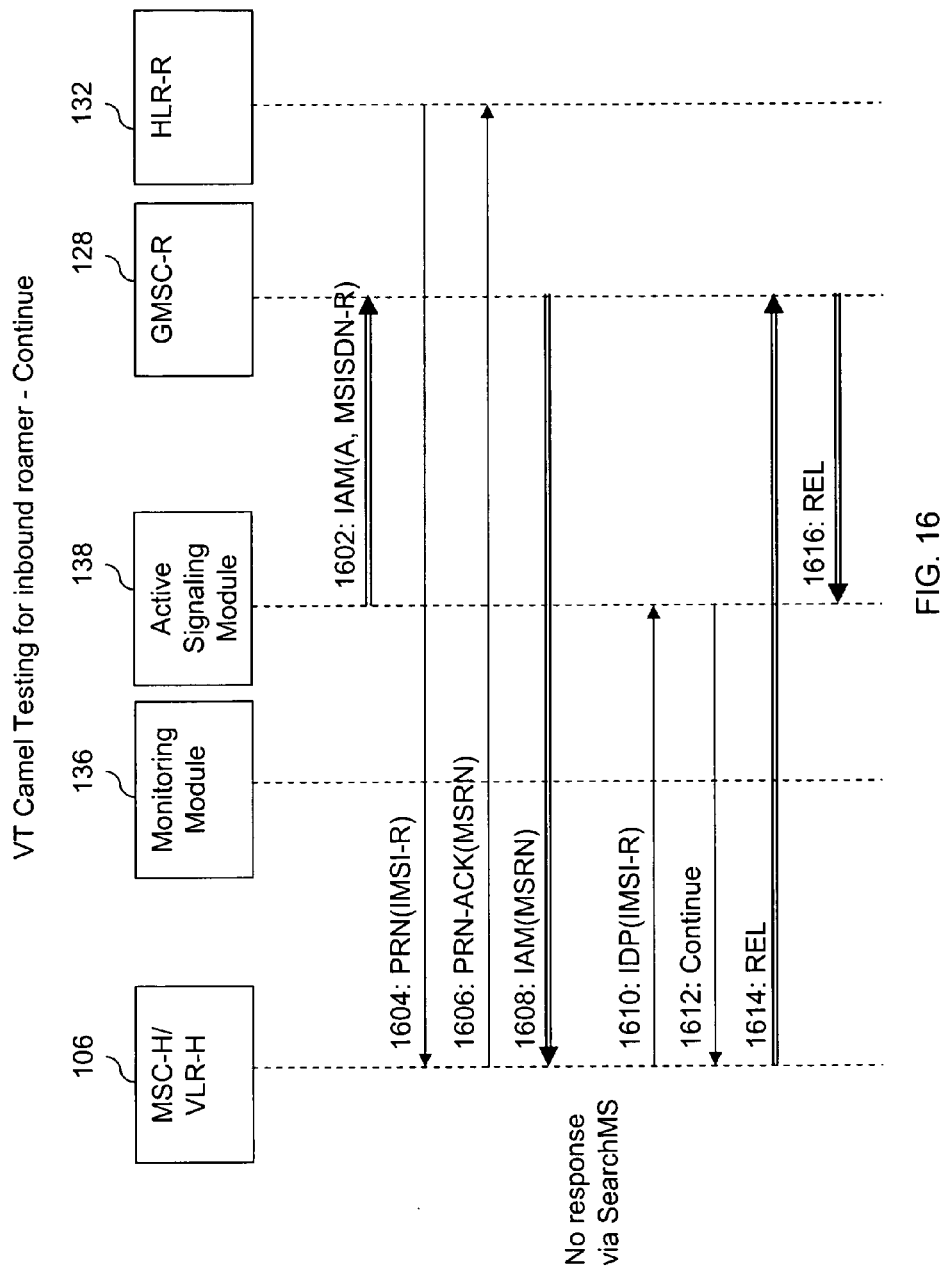
FIG. 16 represents a flow diagram for testing of the VT-CSI on the simulated inbound roamer using the Continue operation, in accordance with a second embodiment of the present invention.

FIG. 16 represents a flow diagram for testing of VT-CSI on the simulated inbound roamer using Continue operation, in accordance with a second embodiment of the present invention. The ITPI process in this case is similar to the ITPI process explained earlier in conjunction with FIG. 12, except that active signaling module 138 also add VT-CSI at MSC-H/VLR-H 106, and active signaling module 138 does not send FTN in the ISD message to MSC-H/VLR-H 106. Moreover, steps 1602 to 1610 are same as corresponding steps explained in conjunction with FIG. 14. In response to the IDP message received at active signaling module 138 (i.e., at step 1610), active signaling module 138 issues a Continue message to MSC-H/VLR-H 106, at step 1612. MSC-H/VLR-H 106 then performs SearchMS operation, as described earlier in the context of the present invention. However at steps 1614 and 1616, since MSC-H/VLR-H 106 fails to find any mobile station for the simulated inbound roamer, MSC-H/VLR-H 106 returns a REL message to active signaling module 138 via GMSC-R 128, so as to terminate the ISUP IAM call on the MSRN.

Alternatively, in another embodiment of the present invention, PI module 102 tests CAMEL MT call on the simulated inbound roamer using a Connect operation. Signal flow for the CAMEL MT call testing using Connect operation is similar to the signal flow for CAMEL MT call using Continue message as described above in the context of the present invention. However, in case of testing using Connect operation, upon receiving the IDP message from MSC-H/VLR-H 106, active signaling module 138 issues a Connect message on the new number to MSC-H/VLR-H 106, and MSC-H/VLR-H 106 then returns an ISUP IAM message on the new number to active signaling module 138.

Figure 17:
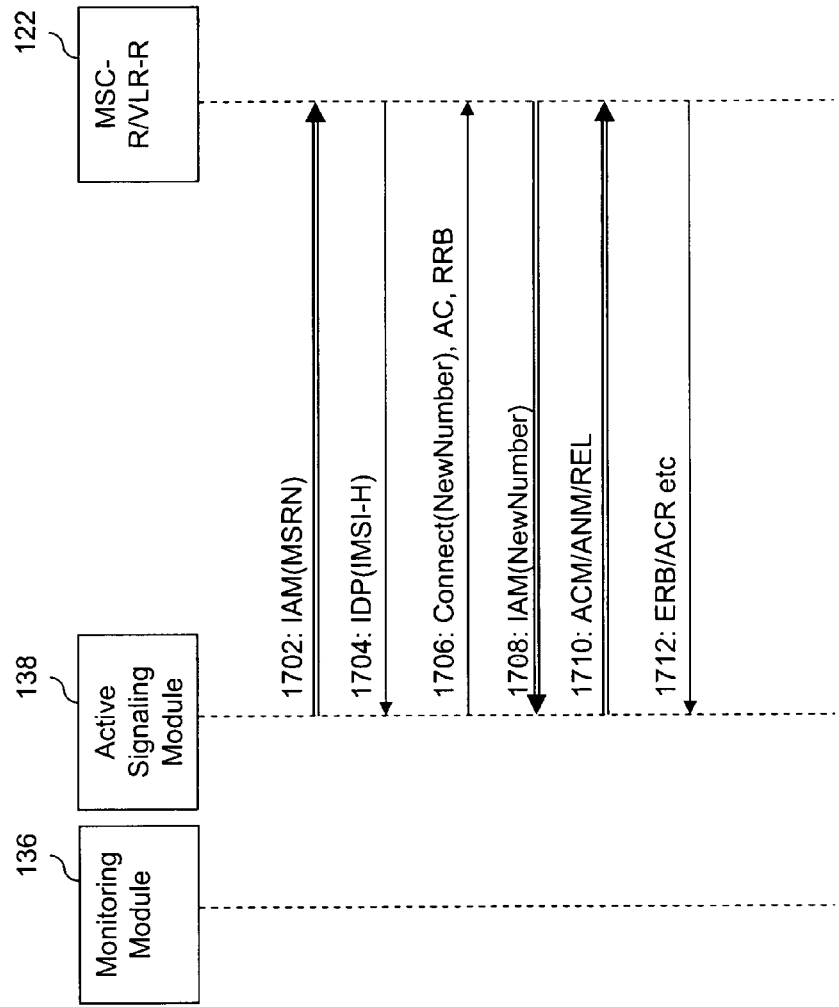
FIG. 17 represents a flow diagram for testing VT-CSI on the simulated outbound roamer for revenue assurance, in accordance with a first embodiment of the present invention.

FIG. 17 represents a flow diagram for testing VT-CSI on the simulated outbound roamer for revenue assurance, in accordance with a first embodiment of the present invention. OTPI process and steps 1702 to 1708 of this embodiment is similar to the OTPI process and corresponding steps, respectively, for testing VT-CSI on the simulated outbound roamer using Connect operation, as explained above in the context of the present invention. In addition to sending Connect message to MSC-R/VLR-R 122, active signaling module 138 also sends an Apply Charging (AC) message and an RRB message to MSC-R/VLR-R 122. Thereafter, at step 1710, active signaling module 138 issues an ACM message, an ANM message and a REL message to MSC-R/VLR-R 122. Finally at step 1712, MSC-R/VLR-R 122 issues an Apply Charging Report (ACR) message and an ERB message to active signaling module 138.

Figure 18A:
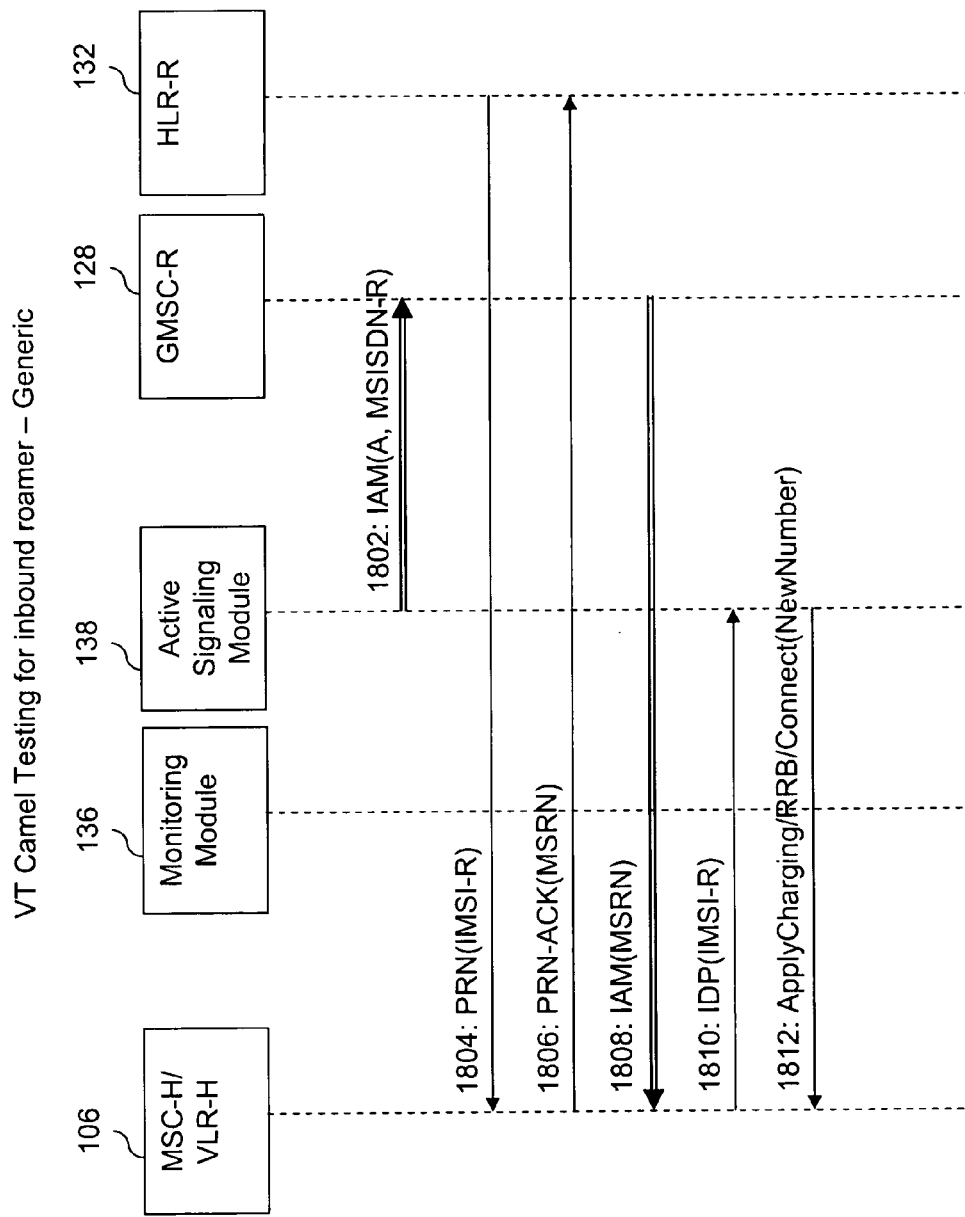
FIGS. 18A and 18B represent a flow diagram for testing VT-CSI on the simulated inbound roamer for revenue assurance, in accordance with a second embodiment of the present invention.
Figure 18B:
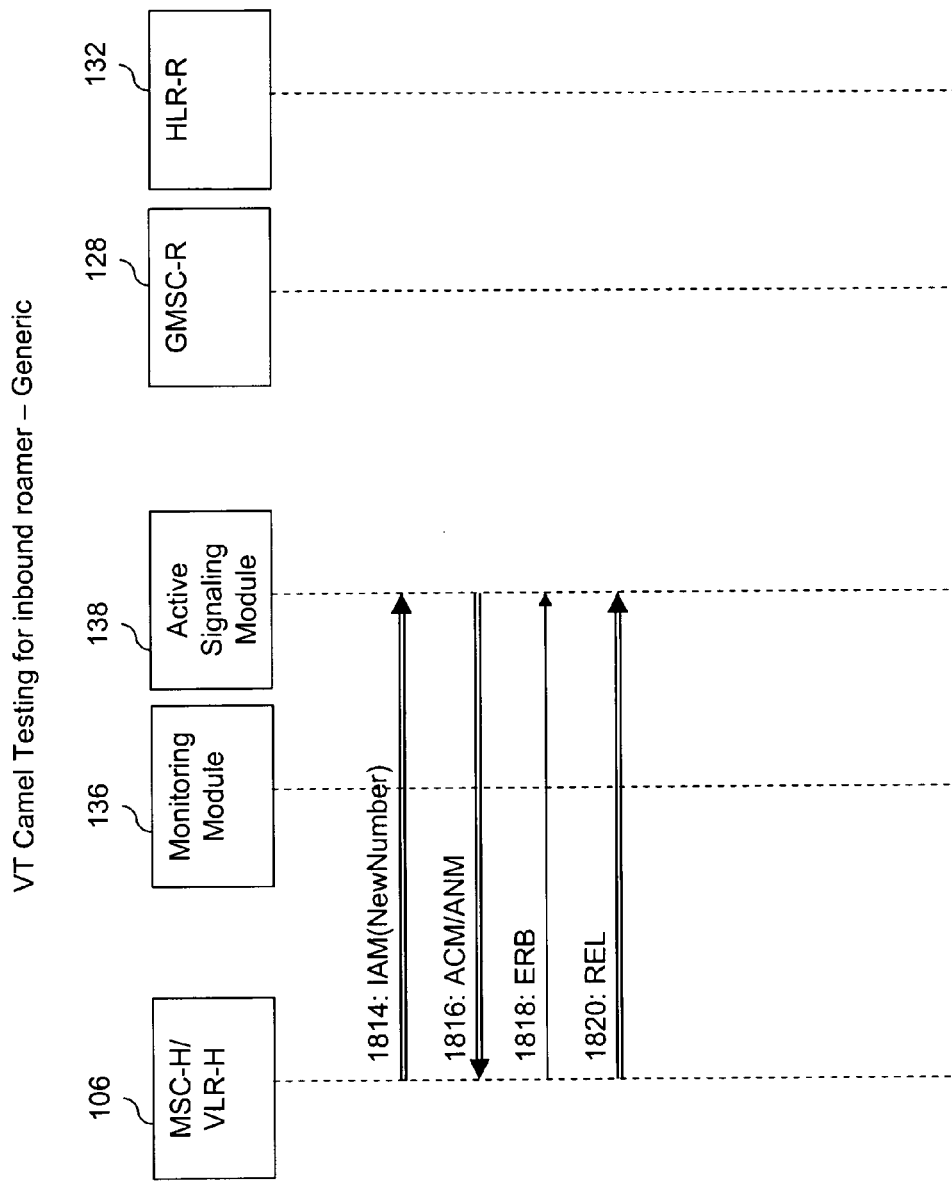

FIGS. 18A and 18B represent a flow diagram for testing VT-CSI on the simulated inbound roamer for revenue assurance, in accordance with a second embodiment of the present invention. OTPI process and steps 1802 to 1810 of this embodiment is similar to the OTPI process and corresponding steps, respectively, explained above for testing VT-CSI on the simulated inbound roamer using Connect operation. Thereafter, at step 1812, active signaling module 138 issues Apply charging, RRB and Connect (new number) messages to MSC-H/VLR-H 106. Further at step 1814, MSC-H/VLR-H 106 issues an ISUP IAM message on the new number to active signaling module 138, in response to which active signaling module 138 issues ACM and ANM messages to MSC-H/VLR-H 106 at step 1816. Finally at steps 1818 and 1820, MSC-H/VLR-H 106 issues an ERB message and a REL message to active signaling module 138.

Camel Default Testing

Figure 19:
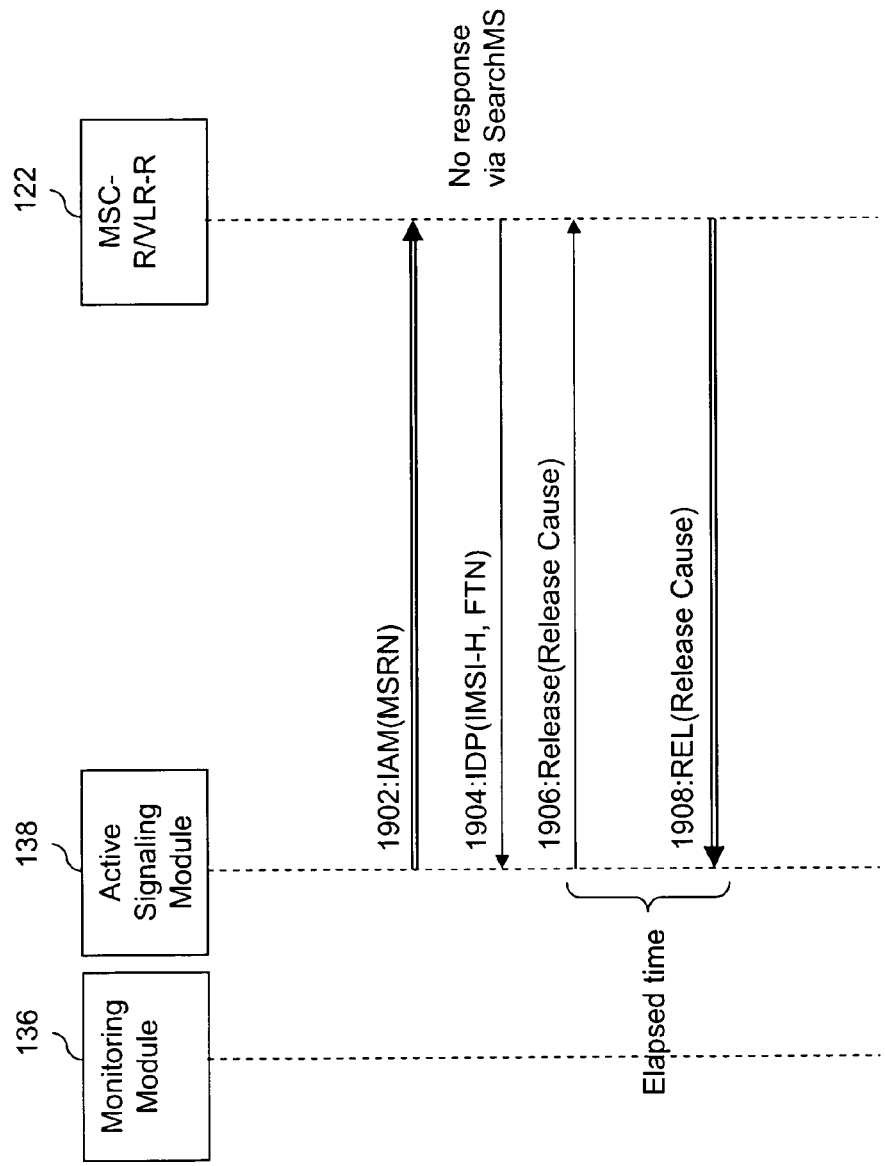
FIG. 19 represents a flow diagram for testing CAMEL release instruction on the simulated outbound roamer, in accordance with an embodiment of the present invention.

CAMEL protocol has a default handling mechanism that includes Continue call or Release call in CSI. The CSI (e.g., O-CSI) profile on the simulated inbound roamer or simulated outbound roamer to a MSC/VLR location of such roamer may contain default handling (continue call or release call). In an embodiment of the present invention, PI module 102 uses the FTN of the roamer to perform CAMEL testing, where the FTN is set as a number on which all calls are routed to active signaling module 138. FIG. 19 represents a flow diagram for testing CAMEL release instruction on the simulated outbound roamer, in accordance with an embodiment of the present invention. In this case, signal flow for the OTPI process in steps 1902 to 1904 is same as the signal flow for the OTPI process explained earlier in conjunction with FIG. 11. Further, when the CAP IDP message reaches active signaling module 138, active signaling module 138 can either returns a TCAP abort message or a time out message to MSC-R/VLR-R 122, in order to check whether the call is still received at active signaling module 138. In an embodiment of the present invention, in case the call is received at active signaling module 138 when the default handling is Continue call, then the default handling on the Continue call is determined to be correct. In another embodiment of the present invention, in case the call is not received at active signaling module 138 when the default handling is Release call, then the default handling on Release call is determined to be correct.

PI module 102 can also verify the way MSC-R/VLR-R 122 responds to a Release instruction. Some network operators, who enable Optimal Routing for Late Call Forwarding (OR-LCF), use the CAMEL Release instruction to avoid call forwarding, while capturing the forwarding condition and forwarded number from the CAMEL IDP message. In such a case, GMSC-R 128 does not require a release cause (which may not be transmitted over international carriers) from MSC-R/VLR-R 122 and instead informs the OR-LCF service control, which in turn connects to the requested forwarded call that was captured from the CAMEL IDP message earlier. The objective of the CAMEL test performed is to identify whether the MSC-R/VLR-R 122 reacts quickly to the Release instruction. PI module 102 can also modify the release cause provided in the CAMEL IDP message to evaluate its influence on the Release operation and the 'release cause' transparency between host PMN 104 and roaming partner PMN 120. At step 1906, active signaling module 138 issues a CAP release message (i.e., a first release message) such as Release call with a release cause to MSC-R/VLR-R 122. Finally at step 1908, MSC-R/VLR-R 122 returns an ISUP REL message (i.e., a second release message) to active signaling module 138 with the release cause, indicating successful testing of CAMEL default handling on Release call. In an embodiment of the present invention, PI module 102 determines the time duration between occurrences of steps 1906 and 1908.

MO Call Barring (CB) and Operator Determined Barring (ODB) Testing

Figure 20:
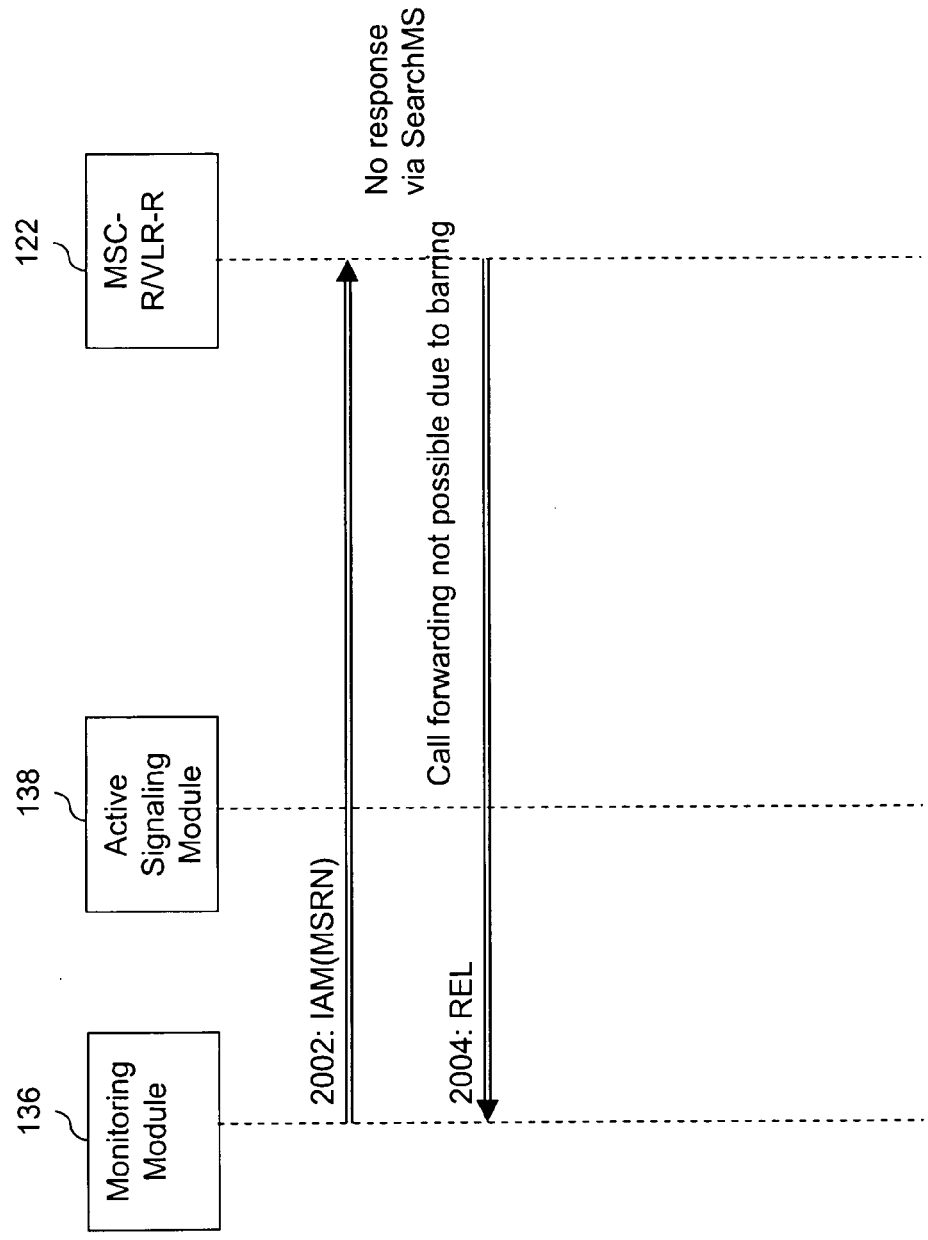
FIG. 20 represents a flow diagram for testing of MO Call Barring (CB) and ODB on any type of the simulated outbound roamer's FTN, in accordance with a first embodiment of the present invention.

Furthermore, host PMN 104 operator can also test SS and ODB service such as call forwarding, call barring and ODB for simulated inbound and outbound roamers. As described earlier, PI module 102 sets SS and/or ODB at a MSC/VLR location of the simulated roaming subscriber. Call forwarding test is already described earlier in various embodiments of MO call testing via call forwarding. FIG. 20 represents a flow diagram of MO CB and ODB testing on any type of the simulated outbound roamer's FTN (e.g., FTN may be a local number that belongs roaming partner PMN 120's country), in accordance with a first embodiment of the present invention. In this case, PI module 102 tests whether CB and ODB for the FTN is successful. The OTPI process for testing MO CB and ODB is similar to the OTPI process for testing MO call explained earlier in conjunction with FIG. 7, except that in case of MO CB and ODB, active signaling module 138 also sends CB and ODB parameters to MSC-R/VLR-R 122. At step 2002, active signaling module 138 issues an ISUP IAM message on the MSRN to MSC-R/VLR-R 122. Although MSC-R/VLR-R 122 is updated with the FTN of the simulated outbound roamer; however, since MO CB and ODB is also set at MSC-R/VLR-R 122, MSC-R/VLR-R 122 issues a REL message to active signaling module 138, at step 2004. Detection of the REL message at PI module 102 indicates a successful testing of MO CB and ODB irrespective of the type of FTN.

Similarly, in another embodiment of the present invention, PI module 102 tests for MO CB and ODB on International Except Home (ExHome). In other words, this embodiment allows host PMN 104 operator to test on non-host international calls. The signal flow for testing MO Barring of Outgoing International Calls (BOIC)-ExHome is similar to signal flow for testing MO CB and ODB as explained above in conjunction with FIG. 20, except that the FTN in case of MO CB BOIC-ExHome is a number that belongs to a country different from host PMN 104 country. Moreover, in case of MO CB BOIC-ExHome, active signaling module 138 sends CB/ODB (BOIC-ExHome) instead of CB/ODB to MSC-R/ VLR-R 122. Detection of the REL message at active signaling module 138 indicates successful testing of MO CB BOIC-ExHome. In yet another embodiment of the present invention, PI module 102 tests MO CB and ODB on host international calls. The signal flow for testing host international calls is similar to signal flow for testing non-host international calls explained above in the context of the present invention, except that in case of testing host international calls, the FTN is of host PMN 104 country. Moreover, in case of testing on host international calls, active signaling module 138 receives an ISUP IAM (FTN) message instead of the REL message. In other words, a successful testing for MO CB and ODB is detected at PI module 102, when active signaling module 138 receives ISUP IAM (X, FTN) in response to ISUP IAM (A, MSRN), where A is the calling party and X is also a calling party different from the calling party A.

Further, in an embodiment of the present invention, PI module 102 tests whether MO CB and ODB on BOIC is successful. In this case, PI module 102 tests MO CB and ODB on a host FTN or an international FTN. When active signaling module 138 issues ISUP IAM (MSRN) to MSC-R/VLR-R 122, MSC-R/VLR-R 122 returns REL message to active signaling module 138 due to international barring of call forwarding to any international FTN. Detection of the REL message at active signaling module 138 indicates a successful testing of MO CB and ODB on BOIC. Similarly, in another embodiment of the present invention, PI module 102 tests MO CB and ODB on a local FTN that is known to host PMN 104 operator. In this case, when active signaling module 138 initiates call ISUP IAM (MSRN) to MSC-R/VLR-R 122, then MSC-R/VLR-R 122 forwards the call to a switch of the local FTN. The switch then returns ISUP ACM and ANM messages to active signaling module 138 via MSC-R/VLR-R 122. Detection of the ACM and ANM messages at active signaling module 138 indicates successful testing of the MO CB and ODB. In order to avoid charging for the fake call, active signaling module 138 issues a REL message to MSC-R/VLR-R 122.

Figure 21:
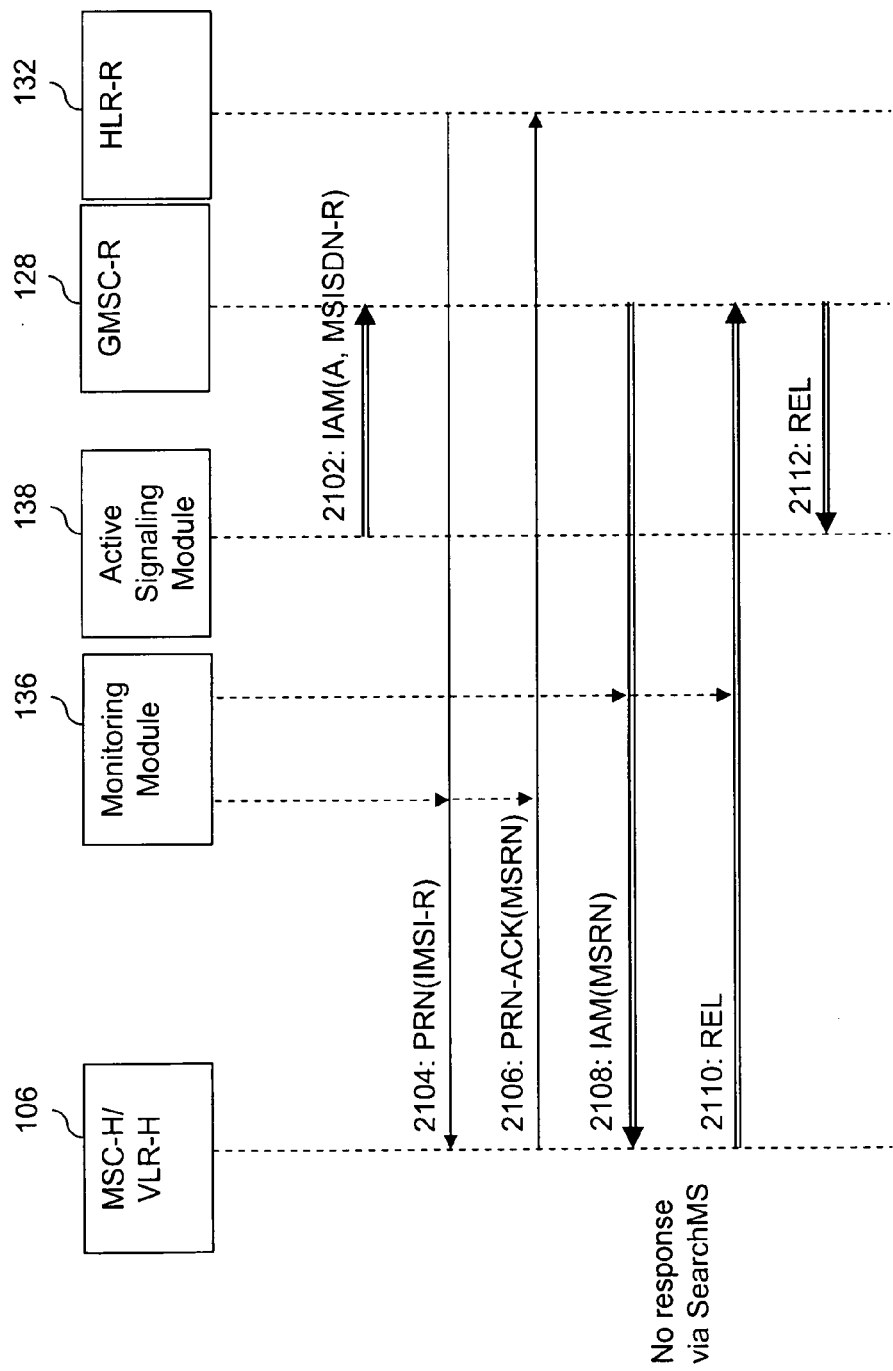
FIG. 21 represents a flow diagram of MO CB and ODB testing on any type of the simulated inbound roamer's FTN, in accordance with a second embodiment of the present invention.

Furthermore, PI module 102 can also test MO CB and ODB on simulated inbound roamers from roaming partner PMN 120 at any MSC/VLR location of host PMN 104. FIG. 21 represents a flow diagram of MO CB and ODB testing on any type of the simulated inbound roamer's FTN, in accordance with a second embodiment of the present invention. In an embodiment of the present invention, PI module 102 tests whether CB and ODB to the FTN is successful. The ITPI process for testing MO CB and ODB is similar to the ITPI process for testing MO call explained earlier in conjunction with FIG. 8, except that in case of MO CB and ODB, active signaling module 138 also sends CB and ODB parameters to MSC-H/VLR-H 106. Moreover, signal flow in steps 2102 to 2108 is same as signal flow in corresponding steps explained earlier in conjunction with FIG. 8, where active signaling module 138 initiates fake call to GMSC-R 128, and exchange of PRN, PRN-ACK and ISUP IAM (MSRN) occurs. MSC-H/VLR-H 106 then performs SearchMS operation to locate mobile station of the simulated inbound roamer, as explained earlier in the context of the present invention. Finally at steps 2110 and 2112, active signaling module 138 determines successful testing of MO CB and ODB, upon receiving an ISUP REL message from MSC-H/VLR-H 106 via GMSC-R 128.

Similarly, in another embodiment of the present invention, PI module 102 tests for MO CB and ODB on call International Except Home (ExHome) for the simulated inbound roamer. In other words, this embodiment allows host PMN 104 operator to test on non-host international calls. The signal flow for testing MO CB IC-ExHome is similar to signal flow for testing MO CB and ODB explained above in conjunction with FIG. 21, except that the FTN in case of MO CB IC-ExHome is a number that belongs to a country different from host PMN 104 country. Moreover, in case of MO CB IC-ExHome, active signaling module 138 sends CB/ODB (IC-ExHome) instead of CB/ODB to MSC-H/VLR-H 106. Detection of the REL message at active signaling module 138 indicates successful testing of MO CB IC-ExHome.

Furthermore, in an embodiment of the present invention, PI module 102 tests MO CB and ODB on host international calls for the simulated inbound roamer. The signal flow for testing host international calls is similar to signal flow for testing non-host international calls explained above in the context of the present invention, except that in case of testing home international calls, the FTN is of host PMN 104's country. Moreover, in case of testing on host international calls, active signaling module 138 receives an ISUP IAM (FTN) message instead of the REL message. In other words, successful testing of CB and ODB is detected at PI module 102, when active signaling module 138 receives ISUP IAM (FTN) directly from MSC-H/VLR-H 106 in response to ISUP IAM (MSRN). In an embodiment of the present invention, host PMN 104 operator needs to set up specific routing rules (e.g., based on number prefixes or ranges) for the home international numbers, in order to route the test calls (i.e., IAM (FTN) in this case) to active signaling module 138. Finally, in order to avoid charging for the fake call, active signaling module 138 issues an ISUP REL message to MSC-H/VLR-H 106.

Alternatively, in another embodiment of the present invention, host PMN 104 operator tests MO CB and ODB on host international calls for the simulated inbound roamer using monitoring module 136, i.e., when the host international FTN is not routed to active signaling module 138. The signal flow for testing MO CB and ODB using monitoring module 136 is same as the signal flow for testing MO CB and ODB using active monitoring technique explained above in the context of the present invention, except that ISUP IAM (FTN) and REL messages are exchanged between MSC-H/VLR-H 106 and GMSC-R 128, and also monitored by monitoring module 136. PI module 102 detects successful testing of MO CB and ODB when monitoring module 136 passively detects exchange of ISUP IAM (FTN) and REL messages.

Further, host PMN 104 operator may also test BOIC for the simulated inbound roamer. The signal flow for testing BOIC is similar to signal flow for testing MO CB and ODB explained above in conjunction with FIG. 21, except that in case of BOIC, the FTN is a host international number and CB/ODB is replaced with CB/ODB (BOIC). Detection of an ISUP REL message at active signaling module 138 in response to an ISUP IAM (MSISDN-R) message indicates successful testing of BOIC. In another embodiment of the present invention, PI module 102 tests BOIC on a local FTN of the simulated inbound roamer. The signal flow for testing BOIC on the local FTN is similar to signal flow for testing MO IC-ExH CB and ODB on the host international number using active signaling module 138, as explained above in the context of the present invention. However, in case of BOIC, the FTN is a local number and CB/ODB (IC-ExH) is replaced with CB/ODB (BOIC). Detection of ISUP IAM (FTN) at active signaling module 138 indicates successful testing of BOIC on the local FTN.

Termination of On-Going Calls Testing

As described earlier, host PMN 104 operator can use the MO call testing to test various mechanisms of MT calls at any switch of roaming partner PMN 120 for outbound roaming, and at any switch of host PMN 104 operator for inbound roaming. This is beneficial for host PMN 104 operator, as it can immediately stop an ongoing call of the simulated roaming subscriber when PI module 102 identifies some reason to do so. The reasons include, but are limited to, prepaid fraud, exceeding the threshold for long duration calls, SIM-box fraud and international revenue share fraud.

Following are the techniques that allow immediate termination of ongoing calls:

Cancel-Location: A network element can send a MAP Cancel-Location on the roaming subscriber's IMSI of the ongoing call to a MSC/VLR, which will cause the MSC/VLR to terminate the ongoing call depending on vendor and version of the MSC/VLR. However, a fraudster's new MO activity at the same MSC/VLR location generates a new LUP process.

ISD (ODB and CB): A network element can use CB and ODB to deny the roaming subscriber to make calls. In this case, the network element sends a standalone ISD (IMSI, CB or ODB for MO call) to the MSC/VLR. This causes the MSC/VLR to terminate the call depending on MSC/VLR's vendor and version. For example, Huwwei can terminate the call using ODB/CB. Some network operators offer an advantage that new MO activities of the fraudster are blocked at the same location.

Delete Subscriber Data (basic services): Basic services such as Bearer services and teleservices are essential services for MO calls. A network sends a MAP DSD (basic services) on the IMSI of the ongoing call to the MSC/VLR. This causes the MSC/VLR to terminate the call depending on MSC/VLR vendor and version. Some network operators offer an advantage that new MO activities of the fraudster are blocked at the same location.

Immediate Service Termination (IST): IST is a part of Third Generation Partnership Project (3GPP) standard for 3G MSCs/VLRs. Since many MSCs/VLRs act as both 2G and 3G, it is difficult to determine the MSCs/VLRs that support IST.

In order to test the mechanism supported at the MSC/VLR, active signaling module 138 generates a fake MO call to the MSC/VLR of the simulated roaming subscriber, in accordance with an embodiment of the present invention. PI module 102 then applies a technique to check whether the fake MO call is terminated by the mechanism at the MSC/VLR.

Figure 22:
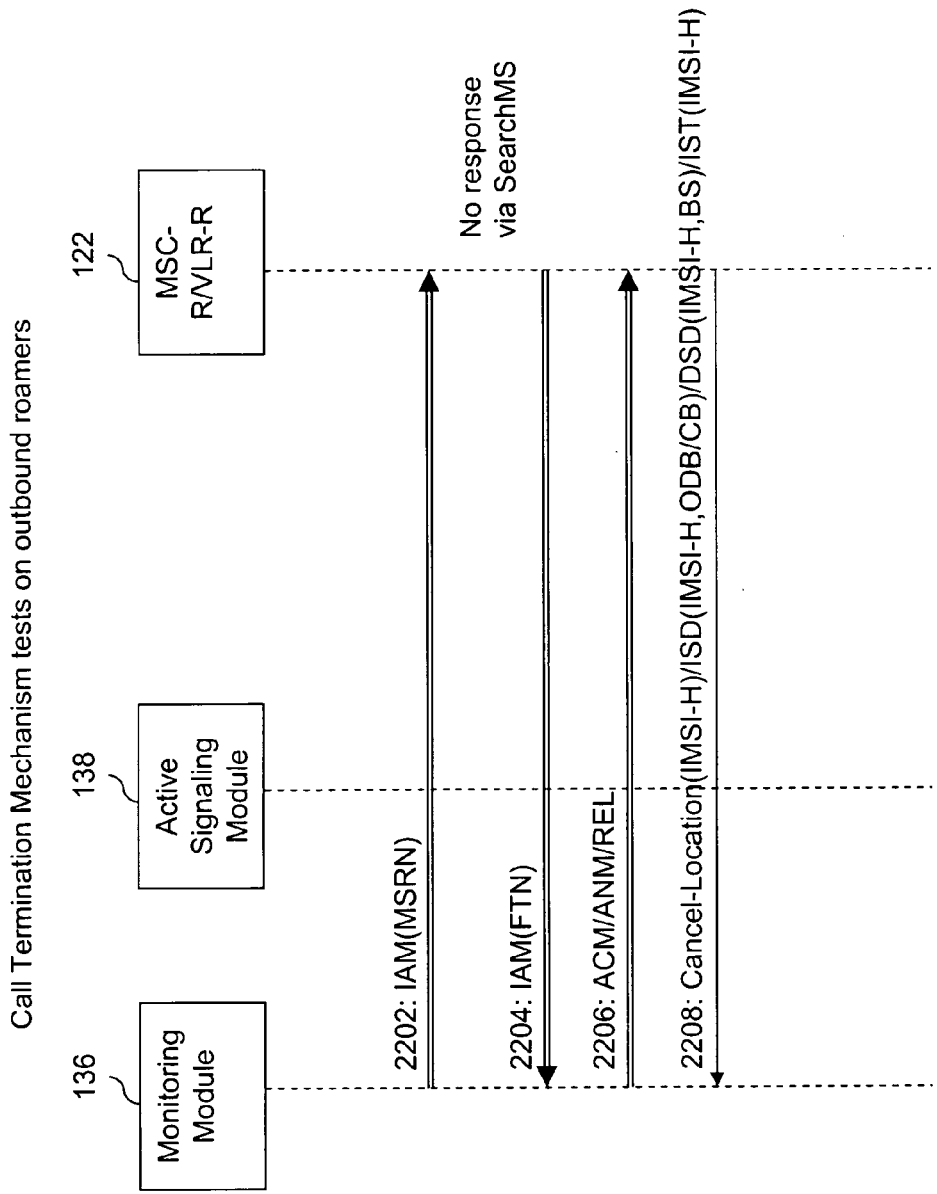
FIG. 22 represents a flow diagram of MO call testing on the host FTN so as to test call termination for the simulated outbound roamer, in accordance with a first embodiment of the present invention.

As described above, host PMN 104 operator can apply a call termination mechanism for outbound roaming. FIG. 22 represents a flow diagram of MO call testing on host FTN to test call termination for the simulated outbound roamer, in accordance with a first embodiment of the present invention. The signal flow for OTPI process and for steps 2202 to 2206 is same as signal flow for OTPI process and corresponding steps, respectively, as explained earlier in conjunction with FIG. 9. Thereafter at step 2208, active signaling module 138 issues a call termination message to MSC-R/VLR-R 122 so as to determine successful testing of MO call termination. The call termination message includes messages such as, but not limited to, Cancel-Location (IMSI-H), ISD (IMSI-H, ODB/CB), DSD (IMSI-H, BS) and IST (IMSI-H), where BS corresponds to Bearer Services. Detection of an acknowledgement message such as a Cancel-Location-ACK, an ISD-ACK, a DSD-ACK message and an IST-ACK message from MSC-R/VLR-R 122 at active signaling module 138 indicates successful termination of ongoing MO call for outbound roamer. In an embodiment of the present invention, in order to reduce the cost of the fake call, PI module 102 maintains a time-out clock that is used to terminate the call via ISUP REL operation after pre-defined time duration (i.e., configurable by host PMN 104 operator). In this case, active signaling module 138 issues the ISUP REL message to MSC-R/VLR-R 122 upon detecting the time-out period.

Figure 23:
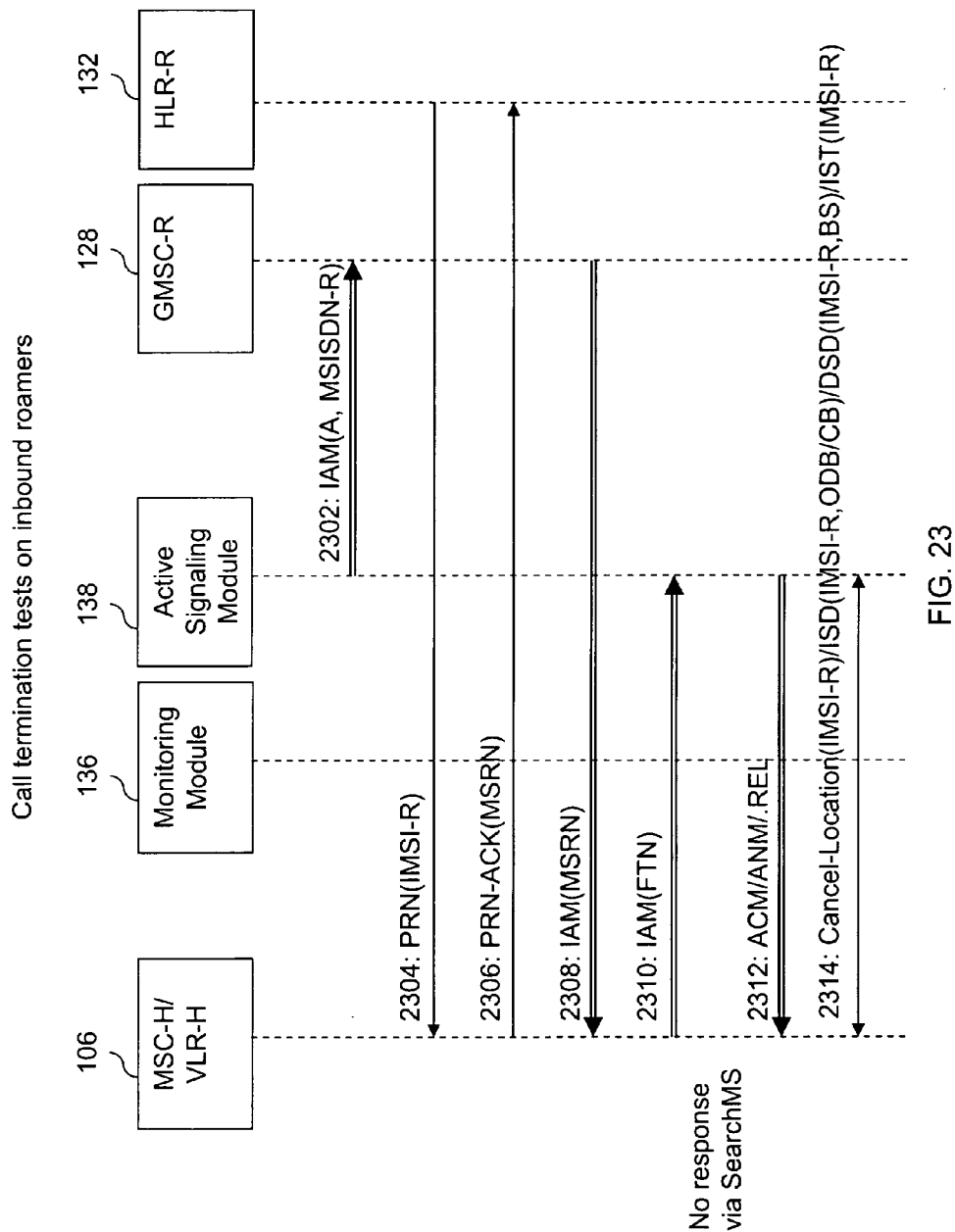
FIG. 23 represents a flow diagram of MO call testing on the host FTN so as to test call termination for the simulated inbound roamer, in accordance with a second embodiment of the present invention.

Similarly, as described above, host PMN 104 operator can also apply a call termination mechanism for inbound roaming. FIG. 23 represents a flow diagram of MO call testing on the host FTN so as to test call termination for the simulated inbound roamer, in accordance with a second embodiment of the present invention. The signal flow for ITPI process and for steps 2302 to 2312 is same as signal flow for ITPI process and corresponding steps, respectively, explained earlier in conjunction with FIG. 10. Finally at step 2314, active signaling module 138 issues the call termination message (IMSI-H is replaced with IMSI-R) to MSC-H/VLR-H 106. Detection of the acknowledgement message in response to the call termination message indicates successful testing of ongoing MO call termination for inbound roamer.

MT SMS

PI module 102 performs MT SMS testing by sending SMS to the simulated roaming subscriber at his MSC/VLR location. Due to absence of mobile station and the concept of SMS forwarding, such a test will only involve routing and expected behavior testing as described below in various MT SMS embodiments of the present invention.

Figure 24:
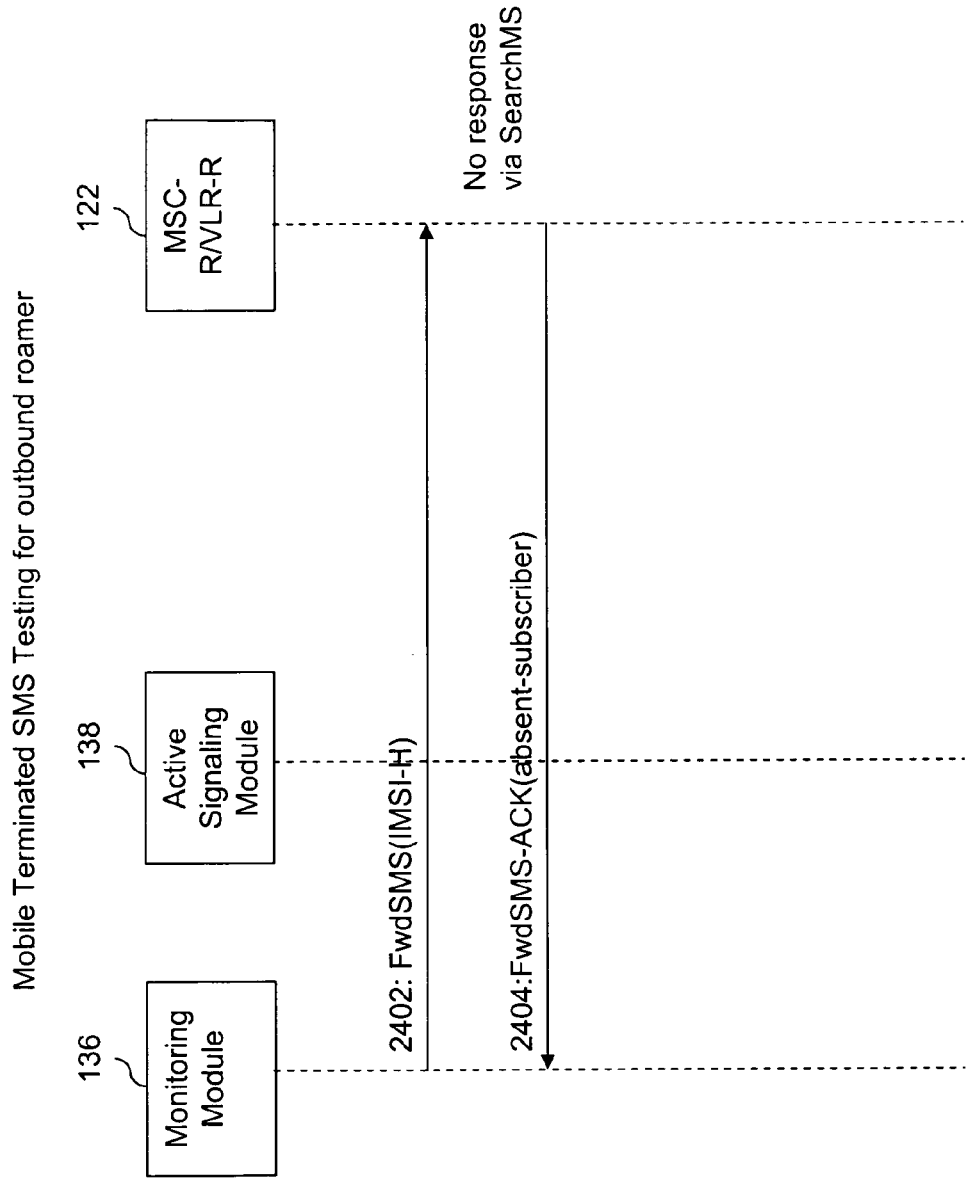
FIG. 24 represents a flow diagram of MT Short Message Service (SMS) testing to the simulated outbound roamer, in accordance with a first embodiment of the present invention.

FIG. 24 represents a flow diagram of MT SMS testing to the simulated outbound roamer, in accordance with a first embodiment of the present invention. The signal flow for OTPI process in this case is same as signal flow for the OTPI process explained earlier in conjunction with FIG. 5. At step 2402, active signaling module 138 issues a MAP FwdSMS on the IMSI-H to MSC-R/VLR-R 122. Due to absence of the simulated outbound roamer's mobile station, MSC-R/VLR-R 122 returns an error message such as absent subscriber in a MAP FwdSMS-ACK to active signaling module 138, at step 2404. Detection of the absent subscriber indication at active signaling module 138 confirms successful completion of the MT SMS testing for outbound roamer.

Figure 25:
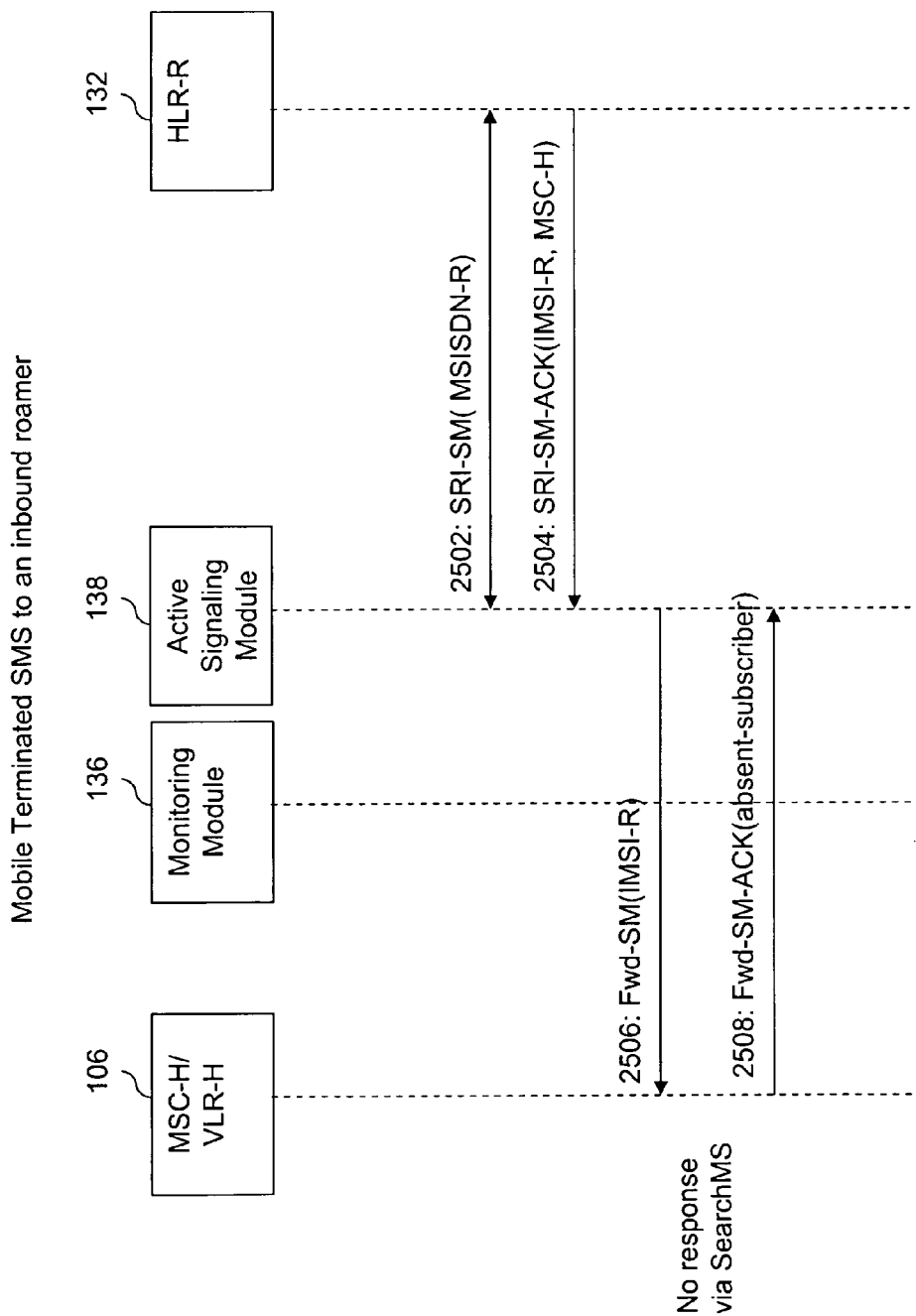
FIG. 25 represents a flow diagram of MT SMS testing to the simulated inbound roamer, in accordance with a second embodiment of the present invention.

FIG. 25 represents a flow diagram of MT SMS testing to the simulated inbound roamer, in accordance with a second embodiment of the present invention. The signal flow for ITPI process in this case is same as signal flow for the ITPI process explained earlier in conjunction with FIG. 6. At step 2502, active signaling module 138 issues a MAP SRI-SM request on the MSISDN-R to GMSC-R 128. Thereafter at 2504, GMSC-R 128 returns IMSI-R and MSC-H/VLR-H 106 address of the simulated inbound roamer in a MAP SRI-SM-ACK message to active signaling module 138. Active signaling module 138 then forwards the MT SMS by sending a MAP FwdSMS on the IMSI-R to MSC-H/VLR-H 106, at step 2506. However, due to absence of the simulated inbound roamer's mobile station, MSC-H/VLR-H 106 returns an error such as absent subscriber in a MAP FwdSMS-ACK message to active signaling module 138, at step 2508. Detection of the absent subscriber indication at active signaling module 138 confirms successful completion of the MT SMS testing for inbound roamer.

Figure 26:
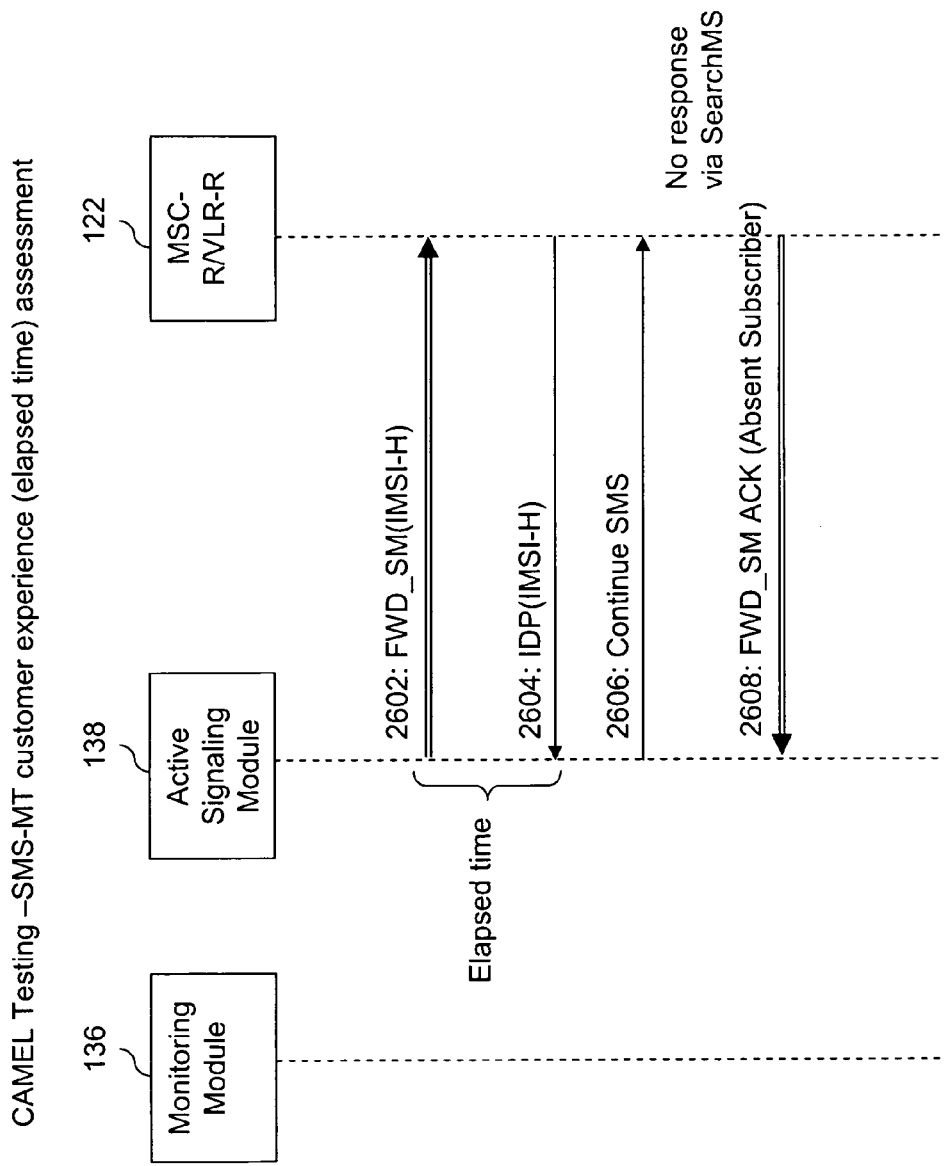
FIG. 26 represents a flow diagram of CAMEL MT SMS testing to the simulated outbound roamer, in accordance with an embodiment of the present invention.

As described earlier, the usage of CAMEL protocol facilitates PI module 102 to analyze the location of the issue when the MT SMS tests described above fails, i.e., when active signaling module 138 does not receive absent subscriber indication from the MSC/VLR location of the simulated roaming subscriber. FIG. 26 represents a flow diagram of CAMEL MT SMS testing to the simulated outbound roamer, in accordance with an embodiment of the present invention. Similar to testing of CAMEL call related procedures explained above in various embodiments of the present invention, PI module 102 performs testing of CAMEL MT SMS. It will be apparent to a person skilled in the art that in case of MT SMS, if a MSC/VLR is CAMEL phase 4 compliant, then such MSC/VLR requires MT-SMS-CSI profile to enable CAMEL MT SMS procedure. The signal flow for OTPI process in this case is similar to signal flow for the OTPI process explained earlier in conjunction with FIG. 5, except that active signaling module 138 also sends MT-SMS-CSI profile of the simulated outbound roamer to MSC-R/VLR-R 122.

At step 2602, active signaling module 138 issues a MAP FwdSMS on the IMSI-H to MSC-R/VLR-R 122. Thereafter at step 2604, MSC-R/VLR-R 122 issues a CAP IDP message on the IMSI-H to active signaling module 138, before the mobile station of the simulated outbound roamer is paged. In an embodiment of the present invention, PI module 102 calculates the roaming subscriber's experience by evaluating the time elapsed between the issue of the MAP FwdSMS by active signaling module 138 and receipt of the CAP IDP message at active signaling module 138. This roaming subscriber experience assessment is also applicable for the SMS interworking case described later in conjunction with FIGS. 29 and 30. Moreover, such experience assessment may also be useful when an SMS hub is used for enabling SMS exchange between network operators. Further at step 2606, active signaling module 138 issues a Continue SMS operation to MSC-R/VLR-R 122. This causes MSC-R/VLR-R 122 to start locating for the mobile station of the simulated outbound roamer using SearchMS operation, as described earlier in the context of the present invention. Upon failing to locate the mobile station, MSC-R/VLR-R 122 returns absent subscriber in an acknowledgement message for the MT SMS such as a MAP FwdSMS-ACK message to active signaling module 138, at step 2608. Detection of the absent subscriber indication in the MAP FwdSMS-ACK message at active signaling module 138 confirms successful completion of the CAMEL MT SMS testing for outbound roamer.

MO SMS

Similar to testing of MT SMS, PI module 102 can also perform MO SMS testing by sending SMS on the simulated outbound roamer at his MSC/VLR location. However, in one embodiment of MO SMS testing, PI module 102 fakes the MSC/VLR that the SMS is from a real SMSC of the simulated outbound roamer. Due to absence of mobile station and the concept of SMS forwarding, such a test will only involve routing and expected behavior testing, as described below in various MO SMS embodiments of the present invention.

Figure 27:
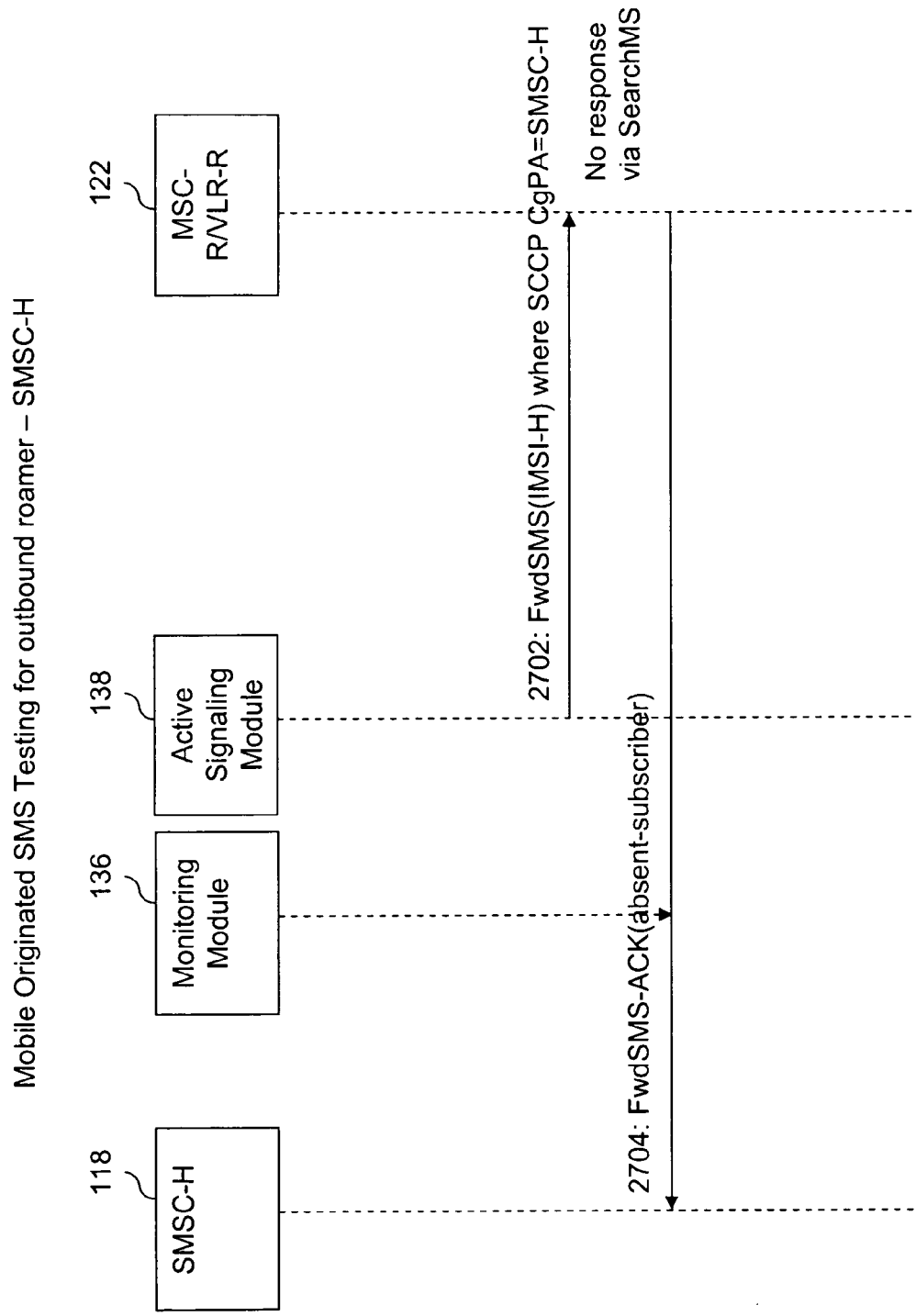
FIG. 27 represents a flow diagram of MO SMS testing on the simulated outbound roamer, in accordance with a first embodiment of the present invention.

FIG. 27 represents a flow diagram of MO SMS testing on the simulated outbound roamer, in accordance with a first embodiment of the present invention. The signal flow for OTPI process is same as signal flow for the OTPI process explained earlier in conjunction with FIG. 5. At step 2702, active signaling module 138 issues a MAP FwdSMS on the IMSI-H to MSC-R/VLR-R 122 with an SCCP CgPA as real SMSC-H 118. Due to absence of the simulated outbound roamer's mobile station, MSC-R/VLR-R 122 returns absent subscriber in a MAP FwdSMS-ACK message directly to SMSC-H 118, at step 2704. Detection of the absent subscriber indication at monitoring module 136 (i.e., by tapping of roaming links between host PMN 104 and roaming partner PMN 120) confirms successful completion of the MO SMS testing for outbound roamer.

In another embodiment of the present invention, PI module 102 tests MO SMS on the simulated outbound roamer at any MSC/VLR location of roaming partner PMN 120, where the simulated outbound roamer is selected from any IMSI of host PMN 104 (e.g., for Very Important Person (VIP) testing). Signal flow for the VIP MO SMS testing is same as the signal flow of normal MO SMS testing explained above in conjunction with FIG. 27, except that in case of VIP MO SMS testing, the error message detected at monitoring module 136 could be, but not limited to, absent subscriber or unknown subscriber.

Furthermore, in yet another embodiment of the present invention, in order to avoid monitoring of roaming links for the outbound roaming MO SMS test, active signaling module 138 acts as a SMSC itself. In order to do so, active signaling module 138 sends MAP FwdSMS to MSC-R/VLR-R 122 with the SCCP CgPA as active signaling module 138 GT. In this case, detection of absent subscriber or unknown subscriber at active signaling module 138 indicates successful testing of the MO SMS for outbound roamer.

Figure 28:
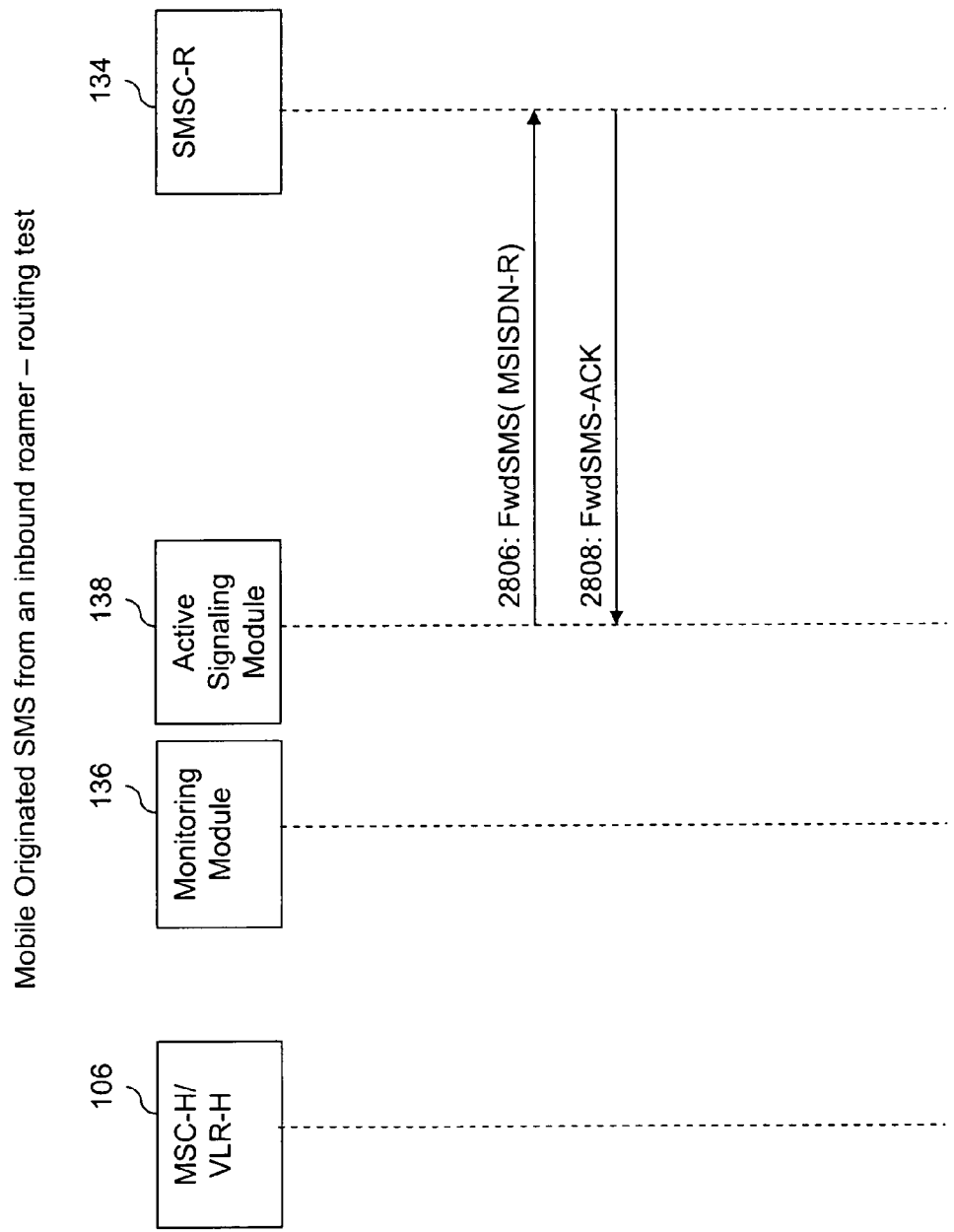
FIG. 28 represents a flow diagram of MO SMS testing on the simulated inbound roamer, in accordance with a second embodiment of the present invention.

Host PMN 104 operator can also test MO SMS for simulated inbound roamers. FIG. 28 represents a flow diagram of MO SMS testing on the simulated inbound roamer, in accordance with a second embodiment of the present invention. The signal flow for ITPI process in this case is same as signal flow for the ITPI process explained earlier in conjunction with FIG. 6. At step 2802, active signaling module 138 issues a MAP FwdSMS on the MSISDN-R to SMSC-R 134 with the SCCP CgPA as active signaling module 138 GT. In this case, active signaling module 138 pretends to be a MSC/VLR location of the simulated inbound roamer. Thereafter at step 2804, SMSC-R 134 returns a success message such as a MO-FwdSMS-ACK message for the delivery of the MO SMS to active signaling module 138. Detection of the MO-FwdSMS-ACK message at active signaling module 138 confirms successful testing of the MO SMS for inbound roamer.

Similarly, in another embodiment of the present invention, PI module 102 tests routing of the MO SMS to real MSC-H/VLR-H 106 location of the simulated inbound roamer. The signal flow for ITPI process in the case is same as signal flow for the ITPI process explained earlier in conjunction with FIG. 6. Further, active signaling module 138 issues a MAP FwdSMS on the MSISDN-R to SMSC-R 134 with the SCCP CgPA as real MSC-H/VLR-H 106, in order to test routing from MSC-H/VLR-H 106 to SMSC-R 134 for the simulated inbound roamer's MSISDN-R. Detection of the FwdSMS-ACK message at monitoring module 136 confirms successful testing of the MO SMS for inbound roamer.

SMS Interworking Testing

PI module 102 performs SMS interworking testing by sending SMS to simulated subscribers located in their respective home locations. Host PMN 104 operator is able to test SMS interworking using roaming partner networks' test SIMs/IMSIs that are exchanged with host PMN 104 operator. In one embodiment of the present invention, PI module 102 sends an SMS to SMSC-R 134 by pretending to be from a subscriber of roaming partner PMN 120 with a recipient number from host PMN 104, so as to create an effect of SMS interworking from the subscriber of roaming partner PMN 120 to host PMN 104's subscriber located in host PMN 104. In another embodiment of the present invention, PI module 102 sends an SMS to the simulated roaming subscriber in its host PMN 104 country with a recipient number from roaming partner PMN 120, so to create an effect of SMS interworking from a subscriber of host PMN 104 to roaming partner PMN 120's subscriber.

Figure 29:
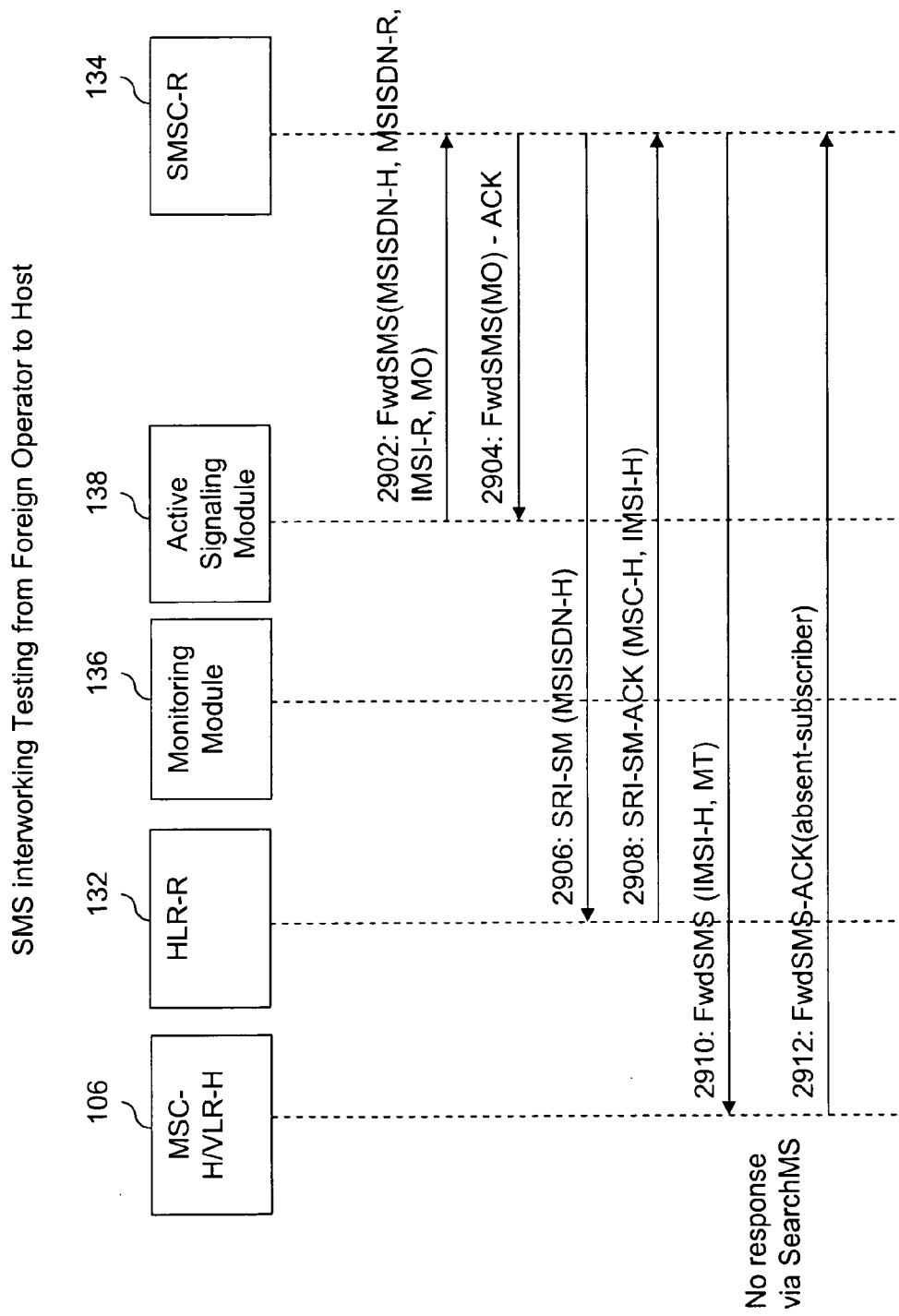
FIG. 29 represents a flow diagram of SMS interworking testing from the roaming partner PMN to the host PMN, in accordance with a first embodiment of the present invention.

FIG. 29 represents a flow diagram of SMS interworking testing from roaming partner PMN 120 to host PMN 104, in accordance with a first embodiment of the present invention. The signal flow for OTPI process in this case is similar to signal flow for the OTPI process explained earlier in conjunction with FIG. 5, except that the OTPI process is performed between active signaling module 138 and MSC-H/VLR-H 106. At step 2902, active signaling module 138 sends a MAP MO FwdSMS on the MSISDN-H to SMSC-R 134 with the simulated inbound roamer's characteristics such as MSISDN-R and IMSI-R. Thereafter at step 2904, SMSC-R 134 returns a MAP MO FwdSMS-ACK message to active signaling module 138. At steps 2906 and 2908, SMSC-R 134 issues a SRI-SM query on the MSISDN-H to HLR-H 116, in order to retrieve MSC-H/VLR-H 106 address and IMSI-H from HLR-H 116. SMSC-R 134 forwards the MO SMS from the simulated inbound roamer of roaming partner PMN 120 towards the simulated subscriber of host PMN 104. Hence at step 2910, SMSC-R 134 issues a MAP MT FwdSMS on the IMSI-H to MSC-H/VLR-H 106. Due to absence of the simulated subscriber's mobile station, MSC-H/VLR-H 106 returns absent subscriber in a MAP FwdSMS-ACK message to SMSC-R 134, at step 2912. PI module 102 confirms successful testing of SMS interworking, upon detecting at monitoring module 136 exchange of such FwdSMS-ACK message with absent subscriber indication.

Figure 30:
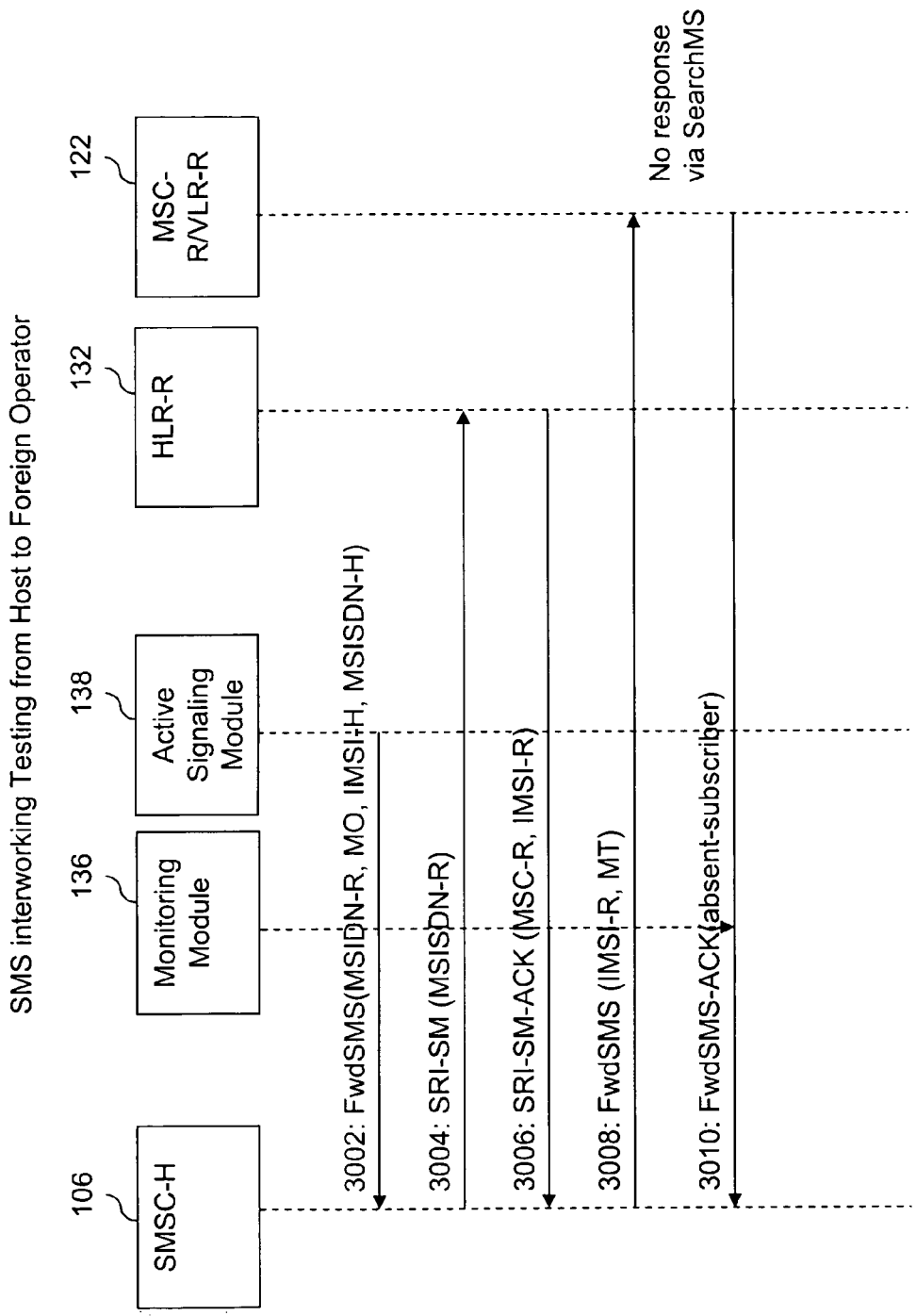
FIG. 30 represents a flow diagram of SMS interworking testing from the host PMN to the roaming partner PMN, in accordance with a second embodiment of the present invention.

FIG. 30 represents a flow diagram of SMS interworking testing from host PMN 104 to roaming partner PMN 120, in accordance with a second embodiment of the present invention. The signal flow for ITPI process is same as signal flow for the ITPI process explained earlier in conjunction with FIG. 6, except that the ITPI process is performed between active signaling module 138 and MSC-R/VLR-R 122. At step 3002, active signaling module 138 sends a MAP MO FwdSMS on the MSISDN-R to SMSC-H 118. Thereafter, at steps 3004 and 3006, SMSC-H 118 issues an SRI-SM query on the MSISDN-R to HLR-R 132, in order to retrieve MSC-R/VLR-R 122 address and IMSI-R from HLR-R 132. Further at step 3008, SMSC-H 118 issues a MAP MT FwdSMS on the IMSI-R to MSC-R/VLR-R 122. Due to absence of the simulated subscriber's mobile station, MSC-R/VLR-R 122 returns absent subscriber in a MAP FwdSMS-ACK message to SMSC-H 118, at step 3010. PI module 102 confirms successful testing of SMS interworking, upon detecting at monitoring module 136 exchange of such FwdSMS-ACK message with absent subscriber indication.

GPRS Testing

Unlike MSC/VLR, where PI module 102 can create and modify simulated profile, an SGSN does not support such simulated profile creation and modification. In order to predict proper working of the SGSN, PI module 102 perform tests on the simulated roaming subscriber's SMS and GPRS routing, in accordance with various embodiments described below in the context of the present invention. GPRS service includes testing of an MT SMS over GPRS, an MO SMS over GPRS, GPRS-based SCCP routing and IP routing.

Figure 31:
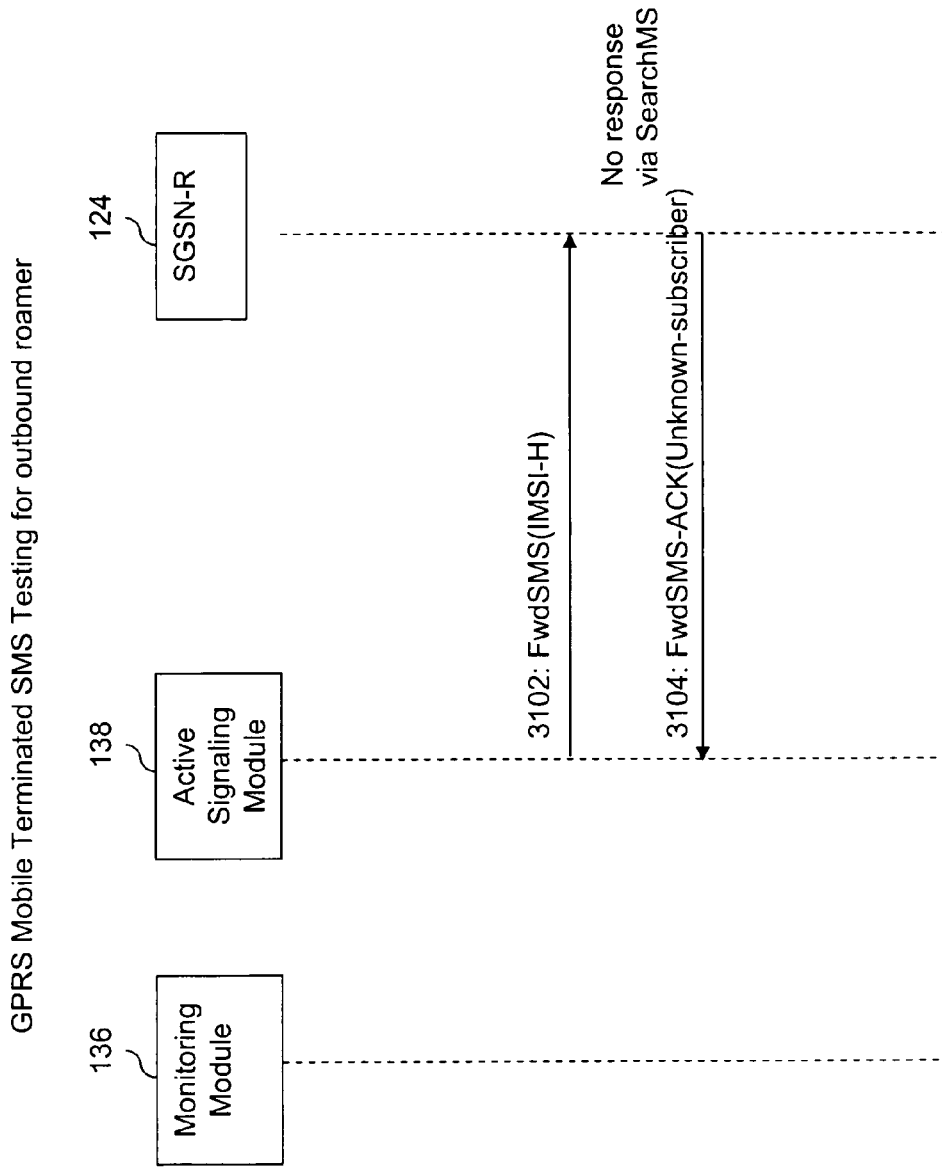
FIG. 31 represents a flow diagram of General Packet Radio Services (GPRS) MT SMS testing on the simulated outbound roamer at a Serving GPRS Support Node (SGSN) location in the roaming partner PMN, in accordance with a first embodiment of the present invention.

FIG. 31 represents a flow diagram of GPRS MT SMS testing on the simulated outbound roamer at SGSN-R 124 location, in accordance with a first embodiment of the present invention. At step 3102, active signaling module 138 issues the MT SMS over GPRS such as a MAP FwdSMS on the IMSI-H for any IMSI of host PMN 104 (including test IMSI-H or a real IMSI, e.g., a VIP IMSI) to SGSN-R 124. Thereafter at step 3104, active signaling module 138 receives an unknown subscriber indication in a FwdSMS-ACK message from SGSN-R 124. Detection of the unknown subscriber indication at active signaling module 138 confirms successful testing of GPRS MT SMS for outbound roamer.

Similarly, in another embodiment of the present invention, PI module 102 tests GPRS MO SMS from the simulated outbound roamer at SGSN-R 124 location. In this case, active signaling module 138 issues MO SMS over GPRS such as a MAP FwdSMS on any IMSI-H to SGSN-R 124 with the SCCP CgPA as SMSC-H 118 GT. Thereafter, SGSN-R 124 returns unknown subscriber indication in a MAP FwdSMS-ACK message to SMSC-H 118. Detection of such unknown subscriber indication at monitoring module 136 (i.e., by tapping roaming links) confirms successful completion of the GPRS MO SMS testing for outbound roamer.

Although MO SMS, mobility and GPRS CSIs can be tested at a VPMN side due to absence of the mobile station; however, host PMN 104 operator may want to test an HPMN SCP side. In order to handle these cases, PI module 102 pretends to be a VPMN network element (e.g., MSC/VLR or SGSN) with the CSI support. Particularly, PI module 102 uses both its active signaling module 138 and monitoring module 136 to test all these types of CSIs.

Figure 32:
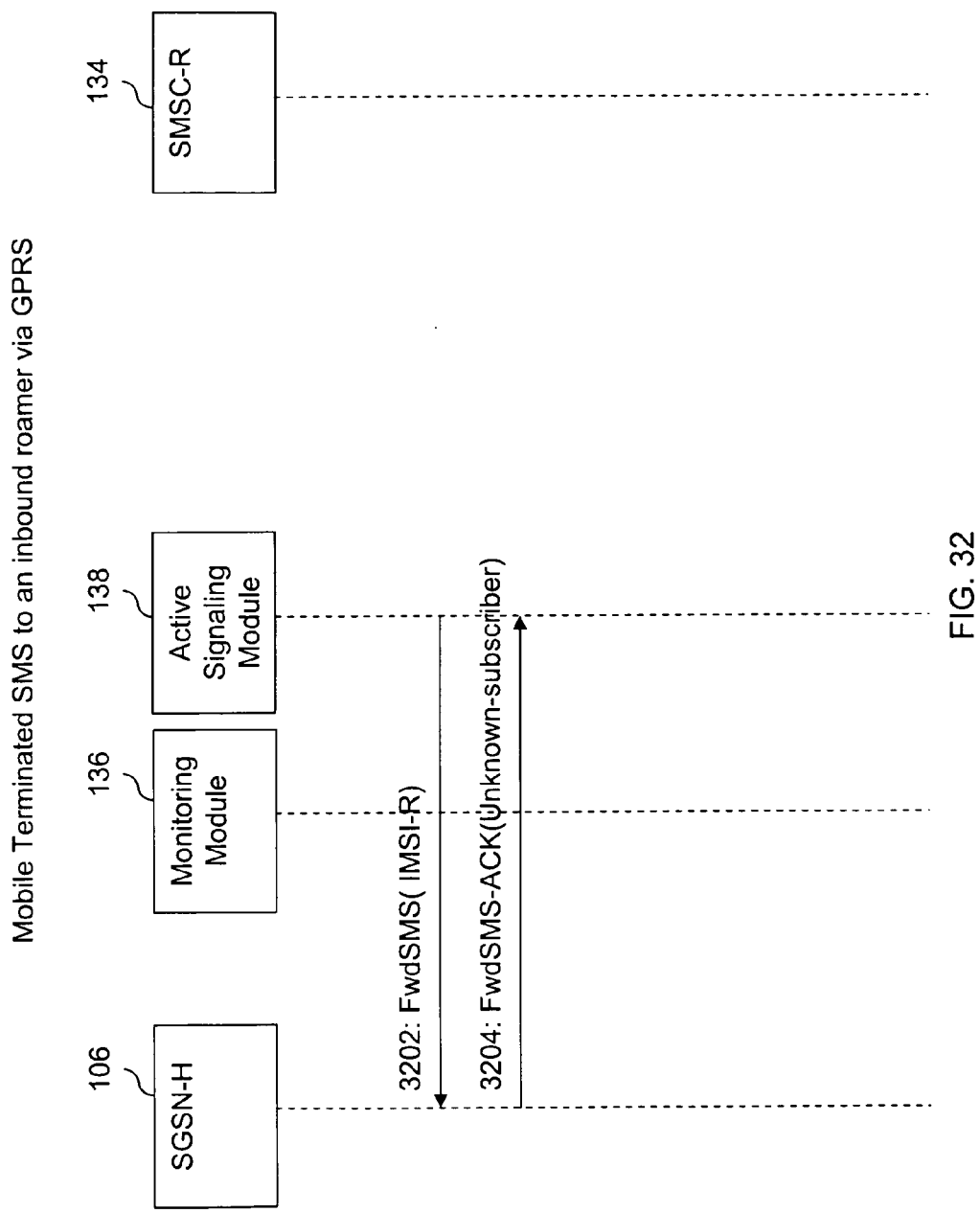
FIG. 32 represents a flow diagram of the GPRS MT SMS testing on the simulated inbound roamer at an SGSN location in the host PMN, in accordance with a second embodiment of the present invention.

FIG. 32 represents a flow diagram of GPRS MT SMS testing on the simulated inbound roamer at SGSN-H 108 location, in accordance with a second embodiment of the present invention. The signal flow in steps 3202 and 3204 is same as signal flow explained above in conjunction with FIG. 31, except that IMSI-H and SGSN-R 124 are replaced with IMSI-R and SGSN-H 108, respectively. In this case of GPRS MT SMS testing on the simulated inbound roamer, detection of the unknown subscriber indication at active signaling module 138 confirms successful testing of GPRS MT SMS for inbound roamer.

Similarly, in another embodiment of the present invention, PI module 102 tests GPRS MO SMS from the simulated inbound roamer at SGSN-H 108 location. The signal flow for GPRS MO SMS testing at SGSN-H 108 location is same as signal flow explained above in conjunction with FIG. 31, except that IMSI-H and SGSN-R 124 are replaced with MSISDN-R and SMSC-R 134, respectively, and successful completion of GPRS MO SMS testing for inbound roamer is detected when an MT SMS confirmation message such as FwdSMS-ACK message is received at active signaling module 138.

In yet another embodiment of the present invention, PI module 102 tests GPRS MO SMS from the simulated inbound roamer at any SGSN location of host PMN 104. In this case, active signaling module 138 issues a MAP FwdSMS on the MSISDN-R to SMSC-R 134 with the SCCP CgPA as any SGSN-H address and the SCCP CdPA as SMSC-R 134. Detection of the successful FwdSMS-ACK message exchange from SMSC-R 134 to the SGSN-H address, at monitoring module 136 confirms successful testing of the GPRS MO SMS for inbound roamer.

Figure 33:
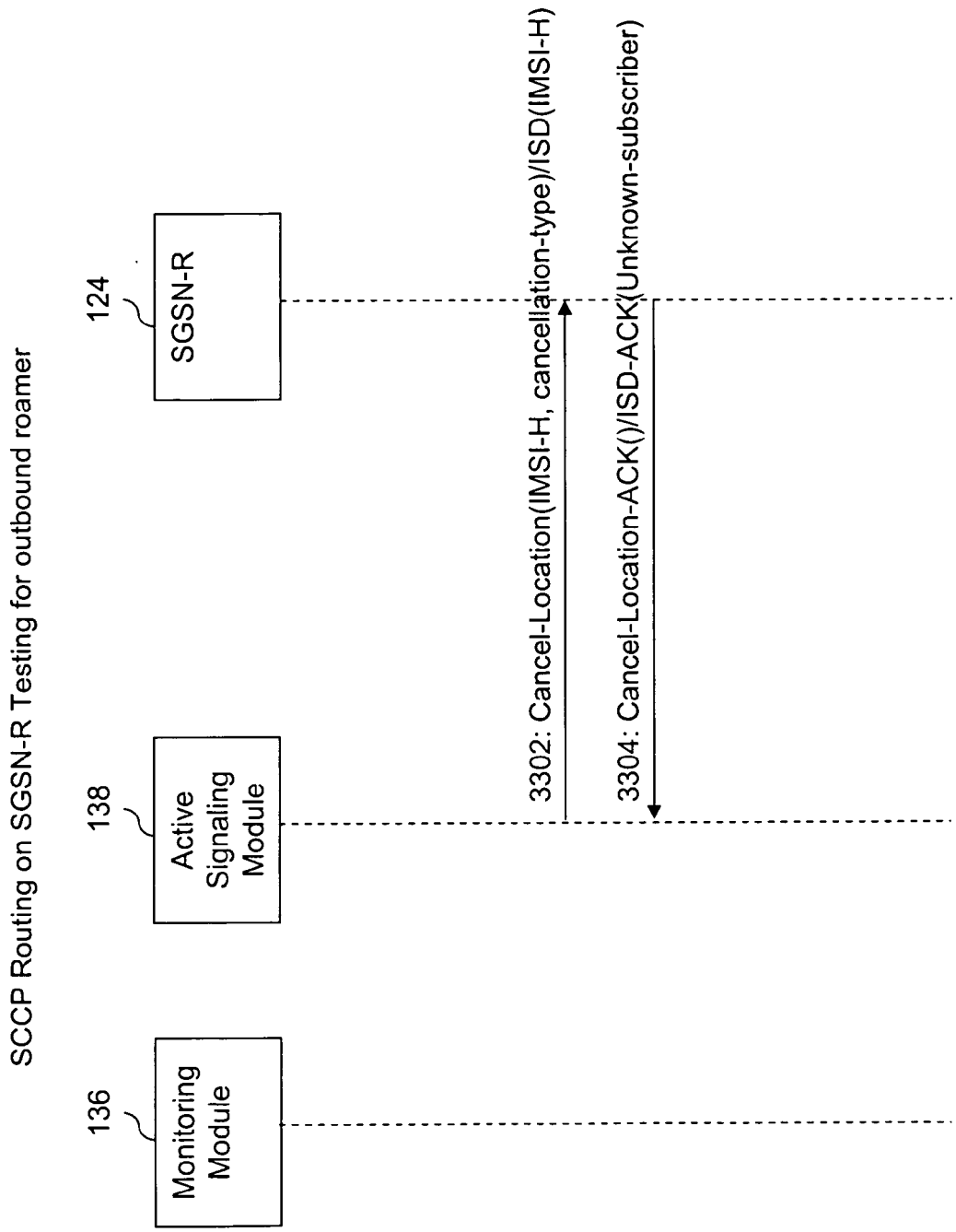
FIG. 33 represents a flow diagram of Signaling Connection Control Part (SCCP) route testing on the simulated outbound roamer between the host PMN and the roaming partner PMN SGSN, in accordance with an embodiment of the present invention.

Furthermore, host PMN 104 operator can test SCCP routing between its PMN and its roaming partner networks' SGSNs. FIG. 33 represents a flow diagram of SCCP route testing on the simulated outbound roamer between host PMN 104 and SGSN-R 124, in accordance with an embodiment of the present invention. At step 3302, active signaling module 138 issues a MAP Cancel-Location (IMSI-H, cancellation type) message to SGSN-R 124, where cancellation type is set to subscription cancellation or update procedure (i.e., to cancel the location at HLR-H 116 so as to force a new LUP later, i.e., next time the mobile is in contact with SGSN-R 124). Alternatively at step 3302, active signaling module 138 issues a MAP ISD message or a MAP DSD message on the IMSI-H to SGSN-R 124. Thereafter at step 3304, active signaling module 138 receives a Cancel-Location-ACK message or an unknown subscriber error indication in an ISD-ACK/DSD-ACK message from SGSN-R 124. Detection of the unknown subscriber indication or Cancel-Location-ACK message at active signaling module 138 confirms successful testing of SCCP route between host PMN 104 and SGSN-R 124.

Similarly, in another embodiment of the present invention, PI module 102 performs SCCP route testing on the simulated outbound roamer between HLR-H 116 and SGSN-R 124. Signal flow in this case is same as signal flow explained above in conjunction with FIG. 33, where Cancel-Location/ISD/DSD and Cancel-Location-ACK/ISD-ACK/DSD-ACK messages are exchanged; however, in this embodiment of testing between HLR-H 116 and SGSN-R 124, active signaling module 138 issues Cancel-Location/ISD/DSD message to SGSN-R 124 with the SCCP CgPA set as HLR-H 116 of the IMSI-H, and thus Cancel-Location-ACK/ISD-ACK/DSD-ACK message is received at HLR-H 116 from SGSN-R 124. Detection of Cancel-Location-ACK/ISD-ACK/DSD-ACK message with unknown subscriber indication at monitoring module 136 confirms successful testing of SCCP route between HLR-H 116 and SGSN-R 124.

Figure 34:
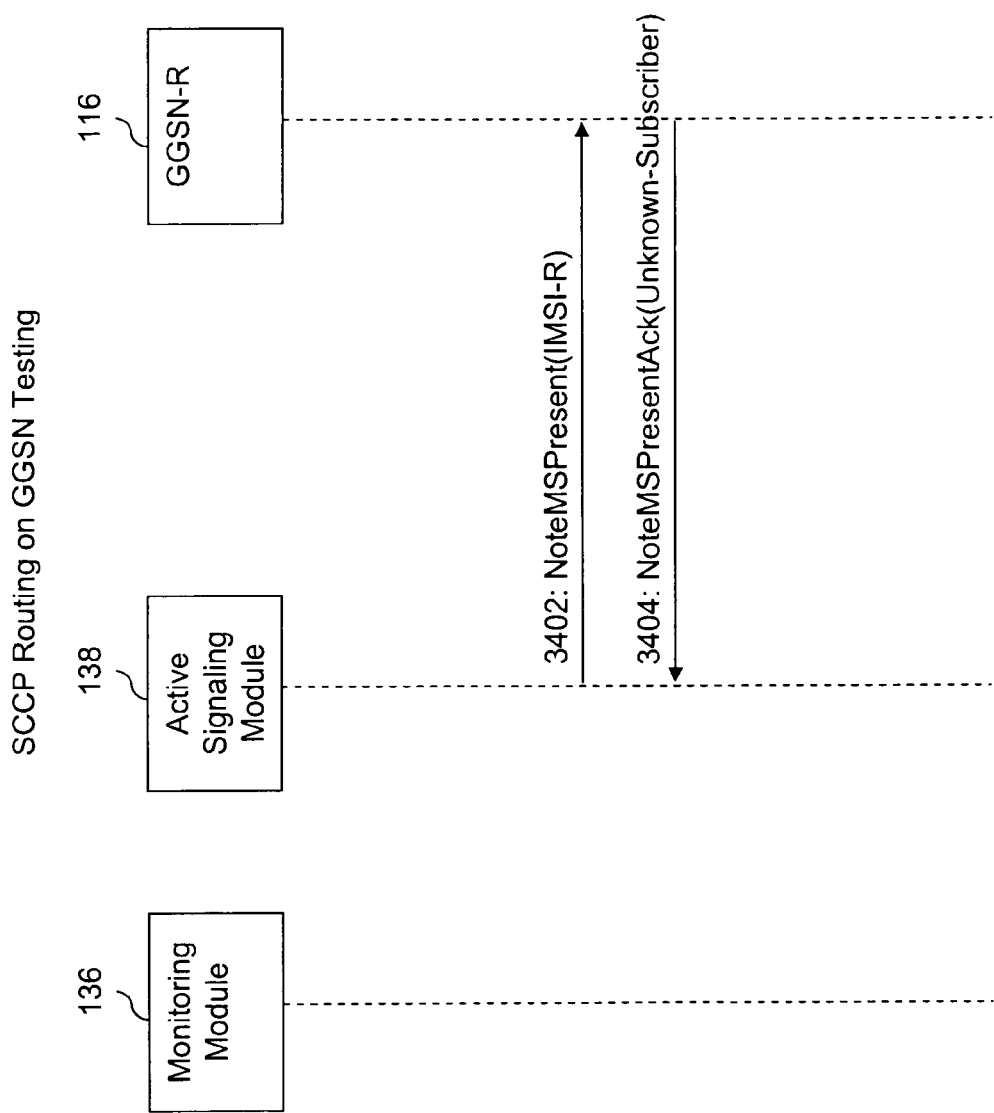
FIG. 34 represents a flow diagram of SCCP route testing between the host PMN and a Gateway GPRS Support Node (GGSN) in the roaming partner PMN, in accordance with an embodiment of the present invention.

Furthermore, host PMN 104 operator can test SCCP routing between its PMN and its roaming partner networks' GGSNs. FIG. 34 represents a flow diagram of SCCP route testing between host PMN 104 and GGSN-R 126, in accordance with an embodiment of the present invention. At step 3402, active signaling module 138 issues a mobile presence message such as a MAP Note-MS-Present-GPRS message on the IMSI-R to GGSN-R 126 by faking itself as an SGSN of host PMN 104 and pretending itself as an HLR of roaming partner PMN 120 when notifying GGSN-R 126 for the presence of IMSI-R. Thereafter at step 3404, active signaling module 138 receives an unknown subscriber error indication in a MAP Note-MS-Present-GPRS-ACK message from GGSN-R 126. Detection of the unknown subscriber indication at active signaling module 138 confirms successful testing of GPRS-based SCCP route between host PMN 104 and GGSN-R 126.

Similarly, in another embodiment of the present invention, PI module 102 performs SCCP route testing between SGSN-H 108 and SGSN-R 124. Signal flow in this case is same as signal flow explained above in conjunction with FIG. 34, where MAP Note-MS-Present-GPRS and MAP Note-MS-Present-GPRS-ACK messages are exchanged. However in this embodiment of testing between SGSN-H 108 and SGSN-R 124, active signaling module 138 issues MAP Note-MS-Present-GPRS message on the IMSI-R to GGSN-R 126 by faking the sender's IP address as SGSN-H 108 and pretending itself as an HLR of roaming partner PMN 120, in order to notify GGSN-R 126 for IMSI-R presence. Thus, MAP Note-MS-Present-GPRS-ACK message is received at SGSN-H 108 from GGSN-R 126. Detection of MAP Note-MS-Present-GPRS-ACK message with unknown subscriber indication at monitoring module 136 confirms successful testing of SCCP route between SGSN-H 108 and SGSN-R 124.

Figure 35:
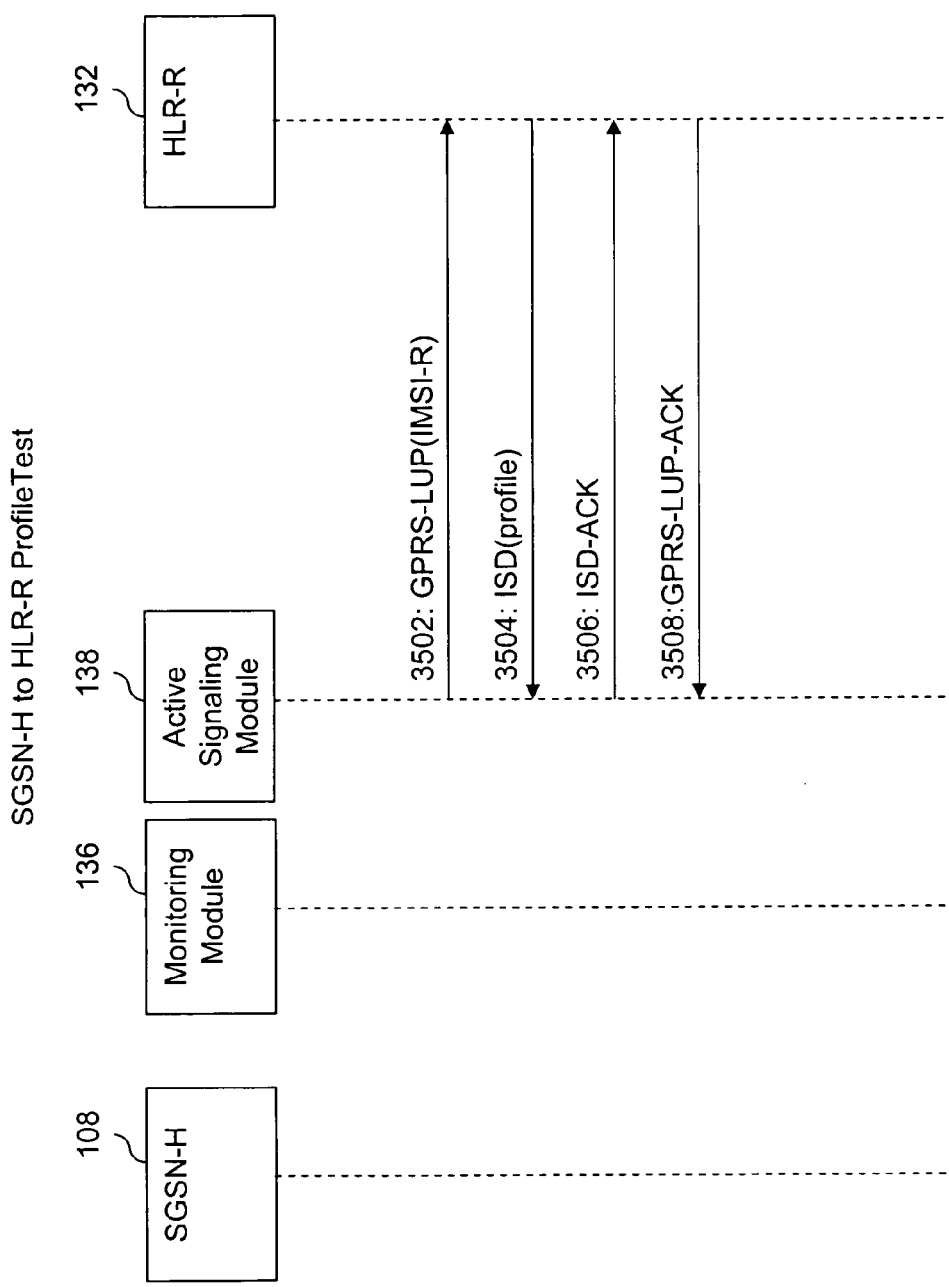
FIG. 35 represents a flow diagram of a GPRS LUP process for testing the SCCP route between the host PMN and a Home Location Register (HLR) in the roaming partner PMN, in accordance with an embodiment of the present invention.

Further, host PMN 104 operator may test SCCP routing between its PMN and HLR-R 132. FIG. 35 represents a flow diagram of a GPRS LUP process for testing SCCP route between host PMN 104 and HLR-R 132 of the IMSI-R, in accordance with an embodiment of the present invention. At step 3502, active signaling module 138 issues a GPRS LUP message on the IMSI-R to HLR-R 132 by faking HLR-R 132 that active signaling module 138 is an SGSN of host PMN 104. Signal flow in steps 3504 to 3508 follows standard flow of GPRS LUP process, where ISD, ISD-ACK and GPRS LUP-ACK messages are exchanged. However, in this embodiment, these messages are exchanged between active signaling module 138 (instead of an SGSN) and HLR-R 132. Detection of GPRS profile exchange in the ISD message at active signaling module 138 indicates successful testing of GPRS-based SCCP routing between host PMN 104 and HLR-R 132.

Similarly, in another embodiment of the present invention, PI module 102 initiates a GPRS LUP process to test SCCP routing between host PMN 104 and HLR-R 132 of the IMSI-R. The signal flow in this case is similar to signal flow explained above in conjunction with FIG. 35, except that in this embodiment of testing between host PMN 104 and HLR-R 132, active signaling module 138 issues GPRS LUP message to HLR-R 132 with the SCCP CgPA as SGSN-H 108. Therefore, in this embodiment, signaling messages ISD, ISD-ACK and GPRS LUP-ACK are exchanged between active signaling module 138 and HLR-R 132. Detection of profile information in the ISD message at monitoring module 136 (i.e., by tapping roaming links) indicates successful testing of SCCP routing between host PMN 104 and HLR-R 132.

Figure 36:
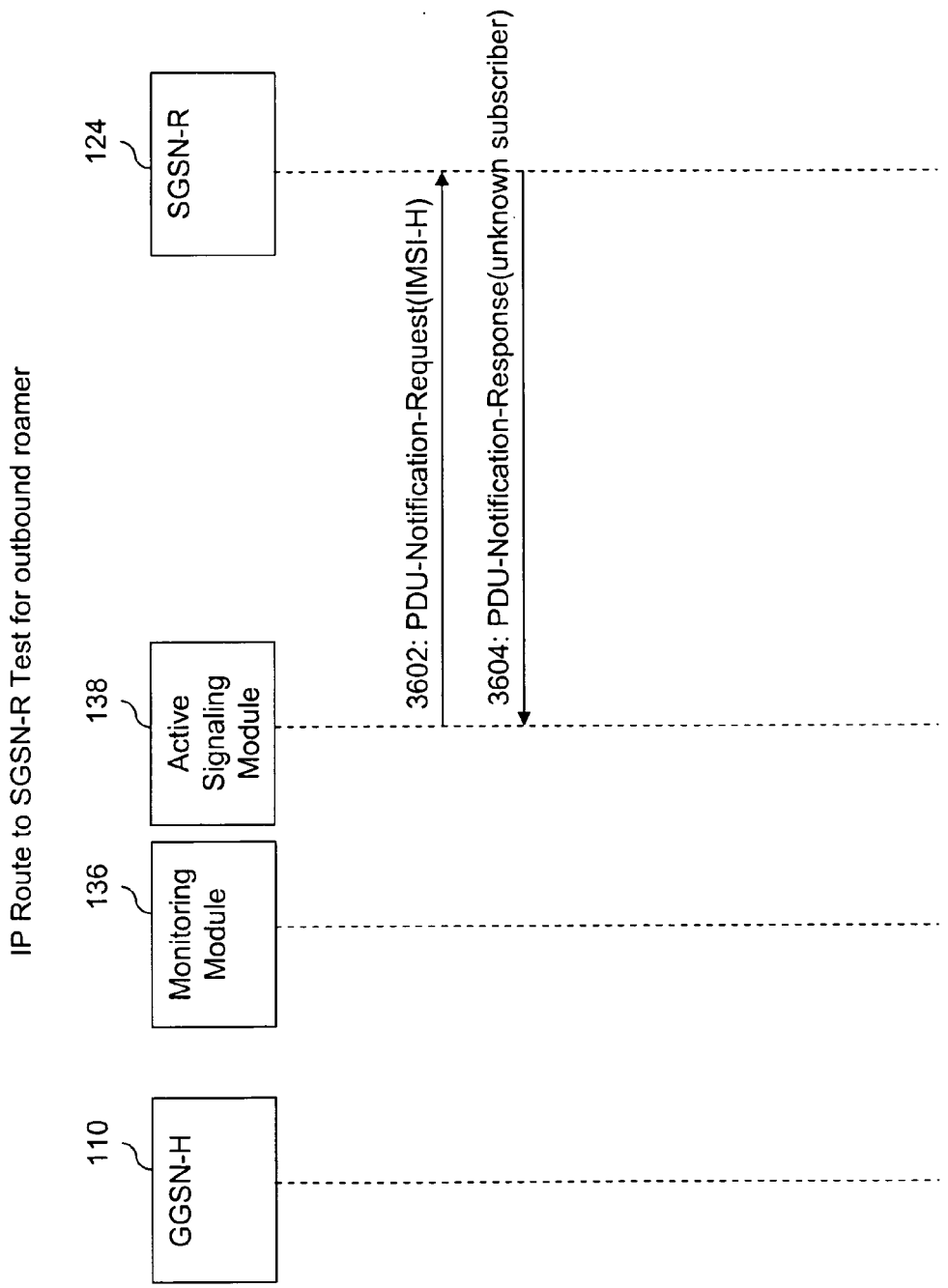
FIG. 36 represents a flow diagram for testing IP route to the roaming partner PMN SGSN for the simulated outbound roamer, in accordance with a first embodiment of the present invention.

Furthermore, PI module 102 can also test IP routing between host PMN 104 and SGSN-R 124. FIG. 36 represents a flow diagram for testing IP route to SGSN-R 124 for the simulated outbound roamer, in accordance with a first embodiment of the present invention. At step 3602, active signaling module 138 issues a Protocol Data Unit (PDU) Notification request message on the IMSI-H to SGSN-R 124. Thereafter at step 3604, detection of unknown subscriber indication in a PDU notification acknowledgment message such as a PDU Notification response at active signaling module 138 from SGSN-R 124 indicates successful testing of IP route to SGSN-R 124.

Similarly, in another embodiment of the present invention, PI module 102 tests IP routing for the simulated outbound roamer between GGSN-H 110 and SGSN-R 124. Signal flow in this case is similar to signal flow explained above in conjunction with FIG. 36, except that active signaling module 138 sends PDU Notification request to SGSN-R 124 by faking a sender IP address as that of an GGSN of host PMN 104, so that an acknowledgement such as a PDU Notification response with unknown subscriber indication from SGSN-R 124 is returned to GGSN-H 110, instead of active signaling module 138. Detection of unknown subscriber indication in the PDU Notification response at monitoring module 136 indicates successful testing of IP route between GGSN-H 110 and SGSN-R 124.

Figure 37:
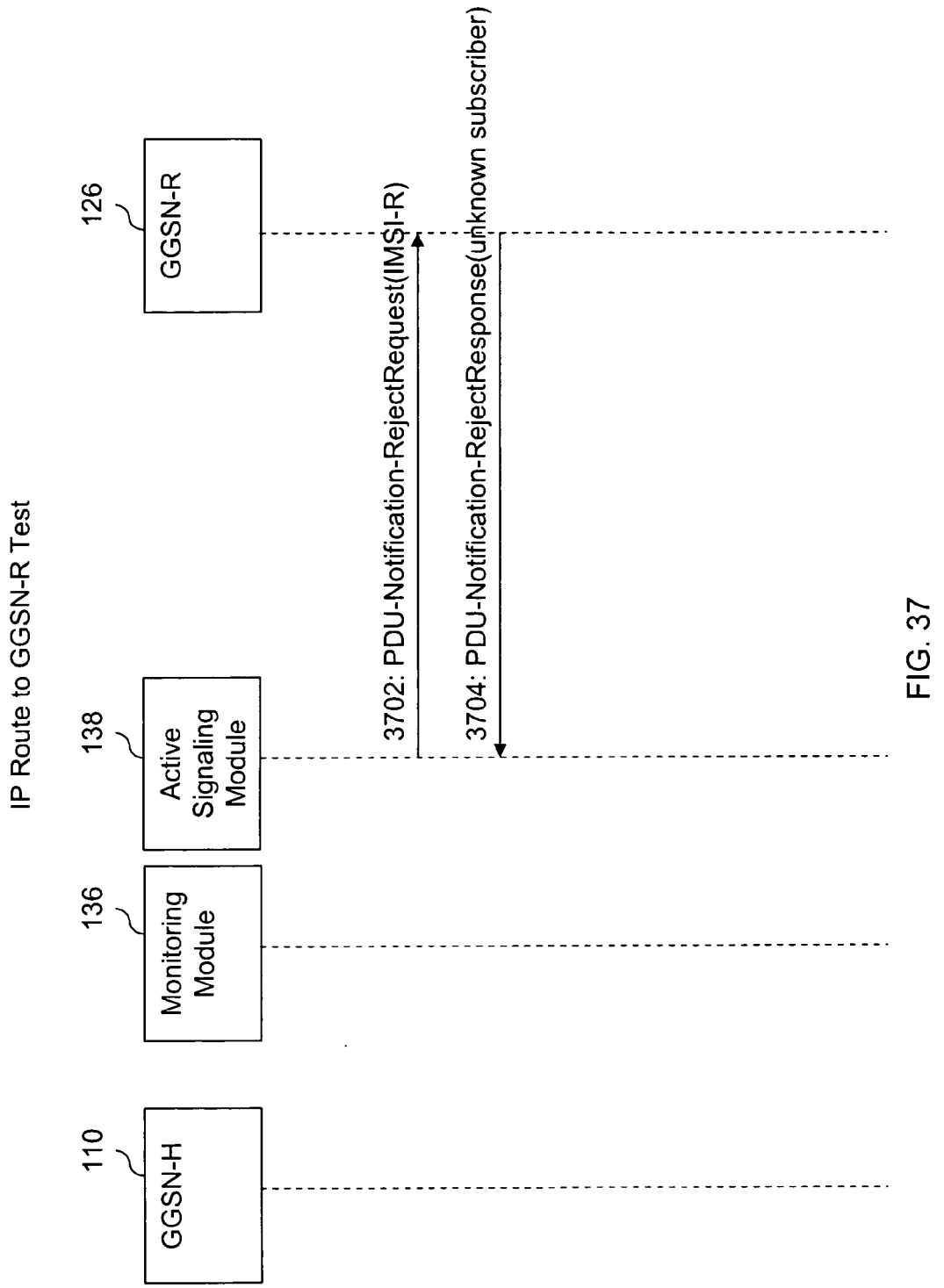
FIG. 37 represents a flow diagram for testing IP route to the roaming partner PMN GGSN for the simulated inbound roamer, in accordance with a second embodiment of the present invention.

Furthermore, PI module 102 can also test IP routing for simulated inbound roamers. FIG. 37 represents a flow diagram for testing IP route to GGSN-R 126 for the simulated inbound roamer, in accordance with a second embodiment of the present invention. Signal flow in steps 3702 and 3704 is similar to signal flow for corresponding steps explained above in conjunction with FIG. 36, except that in this embodiment, a PDU Notification reject request and a PDU Notification reject response are exchanged between active signaling module 138 and GGSN-R 126 (instead of SGSN-R 124). Detection of unknown subscriber indication in the PDU Notification reject response at active signaling module 138 from GGSN-R 126 indicates successful testing of IP routing to GGSN-R 126.

Similarly, in another embodiment of the present invention, PI module 102 tests IP routing for the simulated inbound roamer from active signaling module 138 to GGSN-R 126. Signal flow in this case is similar to signal flow explained above in conjunction with FIG. 37, except that active signaling module 138 sends PDU Notification reject request to GGSN-R 126 by faking a sender IP address as an SGSN of host PMN 104, so that a response such as PDU Notification reject response with unknown subscriber indication from GGSN-R 126 is returned to GGSN-H 108, instead of active signaling module 138. Detection of unknown subscriber indication in the PDU Notification reject response at monitoring module 136 indicates successful testing of IP routing to GGSN-R 126.

Unstructured Supplementary Service Data (USSD) Testing

Since USSD services may be affected by a MAP version, host PMN 104 operator can test USSD bearer support availability at roaming partner PMN 120 side, in addition to testing of the MAP version associated with USSD services. Like SMS testing, testing of USSD support involves routing and expected behavior testing due to lack of mobile station and the concept of USSD forwarding.

Figure 38:
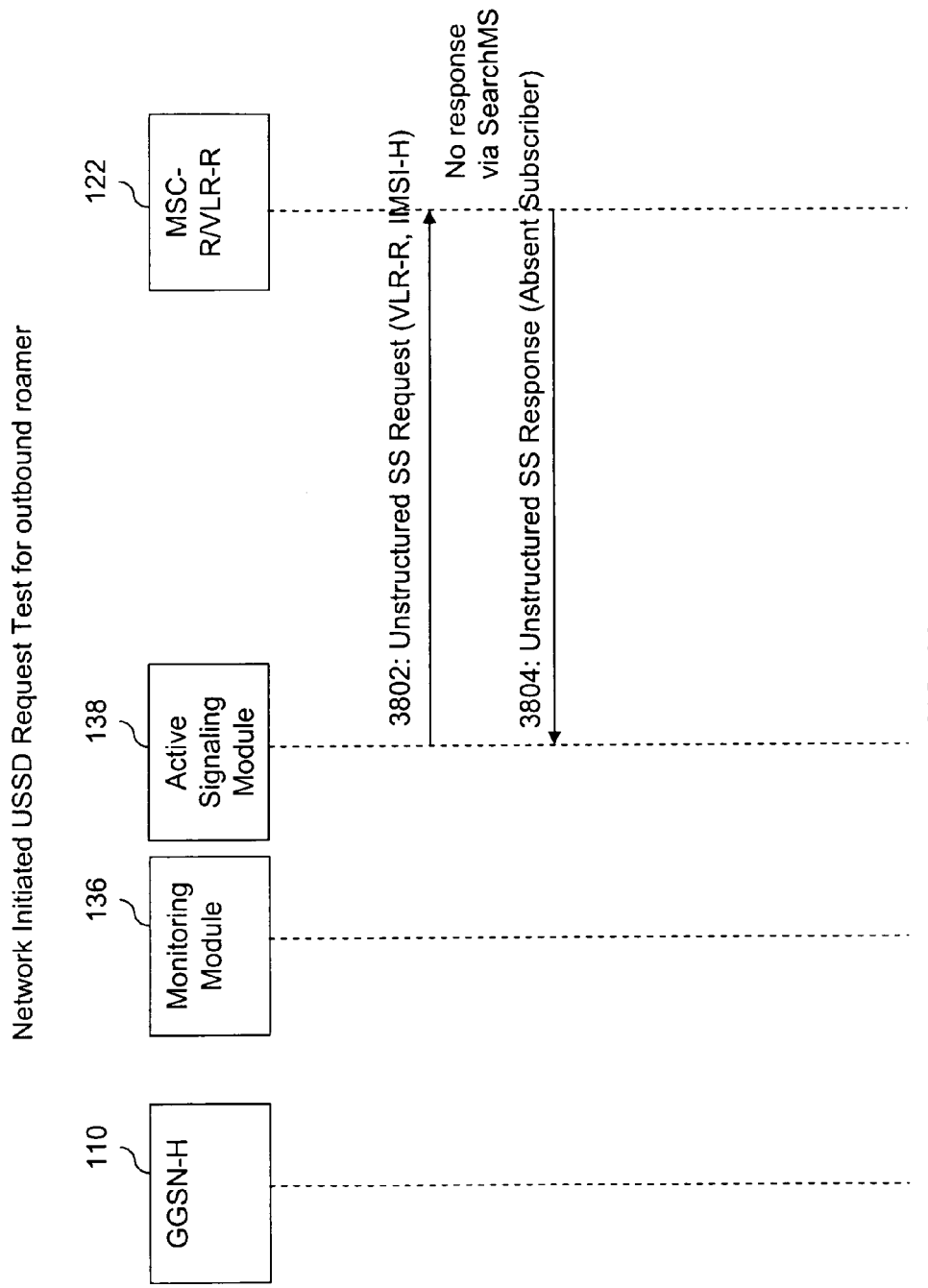
FIG. 38 represents a flow diagram for testing of a network initiated Unstructured Supplementary Service Data (USSD) request to the simulated outbound roamer at the roaming partner PMN MSC/VLR location, in accordance with an embodiment of the present invention.

FIG. 38 represents a flow diagram for testing of a network initiated USSD request to the simulated outbound roamer at MSC-R/VLR-R 122 location, in accordance with an embodiment of the present invention. The signal flow of the OTPI process is same as the OTPI process as explained earlier in conjunction with FIG. 5. At step 3802, active signaling module 138 issues an USSD request such as a MAP Unstructured SS Request for any IMSI of host PMN 104 (e.g., IMSI-H) to MSC-R/VLR-R 122. Since the simulated outbound roamer has no real mobile station associated with him, active signaling module 138 receives absent subscriber or unidentified subscriber indication in an USSD acknowledgement message such as a MAP Unstructured SS response from MSC-R/VLR-R 122, at step 3804. Detection of the absent subscriber or unidentified subscriber indication at active signaling module 138 indicates successful testing of network initiated USSD service in roaming partner PMN 120. Similarly, in another embodiment of the present invention, PI module 102 tests a network initiated USSD notification for the simulated outbound roamer. The signal flow for this embodiment is similar to signal flow explained above in conjunction with FIG. 38, except that Unstructured SS request/Unstructured SS response are replaced with Unstructured SS notify messages. In both these embodiments, active signaling module 138 acts as an HLR of host PMN 104 to MSC-R/VLR-R 122.

Further, host PMN 104 operator can also test USSD support on the simulated inbound roamer. In this case, host PMN 104 operator tests USSD service (e.g. prepay account check) of any known roaming partner PMN. The signal flow of the ITPI process in this case is same as the ITPI process as explained above in conjunction with FIG. 6. In one embodiment of the present invention, PI module 102 checks MAP version 1 (MAPv1) for the USSD service by exchanging MAP Begin Subscriber Activity and MAP Begin Subscriber Activity-ACK messages between active signaling module 138 and HLR-R 132. Detection of USSD data in the MAP Begin Subscriber Activity-ACK message at active signaling module 138 indicates successful testing of USSD service for the simulated inbound roamer. Similarly, in another embodiment of the present invention, PI module 102 checks MAP version 2 (MAPv2) for the USSD service by exchanging MAP Process USSD Request and MAP Process USSD Request-ACK messages between active signaling module 138 and HLR-R 132. Detection of USSD string in the MAP Process USSD Request-ACK message at active signaling module 138 indicates successful testing of USSD service for the simulated inbound roamer.

Provide Subscriber Information (PSI) and Provide Subscriber Location (PSL) Paging Support Camel phase 3 and above versions allows a MSC/VLR to respond to a home network's PSI request by paging the roamer for his current cell location. Therefore, PI module 102 can test the paging support on the simulated outbound roamer at any CAMEL phase 3 (or above) roaming partner PMN that has a CAMEL phase 3 agreement with host PMN 104. Various embodiments for testing PSI paging support assumes CAMEL phase 3 agreement between host PMN 104 and roaming partner PMN 120 operators.

Figure 39:
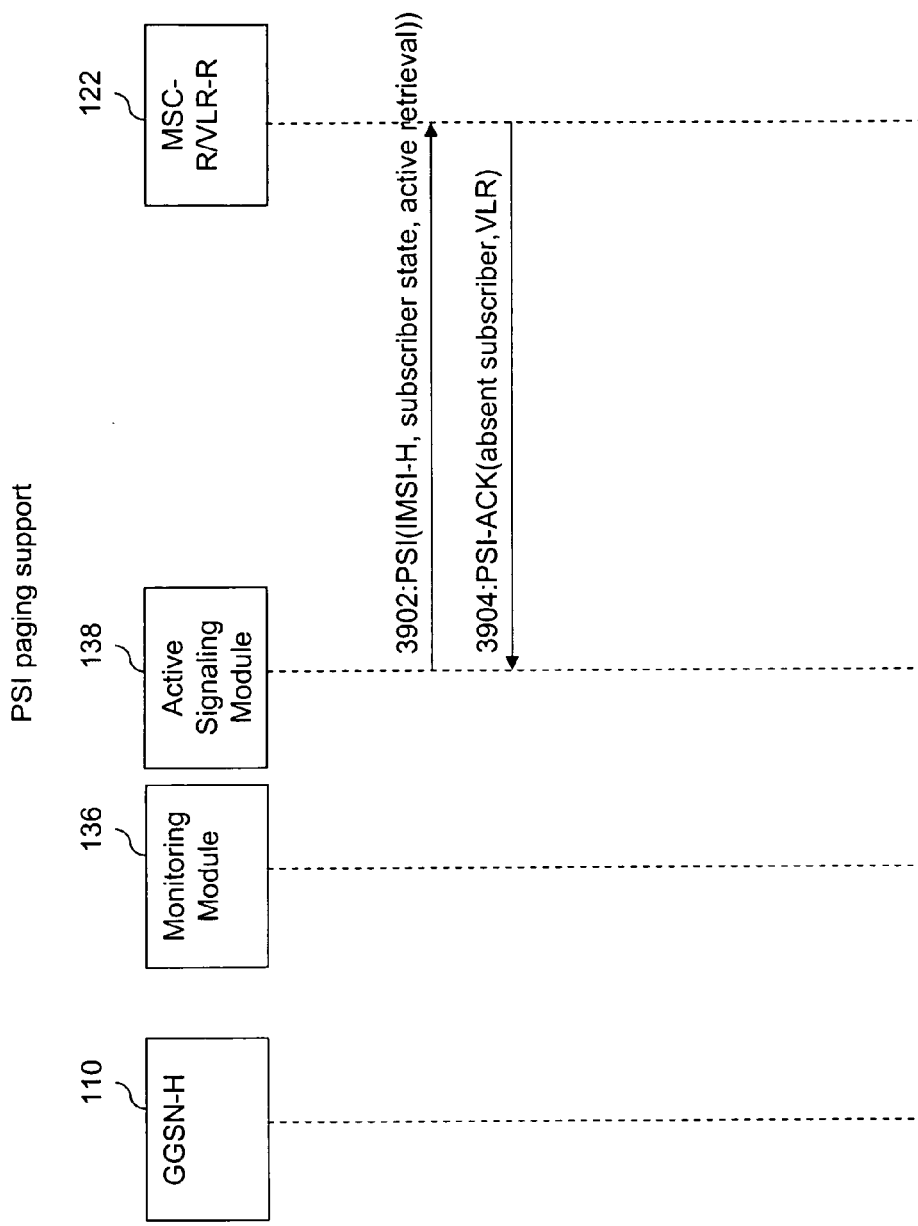
FIG. 39 represents a flow diagram for testing Provide Subscriber Information (PSI) paging support for the simulated outbound roamer at the roaming partner PMN MSC/VLR that has a CAMEL phase 3 agreement with the host PMN, in accordance with an embodiment of the present invention.

FIG. 39 represents a flow diagram for testing PSI paging support for the simulated outbound roamer at MSC-R/VLR-R 122 of roaming partner PMN 120 that has CAMEL phase 3 agreement with host PMN 104, in accordance with an embodiment of the present invention. The signal flow of the OTPI process in this case is same as the OTPI process explained above in conjunction with FIG. 5. At step 3902, active signaling module 138 issues a MAP PSI message on the IMSI-H to MSC-R/VLR-R 122, along with subscriber state and active retrieval parameters. Since the simulated outbound roamer has no real mobile station associated with him, active signaling module 138 receives absent subscriber indication and MSC-R/VLR-R 122 location of the simulated outbound roamer in a MAP PSI-ACK message from MSC-R/VLR-R 122, at step 3904. Detection of absent subscriber and MSC-R/VLR-R 122 location indications at active signaling module 138 indicates successful testing of PSI paging support for the simulated outbound roamer.

Similar to PSI, PI module 102 can also test the location accuracy of the simulated outbound roamer. Signal flow in this case is similar to signal flow explained above in conjunction with FIG. 39, except that PSI and PSI-ACK messages are replaced with PSL and PSL-ACK messages, respectively.

Route Testing

Furthermore, host PMN 104 operator can perform route testing for voice quality, CLI guarantee (which is explained earlier), latency (e.g., how long the call takes to setup), post dial delay testing (i.e., from the time when ISUP IAM is issued or received to the time when ISUP ACM is received) etc. In order to test the quality of a trunk route, PI module 102 initiates a call on an outgoing route for host PMN 104. In one embodiment of the present invention, PI module 102 uses a carrier selection (e.g., ATT long distance or Begalcom long distance) in an ISUP IAM message. In another embodiment of the present invention, PI module 102 uses a special prefix. Host PMN 104 operator may configure GMSC-H 112 to do appropriate route selection based on these indicators.

In order to test voice quality, active signaling module 138 initiates a voice circuit completed on MO call first (i.e. active signaling module 138 issues ISUP ANM when the forwarded call of the MT call is received at active signaling module 138), and then it plays, via IVR, a voice sample on one leg (e.g., outgoing MT call leg) of the test call and receives another voice sample on another leg (e.g., incoming forwarded call leg). Thereafter, PI module 102 compares the original sample with samples of the MT call received on another port, in order to test the voice quality.

Usually, roaming subscriber experience is mainly dependent on Quality of Service (QoS) provided by international carriers. In various embodiments of the present invention, PI module 102 identifies the following parameters to assess and control the quality delivered by its international carriers: call setup duration, CLI transparency, Originally Called Number (OCN)/Redirecting Number (RDN) transparency, identification of an international carrier for incoming calls, Dual Tone Multi-Frequency (DTMF) transparency and perceived Voice QoS.

Call Setup Duration

Host PMN 104 operator may want to estimate call setup durations to reach distant roaming partner networks from its own network. Similarly, host PMN 104 operator may want to estimate call setup duration from distant roaming partner networks to its own network. In an embodiment of the present invention, these estimates are based on an MSRN or an MSISDN routing, depending on the nature of an end destination (i.e., a roamer or a local subscriber).

Figure 40:
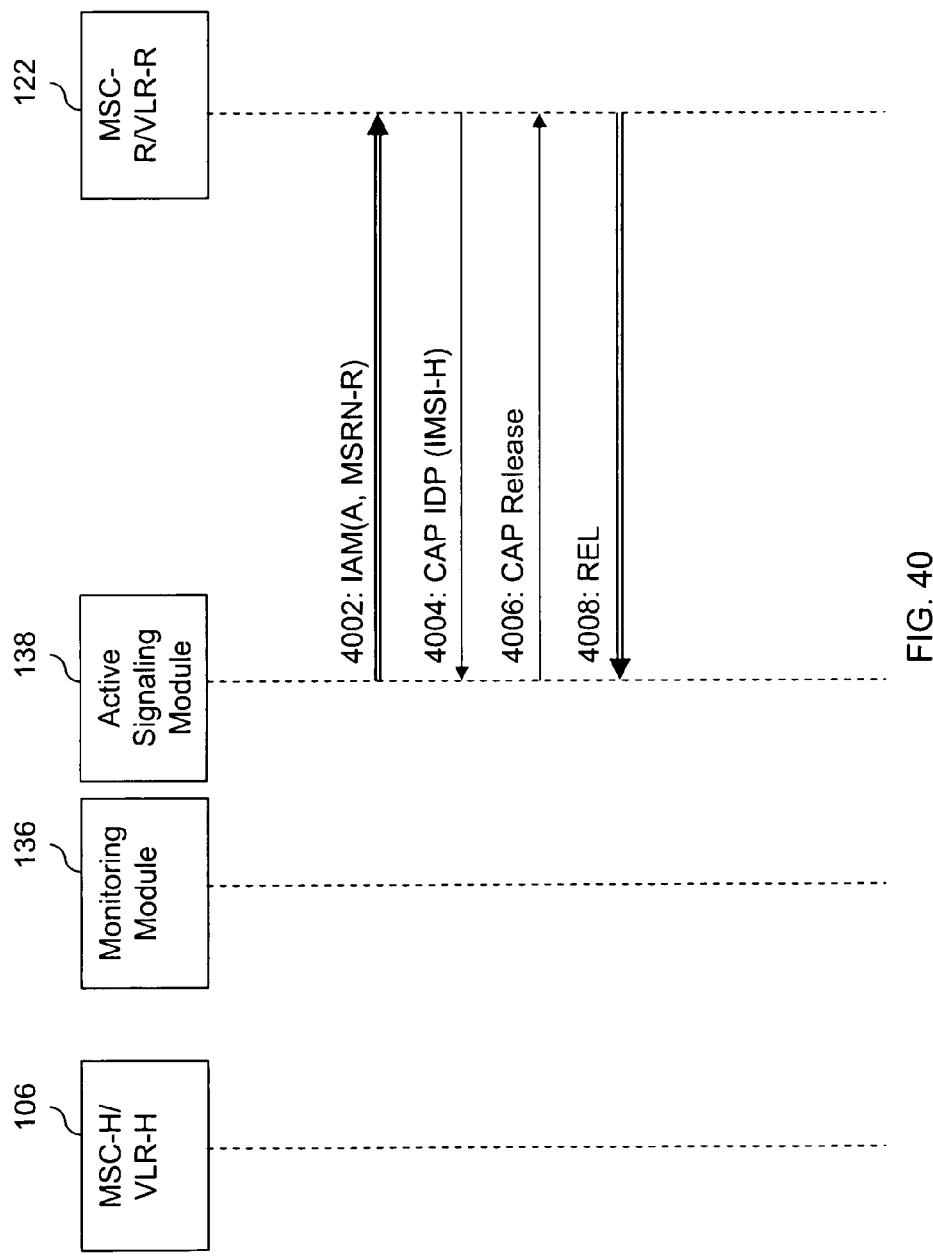
FIG. 40 represents a flow diagram for determining delay in the call setup towards the roaming partner PMN using a Mobile Station Routing Number (MSRN) of the roaming partner PMN and the VT-CSI profile, in accordance with a first embodiment of the present invention.

FIG. 40 represents a flow diagram for determining delay in the call setup towards roaming partner PMN 120 using an MSRN of roaming partner PMN 120 (hereinafter referred to as MSRN-R) and VT-CSI profile, in accordance with a first embodiment of the present invention. The signal flow of the OTPI process in this case is similar to the OTPI process explained above in conjunction with FIG. 5, except that active signaling module 138 also sends VT-CSI profile to MSC-R/VLR-R 122. At step 4002, active signaling module 138 issues a fake call such as ISUP IAM message on the MSRN-R to MSC-R/VLR-R 122 with calling party as A. Since MSC-R/VLR-R 122 is updated with VT-CSI profile, MSC-R/VLR-R 122 issues a CAP IDP message on the IMSI-H to active signaling module 138, at step 4004. In an embodiment of the present invention, PI module 102 determines a time instance when it issued ISUP IAM message and a time instance when it received CAP IDP message. PI module 102 then measures the difference between these time instances to calculate the call setup duration. Thereafter, at steps 4006 and 4008, active signaling module 138 and MSC-R/VLR-R 122 exchanges CAP release call and ISUP REL messages to terminate the CAP IDP call and ISUP IAM fake call, respectively.

Figure 41:
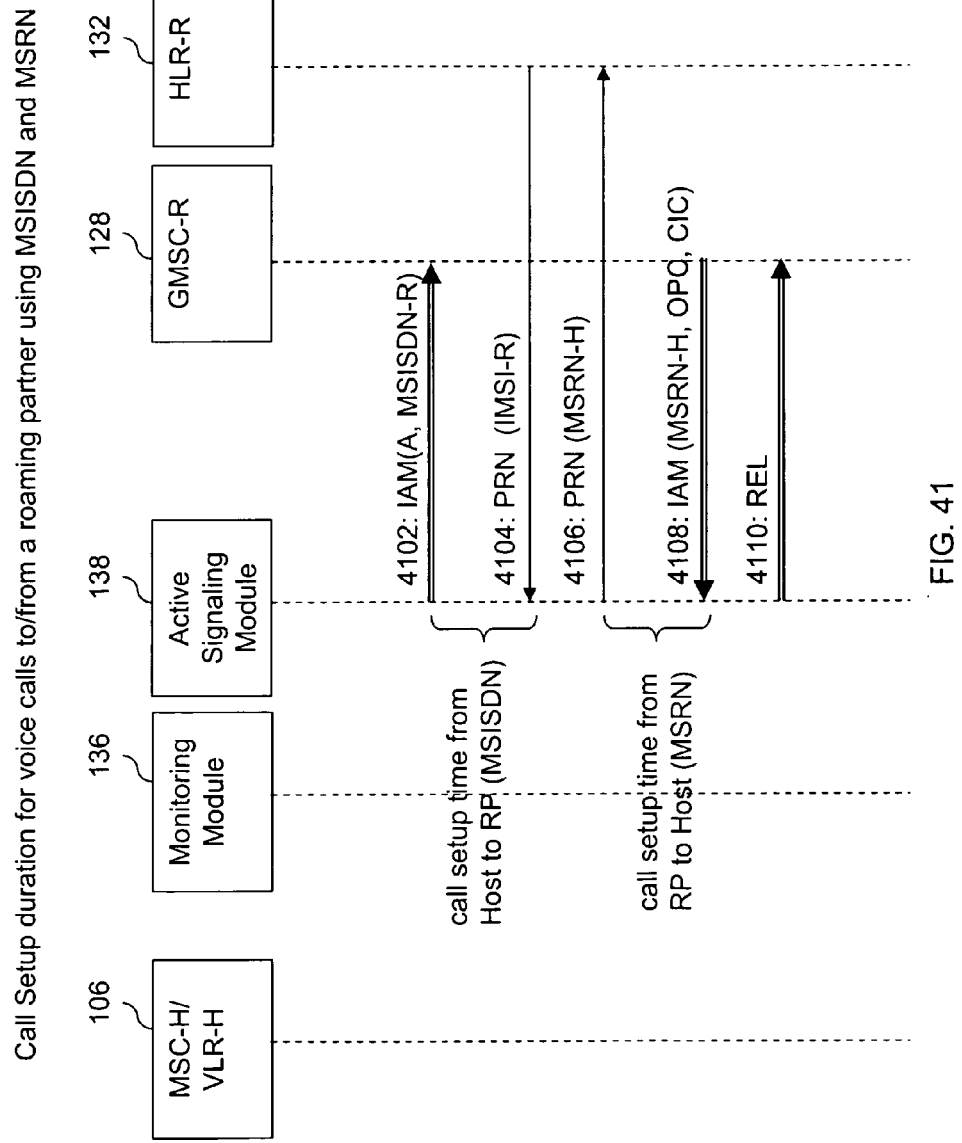
FIG. 41 represents a flow diagram for determining delay in the call setup both to and from the roaming partner PMN, using an MSISDN of the roaming partner PMN and an MSRN of the host PMN, in accordance with a second embodiment of the present invention.

FIG. 41 represents a flow diagram for determining delay in the call setup both to and from roaming partner PMN 120 using MSISDN-R and MSRN-H, in accordance with a second embodiment of the present invention. The signal flow of the ITPI process is same as the ITPI process explained above in conjunction with FIG. 6, except that active signaling module 138 also sends MSISDN-R to MSC-H/VLR-H 106. At step 4102, active signaling module 138 initiates a fake ISUP IAM call request on the MSISDN-R to GMSC-R 128 with calling party as A. Since GMSC-R 128 has no routing information for the MSISDN-R, GMSC-R 128 issues an SRI request to HLR-R 132. HLR-R 132 then issues a PRN request on the IMSI-R to active signaling module 138, at step 4104. In an embodiment of the present invention, PI module 102 measures the delay between sending of ISUP IAM signaling by active signaling module 138 and receipt of PRN (IMSI-R) at active signaling module 138, in order to calculate call setup duration from host PMN 104 to roaming partner 120. Thereafter, at step 4106, actives signaling module 138 issues a PRN-ACK message with MSRN-H to HLR-R 132. HLR-R 132 then relays MSRN-H and active signaling module 138 address as the routing address in an SRI-ACK message to GMSC-R 128. At step 4108, GMSC-R 128 initiates an ISUP IAM call on the MSRN-H to active signaling module 138 along with Originating Point Code (OPC) and Circuit Identification Code (CIC). In an embodiment of the present invention, PI module 102 measures the delay between sending of PRN-ACK (MSRN-H) by active signaling module 138 and receipt of ISUP IAM (MSRN-H) at active signaling module 138, in order to calculate call setup duration from roaming partner 120 to host PMN 104. Finally at step 4110, active signaling module 138 issues an ISUP REL messages to GMSC-R 128 so as to terminate the ISUP IAM call on the MSRN-H.

Figure 42:
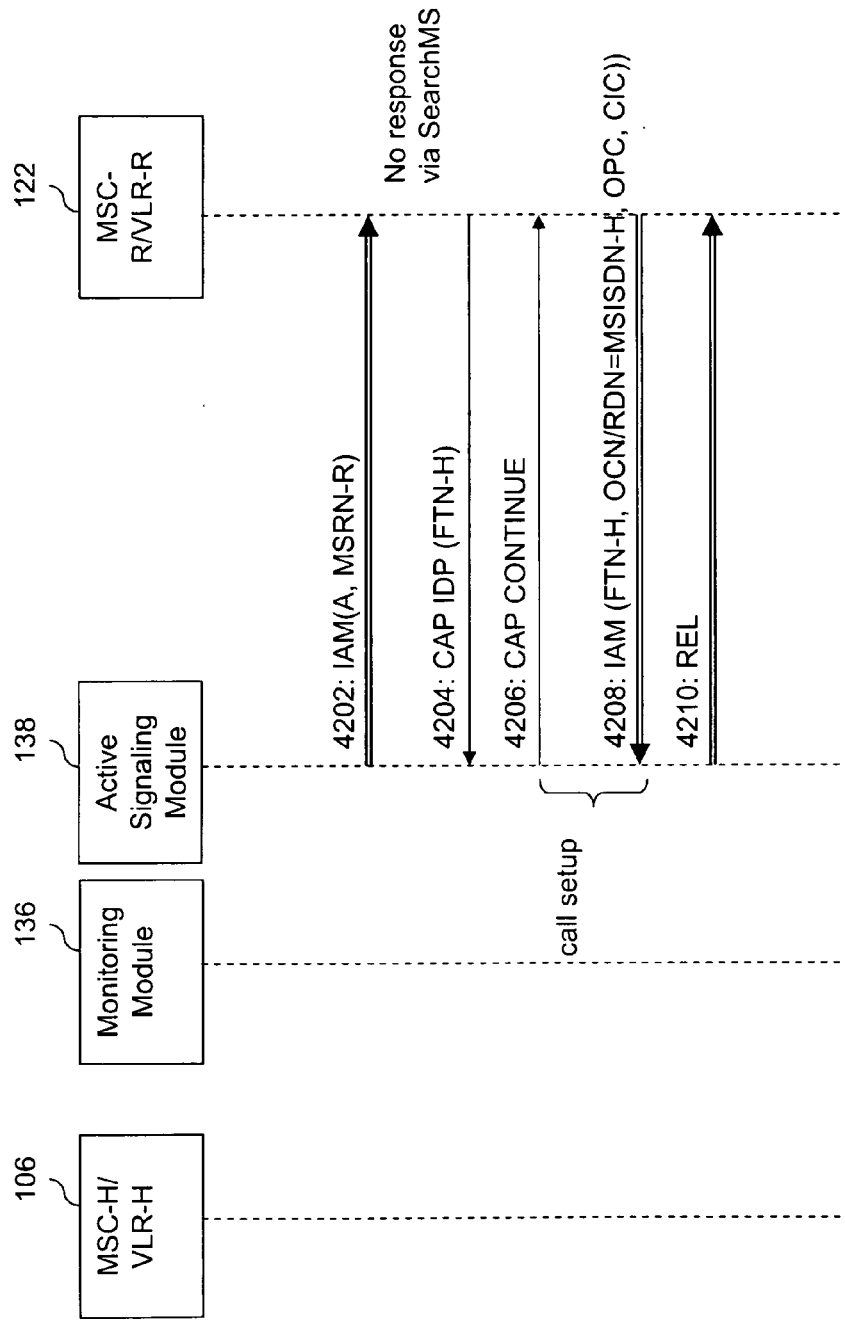
FIG. 42 represents a flow diagram for determining delay in the call setup towards the roaming partner PMN, using the host PMN MSRN and the O-CSI profile, in accordance with a third embodiment of the present invention.

FIG. 42 represents a flow diagram for determining delay in the call setup towards roaming partner PMN 120, using MSRN-H and O-CSI profile, in accordance with a third embodiment of the present invention. The signal flow of the OTPI process in this case is similar to the OTPI process explained above in conjunction with FIG. 5, except that active signaling module 138 also sends FTN and O-CSI profile to MSC-R/VLR-R 122. At step 4202, active signaling module 138 issues ISUP IAM message on the MSRN-R to MSC-R/VLR-R 122 with calling party as A. MSC-R/VLR-R 122 initiates SearchMS operation to locate the mobile station of the simulated outbound roamer in roaming partner PMN 120. Since MSC-R/VLR-R 122 fails to locate the mobile station, it determines that the MSISDN-H is set with forwarding to the FTN and also that the simulated outbound roamer has O-CSI profile. Thus at step 4204, MSC-R/VLR-R 122 issues a CAP IDP message on the FTN to active signaling module 138. Thereafter at step 4206, active signaling module 138 returns a CAP Continue message to MSC-R/VLR-R 122. MSC-R/VLR-R 122 then initiates an ISUP IAM call on the FTN to active signaling module 138 along with OPC and CIC, at step 4208. In an embodiment of the present invention, PI module 102 determines a delay between the CAP Continue call and the ISUP IAM (FTN) call to calculate the call setup duration. Finally at step 4210, active signaling module 138 issues an ISUP REL message to MSC-R/VLR-R 122 so as to terminate the ISUP IAM call on the FTN.

OCN/RDN Transparency

Since OCN/RDN fields are optional in an ISUP protocol, they may be lost when establishing international path between distant networks. Since such fields may be used to determine voice mail of a subscriber, the absence of these fields in a call forwarding scenario may impact network operator's revenue. As shown in FIG. 42, the OCN/RDN test is successful when the ISUP IAM call on the FTN, received at active signaling module 138, contains OCN/RDN fields. Similarly, PI module 102 can also test OCN/RDN fields for inbound roamers.

In order to determine whether the OCN/RDN is correctly transferred from host PMN 104 to roaming partner PMN 120, active signaling module 138 initiates an MT call to the simulated outbound roamer including OCN/RDN parameters. MSC-R/VLR-R 122 that is defined with CAP profile for the simulated outbound roamer indicates the OCN field in case of O-CSI and OCN/RDN in case of VT-CSI.

Figure 43:
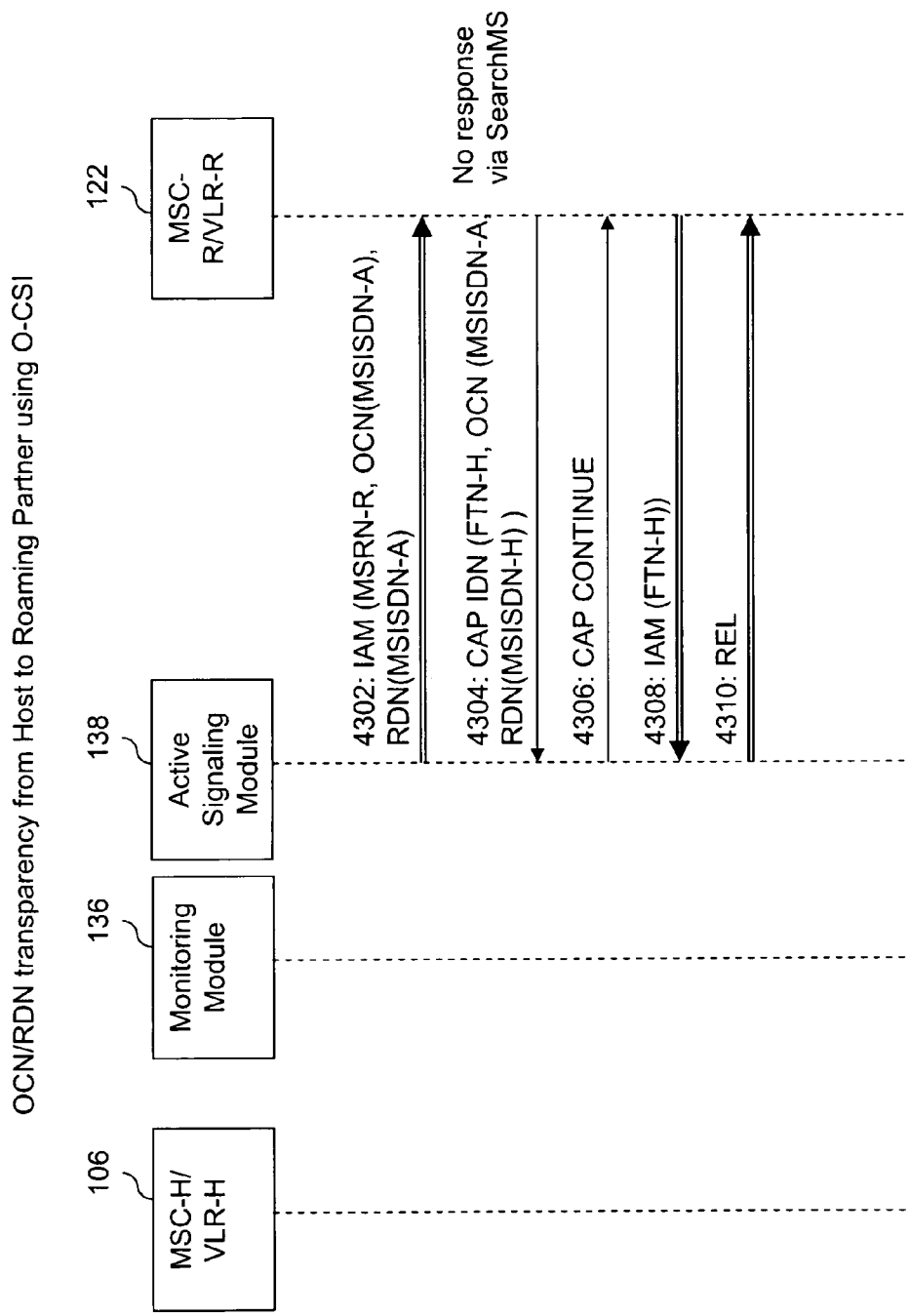
FIG. 43 represents a flow diagram for testing Originally Called Number (OCN)/Redirecting Number (RDN) transparency from the host PMN to the roaming partner PMN using the O-CSI profile, in accordance with an embodiment of the present invention.

FIG. 43 represents a flow diagram for testing OCN/RDN transparency from host PMN 104 to roaming partner PMN 120 using O-CSI profile, in accordance with an embodiment of the present invention. The signal flow of the OTPI process is similar to the OTPI process explained above in conjunction with FIG. 5, except that active signaling module 138 also sends FTN and O-CSI profile to MSC-R/VLR-R 122. At step 4302, active signaling module 138 initiates a first call such as ISUP IAM on the MSRN-R to MSC-R/VLR-R 122 along with OCN and RDN, both set as an MSISDN of the calling party A (hereinafter referred to as MSISDN-A). Since the simulated outbound roamer has no mobile station associated with it, MSC-R/VLR-R 122 fails to locate the mobile station via SearchMS operation, as described earlier in the context of the present invention. Since MSC-R/VLR-R 122 is updated with FTN and O-CSI profile, MSC-R/VLR-R 122 initiates a second call such as a CAP IDP message on the FTN to active signaling module 138 along with OCN set as MSISDN-A and RDN set as MSISDN-H, at step 4304. Detection of MSISDN-A as the OCN parameter at active signaling module 138 confirms successful testing of the OCN transparency. Thereafter at step 4306, active signaling module 138 returns a CAP Continue call to MSC-R/VLR-R 122. MSC-R/VLR-R 122 then initiates an ISUP IAM call on the FTN to active signaling module 138, at step 4308. Finally at step 4310, active signaling module 138 issues an ISUP REL message to MSC-R/VLR-R 122, in order to terminate the ISUP IAM call on the FTN.

Similarly, in another embodiment of the present invention, PI module 102 tests OCN/RDN transparency from host PMN 104 to roaming partner PMN 120 using VT-CSI profile. Signal flow in this case is similar to signal flow for OCN/RDN transparency using O-CSI explained above in conjunction with FIG. 43, except that during the OTPI process, O-CSI profile is replaced with VT-CSI profile. Moreover, active signaling module 138 receives MSISDN-A as the OCN and RDN parameters from MSC-R/VLR-R 122.

Identification of International Carrier for MT Calls

Furthermore, host PMN 104 operator can determine a last leg of international carrier used to terminate MT calls from its distant roaming partner networks. In an embodiment of the present invention, PI module 102 determines an international carrier A as the last leg to terminate an MT call for the simulated roaming subscriber. Detection of OPC and CIC at active signaling module 138, allows host PMN 104 operator to determine the last leg of the international carrier as international carrier A. This information is relevant for host PMN 104 operator's mobile-to-mobile interconnection agreement with a roaming partner PMN (e.g., roaming partner PMN 120), where both parties agree to use a single high-quality international carrier to exchange their traffic.

DTMF Transparency and Voice QoS

Once PI module 102 has initiated a call (i.e., MT or MO) using real ISUP circuit, PI module 102 can check for DTMF transparency. In this case, PI module 102 emits and listens to DTMF tone. Similarly, PI module 102 can also play voice samples on leg of the test call and evaluate the presence of echo, delay etc. in these voice samples and compares the received voice sample from another leg of the call, as mentioned earlier. Thereby, PI module 102 evaluates Mean Opinion Score (MOS) for these voice samples. Since PI module 102 is based on a single operator testing approach (i.e., host PMN 104 operator in this case), DTMF transparency and Voice QoS assessment is applied for both international legs.

Fake Answer

Some international carriers provide false or early answer (i.e., return ACM and ANM messages) to learn connection revenue. Hence capturing such fraud cases will be beneficial to network operators. In an embodiment of the present invention, PI module 102 facilitates host PMN 104 operator to detect such fraud.

Figure 44:
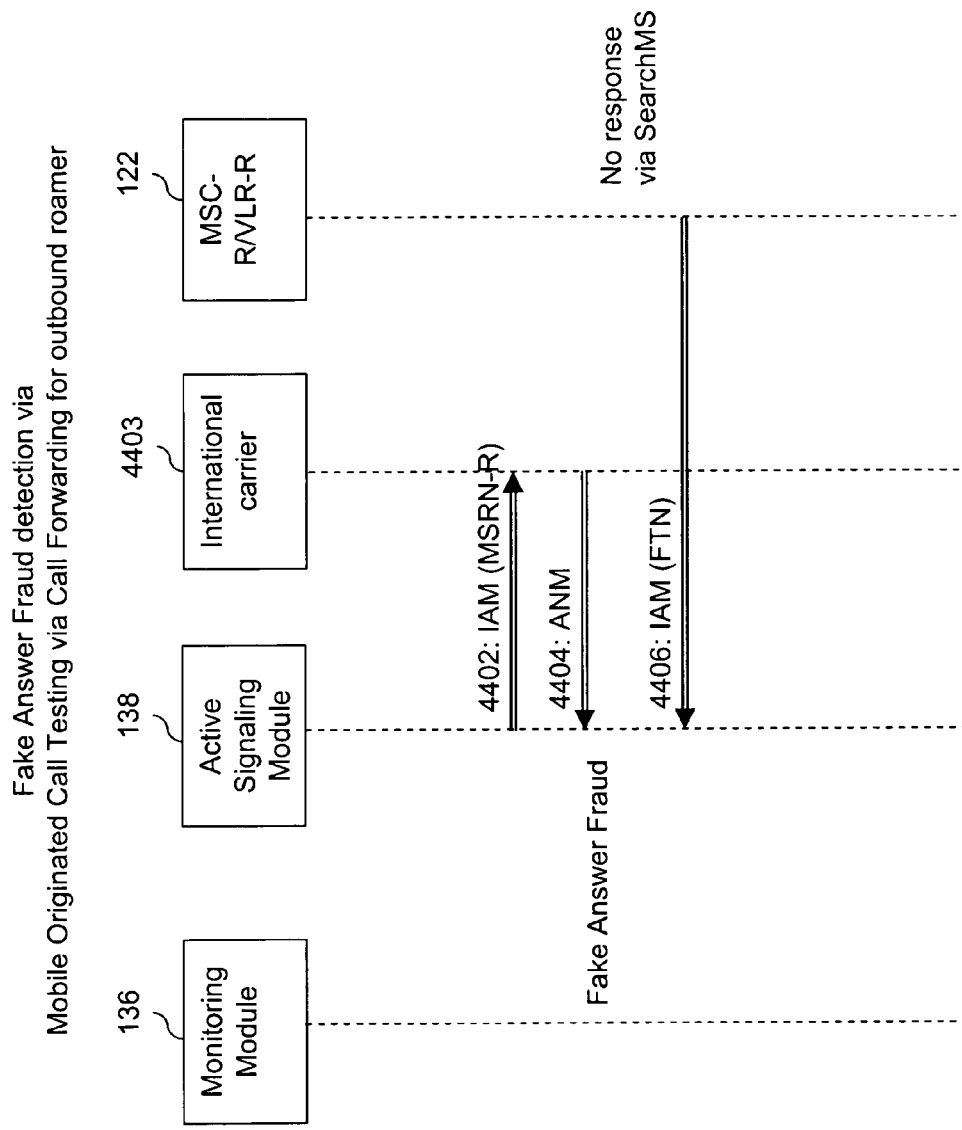
FIG. 44 represents a flow diagram for detecting fake answer fraud for the simulated outbound roamer, in accordance with an embodiment of the present invention.

FIG. 44 represents a flow diagram for detecting fake answer fraud for the simulated outbound roamer, in accordance with an embodiment of the present invention. The signal flow of the OTPI process in this case is similar to the OTPI process explained above in conjunction with FIG. 5, except that active signaling module 138 also sends FTN to MSC-R/VLR-R 122. PI module 102 performs an MO call testing for the simulated outbound roamer via a sequence of MT call and call forwarding. Thus at step 4402, active signaling module 138 issues an ISUP IAM call on the MSRN to an international carrier 4403. Thereafter at step 4404, active signaling module 138 receives an ISUP ANM message from international carrier 4403, prior to receiving an ISUP IAM call on the FTN from MSC-R/VLR-R 122 at step 4406. Detection of the ISUP ANM message prior to detection of the ISUP IAM message on the FTN, at active signaling module 138, confirms the presence of fake answer fraud.

Similarly, in another embodiment of the present invention, PI module 102 detects fake answer fraud for the simulated inbound roamer. The signal flow of the OTPI process in this case is similar to the OTPI process explained above in conjunction with FIG. 6, except that the OTPI process is performed between active signaling module 138 and MSC-R/VLR-R 122, and active signaling module 138 also sends FTN, corresponding to IMSI-R of the simulated inbound roamer, to MSC-R/VLR-R 122. Rest of the signal flow for fake answer fraud detection for simulated inbound roamer is similar to fake answer fraud detection for simulated outbound roamer as explained above in conjunction with FIG. 44, except that active signaling module 138 initiates an international call such as ISUP IAM call on the MSISDN-R (i.e., instead of the MSRN) towards international carrier 4403.

SIM Box Fraud

Figure 45:
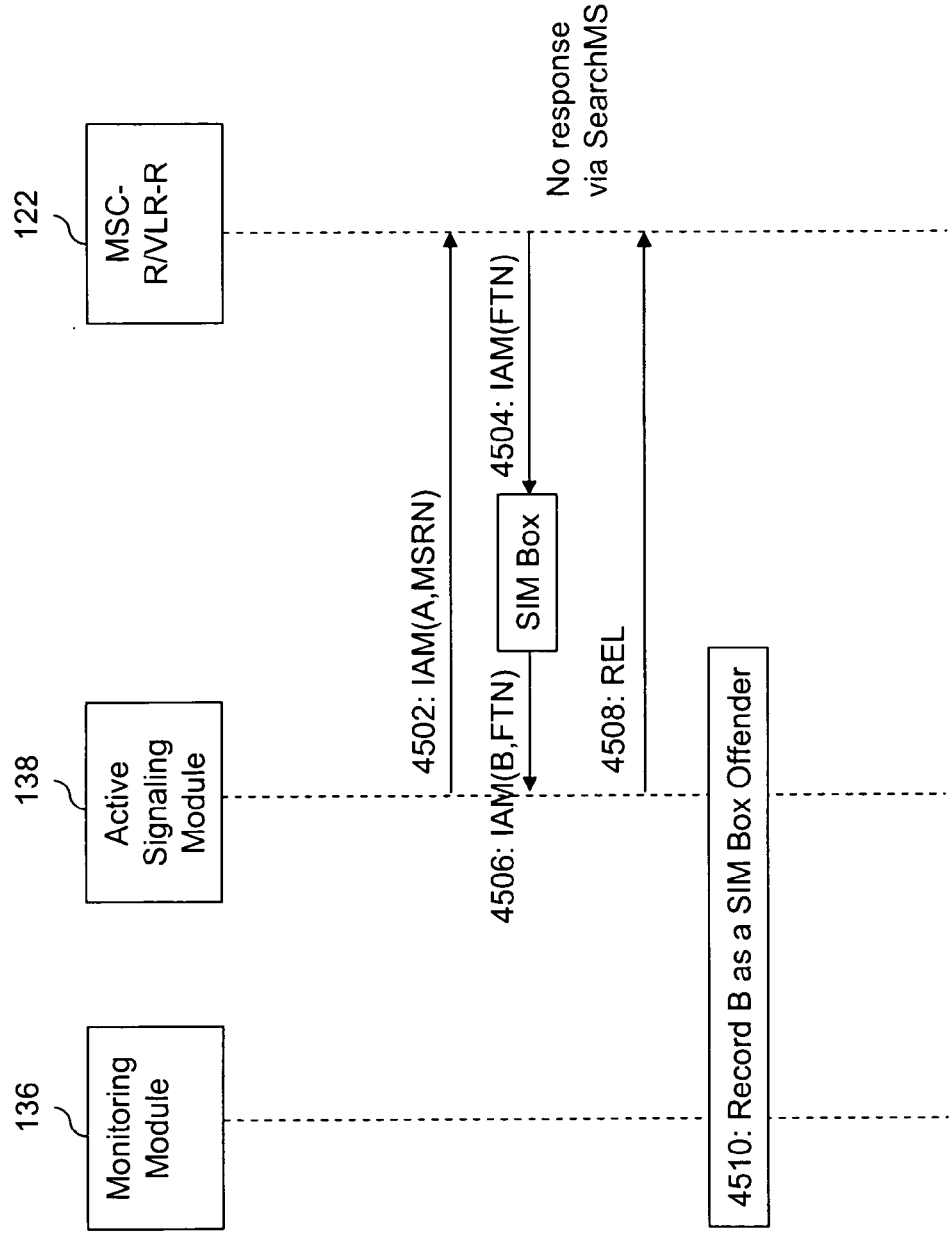
FIG. 45 represents a flow diagram for detecting Subscriber Identity Module (SIM) box fraud for international MO calls from the roaming partner PMN on the simulated outbound roamer, in accordance with an embodiment of the present invention.

As mentioned above PI module 102 detects SIM box frauds. SIM box fraud is used by rouge international transit carriers to bypass mobile termination revenue to a terminating mobile carrier. PI module 102 detects SIM box frauds by detecting modifications in caller IDs associated with host PMN 104, by the SIM box. FIG. 45 represents a flow diagram for detecting SIM box frauds for international MO calls from roaming partner PMN 120 on the simulated outbound roamer, in accordance with an embodiment of the present invention. The signal flow of the OTPI process is same as the OTPI process explained above in conjunction with FIG. 5, except that active signaling module 138 also sends FTN profile to MSC-R/VLR-R 122. In an embodiment of the present invention, the FTN corresponds to active signaling module 138's number or MSISDN assigned by host PMN 104 operator. At step 4502, active signaling module 138 initiates a MT call (by issuing an ISUP IAM call) on the obtained MSRN to MSC-R/VLR-R 122 with the caller ID as 'A'. In an embodiment of the present invention, when MSC-R/VLR-R 122 receives this MT call request, it initiates searchMS operation to search mobile station of the simulated outbound roamer. The operation fails to establish radio contact as there is no real mobile station associated with the simulated outbound roamer (i.e., absent subscriber). However, since call forwarding is set at MSC-R/VLR-R 122, MSC-R/VLR-R 122 directs this MT call to the FTN at step 4504. Thereafter, at step 4506, active signaling module 138 receives forwarded MT call IAM (FTN). In an embodiment of the present invention, in case there is no SIM box then active signaling module 138 receives the IAM (FTN) message with the caller ID 'A'. In an another embodiment of the present invention, if there is international SIM box then active signaling module 138 receives the IAM (FTN) message with caller ID 'B' different from the caller id 'A' that was issued by active signaling module 138. Thereafter, at step 4508, active signaling module 138 issues REL message and PI module 102 confirms detection of the SIM box since the caller ID got changed from A to B at step 4510. Generally, a majority of SIM boxes can be captured from mobile to mobile calls. Therefore this solution is expected to capture SIM boxes along the route of fixed line international calls from various countries.

In an embodiment of the present invention, an additional indicator is used by PI module 102 to improve the detection process of the SIM box. PI module 102 uses a timing method to confirm the presence of the SIM box. The detection of SIM box by PI module 102 on the basis of the change in the caller IDs is confirmed by a delay in receipt of the IAM message at PI module 102. This delay occurs due to two radio processes occurring because of the SIM box. The first process includes paging the SIM box and the other process includes establishing the call from the SIM box.

Figure 46:
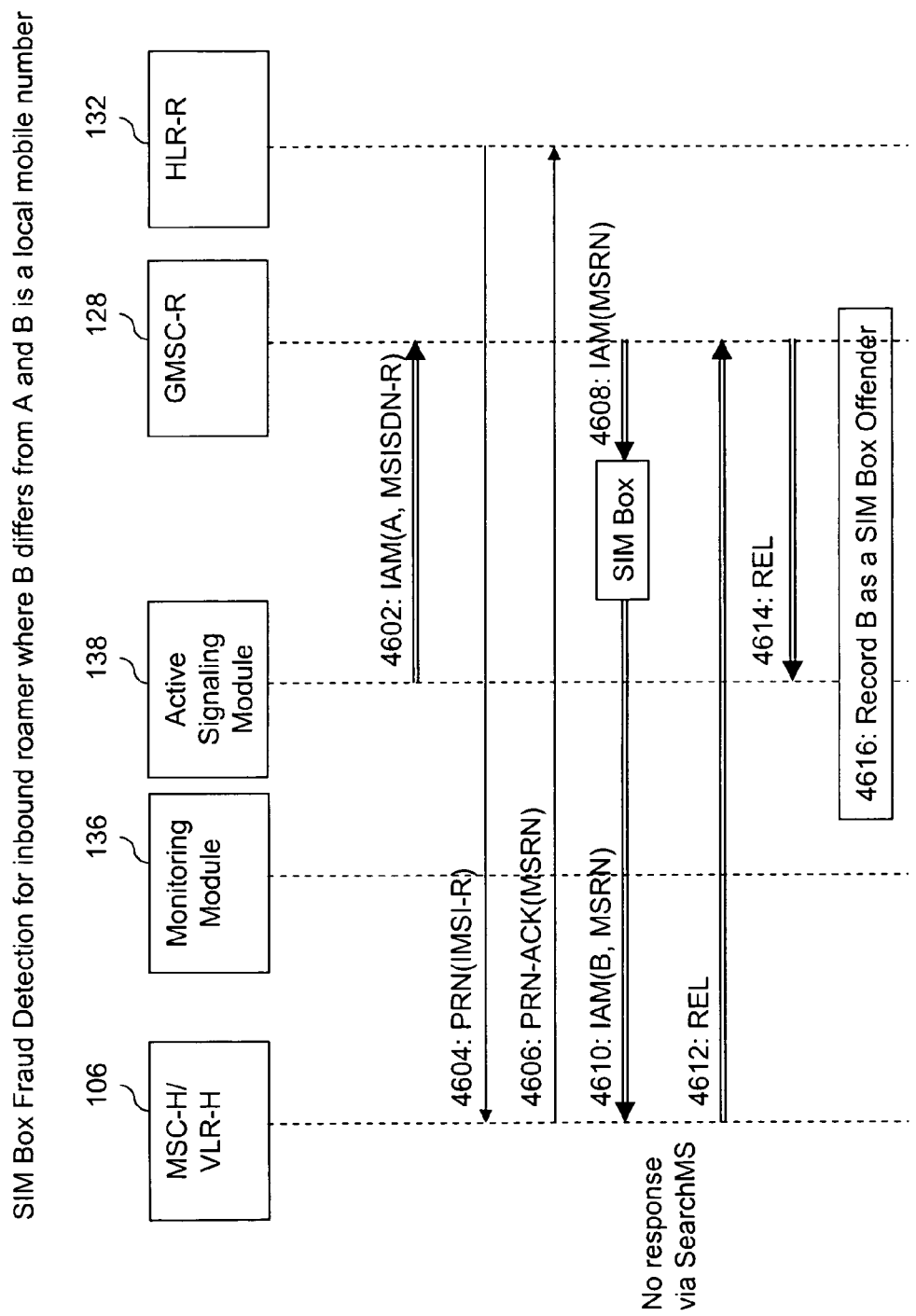
FIG. 46 represents a flow diagram for detecting SIM box fraud for international rerouted calls to the host PMN on the simulated inbound roamer from the roaming partner PMN, in accordance with an embodiment of the present invention.

FIG. 46 represents a flow diagram for detecting SIM box frauds for international rerouted calls to host PMN 104 on the simulated inbound roamer from roaming partner PMN 120, in accordance with an embodiment of the present invention. The signal flow of the ITPI process is same as the ITPI process explained above in conjunction with FIG. 5. At step 4602, active signaling module 138 issues an ISUP IAM call on the obtained MSISDN-R to GMSC-R 128 with the caller ID as 'A'. Upon receiving the IAM message, HLR-R 132 then issues a PRN message on IMSI-R at step 4604 to obtain MSRN from PRN-ACK message from MSC-H/VLR-H 106 at step 4606. After obtaining the MSRN, GMSC-R 128 sends another IAM message on the MSRN at step 4608. Thereafter, at step 4610, MSC-H/VLR-H 106 receives the IAM message. In an embodiment of the present invention, when there is no SIM box, then MSC-H/VLR-H 106 receives IAM message with the caller ID 'A' as was sent at step 4602. In another embodiment of the present invention, when there is a SIM box then MSC-H/VLR-H 106 receives IAM message with caller ID 'B' different from the caller ID 'A' that was issued by active signaling module 138. In an embodiment of the present invention, when MSC-H/VLR-H 106 receives the IAM message, it initiates searchMS operation to search mobile station of the simulated inbound roamer. The operation fails to establish radio contact as there is no real mobile station associated with the simulated inbound roamer (i.e., absent subscriber). Thereafter, at step 4612, MSC-H/VLR-H 106 issues a REL message for GMSC-R 128. Upon receiving the REL message GMSC-R 128, sends the REL message to active signaling module 138 at step 4614. The caller ID obtained by MSC-H/VLR-H 106 is captured by PI module 102 by tapping the roaming links via monitoring module 136. Thereafter, at step 4616, PI module 102 compares the received caller ID 'B' and the issued caller ID 'A' and detects presence of a SIM box as there is a change in the caller IDs and records 'B' as a SIM box offender. In another embodiment of the present invention, PI module 102 detects potential use of the SIM box when while monitoring the roaming link the IAM message on the MSRN is not detected.

As detection of SIM box frauds depends on international carrier routing, there may be situations when MSRN routing may fail and therefore the calls on the MSRN would not be monitored on the international ISUP roaming links. In an embodiment of the present invention, the SIM box fraud is detected by having call forwarding via the MO call testing for the simulated outbound roamers and MT call testing for the simulated inbound roamers also include a range of MSRNs of host PMN 104 to capture SIM box frauds which are activated only on a range of MSRN.

Figure 47:
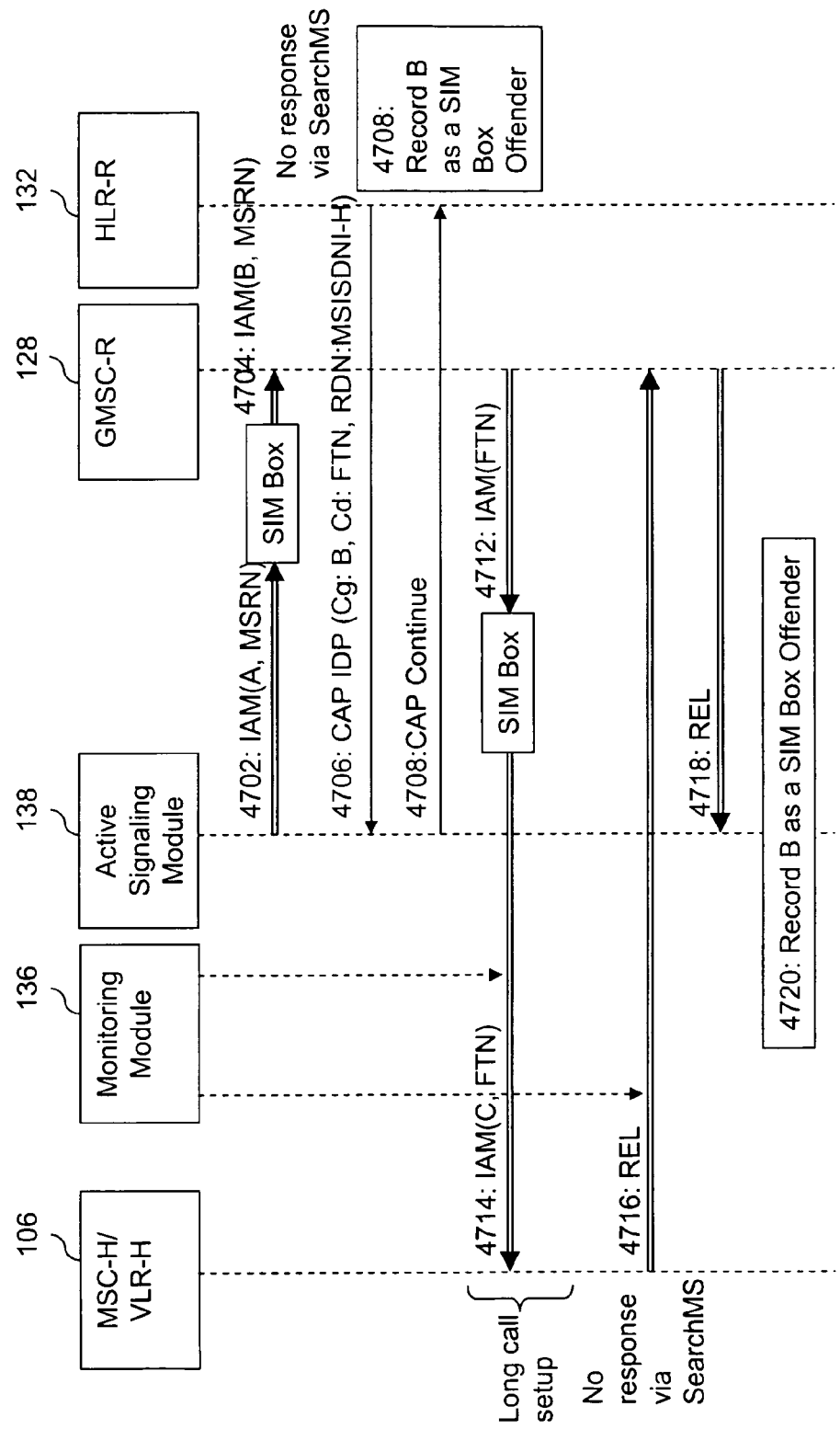
FIG. 47 represents a flow diagram for detecting SIM box fraud for the simulated CAMEL outbound roamer, in accordance with an embodiment of the present invention.

FIG. 47 represents a flow diagram for detecting SIM box frauds for simulated CAMEL outbound roamer in accordance with an embodiment of the present invention. The signal flow of the OTPI process is same as the OTPI process explained above in conjunction with FIG. 5, except that active signaling module 138 also sends O-CSI and FTN profile to HLR-R 132. In an embodiment of the present invention, the FTN corresponds to number assigned by host PMN 104 operator. At step 4702, active signaling module 138 issues an ISUP IAM call on the obtained MSRN to GMSC-R 128 with the caller ID as 'A'. At step 4704, GMSC-R 128 receives the IAM message. In an embodiment of the present invention GMSC-R 128 receives the IAM message with caller ID as 'A'. In another embodiment of the present invention, GMSC-R 128 receives IAM message with a caller id 'B' different from 'A'. When GMSC-R 128 receives the IAM message, it initiates searchMS operation to search mobile station of the simulated outbound roamer. The operation fails to establish radio contact as there is no real mobile station associated with the simulated outbound roamer (i.e., absent subscriber). Thereafter, at step 4706, GMSC-R 128 sends a CAP IDP message to active signaling module 138. The CAP IDP message includes calling party number, called party number as the FTN and RDN as MSISDN-H. In an embodiment of the invention when the calling party number or the caller ID is 'B', PI module 102 detects a SIM box in this leg of call. Thus, at step 4708, PI module 102 records 'B' as a SIM box offender. Thereafter, at step 4710, active signaling module 138 issues a CAP continue message to GMSC-R 128. Signal flow in steps 4712 to 4720 are same as signal flow in steps 4608 to 4616, explained in conjunction with FIG. 46, except that GMSC-R 128 routes the IAM message on the FTN and the caller id received is 'C' which is different from 'B'. Thus PI module 102 compares the received caller ID 'C' and the caller ID 'B', received by GMSC-R 128, and detects presence of a SIM box as there is a change in the caller IDs and records 'C' as a SIM box offender for the other leg of the call. In another embodiment of the present invention, PI module 102 detects potential use of the SIM box when while monitoring the roaming link the IAM message on the MSRN is not detected.

The SIM box fraud can be identified with the help of the detection method explained in conjunction with FIG. 45. In an embodiment of the present invention, when PI module 102 monitors PRN-ACK (MSRN) exchanged at step 4606, by monitoring at roaming SCCP links, via monitoring module 136, and still monitors an absence of the IAM message at the ISUP roaming links, PI module 102 subsequently initiates a profile at roaming partner PMN 120 for a VLR-H GT close to HLR-R 132's GT to prepare an international call back to PI module 102, via call forwarding, in order to identify the SIM box.

After the SIM box has been detected, there are several ways to handle the SIM box. In one embodiment of the present invention, the IMSI of the SIM box is de-provisioned from HLR-H 116. In another embodiment of the present invention, upon detecting the SIM box, the outgoing calls are barred by sending MAP ISD message to VLR-H 106. This is done to reduce the legal disputes among the operators. In an embodiment of the present invention, VLR-H 106 is identified from the mapping to the VMSC associated with the host network returned from a SRI-SM message an HLR of the MSISDN of the SIM box. This mapping is easy to define as it belongs to host PMN 104. In an embodiment of the present invention, the mapping is an identity mapping which does not require any database or storage to store the mapping. In another embodiment of the present invention, VLR-H 116 and the VMSC associated with the host network have an interface to direct traffic based on the Subsystem Number (SSN). Thus, the MAP ISD message for call barring is sent to the VMSC with SSN set to indicate VLR-H 116 type, e.g., 7 instead of 8 (i.e., the VMSC type).

Figure 48:
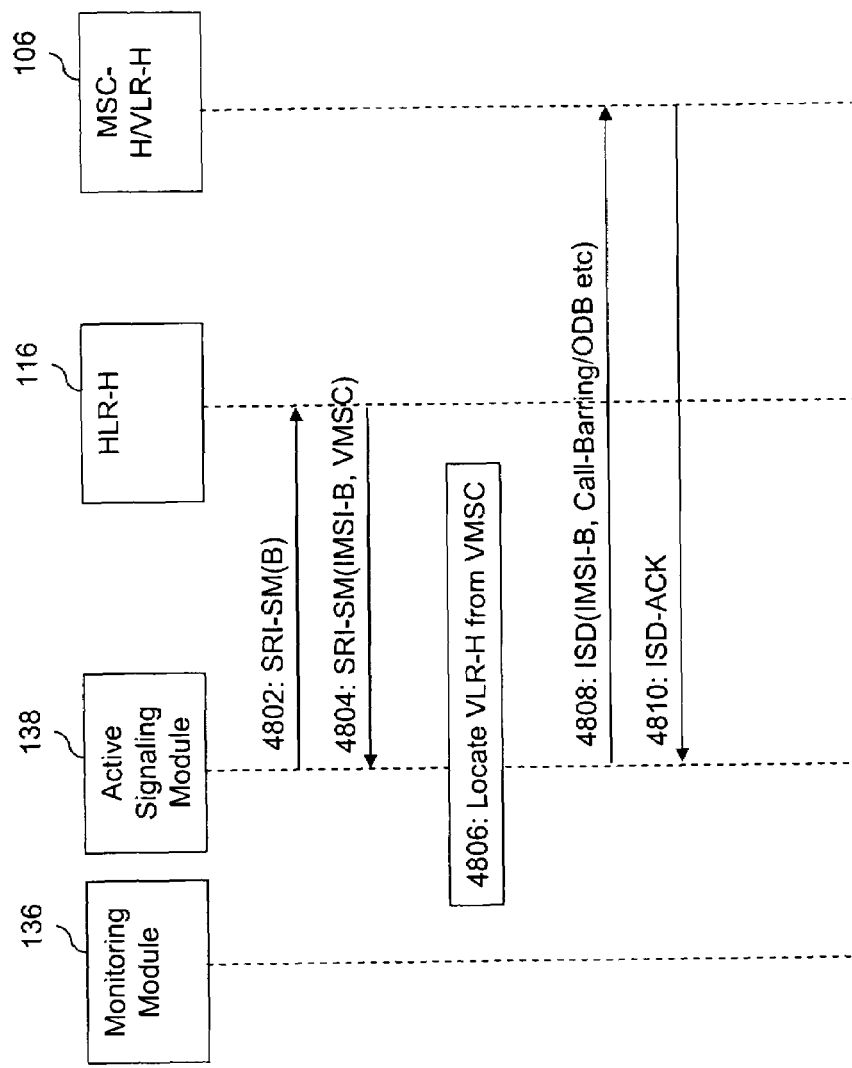
FIG. 48 represents a flow diagram for detecting and preventing SIM box fraud, in accordance with an embodiment of the present invention.

FIG. 48 represents a flow diagram for preventing a SIM box after it has been detected in accordance with an embodiment of the present invention. At step 4802, active signaling module 138 issues a SRI-SM message to HLR-H 116 on the received caller ID B's MSISDN. Upon receiving the SRI-SM message, HLR-H 116 sends the address of MSC-H/VLR-H 106 at step 4804. Thereafter at step 4806, active signaling module 138 deduces the location of VLR-H from the mapping to VMSC-H. After locating VLR-H, at step 4806, active signaling module 138 at step 4808, sends ISD message with ODB to bar the calls. Further at step 4810 it receives ISD-ACK message. In an embodiment of the present invention, active signaling module 138 sends call barring message to bar the calls. In an embodiment of the present invention, active signaling module 138 bars MO calls upon detecting 'B' doing SIM box frauds. In another embodiment of the present invention, active signaling module 138 bars all calls upon detecting 'B' doing SIM box frauds.

In another embodiment of the present invention, active signaling module 138 sends a 'Cancel Location' message to terminate the calls. In yet another embodiment of the present invention, active signaling module 138 sends a DSD message to terminate the calls. In yet another embodiment of the present invention, active signaling module 138 initiates an IST message to terminate the calls.

In an embodiment of the present invention, as mobile international calls share carriers with calls from fixed line phones, PI module 102 normally captures SIM box frauds on the calls originated from the fixed line phones via MSC routing. There may be situations when fixed line calls will never overlap with any MO international calls. In such a situation PI module 102 initiates SIM box detection on the international calls access lines and completes the call so that DTMF can be sent to route the call back to host PMN 104. In an embodiment of the present invention, for CAMEL outbound roamers, PI module 102 uses connect message to indicate carrier selection to force a particular route.

In an embodiment of the present invention, PI module 102 helps host PMN 104 operator to detect SIM boxes at roaming partner PMN 120 for MT calls to their outbound roamers and international calls at roaming partner PMN 120. This helps roaming partner PMN operator to increase the MT call revenue, which in effect increases revenue for host PMN 104 operator. PI module 102 is able to detect SIM boxes on MT calls to outbound roamers and international calls when the CLI from roaming partner PMN 120 is delivered back to host PMN 104 or there is a CAMEL agreement between host PMN 104 and roaming partner PMN 120.

In an embodiment of the present invention, to detect the SIM box for MT calls to the outbound roamers, PI module 102 performs a MO-call testing for the simulated outbound roamer at MSC-R/VLR-R 122 as described earlier in conjunction with FIG. 45. Since the testing is essentially an MT-call via call forwarding back to PI module 102, PI module 102 receives a CLI and checks whether the received CLI belongs to roaming partner PMN 120. When the CLI belongs to roaming partner PMN 120, a SIM box is discovered. In an embodiment of the present invention, the CLI checking is done at the reception of the forwarded call back to PI module 102. In another embodiment of the present invention and as explained in FIG. 47, the CLI testing is performed by obtaining CLI with the help of the CAMEL IDP trigger from GMSC-R 128 due to the call forwarding by the O-CSI profile created at MSC-H/VLR-H 106 by PI module 102.

In an embodiment of the present invention, to detect SIM box for international calls, PI module 102 creates a fake profile for IMSI-R at MSC-R/VLR-R 122. PI module 102 further sets the call forwarding on IMSI-R to PI module 102. Thereafter, active signaling module 138 initiates an international call to the IMSI-R's MSISDN-R. In response to the international call, a forwarded MT call comes back to PI module 102. PI module 102 obtains a CLI from the forwarded MT call and checks whether the received CLI belongs to roaming partner PMN 120. When the CLI belongs to roaming partner PMN 120, a SIM box is discovered. In an embodiment of the present invention, the CLI checking is done at the reception of the forwarded call back to PI module 102. In another embodiment of the present invention and as explained in FIG. 47, the CLI testing is performed by obtaining CLI with the help of the CAMEL IDP trigger from GMSC-R 128 due to the call forwarding by the O-CSI profile created at MSC/R/VLR-R 122 by PI module 102.

Figure 49:
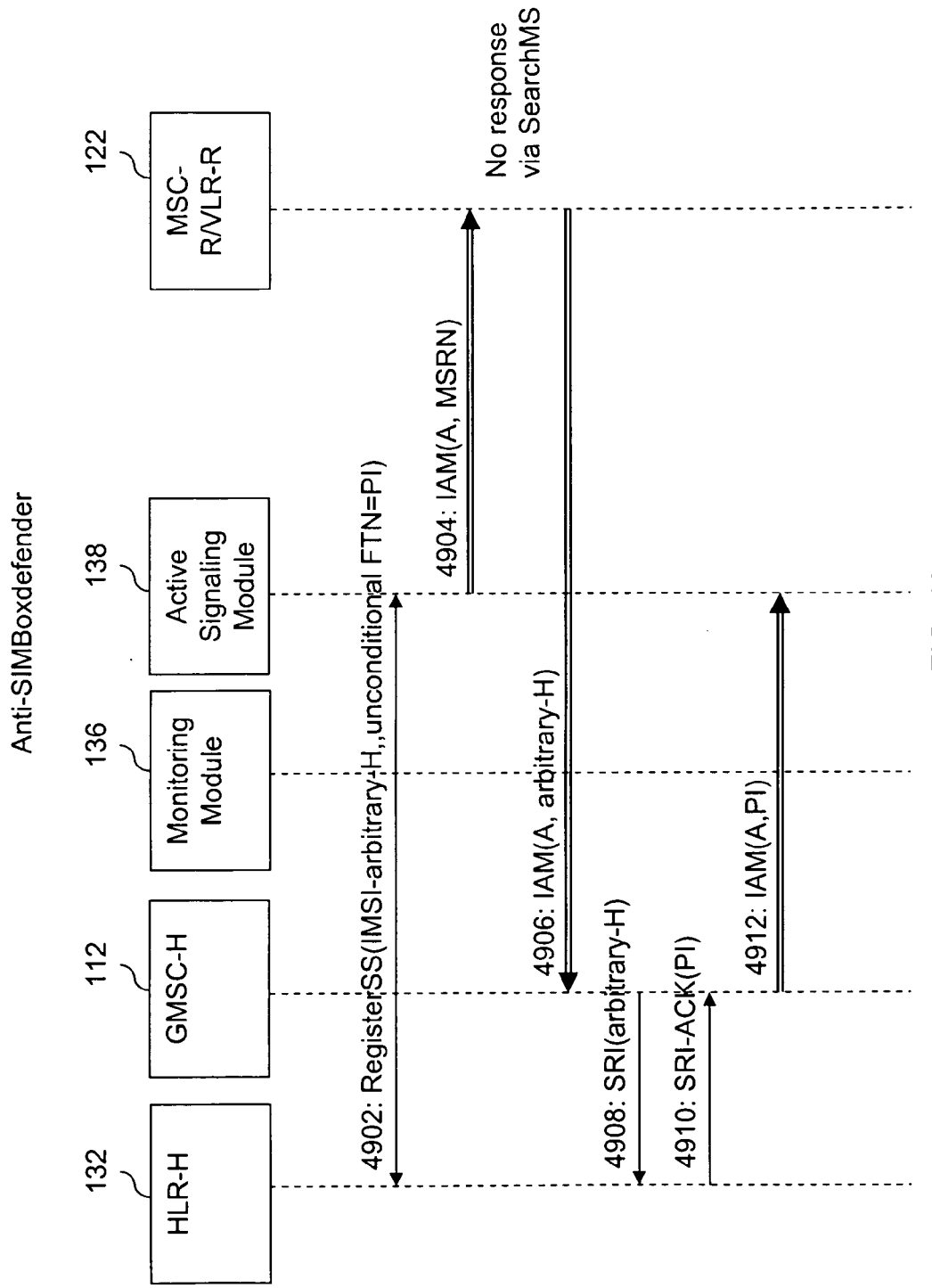
FIG. 49 represents a flow diagram for handling intelligent SIM box defender, in accordance with an embodiment of present invention.

Many a times it is difficult to detect SIM boxes due to existence of intelligent SIM box defenders. The intelligent SIM box defenders recognize the special routed numbers used for detecting the SIM boxes. Upon recognizing these numbers, the intelligent SIM box defenders bypass calls on these numbers and apply SIM box on other numbers and thus making detection of SIM boxes difficult. In an embodiment of the present invention to handle such intelligent SIM box defenders, PI module 102 uses an arbitrary or a predefined host PMN number for routing calls to host PMN 104. FIG. 49 represents a signal flow diagram to handle intelligent SIM box defender in accordance with an embodiment of present invention. The signal flow of the OTPI process is same as the OTPI process explained above in conjunction with FIG. 5, except that active signaling module 138 also sends FTN profile to MSC-R/VLR-R 122. In an embodiment of the present invention, the FTN corresponds to a number associated with host PMN 104 operator. At step 4902, active signaling module 138 issues a MAP RegisterSS to HLR-H 116, in order to set a second FTN (maybe predefined number) for the first FTN. The predefined number is a number from the host network that has been configured to be route to active signaling module 138. Thereafter at step 4904, active signaling module 138 issues an ISUP IAM call on the MSRN obtained during the OTPI process with a caller id 'A' (i.e., a first CLI) to MSC-R/VLR-R 122. In an embodiment of the present invention, when MSC-R/VLR-R 122 receives the IAM message, it initiates searchMS operation to search mobile station of the simulated outbound roamer. The operation fails to establish radio contact as there is no real mobile station associated with the simulated outbound roamer (i.e., absent subscriber). However, since call forwarding is set at MSC-R/VLR-R 122, MSC-R/VLR-R 122 sends the MT call on the FTN at step 4906. Thereafter, at step 4908, GMSC-H 112 sends MAP SRI to HLR-H 116. HLR-H 116 further sends the second FTN for the first FTN as active signaling module 138's number with SRI ACK to GMSC-H 112 at step 4910. Thereafter, at step 4912, GMSC-H 112 forwards the IAM message to active signaling module 138 with caller ID. In an embodiment of the present invention, active signaling module 138 receives 'A' as the first CLI. In another embodiment of the present invention, active signaling module 138 receives 'B' as a second CLI. PI module 102 then correlates the received CLI with the issued CLI. When the received caller ID (i.e., B) is different from the issued CLI an intelligent SIM box is detected.

In an embodiment of the present invention, PI module 102 detects an "On-Net termination bypass" or an "On-net SIM box" and an "Off-Net Termination Incoming Bypass" or an "Off-net SIM box". PI module 102 correlates the caller ID of the incoming call with the original caller ID initiated by the PI module 102. In an embodiment of the present invention, when the caller ID of the incoming call does not match with the original caller ID and the caller ID is associated with host PMN 104, the "On-Net termination bypass" is detected. In another embodiment of the present invention, when the caller ID of the incoming call does not match with the original caller ID and the caller ID is associated with roaming partner PMN 120, the "Off-Net Termination Incoming Bypass" is detected. In this case, roaming partner PMN 120 and host PMN 104 are in the same country.

Figure 50:
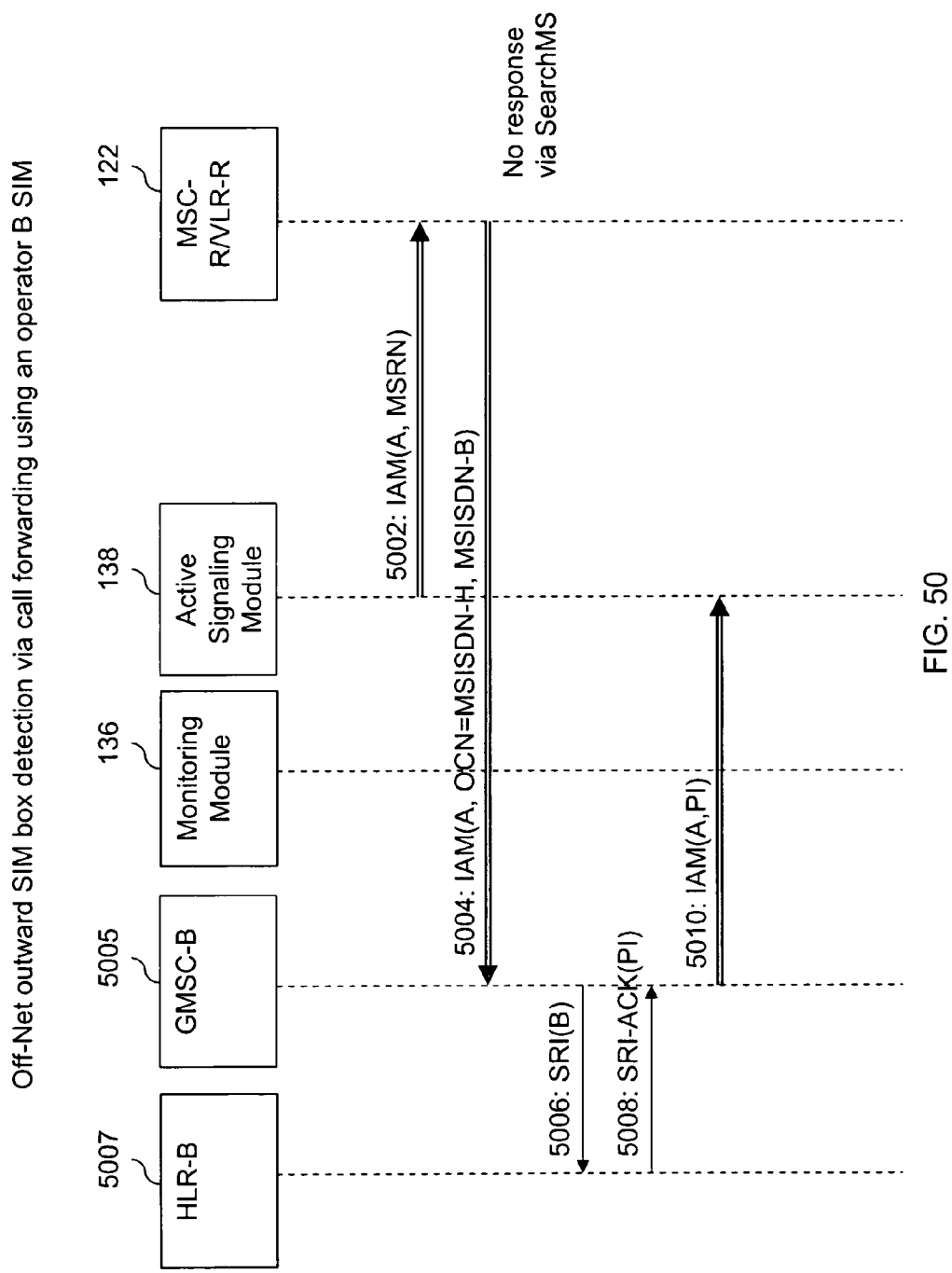
FIG. 50 represents a flow diagram for detecting "Off-Net Termination Outgoing Bypass" for the host PMN, in accordance with an embodiment of the present invention.

In an embodiment of the present invention, PI module 102 detects an "Off-Net Termination Outgoing Bypass" or an "Off-net outward SIM box" for host PMN 104. FIG. 50 represents a signal flow diagram to detect "Off-Net Termination Outgoing Bypass" for host PMN 104, in accordance with an embodiment of the present invention. FIG. 50 shows a roaming partner PMN-B different from roaming partner PMN 120. Host PMN 104 uses Mobile Number Portability (MNP) and assigns an IMSI-H with an MSISDN-B. The signal flow of the OTPI process is same as the OTPI process explained above in conjunction with FIG. 5, except that active signaling module 138 also sends FTN profile to MSC-R/VLR-R 122. In an embodiment of the present invention, the FTN corresponds to a ported-in MSISDN-B (from roaming partner PMN-B) assigned by host PMN 104 operator. At step

5002, active signaling module 138 ISUP IAM call on the MSRN obtained during the OTPI process with a caller id 'A' to MSC-R/VLR-R 122. In an embodiment of the present invention, when MSC-R/VLR-R 122 receives the IAM message, it initiates searchMS operation to search mobile station of the simulated outbound roamer. The operation fails to establish radio contact as there is no real mobile station associated with the simulated outbound roamer (i.e., absent subscriber). However, since call forwarding is set at MSC-R/VLR-R 122, MSC-R/VLR-R 122 sends the MT call on the FTN at step 5004 to a GMSC-B 5005 associated with the roaming partner PMN-B. Thereafter, at step 5006 and 5008, GMSC-B 5005 obtains PI module 102's number from HLR-B 5007 by exchanging MAP SRI and MAP SRI ACK. Then at step 5010, GMSC-B 5005 sends the IAM message to active signaling module 138. PI module 102 correlates the caller ID of the incoming call with the original caller ID (i.e. 'A') initiated by the PI module 102. In an embodiment of the present invention, when the caller ID of the incoming call does matches with the original caller ID, the "Off-Net Termination Outgoing Bypass" for host PMN 104 is detected.

In another embodiment of the present invention, PI module 102 uses the FTN as a number of the roaming partner PMN-B (i.e. roaming partner PMN-B's SIM) to detect "Off-Net Termination Outgoing Bypass" for host PMN 104. It will be apparent to a person of ordinary skill in the art that the call flow for this embodiment is similar to that explained in FIG. 49.

In yet another embodiment of the present invention, PI module 102 uses IMSI-R to detect "Off-Net Termination Outgoing Bypass" for host PMN 104. In an embodiment of the present invention, the IMSI-R is registered on the roaming partner PMN-B's network and the FTN is set to active signaling module 138's number. In another embodiment of the present invention, when there is an SS7 link between host PMN 104 and roaming partner PMN-B, a profile is created at an MSC/VLR associated with roaming partner PMN-B and either the FTN is set to active signaling module 138's number or a CAMEL profile is created to obtain the caller ID to detect "Off-Net Termination Outgoing Bypass" for host PMN 104.
Roaming Partner Services Detection Although known services of roaming partner networks can be tested based on Roaming Agreement EXchange (RAEX) AA.14 of these roaming partner networks; however, some of these roaming partner networks may offer some services that are not mentioned in AA.14. Moreover, some of these unknown/hidden services for their outbound or inbound roamers may affect host PMN 104 operator's revenue and customer care. In one exemplary case, if a roaming partner network operator provides a roaming home short code service, it will help complete calls for roamers using their home short codes (e.g., 411 directory service). In another exemplary case, in case the roaming partner network operator provides a roaming misdialed number call correction service, it might produce customer care issue for home operator as the returning subscriber might dispute the corrected call as different from his originally intended call. Therefore, discovering or detecting such unknown/hidden services facilitates host PMN 104 operator to better explain, prepare, predict, counter negative effects of these services and also control steering of its roamers to roaming partner networks based on these services. Various sections described below uses PI module 102 to detect services implemented by roaming partner PMNs (e.g., roaming partner PMN 120).
Gateway Location Register (GLR) Detection In an earlier approach, as taught by the inventor in U.S. patent application Ser. No. 11/979,538 titled "Method and system for providing roaming services to outbound roamers using home network Gateway Location Register" filed on Nov. 5, 2007, a method and system for using real roamer traffic to detect presence of a GLR at a roaming partner network (i.e., for outbound roaming) and a competitor VPMN is provided. This application, which is incorporated herein in its entirety, is hereinafter referred to as "previous GLR filing." Various embodiments of the present invention mentioned in this section describe various techniques for using PI module 102 to detect GLR presence at a roaming partner network for simulated roaming subscribers.

Figure 51:
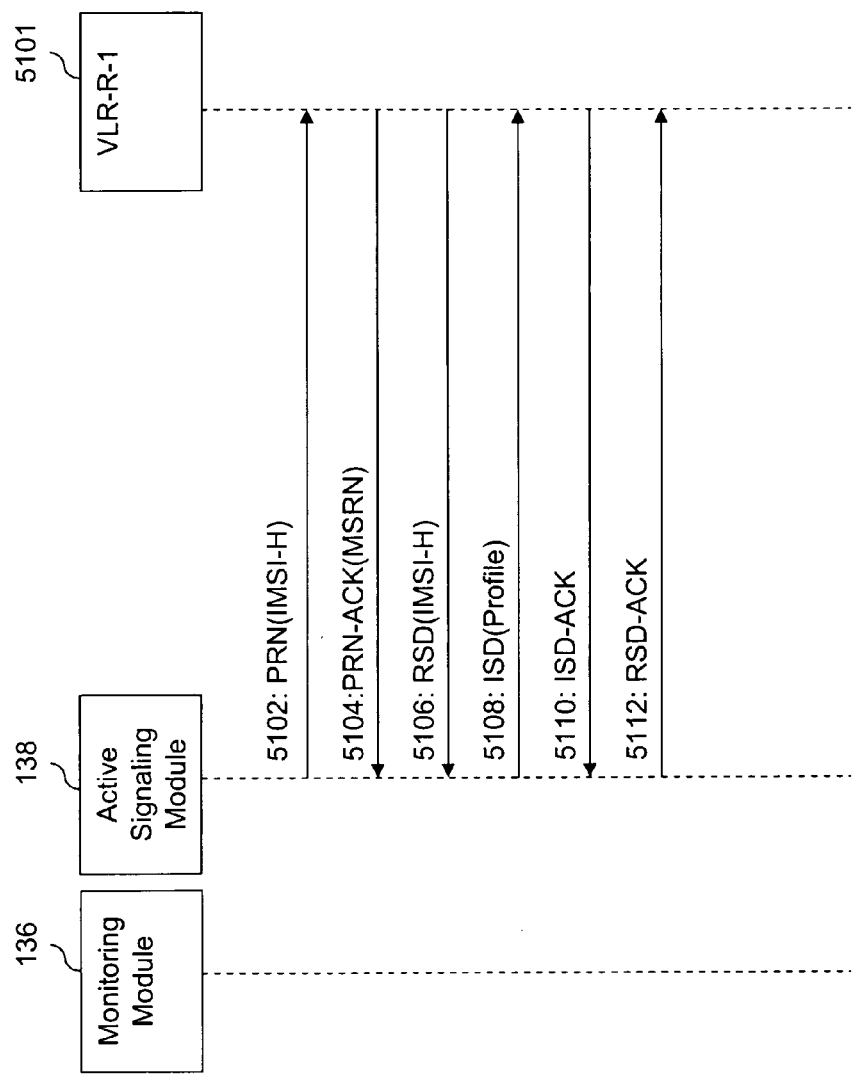
FIG. 51 represents a flow diagram for detecting a Gateway Location Register (GLR) in the roaming partner PMN by simulating transactions with a VLR in the roaming partner PMN, in accordance with a first embodiment of the present invention.

FIG. 51 represents a flow diagram for detecting a GLR-R in roaming partner PMN 120 by simulating transactions with a VLR-R-1 5101 associated with roaming partner PMN 120, in accordance with a first embodiment of the present invention. At step 5102, active signaling module 138 issues a fake PRN request on the IMSI-H to VLR-R-1 5101. Thereafter at step 5104, active signaling module 138 receives MSRN in a PRN-ACK message from VLR-R-1 5101. In an embodiment of the present invention, PI module 102 records a CgPA of the PRN-ACK message. Signal flow in steps 5106 to 5112 follows signal flow for standard RSD procedure, where RSD, ISD, ISD-ACK and RSD-ACK messages are exchanged between active signaling module 138 and VLR-R-1 5101. Since active signaling module 138 receives RSD messages from a CgPA that is same as the CgPA from which the PRN-ACK is received at active signaling module 138, PI module 102 confirms absence of GLR in roaming partner PMN 120. Likewise, PI module 102 can check for GLR presence by simulating transaction with other VLRs in roaming partner PMN 120.

In another embodiment of the present invention, PI module 102 suspects the presence of the GLR-R in roaming partner PMN 120 when it detects that a CgPA of RSD message received at active signaling module 138 is different from the CgPA of PRN-ACK message received at active signaling module 138. In this case, the PRN-ACK message is received from VLR-R-1 5101, whereas RSD message is received from the GLR-R. In yet another embodiment of the present invention, in case PI module 102 fails to detect a receipt of RSD message at active signaling module 138 after sending PRN request on the IMSI-H to VLR-R-1 5101, host PMN 104 operator suspects the GLR-R presence in roaming partner PMN 120. In this case, PI module 102 waits for the receipt of the RSD message for a pre-defined time interval before suspecting presence of GLR-R in roaming partner PMN 120. Also, in an embodiment of the present invention, monitoring module 136 detects the receipt of this RSD message at some other network element (i.e., GLR-R) in roaming partner PMN 120.

Figure 52:
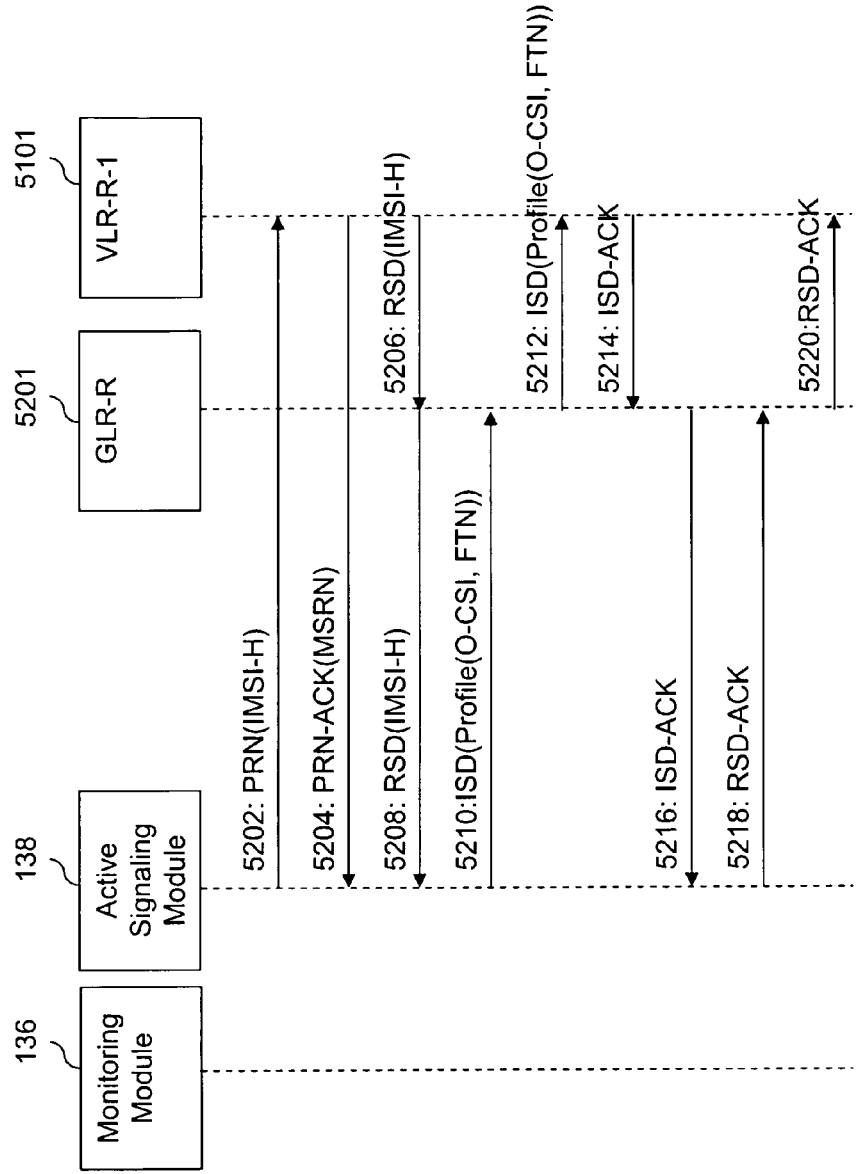
FIG. 52 represents a flow diagram for detecting the GLR in the roaming partner PMN with CAMEL support at the VLR, in accordance with a second embodiment of the present invention.

Similarly, PI module 102 can perform detection of GLR-R presence for simulated outbound roamer with CAMEL support at VLR-R-1 5101. FIG. 52 represents a flow diagram for detecting a GLR-R 5201 in roaming partner PMN 120 with CAMEL support at VLR-R-1 5101, in accordance with a second embodiment of the present invention. The signal flow for steps 5202 to 5220 is similar to signal flow of corresponding steps explained above for detecting GLR-R 5201 presence when CgPA of RSD message is different from CgPA of PRN-ACK message. Alternatively, the signal flow for detecting GLR-R 5201 presence for simulated outbound roamer with CAMEL support is similar to signal flow when PI module 102 fails to detect RSD message at active signaling module 138. However, in the former case of CAMEL support, active signaling module 138 sends O-CSI profile and FTN as additional profile information for the simulated outbound roamer in the ISD message to VLR-R-1 5101 via GLR-R

5201. In the latter case of CAMEL support, GLR-R 5201 issues only O-CSI profile as additional profile information to VLR-R-1 5101. Additionally, in both these cases, successful completion of RSD procedure confirms CAMEL support for host PMN 104's outbound roamers at VLR-R-1 5101.

As described earlier, failure to detect the receipt of RSD message at active signaling module 138 after sending PRN request on the IMSI-H to VLR-R-1 5101 only allows host PMN 104 operator to suspect, and not confirm, the GLR-R presence in roaming partner PMN 120. In order to avoid providing incorrect information to host PMN 104 operator, active signaling module 138 waits to receive the RSD message for a pre-defined time interval (i.e., configurable by host PMN 104 operator). Upon reaching the timeout period, active signaling module 138 issues a MAP RESET message towards roaming partner PMN 120 so as to restart the profile creation procedure for the IMSI-H. Detection of a new RSD message on the IMSI-H with a CgPA different from CgPA of a new PRN-ACK message at active signaling module 138 confirms the presence of the GLR-R in roaming partner PMN 120. Alternatively, in case the CgPA of the RSD message is same as the CgPA of the new PRN-ACK message, absence of the GLR-R is confirmed.

SoR Detection

Figure 53:
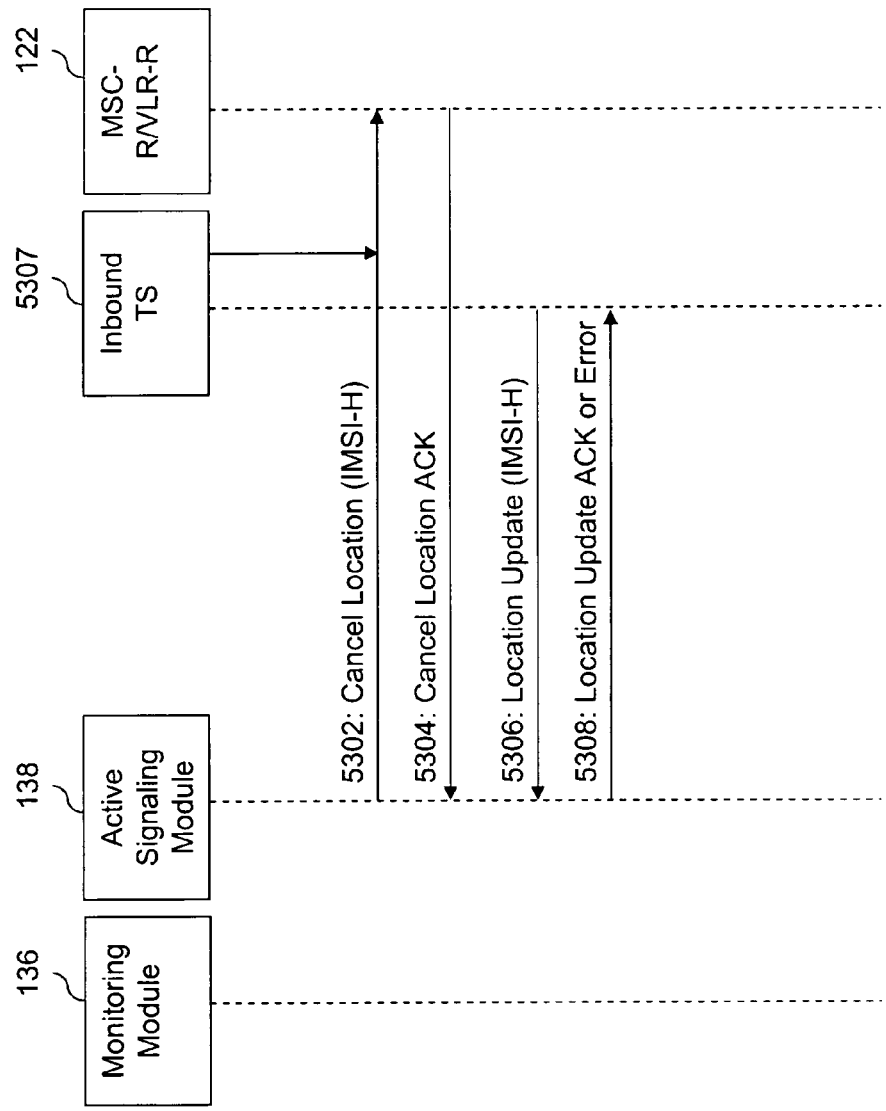
FIG. 53 represents a flow diagram for detecting inbound roaming Steering of Roaming (SoR) traffic applied by the roaming partner PMN on the simulated outbound roamers of the host PMN, in accordance with an embodiment of the present invention.

In one of the earlier approaches, a method for inbound traffic steering for a VPMN is provided. The method is based on retaining the VPMN's departing roamer, coming from an HPMN, who has received a Cancel-location message from his HPMN. FIG. 53 represents a flow diagram for detecting inbound roaming SoR applied by roaming partner PMN 120 on the simulated outbound roamers of host PMN 104, in accordance with an embodiment of the present invention. Host PMN 104 operator uses PI module 102 to actively detect the usage of such mechanism. The signal flow of the OTPI process in this case is same as the OTPI process explained earlier in conjunction with FIG. 5. At step 5302, active signaling module 138 issues a fake Cancel-Location message on the IMSI-H to MSC-R/VLR-R 122, in order to cancel the simulated outbound roamer's registration with roaming partner PMN 120. MSC-R/VLR-R 122 returns a Cancel-Location-ACK message to active signaling module 138, at step 5304. Thereafter at step 5306, active signaling module 138 detects a LUP message on the IMSI-H from an inbound TS module 5307 associated with roaming partner PMN 120. Since the simulated outbound roamer has no mobile associated with him, receipt of the LUP message on the IMSI-H from a network entity (i.e., inbound TS module 5307 in this case) other than PI module 102 indicates the presence of SoR mechanism in roaming partner PMN 120. In an embodiment of the present invention, active signaling module 138 rejects the LUP attempt from inbound TS module 5307 so as to restrict the simulated outbound roamer to register with roaming partner PMN 120. Hence at step 5308, active signaling module 138 returns an error message such as RNA or Roaming Restricted Due to Unsupported Feature (RR) in a LUP-ACK message to inbound TS module 5307. In another embodiment of the present invention, active signaling module 138 issues a LUP-ACK message without error message to successfully complete the LUP process of the simulated outbound roamer at roaming partner PMN 120.

In some other existing techniques, a VPMN operator is able to detect SoR by an HPMN operator on real inbound roamer traffic of the VPMN operator. Moreover, using such techniques, the VPMN operator is also able to detect the type of mechanism HPMN operator applies to steer the inbound roamers, coming from the HPMN, away from the VPMN. Various embodiments of the present invention allows host PMN 104 (i.e., VPMN in this case) operator to detect SoR by roaming partner PMN 120 (i.e., HPMN in this case) that steers host PMN 104's inbound roamers away from host PMN 104, using the simulated inbound roamer profile. In this case, active signaling module 138 initiates fake LUPs on various class of roamer IMSIs (e.g., IMSI-R or a VIP IMSI) towards HLR-R 132 or a SoR module in roaming partner PMN 120. In this case, active signaling module 138 acts as a VLR of host PMN 104. By sending fake LUPs towards roaming partner PMN 120, PI module 102 identifies the following based on the responses received at active signaling module 138 from a network element in roaming partner PMN 120 (e.g., the SoR module):

The type of SoR rejection mechanism employed by roaming partner PMN 120. In an embodiment of the present invention, active signaling module 138 receives a LUP rejection message such as a System Failure (SF), Unexpected Data Value (UDV), Missing Data (MD), Cancel-location, Roaming Not Allowed (RNA) and Roaming Restricted (RR) from the SoR module in roaming partner PMN 120.

Whether roaming partner PMN 120's SoR is in-signaling based or passive based. In an embodiment of the present invention, in case the reject error is RNA or RR, PI module 102 infers the SoR as in-signaling based. Similarly, in another embodiment of the present invention, if for other rejection mechanism in case no ISD message (even after LUP reject) is received at active signaling module 138 in response to fake LUP(s), PI module 102 infers the SoR as in-signaling based. However, in all other cases (i.e., when SF, MD, UDV or Cancel-Location is received at active signaling module 138, and no ISD message is received at active signaling module 138), PI module 102 infers the SoR as passive based.

Whether roaming partner PMN 120's SoR module examines E.164 address of the LUP. By knowing such information, host PMN 104 operator is able to counter the effects of roaming partner PMN 120's SoR on the inbound roamers by detecting that the E.164 address bypasses the SoR without affecting registration success and fakes the SoR on real outbound roamer distribution in host PMN 104.

In an embodiment of the present invention, detection of roaming partner PMN 120's SoR also includes Mobile Country Code (MCC)/Mobile Network Code (MNC) to CC NDC mapping, which is a static file in GSMA's IR.21 format sent by roaming partner PMN 120 to host network 104.

Optimal Routing Detection

Optimal routing is a service that roamer partner PMN 120 may use to connect its inbound roamers without letting the voice call trombone through host PMN 104. Although it improves the use of resources, such a mechanism may impact host PMN 104 operator's revenue and MT services it may otherwise offer to its outbound roamers (e.g., prepay, ring back tone, free of charge voice mail deposit etc.). Thereby, host PMN 104 operator needs to check if its roaming partner PMN 120 operator applies optimal routing on host PMN 104's outbound roamers in roaming partner PMN 120 without host PMN 104 operator's consent.

Figure 54A:
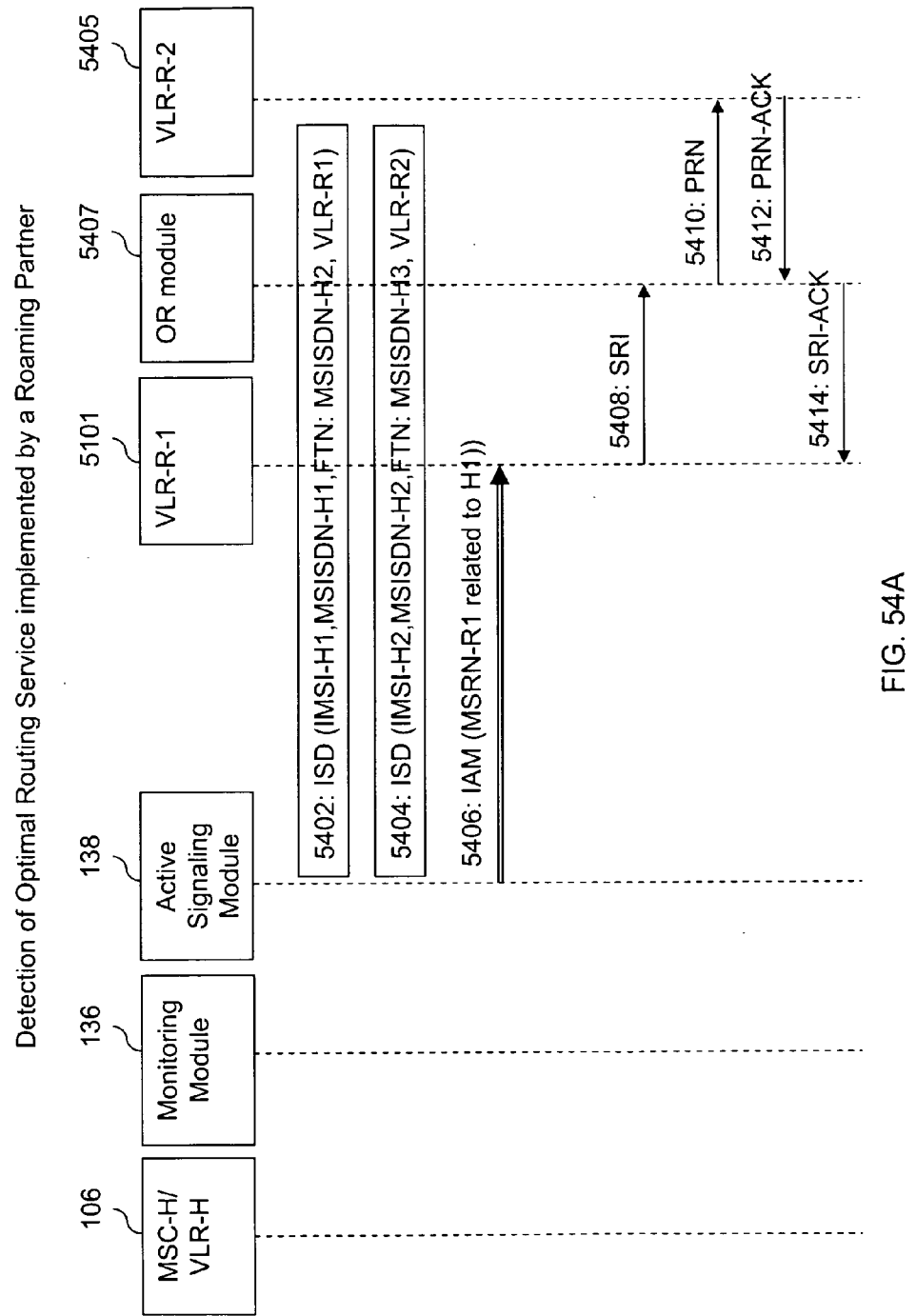
FIGS. 54A and 54B represent a flow diagram for detecting optimal routing applied by the roaming partner PMN on the simulated outbound roamers of the host PMN, in accordance with an embodiment of the present invention.
Figure 54B:
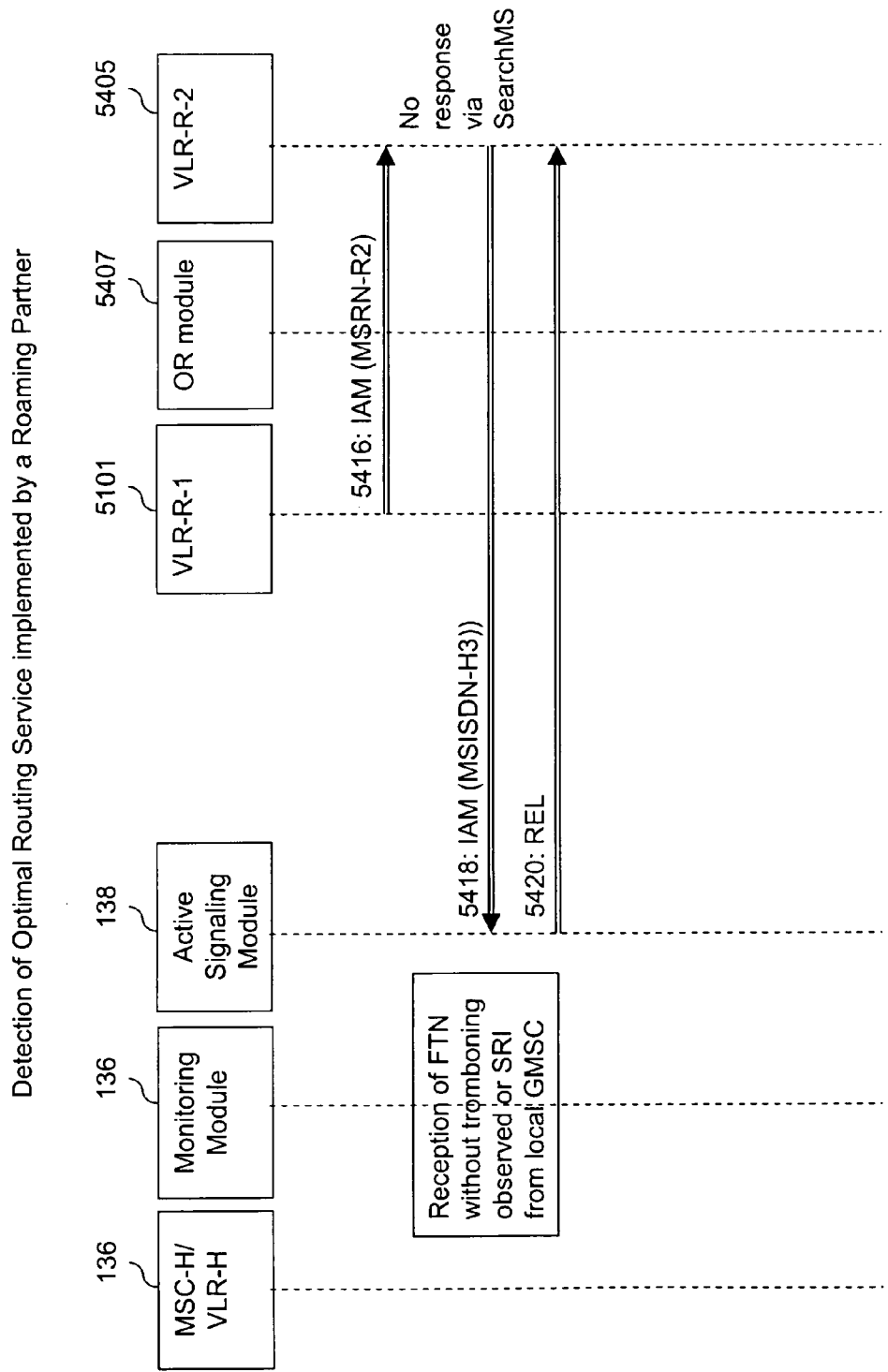

FIGS. 54A and 54B represent a flow diagram for detecting optimal routing applied by roaming partner PMN 120 on the simulated outbound roamers of host PMN 104 roaming in roaming partner PMN 120, in accordance with an embodiment of the present invention. In this case, PI module 102 uses two simulated roaming subscribers within the same roaming partner PMN 120. In an embodiment of the present invention, the two roaming subscribers are located in the same VLR of roaming partner PMN 120. In another embodiment of the present invention, the two roaming subscribers are located in different VLRs of roaming partner PMN 120. FIGS. 54A and 54B consider this second embodiment. At step 5402, active signaling module 138 initiates the OTPI process, where active signaling module 138 issues a PRN request on an IMSI-H1 of a first simulated roaming subscriber to VLR-R-1 5101 location of the first roaming subscriber. Additionally during the OTPI process, at step 5402, active signaling module 138 issues an ISD message to VLR-R-1 5101. The ISD message includes an MSISDN-H1 (i.e., a first MSISDN) corresponding to the IMSI-H1, an FTN of the MSISDN-H1 (i.e., a first FTN) and VLR-R-1 5101 address. Active signaling module 138 also sets the FTN of the MSISDN-H1 as an MSISDN-H2 (i.e., a second MSISDN) associated with a second simulated roaming subscriber, prior to sending the ISD message to VLR-R-1 5101. In other words, the FTN for the first simulated roaming subscriber is set to the second simulated roaming subscriber's MSISDN.

Thereafter, active signaling module 138 receives an MSRN-R1 corresponding to the MSISDN-H1 in an ISD-ACK message from VLR-R-1 5101. Similarly, at step 5404, active signaling module 138 issues a PRN request to retrieve an MSRN-R2 corresponding to the MSISDN-H2, to a VLR-R-2 5405 in roaming partner PMN 120. Additionally during the OTPI process, at step 5404, active signaling module 138 issues an ISD message to VLR-R-2 5405, where the ISD message includes the MSISDN-H2, an IMSI-H2 corresponding to the MSISDN-H2, an FTN of the MSISDN-H2 set to an MSISDN-H3 (i.e., a second FTN), and VLR-R-2 5405 location of the second simulated roaming subscriber. MSISDN-H3 is a special number that corresponds to active signaling module 138's number, in accordance with an embodiment of the present invention. Further at step 5406, active signaling module 138 initiates a first MT call such as an ISUP IAM on an MSRN-R1 corresponding to the MSISDN-H1 to VLR-R-1 5101. Since VLR-R-1 5101 fails to locate the first simulated roaming subscriber, it issues an SRI request on the MSISDN-H2 (since it is the FTN of the MSISDN-H1) to an Optimal Routing (OR) module 5407, and then retrieves an MSRN-R2 corresponding to the MSISDN-H2 in an SRI-ACK message from OR module 5407, at steps 5408 to 5414. Signal flow for the retrieval of MSRN-R2 follows standard MSRN retrieval process, where OR module 5407 and VLR-R-2 5405 exchange PRN and PRN-ACK messages. Thereafter at step 5416, VLR-R-1 5101 initiates an ISUP IAM call on the MSRN-R2 to VLR-R-2 5405. VLR-R-2 5405 then fails to locate mobile station for the second simulated roaming subscriber, and thus it initiates a second MT call such as an ISUP IAM call on the MSISDN-H3 to active signaling module 138, at step 5418. It will be apparent to a person skilled in the art that in case of successful call forwarding, monitoring module 136 detects an ISUP IAM call coming back to a GMSC of host PMN 104 (e.g., GMSC-H 112). However, in case of successful optimal routing, the ISUP call on the second MSISDN does not transit through host PMN 104. Therefore, detection of the ISUP IAM call on the MSISDN-H3 (without tromboning) at active signaling module 138 confirms the presence of OR service in roaming partner PMN 120.

Optimal Routing for Late Call Forwarding (ORLCF) for Outbound Roamers

Voicemail deposit or any other FTN as a result of a late call forwarding for an outbound roamer not answering calls, out of coverage area, paging no response, busy etc. results in tromboning of two international legs for the outbound roamer. For this reason, various network operators have deployed a solution for ORLCF.

Figure 55:
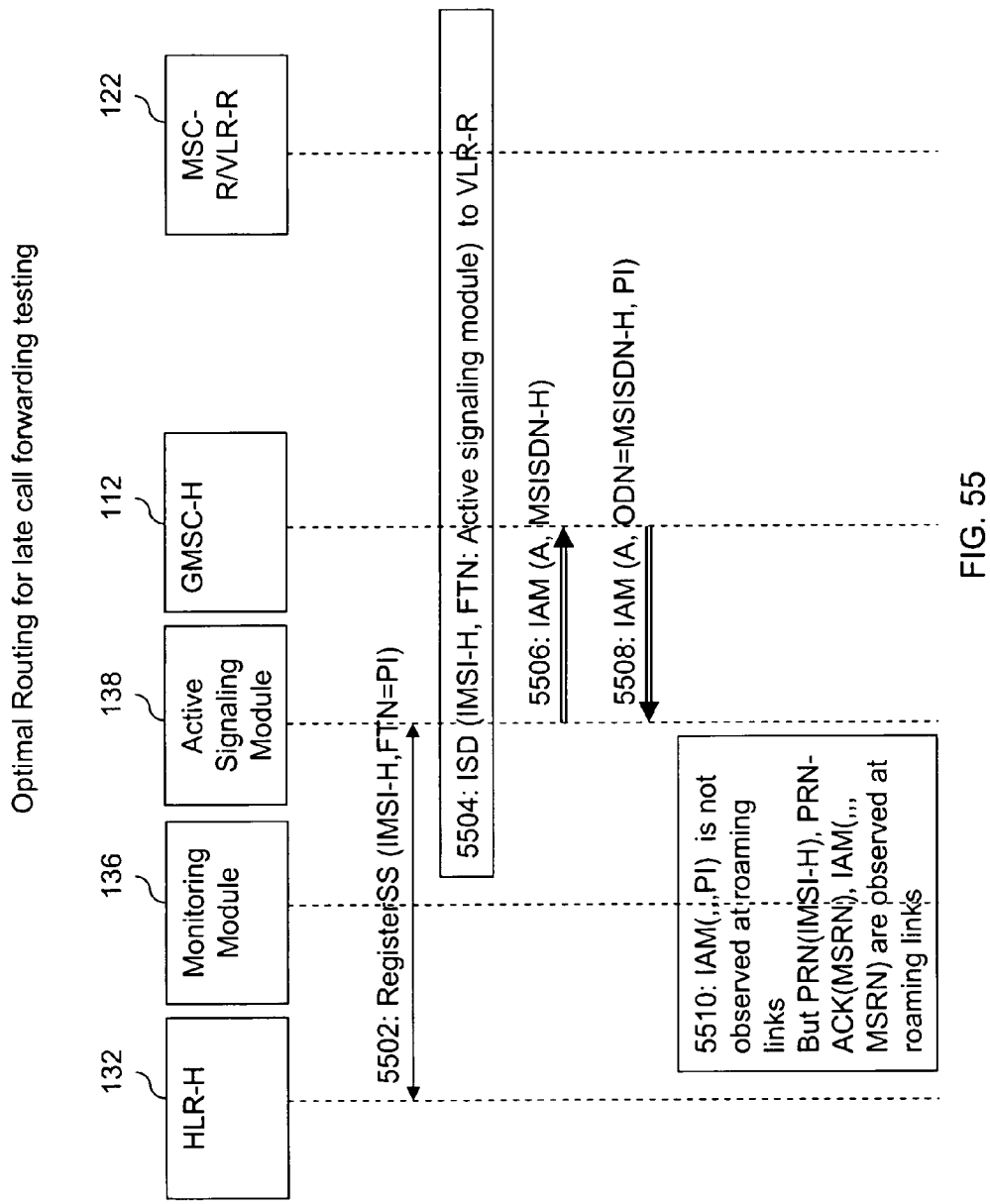
FIG. 55 represents a flow diagram for testing Optimal Routing for Late Call Forwarding (ORLCF) for the simulated outbound roamer of the host PMN, in accordance with an embodiment of the present invention.

FIG. 55 represents a flow diagram for testing ORLCF for the simulated outbound roamer of host PMN 104, in accordance with an embodiment of the present invention. In this case, active signaling module 138 issues a fake LUP message on the simulated outbound roamer's IMSI-H, at any MSC/VLR in roaming partner PMN 120, towards HLR-H 116. At step 5502, active signaling module 138 issues a MAP RegisterSS (IMSI-H) to HLR-H 116, in order to set FTN for the MSISDN-H as active signaling module 138's number/MSISDN (i.e., PI module 102's number). Also, at step 5504, active signaling module 138 performs the OTPI process, where active signaling module 138 issues an ISD message on the IMSI-H to MSC-R/VLR-R 122 with FTN for the MSISDN-H as active signaling module 138's number/MSISDN. Active signaling module 138 then obtains MSISDN-H in an ISD-ACK message from MSC-R/VLR-R 122. Thereafter at step 5506, active signaling module 138 issues an ISUP IAM call on the MSISDN-H (i.e., ISUP IAM (A, MSISDN-H)) to GMSC-H 112 with calling party as A. This triggers MT call at GMSC-H 112, which will request routing information from HLR-H 116 (i.e., by exchanging SRI and SRI-ACK messages with HLR-H 116). HLR-H 116 upon receiving the SRI request, issues a PRN request to MSC-R/VLR-R 122, which returns an MSRN corresponding to the MSISDN-H to GMSC-H 112. Thus, GMSC-H 112 initiates an ISUP IAM (A, MSRN) call at the roaming (i.e., MAP and ISUP) links towards MSC-R/VLR-R 122. The ORLCF service may send additional messages (e.g., modify the FTN or turn off the forwarding subscription at MSC-R/VLR-R 122)

In an embodiment of the present invention, monitoring module 136 monitors PRN, PRN-ACK and ISUP IAM (A, MSRN) messages exchanged due to triggering of the MT call at GMSC-H 112. When MSC-R/VLR-R 122 fails to locate mobile station for the simulated outbound roamer, MSC-R/VLR-R 122 issues an ISUP IAM call on an FTN or releases the call if the ORLCF service has removed FTN or turned off call forwarding. In the first case where the forwarding on the FTN (which may be PI module 102's number or a new FTN number) is performed, monitoring module 136 observes an ISUP release message at the roaming links before receiving an ISUP IAM (X, PI) at active signaling module 138. This detection allows host PMN 104 operator to conclude successful testing of the ORLCF service.

In the above mentioned case of ORLCF testing, monitoring module 136 needs to detect exchange of PRN, PRN-ACK and ISUP IAM (A, MSRN) (and possibly ISUP IAM (X, FTN) and ISUP REL) messages at roaming signaling links. In an embodiment of the present invention, host PMN 104 operator configures GMSC-H 112 to route any call on the FTN (i.e., PI module 102's number) to active signaling module 138 via ISUP signaling, in order to avoid such probing of roaming signaling links. In this case, active signaling module 138 directly receives the ISUP IAM (A, FTN) from GMSC-H 112, which indicates successful testing of ORLCF for the outbound roamers of host PMN 104.

Roaming Agreement Detection

In order to provide roaming services like GSM, CAMEL, GPRS, 3G etc., a VPMN operator needs to have roaming agreements (i.e., with a home network) that support these services for inbound roamers from the home network. Such roaming agreements include standard GSM, CAMEL, GPRS, 3G etc. However some home network operators do not check such an agreement when providing service profile (i.e., in an ISD message) to their outbound roamer's MSC/VLR location in the VPMN that does not possess the roaming agreement on the type of service with the HPMN. This may result in various consequences for such HPMN and VPMN. In one exemplary consequence, the VPMN may allow the outbound roamer of the HPMN to register and perform mobile activities (e.g., MO/MT call and SMS) in the VPMN even when these two networks do not possess GSM agreement with each other. In this case, the HPMN operator may not pay to the VPMN operator for the usage of the outbound roamer at the VPMN, due to a lack of billing process for such a roamer. Even though the HPMN operator may have billed the outbound roamer by deducting balance from his prepaid account, the HPMN operator may not be able to pay the VPMN operator since there is no corresponding retail process for the outbound roamer's usage. In another exemplary consequence, the VPMN operator obtains some information for a service from the HPMN, despite lack of an agreement on the required service. In one exemplary scenario, the VPMN operator can perform the authentication on the outbound roamer of the HPMN despite lack of a GSM roaming agreement with the HPMN. In another exemplary scenario, the VPMN operator determines CAMEL version support by the HPMN operator.

Figure 56:
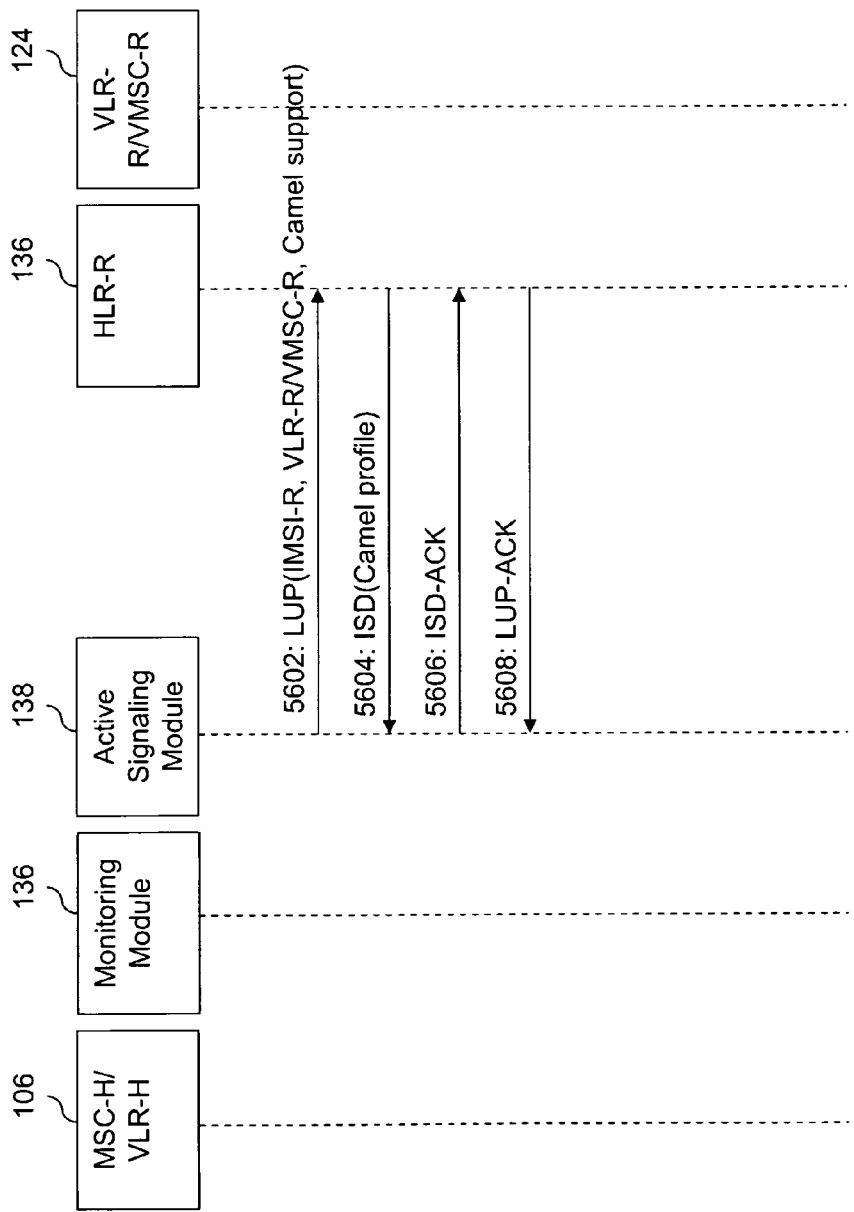
FIG. 56 represents a flow diagram for detecting return of CAMEL profile for the simulated inbound roamer from the roaming partner PMN, even though the host PMN lacks a CAMEL roaming agreement with the roaming partner PMN, in accordance with an embodiment of the present invention.

PI module 102 can facilitate host PMN 104 operator (i.e., the VPMN operator in this case) to identify the behavior of roaming partner PMN 120 (i.e., HPMN in this case) on such a lack of service agreement. FIG. 56 represents a flow diagram for detecting return of CAMEL profile for the simulated inbound roamer from roaming partner PMN 120, even though host PMN 104 lacks CAMEL roaming agreement with roaming partner PMN 120, in accordance with an embodiment of the present invention. In this case, active signaling module 138 issues a fake LUP message on the simulated inbound roamer's IMSI-R to HLR-R 132, along with any MSC/VLR address of roaming partner PMN 120 and fake CAMEL support indication, at step 5602. Thereafter at step 5604, active signaling module 138 detects a receipt of CAMEL profile in an ISD message from HLR-R 132. Detection of CAMEL profile information at active signaling module 138, even though roaming partner PMN 120 does not have CAMEL roaming agreement with host PMN 104, confirms the testing of CAMEL profile return. Thereafter at steps 5606 and 5608, active signaling module 138 exchanges ISD-ACK and LUP-ACK messages with HLR-R 132. Similarly, PI module 102 can also detect return of other roaming profiles (e.g., GSM profile, GPRS profile, 3G profile etc.) for roaming agreements such as GSM, GPRS, 3G etc. Moreover, PI module 102 can also check if host PMN 104 can obtain authentication information exchange from roaming partner PMN 120 that does not have GSM agreement or GPRS agreement, by performing fake authentication with HLR-R 132.

Network Extension Detection

Network extension is a service used by a roaming partner network operator (sometimes called a sponsor network operator) to extend its network virtually to include a client network operator (sometimes called a sponsored network operator) in the same or different country. This service allows the client network operator to piggyback on the roaming partner network's roaming relationships so that inbound roamers from an HPMN operator at the client operator appear to the HPMN operator as if they are at the roaming partner network. Network extension can affect the HPMN operator's SoR service as the HPMN operator is mislead that the outbound roamer is in the sponsor network (i.e., roaming partner network), although he actually is present in the client network. Moreover, it can also introduce customer care issues for the HPMN operator as its outbound roamers can argue on their bill details, which will suggest that calls originated or terminated at the sponsor network operator country where they did not visit.

In an embodiment of the present invention, host PMN 104 operator (i.e., the HPMN operator in this case) uses PI module 102 to detect network extension of the client network operator to roaming partner PMN 120. The OTPI process for this case is same as the OTPI process explained earlier in conjunction with FIG. 5, where active signaling module 138 obtains MSRN and MSISDN-H from MSC-R/VLR-R 122. In this case, if a CC NDC of the obtained MSRN (corresponds to a first CC NDC) is different from a CC NDC of MSC-R/VLR-R 122 (corresponds to a second CC NDC), roaming partner PMN 120 identified by CC NDC of MSC-R/VLR-R 122 is considered to perform network extension for the client network operator identified by the CC NDC of the MSRN. In an embodiment of the present invention, PI module 102 detects network extension service of the client network that is located in a country different from roaming partner PMN 120's country. In this case, PI module 102 compares only CC of the MSRN with CC of MSC-R/VLR-R 122, instead of NDC. In an embodiment of the present invention, PI module 102 adds MSC-R/NLR-R 122 GT to a restricted list of network elements for network extension. By proactively initiating profiles for its roaming partner networks, host PMN 104 operator builds such a restricted list of network elements. PI module 102 then uses this list to restrict any future registration attempt from any network element of the list.

Dual IMSI Detection

Dual IMSI service is a service that the sponsor or roaming partner network operator uses to extend its roaming relationships to the client network operator so that outbound roamers of the client network operator in the HPMN operator appears to the HPMN operator as if the outbound roamers are from the sponsor/roaming partner network. Dual IMSI service affects the HPMN operator's inbound roaming revenue, as the client network's roamers is charged with the IOT of the sponsor/roaming partner network.

In an embodiment of the present invention, host PMN 104 operator (i.e., the HPMN operator in this case) uses PI module 102 to detect the dual IMSI service used by roaming partner PMN 120 operator (i.e., the sponsor network operator). For each IMSI provided by roaming partner PMN 120 for testing, PI module 102 performs profile initiation on the simulated inbound roamer at a MSC/VLR of host PMN 104. The ITPI process for this case is same as the ITPI process explained earlier in conjunction with FIG. 6, where active signaling module 138 obtains MSISDN-R from MSC-H/VLR-H 106. In this case, if a CC NDC of the obtained MSISDN-R (corresponds to a third CC NDC) is different from a MCC MNC of the IMSI-R (corresponds to a fourth CC NDC), PI module 102 suspects presence of dual IMSI service in roaming partner PMN 120. In order to handle the dual IMSI service case where sponsor and client network operators belong to different countries, PI module 102 compares only CC of the MSISDN-R with the CC of the IMSI-R. Similar to network extension service detection, PI module 102 can add IMSI-R prefixes to a restricted list of IMSIs for dual IMSI services. By proactively initiating profiles on the IMSIs of its roaming partner networks (e.g., roaming partner PMN 120), host PMN 104 operator creates such a restricted list of IMSIs. PI module 102 then uses this list to restrict any future registration attempts from any of these restricted IMSIs.

Ping Service or Node Discovery

Furthermore, some roaming partner networks add new network elements without host PMN 104 operator's awareness. In an embodiment of the present invention, active signaling module 138 issues an SCCP UDT message to various network element in roaming partner PMN 120, where SSN is either unknown or not used, and return option as return on error. This can be used to check the presence of some new network elements (correspond to third network elements) that are not routable. PI module 102 scans roaming partners' network ranges to determine availability of a new network element. In order to detect unknown network elements, PI module 102 uses a UDT ping to see if there is an error response other than unroutable. Likewise, to detect known network elements that got removed (like MSC/VLR), PI module 102 uses the UDT ping to se if there is an UDT response that indicates routable.

Some roaming partner networks also exchange IR.21 documents with ranges for various types of network elements (e.g., 123456XY where X is 1-9 and Y is 0-8) without specifying the address that is actually being used by a network element. The ping service can be similarly used to periodically check the existence of such a network element against each address of the range. In case the address is discovered from ping as not used, PI module 102 excludes it from subsequent testing procedure for certain configurable duration (i.e., defined by host PMN 104 operator). In an embodiment of the present invention, host PMN 104 operator combines ping service with monitoring of roaming signaling links and TAP data to determine a MSC/VLR or network element that actually exists.

SC/SCA Detection

SC and wrongly dialed digits correction (SCA) are roaming services that can improve call completion and hence roaming revenue. Detecting which roaming partner offer such a service can help host PMN 104 operator to steer traffic towards such partner to increase roaming revenue. PI module 102 detects whether roaming partner PMN 120 operator provides SC/SCA service. PI module 102 can further detect whether an existing SC/SCA service has a correct or an incorrect functioning.

In an embodiment of the present invention, PI module 102 detects absence of SC/SCA at MSC-R/VLR-R 122 by setting up an FTN profile, by active signaling module 138 at MSC-R/VLR-R 122, with a known SC or wrongly dialed number. When an ISUP IAM call is made to the MSRN by active signaling module 138, obtained by the OTPI process, it results in receiving a REL message at active signaling module 138. This receipt of REL message at the active signaling module 138 confirms the absence of SC/SCA service at roaming partner PMN 120.

Figure 57:
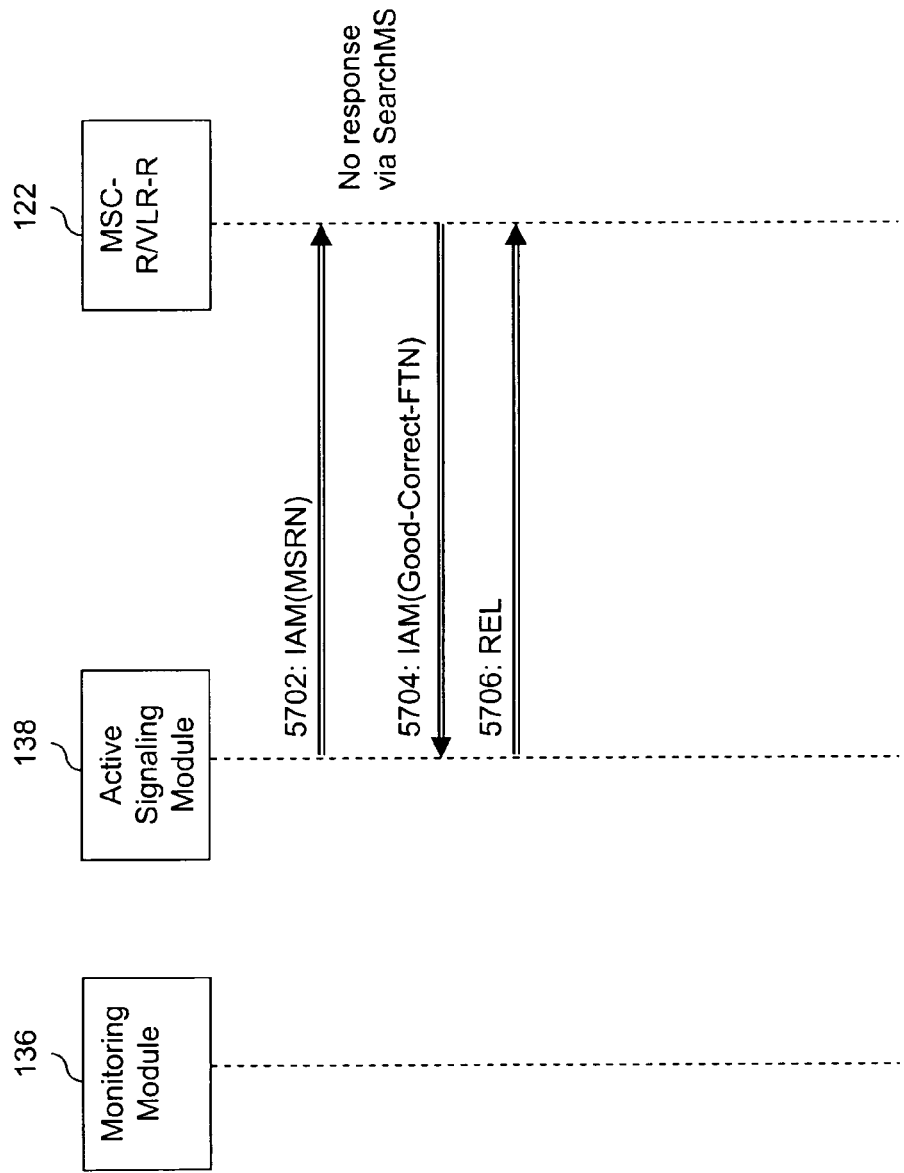
FIG. 57 represents flow diagram for detecting functionality of Short code (SC)/Smart Call Assistant (SCA) service for the simulated outbound roamer, in accordance with an embodiment of the present invention.

As said earlier PI module 102 can further detect whether an existing SC/SCA service has a correct or an incorrect functioning. FIG. 57 represents flow diagram to detect functionality of SC/SCA service for the simulated outbound roamer, in accordance with an embodiment of the present invention. The signal flow of the OTPI process is same as the OTPI process explained above in conjunction with FIG. 5, except that active signaling module 138 also sends FTN profile to MSC-R/VLR-R 122. In an embodiment of the present invention, the FTN corresponds to a number 'Y' for SC or wrongly dialed numbers. At step 5702, active signaling module 138 issues an ISUP IAM call on the obtained MSRN to MSC-R/VLR-R 122. In an embodiment of the present invention, when MSC-RNLR-R 122 receives the IAM message, it initiates searchMS operation to search mobile station of the simulated outbound roamer. The operation fails to establish radio contact as there is no real mobile station associated with the simulated outbound roamer (i.e., absent subscriber). However, since call forwarding is set at MSC-R/VLR-R 122, MSC-R/VLR-R 122 sends the MT call on a new number 'Z' at step 5704. PI module 102 upon receiving the IAM message correlates the received new number 'Z' with the number 'Y' set by PI module 102 for the SC or wrong dialed numbers. If 'Y' matches with 'Z' then roaming partner PMN 120 operator is suspected to provide a correct SC/SCA service. In another embodiment of the present invention, when 'Y' does not match with 'Z'. then roaming partner PMN 120 operator is suspected to provide an incorrect SC/SCA service. In yet another embodiment of the present invention, when PI module 102 does not receive the IAM message but receives the ACM/ANM message, then roaming partner PMN 120 operator is suspected to provide an incorrect SC/SCA service. Thereafter, at step 5706, active signaling module 138 issues REL message to MSC-R/VLR-R 122, in order to avoid generation of usage CDR.

Figure 58:
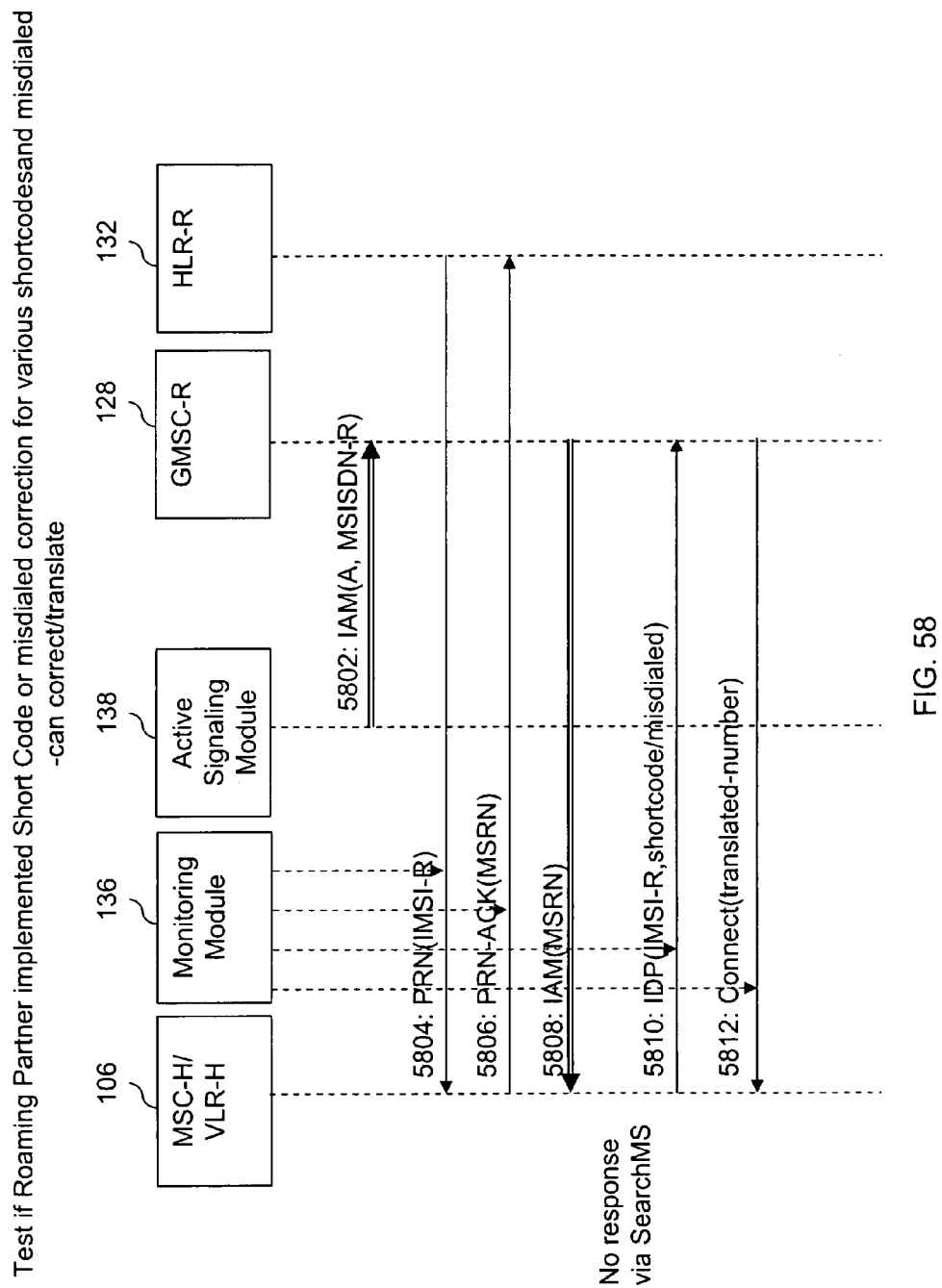
FIG. 58 represents flow diagram for detecting functionality of the SC/SCA service for the simulated inbound roamer, in accordance with an embodiment of the present invention.

FIG. 58 represents flow diagram to detect functionality of SC/SCA service for the simulated inbound roamer, in accordance with an embodiment of the present invention. The signal flow of the ITPI process is same as the ITPI process explained above in conjunction with FIG. 6, except that active signaling module 138 also sends FTN profile to MSC-H/VLR-H 106. In an embodiment of the present invention, the FTN corresponds to a number 'Y' for SC or wrongly dialed numbers. At step 5802, active signaling module 138 issues an ISUP IAM call on the obtained MSISDN-R. Thereafter, at steps 5804 and 5806, HLR-R 132 and MSC-H/VLR-H 106 exchange signaling messages with each other to obtain MSRN. Upon obtaining the MSRN, at step 5808, GMSC-R 128 routes the IAM message to MSC-H/VLR-H 106. In an embodiment of the present invention, when MSC-H/VLR-H 106 receives the IAM message, it initiates searchMS operation to search mobile station of the simulated outbound roamer. The operation fails to establish radio contact as there is no real mobile station associated with the simulated inbound roamer (i.e., absent subscriber). However, since call forwarding is set at MSC-H/VLR-H 106, MSC-H/VLR-H 106 sends the IDP message with the number 'Y' at step 5810. As a result of this, GMSC-R 128 at step 5812 sends a CAMEL CAP Connect message on a translated number to MSC-H/VLR-H 106. Monitoring module 136 monitors this Connect message on the roaming links and taps the translated number. PI module 102 correlates this translated number with the number 'Y' set for the SC and wrong dialed numbers. If 'Y' matches with the translated number then roaming partner PMN 120 operator is suspected to provide a correct SC/SCA service. In another embodiment of the present invention, when 'Y' does not match with the translated number then roaming partner PMN 120 operator is suspected to provide an incorrect SC/SCA service. In yet another embodiment of the present invention, when monitoring module 136 does not see or monitor the Connect message on the roaming links and monitors only CAMEL Continue/Release message on the roaming links then roaming partner PMN 120 operator is suspected to provide an incorrect SC/SCA service.

Detection of Restricted Dialing on International Revenue Share (IRS) Numbers

IRS fraud (FF. 17) is a well-known subscription fraud in the telecommunication industry. A fraudster uses SIMs that are illegally procured to make calls to third country international premium numbers (i.e., hereinafter referred to as IRS numbers) that appears as ordinary telephone numbers to network operators. International Direct Dial (IDD) transit carriers provide short-chained calls to some premium audio text services (e.g., adult lines), in order to share termination revenue between these transit carriers and premium audio text service providers. Although, GSMA industry has proposed the implementation of Near Real Time Roaming Data Exchange (NRTRDE) (i.e., in FF.18) by October 2008; however, it is still not real time and it does not deal with fraud prevention.

Figure 59:
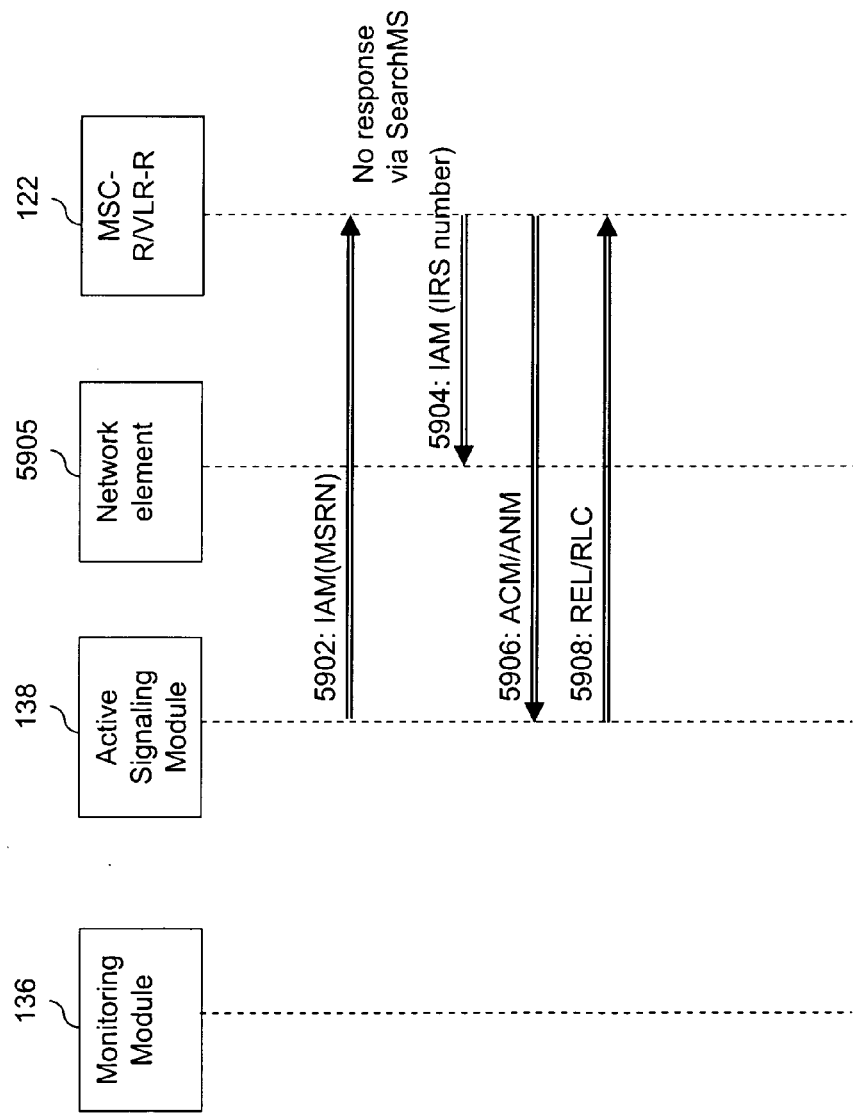
FIG. 59 represents a flow diagram for detecting absence of an International Revenue Share (IRS) service in the roaming partner PMN, in accordance with an embodiment of the present invention.

Some roaming partner network operators provide a restricted dialing service on IRS numbers. Detecting roaming partner network operators that offer such a service can help host PMN 104 operator to steer traffic towards such roaming partner networks so as to reduce roaming revenue loss. In an embodiment of the present invention, host PMN 104 operator uses PI module 102 to detect absence or presence of an IRS control service in roaming partner PMN 120. FIG. 59 represents a flow diagram for detecting absence of the IRS control service in roaming partner PMN 120, in accordance with an embodiment of the present invention. The OTPI process for this case is similar to the OTPI process described earlier in conjunction with FIG. 5, except that active signaling module 138 also sends an IRS number as an FTN of the MSISDN-H to MSC-R/VLR-R 122. The IRS number is any existing IRS MSISDN known to host PMN 104 operator, in accordance with an embodiment of the present invention. Upon obtaining MSRN from MSC-R/VLR-R 122, active signaling module 138 issues a fake ISUP IAM call on the MSRN to MSC-R/VLR-R 122, at step 5902. Upon detecting a failure to locate mobile station associated with the simulated outbound roamer via SearchMS operation, at step 5904, MSC-R/VLR-R 122 initiates an ISUP IAM call on the IRS number towards a network element 5905 other than active signaling module 138. Thereafter at step 5906, MSC-R/VLR-R 122 also issues ACM and ANM messages to active signaling module 138 so as to answer the ongoing call on the IRS number. Detection of ACM and ANM messages at active signaling module 138 indicates absence of the IRS service in roaming partner PMN 120. In order to avoid charging, active signaling module 138 issues ISUP REL and ISUP RLC messages to MSC-R/VLR-R 122, at step 5908.

Similarly, PI module 102 can also detect presence of the IRS control service in roaming partner PMN 120. The signal flow for this case is similar to the signal flow for detecting the absence of the IRS control service explained above in conjunction with FIG. 59, except that MSC-R/VLR-R 122 returns an ISUP REL message, instead of ISUP IAM on the IRS number and ACM/ANM messages, to active signaling module 138. Detection of the ISUP REL message at active signaling module 138 confirms the presence of the IRS service in roaming partner PMN 120.

Home Routing Detection

Home routing is a service that a roaming partner network uses to route calls to non-HPMN destination numbers via its own network first. The purpose of the service is often to gain the arbitrage between the call charge routed via the roaming partner network and the call charge routed directly to the destination number, although sometimes this can also improve the QoS (e.g., caller ID delivery, and network monitoring and control). Another benefit for the roaming partner network operator (i.e., HPMN or home operator in this case) is to collect MT fees at the interconnect level for call that was originally not terminating within its network. For example, although the destination is a fixed number that belongs to the HPMN country, the HPMN operator may force the call to transit through its network. In this case, the HPMN operator collects the MT fees, although it is also charged with a fixed termination fee by the end-point network. The home routing may occur for any local destination number for which the HPMN operator may realize an arbitrage on the local termination rates.

However, home routing service can affect host PMN 104 operator's inbound roaming revenue as roaming partner network's (e.g., roaming partner PMN 120's) roamers will be charged with the IOT of the call to the roaming partner network rather than to the actual destination number. The home routing pattern may also influence the charges incurred to the international carriers. It will be apparent to a person skilled in the art that international carrier service operators usually charge differently for mobile and fixed destinations.

Figure 60:
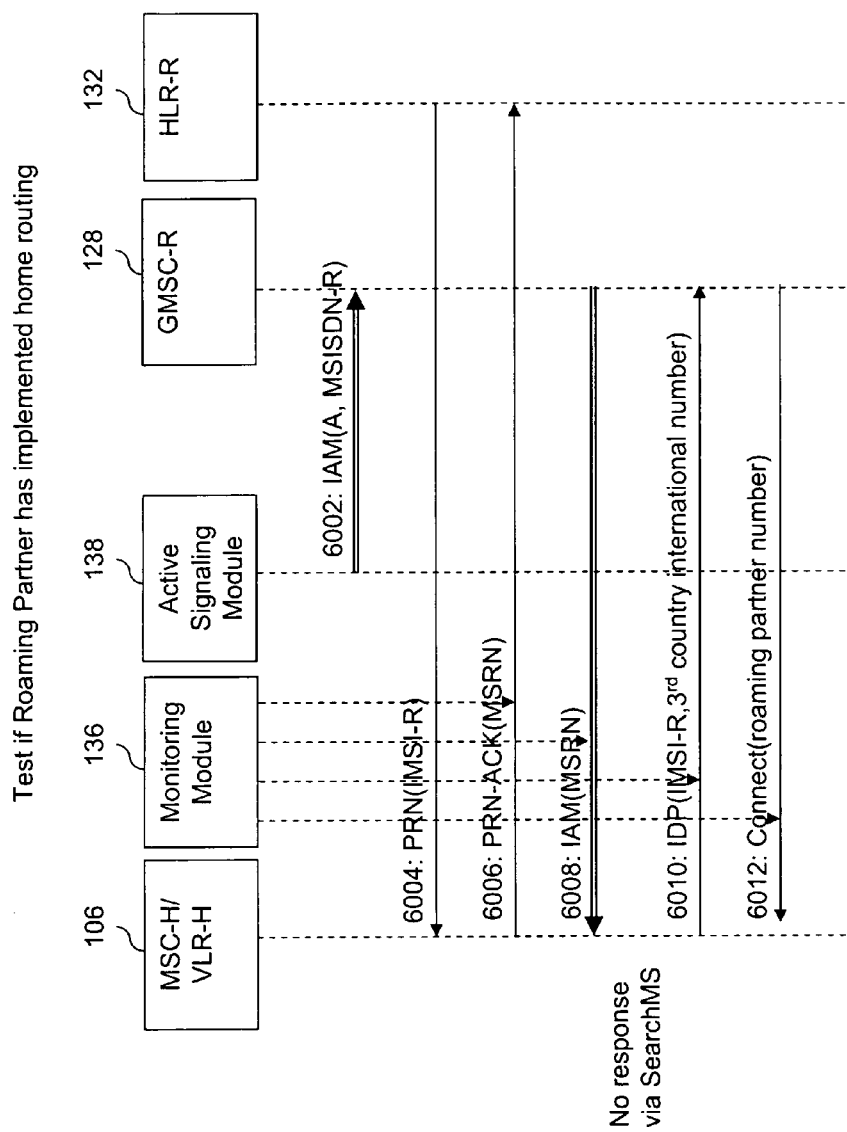
FIG. 60 represents a flow diagram for detecting a home routing service applied by the roaming partner PMN, in accordance with an embodiment of the present invention.

FIG. 60 represents a flow diagram for detecting a home routing service applied by roaming partner PMN 120, in accordance with an embodiment of the present invention. For each IMSI provided by roaming partner PMN 120 operator for testing purposes, PI module 102 performs ITPI process. The ITPI process for this case is same as the ITPI process described earlier in conjunction with FIG. 8, where active signaling module 138 obtains MSISDN-R from MSC-H/VLR-H 106. However, in case of the ITPI process for home routing service detection, active signaling module 138 issues an ISD message on the IMSI-R to MSC-H/VLR-H 106, with an FTN set to a third country (i.e., other than roaming partner PMN 120 and host PMN 104 countries) international number, or a fixed or mobile number belonging to a country different from roaming partner PMN 120. In an embodiment of the present invention, host PMN 104 operator selects IMSI of roaming partner PMN 120 (e.g., IMSI-R) that supports CAMEL protocol, since home routing is usually implemented in CAMEL protocol. At step 6002, active signaling module 138 issues a fake ISUP IAM call on the MSISDN-R to GMSC-R 128 with the calling party as A. Signal flow for steps 6004 to 6008 follows the standard MT call flow, where PRN and PRN-ACK messages are exchanged between MSC-HNLR-H 106 and HLR-R 132, whereas an ISUP IAM (MSRN) message is exchanged between MSC-H/VLR-H 106 and GMSC-R 128. Thereafter, MSC-H/VLR-H 106 searches for the mobile station of the simulated inbound roamer using SearchMS operation. Upon detecting a failure to locate the mobile station, MSC-H/VLR-H 106 issues a CAP IDP message on the FTN, set at MSC-H/VLR-H 106 as the third country international number, to GMSC-R 128, at step 6010. Finally at step 6012, MSC-H/VLR-H 106 receives a CAP Connect call on a new number other than the FTN from GMSC-R 128. The new number corresponds to an MSISDN of roaming partner PMN 120, in accordance with an embodiment of the present invention. PI module 102 confirms the presence of the home routing service in roaming partner PMN 120, when monitoring module 136 detects the CAP Connect (new number) call at the roaming links, where the new number belongs to roaming partner PMN 120.

VIP Tracker

Figure 61:
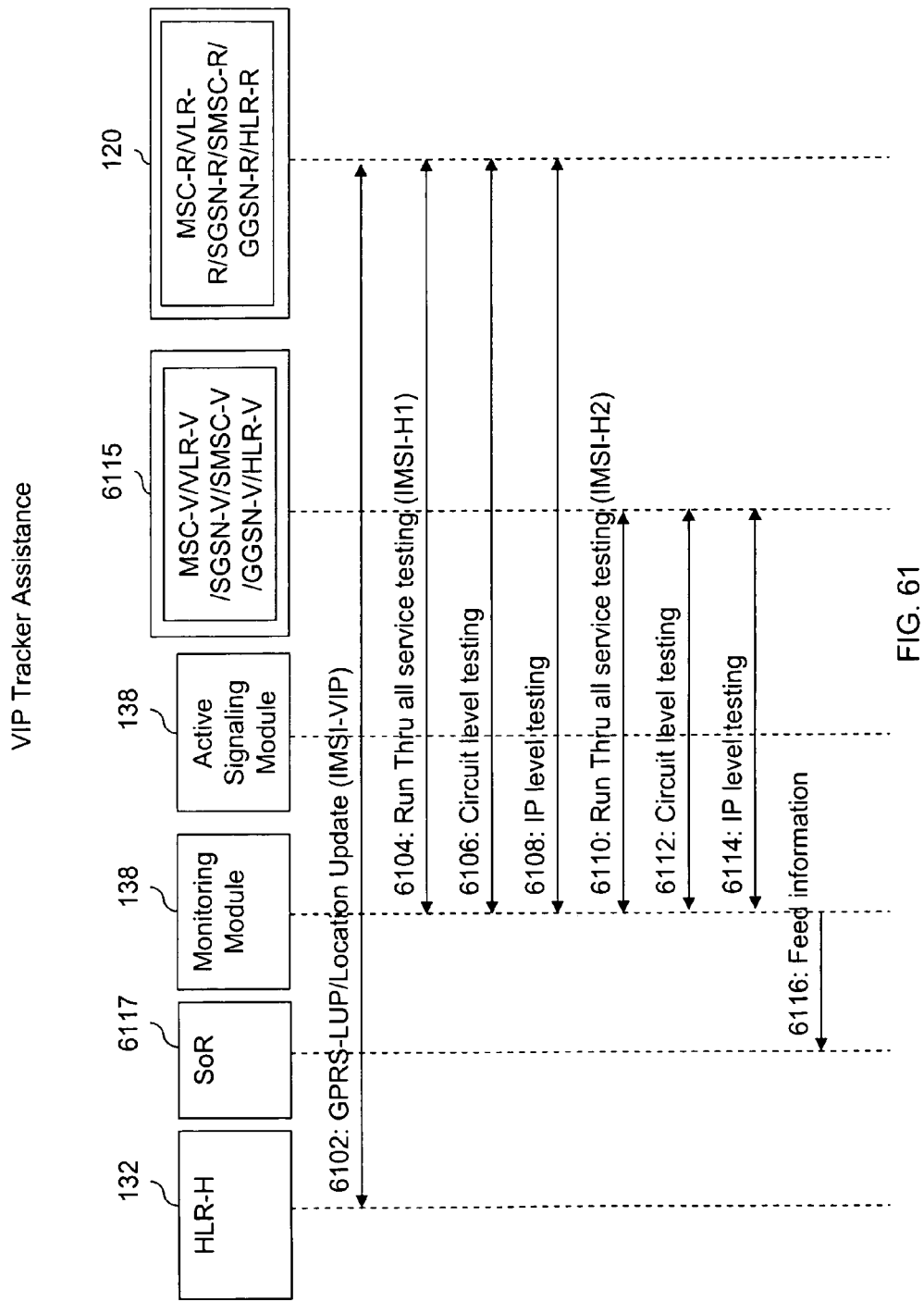
FIG. 61 represents a flow diagram for supporting a Very Important Person (VIP) service for the selected outbound roamers in any roaming partner network, in accordance with an embodiment of the present invention.

Host PMN 104 operator can use PI module 102 to also facilitate the support of VIP services for host PMN 104's selected outbound roamers. FIG. 61 represents a flow diagram for supporting a VIP service for the selected outbound roamers in any roaming partner network, in accordance with an embodiment of the present invention. In this case, those outbound roamers who are VIP subscribers of host PMN 104 are the selected outbound roamers, and they are hereinafter interchangeably referred to as VIP roamers. Rather than waiting for a VIP roamer's service problems to occur and report them at a MSC/VLR location or an SGSN location of a roaming partner network, host PMN 104 operator uses PI module 102 to proactively ensure proper functioning of the VIP roamer's services in all roaming partner networks of the VIP roamer's visited country, even before they are used at these networks. This is achieved by firstly determining the VIP roamer's country and network location by monitoring the roaming links of the VIP roamer. Thus at step 6102, monitoring module 136 detects the exchange of a GSM LUP message or a GPRS LUP message on an IMSI of the VIP roamer (hereinafter referred to as IMSI-VIP) between MSC-R/VLR-R 122 and HLR-H 116, or SGSN-R 124 and HLR-H 116, respectively. PI module 102 obtains MSC-R/VLR-R 122 or SGSN-R 124 as the VIP roamer's network location, and roaming partner PMN 120's country (i.e., from an MCC of the IMSI-VIP) as the VIP roamer's country from the monitored LUP message. It will be apparent to a person skilled in the art that network location and IMSI are usually exchanged during the LUP transaction.

Thereafter, PI module 102 uses the simulated outbound roamers to test various roaming services (e.g., SS, CAMEL, call, data, SMS etc.) in roaming partner PMN 120 first, and then all other networks in the same country. Hence at steps 6104 to 6108, active signaling module 138 performs testing of these roaming services on a first simulated outbound roamer with various network elements (shown in FIG. 1) in roaming partner PMN 120. PI module 102 allots an IMSI of the first simulated outbound roamer (hereinafter referred to as IMSI-H1) to perform testing of roaming services by exchanging signaling such as, but not limited to, SCCP, MAP, ISUP, TN, CAP and IP with the network elements in roaming partner PMN 120. Similarly, at steps 6110 to 6114, active signaling module 138 performs testing of these roaming services on a second simulated outbound roamer (who is allotted an IMSI-H2 by host PMN 104 operator) with various network elements such as an MSC-V/VLR-V, an SGSN-V, an SMSC-V, a GGSN-V and an HLR-V in a visited network 6115. Visited network 6115 can be any competitor network of roaming partner PMN 120 located in roaming partner PMN 120's country. Similar tests can be performed with other visited networks that are located in roaming partner PMN 120's country.

Finally at step 6116, active signaling module 138 aggregates the roaming services' testing results and feeds this information into a SoR module 6117 of host PMN 104. In an embodiment of the present invention, host PMN 104 operator uses SoR module 6117 to perform steering of roaming traffic. For example, SoR module 6117 can be used to retain inbound roamers of host PMN 104 in its own network or to reject outbound roamers of host PMN 104 to register with any competitor network of host PMN 104. In an embodiment of the present invention, host PMN 104 operator uses SoR module 6117 to reject registration attempt of the VIP roamer at a MSC/VLR or an SGSN location of a network 'X', when one or more network elements such as, but not limited to, the MSC/VLR, the SGSN, an SMSC, and an HLR in the network 'X', or the network 'X' itself, is determined with some fault (e.g., detection of absence of CAMEL roaming agreement between host PMN 104 and this network 'X'). Thereafter, SoR module 6117 redirects the roaming traffic of such VIP roamer to an alternative network. For example, in case the VIP roamer attempted to register at visited network 6115, which is determined to lack CAMEL agreement with host PMN 104 (i.e., using testing procedure explained above in conjunction with FIG. 42), SoR module 6117 may direct the VIP roamer's traffic to a problem-free network (i.e., one that has CAMEL agreement with host PMN 104 in this case) like roaming partner PMN 120.

It will be apparent to a person skilled in the art, that the present invention can also be applied to Code Division Multiple Access (CDMA)/American National Standards Institute # 41D (ANSI-41D), and various other technologies such as, but not limited to, VoIP, WiFi, 3GSM and inter-standard roaming. In one exemplary case, a CDMA outbound roamer travels with an HPMN CDMA handset. In another exemplary case, the CDMA outbound roamer travels with an HPMN GSM SIM and a GSM handset. In yet another exemplary case, GSM outbound roamer travels with an HPMN CDMA RUIM and a CDMA handset. To support these variations, gateway 104 and client 106 will have a separate SS7 and network interfaces, corresponding to both the HPMN and FPMN networks. It will also be apparent to a person skilled in the art that these two interfaces in different directions may not have to be the same technologies. Moreover, there could be multiple types of interface in both directions.

An exemplary list of the mapping between GSM MAP and ANSI-41D is described in the table below as a reference.

| GSM MAP | ANSI-41D |
|---|---|
| Location Update/ISD | REGNOT |
| Cancel Location | REGCAN |
| RegisterSS | FEATUREREQUEST |
| InterrogateSS | FEATUREREQUEST |
| SRI-SM | SMSREQ |
| SRI | LOCATION REQUEST |
| ForwardSMS | SMSDPP |
| ReadyForSMS | SMSNOTIFICATION |
| AlertServiceCenter | SMSNOTIFICATION |
| ReportSMSDelivery | SMDPP |
| ProvideRoamingNumber | ROUTING REQUEST |

The present invention provides a predictive intelligence solution for a host network that allows the host network to predict quality of services in roaming, frauds in roaming, roaming services and network capabilities of the host network and the roaming partner networks. Through such intelligence, the hosting operator can more accurately places roamers (e.g. via steering of roaming SoR) at the right network location, and apply the right service profiles at the right network location. For example, for VIP high end roamers, the present invention will help steering them in the functioning networks so revenue usage can be generated. Also, ODB prepaid roamers can be registered with those networks where there are no camel agreements so to ensure there is no revenue loss due to ODB malfunctioning and yet at least generate the prepaid roaming MT revenue. The present invention helps the hosting operator to increase revenue, reduce loss, prevent fraud and improve customer experience and quality.

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

A computer usable medium provided herein includes a computer usable program code, which when executed, enables support of IN services for the outbound roamer of an HPMN by enabling a client that is coupled to the outbound roamer's mobile device based on observation of exchange of one or more parameters with a gateway. The client is enabled upon detecting a successful location update of the outbound roamer in a VPMN and by exchanging encapsulated IN messages with the gateway over one or more bearers. The gateway is deployed in the HPMN. Moreover, the HPMN and the VPMN are unable to support either exchange of IN messages or an IN agreement. The computer program product further includes a computer usable program code for facilitating communication between the client and an HPMN service node, or the client and an HPMN SCP, via the gateway. The gateway facilitates communication by translating the encapsulated IN messages, exchanged with the client, in a protocol that is compatible with either the service node or the SCP. The computer program product further includes a computer usable program code for managing the outbound roamer's IN services using the gateway and one of the HPMN service node and the HPMN SCP, by updating the outbound roamer's one or more traffic control conditions at the client, based on recognition of the exchanged encapsulated IN messages.

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for proactive roaming tests, discoveries of roaming partner services and discoveries of frauds in roaming using simulated roaming traffic. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
| --- | --- |
| 3G | Third generation of mobile |
| ACM | ISUP Address Completion Message |
| ANM | ISUP Answer Message |
| ANSI-41 | American National Standards Institute #41 |
| ATI | Any Time Interrogation |
| BCSM | Basic Call State Model |
| BSC | Base Station Controller |
| BOIC | Barring Outgoing International Calls |
| BOIC-EX-Home | Barring Outgoing International Calls except to home country |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CDR | Call Detail Record |
| CF | Call Forwarding |
| CgPA | Calling Party Address |
| CIC | Circuit Identification Code |
| CLI | Calling Line Identification |
| CSD | Circuit Switched Data |
| CSI | Camel Subscription Information |
| DPC | Destination Point Code |
| DSD | Delete Subscriber Data |
| DTMF | Dual Tone Multi-Frequency |
| ERB | CAP Event Report Basic call state model |
| EU | European Union |
| FPMN | Friendly Public Mobile Network |
| FTN | Forward-To-Number |
| GLR | Gateway Location Register |
| GGSN | Gateway GPRS Support Node |
| GMSC | Gateway MSC |
| GMSC-F | GMSC in FPMN |
| GMSC-H | GMSC in HPMN |
| GPRS | General Packet Radio System |
| GSM | Global System for Mobile |
| GSMA | GSM Association |
| GSM SSF | GSM Service Switching Function |
| GsmSCF | GSM Service Control Function |
| GT | Global Title |
| GTP | GPRS Tunnel Protocol |
| HLR | Home Location Register |
| HPMN | Home Public Mobile Network |
| IN | Intelligent Network |
| IOT | Inter-Operator Tariff |
| GTT | Global Title Translation |
| IAM | Initial Address Message |
| IDP | Initial DP IN/CAP message |
| IDD | International Direct Dial |
| IMSI | International Mobile Subscriber Identity |
| IMSI-H | HPMN IMSI |
| IN | Intelligent Network |
| INAP | Intelligent Network Application Part |
| INE | Interrogating Network Entity |
| IP | Internet Protocol |
| IREG | International Roaming Expert Group |
| IRS | International Revenue Share |
| ISC | International Service Carrier |
| ISD | MAP Insert Subscriber Data |
| ISG | International Signal Gateway |
| IST | Immediate Service Termination |
| ISTP | International STP |
| ISTP-F | ISTP connected to FPMN STP |
| ISTP-H | ISTP connected to HPMN STP |
| ISUP | ISDN User Part |
| ITPT | Inbound Test Profile Initiation |
| ITR | Inbound Traffic Redirection |
| IVR | Interactive Voice Response |

APPENDIX-continued

| Acronym | Description |
| --- | --- |
| LU | Location Update |
| LUP | MAP Location Update |
| MAP | Mobile Application Part |
| MCC | Mobile Country Code |
| MCC | Mobile Country Code |
| MD | Missing Data |
| ME | Mobile Equipment |
| MGT | Mobile Global Title |
| MMS | Multimedia Message Service |
| MMSC | Multimedia Message Service Center |
| MMSC-F | FPMN MMSC |
| MMSC-H | HPMN MMSC |
| MNC | Mobile Network Code |
| MNP | Mobile Number Portability |
| MO | Mobile Originated |
| MOS | Mean Opinion Score |
| MS | Mobile Station |
| MSC | Mobile Switching Center |
| MSISDN | Mobile Station International Subscriber Directory Number |
| MSISDN-F | FPMN MSISDN |
| MSISDN-H | HPMN MSISDN |
| MSRN | Mobile Station Roaming Number |
| MSRN-F | FPMN MSRN |
| MSRN-H | HPMN MSRN |
| MT | Mobile Terminated |
| MTP | Message Transfer Part |
| NDC | National Dialing Code |
| NP | Numbering Plan |
| NPI | Numbering Plan Indicator |
| NRTRDE | Near Real Time Roaming Data Exchange |
| O-CSI | Originating CAMEL Subscription Information |
| OCN | Original Called Number |
| ODB | Operator Determined Barring |
| OPC | Origination Point Code |
| OR | Optimal Routing |
| ORLCF | Optimal Routing for Late Call Forwarding |
| OTA | Over The Air |
| OTPI | Outbound Test Profile Initiation |
| PDP | Protocol Data Packet |
| PDN | Packet Data Network |
| PDU | Packet Data Unit |
| PRN | MAP Provide Roaming Number |
| PSI | MAP Provide Subscriber Information |
| QoS | Quality of Service |
| RAEX | Roaming Agreement EXchange |
| RI | Routing Indicator |
| RIS | Roaming Intelligence System |
| RDN | Redirecting Number |
| RNA | Roaming Not Allowed |
| RR | Roaming Restricted due to unsupported feature |
| RRB | CAP Request Report Basic call state model |
| RSD | Restore Data |
| RTP | Real-Time Transport Protocol |
| SAI | Send Authentication Info |
| SC | Short Code |
| SCA | Smart Call Assistant |
| SCCP | Signal Connection Control part |
| SCP | Signaling Control Point |
| SF | System Failure |
| SG | Signaling Gateway |
| SGSN | Serving GPRS Support Node |
| SGSN-F | FPMN SGSN |
| SIM | Subscriber Identity Module |
| SIGTRAN | Signaling Transport Protocol |
| SME | Short Message Entity |
| SM-RP-UI | Short Message Relay Protocol User Information |
| SMS | Short Message Service |
| SMSC | Short Message Service Center |
| SMSC-F | FPMN SMSC |
| SMSC-H | HPMN SMSC |
| SoR | Steering of Roaming |
| SPC | Signal Point Code |
| SRI | MAP Send Routing Information |
| SRI-SM | MAP Send Routing Information For Short Message |
| SS | Supplementary Services |
| SS7 | Signaling System #7 |
| SSN | Sub System Number |
| SSP | Service Switch Point |

APPENDIX-continued

| Acronym | Description |
| --- | --- |
| STK | SIM Tool Kit Application |
| STP | Signal Transfer Point |
| STP-F | FPMN STP |
| STP-H | HPMN STP |
| TADIG | Transferred Account Data Interchange Group |
| TAP | Transferred Account Procedure |
| TCAP | Transaction Capabilities Application Part |
| VT-CSI | Visited Terminating CAMEL Service Information |
| TP | SMS Transport Protocol |
| TR | Traffic Redirection |
| TS | Traffic Steering |
| TT | Translation Type |
| UD | User Data |
| UDH | User Data Header |
| UDHI | User Data Header Indicator |
| USSD | Unstructured Supplementary Service Data |
| VAS | Value Added Service |
| VIP | Very Important Person |
| VLR | Visited Location Register |
| VLR-F | FPMN VLR |
| VLR-H | HPMN VLR |
| VLR-V | VPMN VLR |
| VMSC | Visited Mobile Switching Center |
| VoIP | Voice over IP |
| VPMN | Visited Public Mobile Network |
| ATI | Access Transport Information |
| UDV | Unexpected Data Value |
| USI | User Service Information |
| WAP | Wireless Access Protocol |

TECHNICAL REFERENCES, EACH OF WHICH IS INCORPORATED BY REFERENCE HEREIN

GSM 902 on MAP specification
Digital cellular telecommunications system (Phase 2+);
Mobile Application Part (MAP) Specification
(3GPP TS 09.02 version 7.9.0 Release 1998)
GSM 378 CAMEL Architecture, Release 1998
GSM 978 CAMEL Application Protocol, Release 1998
GSM 340 on SMS
Digital cellular telecommunications system (Phase 2+);
Technical realization of the Short Message Service (SMS);
(GSM 03.40 version 7.4.0 Release 1998)
Q1214-Q1218 on Intelligent Networks
Q701-704 on SS7 MTP
Q711-Q714 on SS7 SCCP
TD.35 NRTRDE Format for Fraud information
FF.18 NRTRDE Business Requirements
ETSI CS domain charging documents: TS 12.05, TS 32.005, TS 32.205, TS 32.298
ETSI PS domain charging documents: TS 12.15, TS 32.015, TS 32.215, TS 32.298
ETS 300 374-1 Intelligent Network (IN); Intelligent Network Capability Set I (CSI); Core Intelligent Network Application Protocol (INAP); Part 1: Protocol specification
EN 301 140-1 Intelligent Network (IN); Intelligent Network Application Protocol (INAP); Capability Set 2 (CS2); Part 1: Protocol specification
Jiang DCG 2005 Dynamic originating CAMEL approach for Implementing Call Control Services for Inbound Roamers, U.S. Provisional Patent Application Ser. No. 60/679,444;
Jiang 2005 Anti-Steering Patent Filing
Jiang 2005 Anti-Anti-Steering, Patent filing
Jiang 2005 Inbound Traffic Steering, Patent filing
Jiang 2005 Anti-inbound traffic steering from HPMN and VPMN, Patent filing
Jiang et al 2003 [TR 2003] Cellular Network Traffic Redirection
David Gillot, John Jiang, [RIS 2007] Roaming Intelligence System
David Gillot and John Jiang [RTRDE 2007] Real time roaming data exchange
John Jiang [PI 2007] A single operator and network side solution for inbound and outbound roaming tests and discoveries of roaming partner services and frauds without involving remote probes or real roamer traffic—Phase 1
GSM 379 on CAMEL Support of Optimal Routing (SOR)
GSM 318 Basic Call Handling
GSM 23018 Basic Call Handling
GSM 23081 Line identification service
GSM 23116 Super Charger Function
ITU-T Recommendation Q.1214 (1995), Distributed functional plane for intelligent network CS-1;
ITU-T Recommendation Q.1218 (1995), Interface Recommendation for intelligent network CS-1;
ITU-T Recommendation Q.762 (1999), Signaling system No. 7—ISDN user part general functions of messages and signals;
ITU-T Recommendation Q.763 (1999), Signaling system No. 7—ISDN user part formats and codes;
ITU-T Recommendation Q.764 (1999), Signaling system No. 7—ISDN user part signaling procedures;
ITU-T Recommendation Q.766 (1993), Performance objectives in the integrated services digital network application;
ITU-T Recommendation Q.765 (1998), Signaling system No. 7—Application transport mechanism;
ITU-T Recommendation Q.769.1 (1999), Signaling system No. 7—ISDN user part enhancements for the support of Number Portability
BA 19 GSMA RAEX on AA 14 and IR 21
FF 17 International Revenue Share Fraud

I claim:

1. A method for facilitating roaming tests for a host network having an associated gateway and a roaming partner network, wherein the host network and the roaming partner network respectively correspond to a Home Public Mobile Network (HPMN) and a Visited Public Mobile Network (VPMN), and wherein a Mobile Switching Center/Visiting Location Register (MSC/VLR), a first network element and a second network element are each associated with at least one of the host network and the roaming partner network, the method comprising:
creating, via the gateway, a fake profile for a roaming subscriber at the MSC/VLR, the roaming subscriber being associated with the host network and the roaming partner network;
simulating, via the gateway, a transaction with the first network element; and
testing, via the gateway, the first element's response to the simulated transaction, and network routing of the roaming subscriber from the first network element to the second network element;
wherein the fake profile is one selected from the group consisting of Supplementary Services (SS) profile, Operator Determined Barring (ODB) profile, Customized Application for Mobile Enhancement Logic (CAMEL) profile and General Packet Radio Service (GPRS) profile.

2. The method of claim 1, wherein creating the fake profile further comprises:
exchanging, via the gateway, one or more signaling messages with at least one of a Home Location Register (HLR) and the MSC/VLR.

3. The method of claim 2, further comprising:
modifying the fake profile at the MSC/VLR.

4. The method of claim 1, wherein the roaming subscriber is one of an outbound roaming subscriber and an inbound roaming subscriber, each having a test International Mobile Subscriber Identity (IMSI) associated with one of the host network and the roaming partner network.

5. The method of claim 1, wherein the simulated transaction is one selected from a group consisting of ISDN User Part (ISUP) traffic, Transaction Capabilities (TCAP) traffic and packet data traffic.

6. The method of claim 1, wherein the roaming tests include at least one selected from a group consisting of a Mobile Terminated (MT) call, a Mobile Originated (MO) call, termination of an on-going call, MO call barring, an MT Short Message Service (SMS), an MO SMS, SMS interworking, authentication for the roaming subscriber, an Unstructured Supplementary Service Data (USSD) service, a GPRS service, a CAMEL MO call, a CAMEL MT call, CAMEL default handling, Provide Subscriber Information (PSI) and Provide Subscriber Location (PSL) paging support, route testing, voice quality, location management, call setup duration, Originally Called Number (OCN)/Redirecting Number (RDN) transparency, last leg of international carrier used for MT calls from the roaming partner network, fake answer fraud, Dual Tone Multi-Frequency (DTMF) transparency and Voice Quality of Service (QoS), detecting SIMBox fraud, detecting Off-net SIMBox, detecting On-net SIMBox, detecting a Gateway Location Register (GLR), detecting inbound roaming traffic management, detecting an optimal routing service, detecting Steering of Roaming (SoR) mechanism, detecting optimal routing of late call forwarding, detecting roaming agreements, detecting roaming service extension, detecting a Dual IMSI service, detecting a Short Code (SC)/Smart Call Assistant (SCA) service, detecting a node, detecting restricted international dialing, detecting home routing, and detecting a Very Important Person (VIP) service.

7. The method of claim 6, wherein testing of the MT call further comprises:
obtaining, via the gateway, one of the roaming subscriber's Mobile Station Routing Number (MSRN) and the roaming subscriber's Mobile Station International Subscriber Directory Number (MSISDN);
initiating, via the gateway, the MT call to one of the first network element and the MSC/VLR; and
detecting, at the gateway, a release message in response to the initiated MT call, wherein detection of the release message indicates successful testing of the MT call.

8. The method of claim 6, wherein testing of the MO call further comprises:
obtaining, via the gateway, one of the roaming subscriber's MSRN and the roaming subscriber's MSISDN;
initiating, via the gateway, the MT call to one of the MSC/VLR and the first network element; and
detecting, at the gateway, one of a forwarded call and an answer message in response to the initiated MT call, wherein detection of the forwarded call and the answer message indicate successful testing of the MO call.

9. The method of claim 6, wherein testing of the termination of the on-going call further comprises:
obtaining, via the gateway, one of the roaming subscriber's MSISDN and the roaming subscriber's MSRN;
initiating, via the gateway, the MT call to one of the MSC/VLR and the first network element;
detecting, at the gateway, a forwarded call in response to the initiated MT call;
answering the forwarded call via the gateway; and
terminating, via the gateway, the answered forwarded call by exchanging one selected from a group consisting of a Cancel-Location message, an ISD message, a DSD message and an Immediate Service Termination (IST) message with the MSC/VLR.

10. The method of claim 6, wherein testing barring of the MO call further comprises:
obtaining, via the gateway, one of the roaming subscriber's MSRN and the roaming subscriber's MSISDN;
initiating, via the gateway, the MT call to one of the first network element and the MSC/VLR; and
detecting, at the gateway, one selected from a group consisting of a release message, a forwarded call and an answer message, wherein detection of the release message, the forwarded call and the answer message indicate successful testing of the MO call barring.

11. The method of claim 6, wherein testing of the MT SMS further comprises:
obtaining, via the gateway, at least one of the roaming subscriber's MSRN and the roaming subscriber's MSISDN;
initiating, via the gateway, the MT SMS to one of the MSC/VLR and the first network element; and
detecting, at the gateway, an error message indicating absence of the roaming subscriber in response to the MT SMS, wherein detection of the error message indicates successful testing of the MT SMS.

12. The method of claim 6, wherein testing of the MO SMS and the SMS interworking further comprises:
obtaining, via the gateway, at least one of the roaming subscriber's MSRN and the roaming subscriber's MSISDN;
initiating, via the gateway, the MT SMS to one of the MSC/VLR and the first network element; and
detecting, at the gateway, one of an error message and a success message in response to the initiated MT SMS, wherein detection of the error message and the success message indicate successful testing of the MO SMS and the SMS interworking.

13. The method of claim 6, wherein testing the authentication for the roaming subscriber further comprises:
detecting, at the gateway, exchange of one or more authentication messages between the MSC/VLR and the first network element, wherein detection of the authentication messages indicate successful testing of the authentication for the roaming subscriber.

14. The method of claim 6, wherein testing of the USSD service further comprises:
obtaining, via the gateway, one of the roaming subscriber's MSRN and the roaming subscriber's MSISDN;
initiating, via the gateway, one of an USSD request and an USSD notification to the MSC/VLR; and
detecting, at the gateway, one of an USSD acknowledgement message in response to the USSD request and USSD data in response to the USSD notification, wherein detection of the USSD acknowledgement message and the USSD data indicate successful testing of the USSD service.

15. The method of claim 6, wherein testing of the GPRS service further comprises:
testing of an MT SMS over GPRS;
testing of an MO SMS over GPRS;
testing GPRS-based Signalling Connection Control Part (SCCP) routing; and
testing Internet Protocol (IP) routing.

16. The method of claim 6, wherein testing of the CAMEL MO call further comprises:

obtaining, via the gateway, one of the roaming subscriber's MSRN and the roaming subscriber's MSISDN;

initiating, via the gateway, the MT call to one of the MSC/VLR and the first network element; and detecting a forwarded call at the gateway, wherein detection of the forwarded call indicates successful testing of the CAMEL MO call.

17. The method of claim 6, wherein testing of the CAMEL MT call further comprises:

obtaining, via the gateway, one of the roaming subscriber's MSRN and the roaming subscriber's MSISDN;

initiating, via the gateway, the MT call to one of the first network element and the MSC/VLR; and detecting, at the gateway, a release message in response to the initiated MT call, wherein detection of the release message indicates successful testing of the CAMEL MT call.

18. The method of claim 6, wherein the testing of the default call handling further comprises:

initiating, via the gateway, the MT SMS to the MSC/VLR;

initiating, via the gateway, a continue SMS upon receiving an IDP message from the MSC/VLR; and detecting, at the gateway, an indication of absence of the roaming subscriber in an acknowledgement message for the MT SMS, wherein detection of the absent roaming subscriber indicates successful testing of the CAMEL default handling.

19. The method of claim 6, wherein testing the PSI and the PSL paging support further comprises:

issuing, via the gateway, one of a PSI message and a PSL message to the MSC/VLR; and detecting, at the gateway, an indication of absence of the roaming subscriber in response to one of the PSI message and the PSL message, wherein detection of the absent roaming subscriber indicates a successful testing of the PSI and the PSL paging support.

20. The method of claim 6, wherein route testing further comprises:

initiating, via the gateway, a call to the first network element using one of a carrier selection parameter in the call and a special prefix.

21. The method of claim 6, wherein testing of the voice quality further comprises:

receiving, at the gateway, one or more samples of the MT call on a first port;

playing, via the gateway, an original sample of the MO call on a second port; and comparing, at the gateway, the original sample with the one or more samples of the MT call so as to test the voice quality.

22. The method of claim 6, wherein testing of the location management for the roaming subscriber further comprises:

sending, via the gateway, a LUP message to the first network element with a CgPA as one of: an address of the gateway and an address of the MSC/VLR; and detecting, at the gateway, an ISD message in response to the LUP message, wherein detection of the ISD message indicates successful testing of the location management.

23. The method of claim 6, wherein detecting the GLR further comprises:

sending, via the gateway, a PRN message to the MSC/VLR of the roaming subscriber;

recording, at the gateway, a CgPA of a PRN-ACK message received from the MSC/VLR; and correlating, at the gateway, a CgPA of a received RestoreData message and the CgPA of the PRN-ACK message, wherein a difference in the CgPAs indicates presence of the GLR in the roaming partner network.

24. The method of claim 6, wherein detecting the GLR further comprises:

sending, via the gateway, a PRN message to the MSC/VLR of the roaming subscriber;

receiving a PRN-ACK message from the MSC/VLR at the gateway; and determining, via the gateway, presence of the GLR in the roaming partner network, upon a failure to detect a RestoreData message at the gateway after a pre-defined time interval.

25. The method of claim 6, wherein detecting the inbound roaming traffic management further comprises:

initiating, via the gateway, a cancel-location message for the roaming subscriber to the MSC/VLR, wherein the roaming subscriber is a subscriber of the host network and is registered with the roaming partner network;

detecting, at the gateway, a LUP attempt from the roaming subscriber, wherein the LUP attempt indicates steering of the roaming subscriber's traffic towards the roaming partner network; and rejecting the roaming subscriber's LUP attempt so as to restrict the roaming subscriber from registering with the roaming partner network.

26. The method of claim 6, wherein detecting the SoR mechanism further comprises:

initiating, via the gateway, a fake Location Update (LUP) of the roaming subscriber at the first network element; and determining, at the gateway, the SoR by the roaming partner network in response to the fake LUP based on a LUP rejection message.

27. The method of claim 6, wherein detecting the roaming agreements further comprises:

issuing, via the gateway, a LUP message to the first network element for determining support of one of: a CAMEL service, a 3G roaming service, a GSM roaming service and a GPRS roaming service between the host network and the roaming partner network; and detecting, at the gateway, a receipt of profile in response to the LUP message, the profile is one of: CAMEL profile, 3G profile, GSM profile and GPRS profile, wherein detection of the profile receipt indicates detection of existing roaming agreements between the host network and the roaming partner network.

28. The method of claim 6, wherein detecting the restricted international dialing further comprises:

initiating, via the gateway, a call to the MSC/VLR where a simulated outbound roaming profile is created with an IRS fraud number; and detecting, at the gateway, one of a release message indicating presence of an IRS service, and an ACM/ANM message indicating absence of the IRS service.

29. A method for facilitating roaming tests for a host network having an associated gateway, a Mobile Switching Center/Visiting Location Register (MSC/VLR), a first network element and a second network element, wherein the host network corresponds to one of a Home Public Mobile Network (HPMN) and a Visited Public Mobile Network (VPMN), the method comprising:

creating, via the gateway, a fake profile for a roaming subscriber at the MSC/VLR, the roaming subscriber being associated with the host network;

simulating, via the gateway, a transaction with the first network element; and testing, via the gateway, the first element's response to the simulated transaction, and network routing of the roaming subscriber from the first network element to the second network element;

wherein the fake profile is one selected from the group consisting of Supplementary Services (SS) profile, Operator Determined Barring (ODB) profile, Customized Application for Mobile Enhancement Logic (CAMEL) profile and General Packet Radio Service (GPRS) profile.

30. A system for facilitating roaming tests for a host network having a roaming partner network, wherein the host network and the roaming partner network respectively correspond to a Home Public Mobile Network (HPMN) and a Visited Public Mobile Network (VPMN), and wherein a Mobile Switching Center/Visiting Location Register (MSC/VLR), a first network element and a second network element are each associated with at least one of the host network and the roaming partner network, the system comprising:

a gateway associated with the host network for creating a fake profile of a roaming subscriber at the MSC/VLR, the roaming subscriber being associated with the host network and the roaming partner network;

a simulation module for simulating a transaction with the first network element; and a testing module for testing the first element's response to the simulated transaction, and network routing of the roaming subscriber from the first network element to the second network element;

wherein the fake profile is one selected from the group consisting of Supplementary Services (SS) profile, Operator Determined Barring (ODB) profile, Customized Application for Mobile Enhancement Logic (CAMEL) profile and General Packet Radio Service (GPRS) profile.

31. The system of claim 30, wherein the gateway further comprises:

a monitoring module for monitoring roaming signaling and IP links.

32. The system of claim 30, wherein the gateway further comprises an active signaling module for exchanging all signaling messages with at least one selected from of the first network element, the second network element and the MSC/VLR.

33. A computer program product comprising a non-transitory computer usable medium having computer readable program code stored thereon for facilitating roaming tests for a host network having an associated gateway and a roaming partner network, wherein the host network and the roaming partner network respectively correspond to a Home Public Mobile Network (HPMN) and a Visited Public Mobile Network (VPMN), and wherein a Mobile Switching Center/Visiting Location Register (MSC/VLR), a first network element and a second network element are each associated with at least one of the host network and the roaming partner network, computer program product comprising:

first computer readable program code means for creating, via the gateway, a fake profile for a roaming subscriber at the MSC/VLR, the roaming subscriber being associated with the host network and the roaming partner network;

second computer readable program code means for simulating, via the gateway, a transaction with the first network element; and third computer readable program code means for testing, via the gateway, the first element's response to the simulated transaction, and network routing of the roaming subscriber from the first network element to the second network element;

wherein the fake profile is one selected from the group consisting of Supplementary Services (SS) profile, Operator Determined Barring (ODB) profile, Customized Application for Mobile Enhancement Logic (CAMEL) profile and General Packet Radio Service (GPRS) profile.

* * * * *